US011301130B2

(12) United States Patent
Ko et al.

(10) Patent No.: US 11,301,130 B2
(45) Date of Patent: Apr. 12, 2022

(54) RESTRICTED OPERATION OF AN ELECTRONIC DEVICE

(71) Applicant: Apple Inc., Cupertino, CA (US)

(72) Inventors: Heena Ko, San Francisco, CA (US); Tyler Hawkins, Sunnyvale, CA (US); Catherine Lee, San Francisco, CA (US); Reed E. Olsen, San Jose, CA (US); Jennifer D. Patton, Cupertino, CA (US); Paul Salzman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/867,002

(22) Filed: May 5, 2020

(65) Prior Publication Data
US 2020/0356252 A1    Nov. 12, 2020

Related U.S. Application Data

(60) Provisional application No. 62/856,032, filed on Jun. 1, 2019, provisional application No. 62/843,788, filed on May 6, 2019.

(51) Int. Cl.
| | |
|---|---|
| G06F 1/16 | (2006.01) |
| G06F 3/04883 | (2022.01) |
| G06F 3/0354 | (2013.01) |
| G06F 3/041 | (2006.01) |
| G06F 3/04817 | (2022.01) |
| G06F 3/04842 | (2022.01) |
| G06F 9/451 | (2018.01) |
| G04G 9/00 | (2006.01) |

(Continued)

(52) U.S. Cl.
CPC ....... *G06F 3/04883* (2013.01); *G04G 9/0064* (2013.01); *G04G 21/04* (2013.01); *G04G 21/08* (2013.01); *G06F 1/163* (2013.01); *G06F 3/03547* (2013.01); *G06F 3/0414* (2013.01); *G06F 3/04817* (2013.01); *G06F 3/04842* (2013.01); *G06F 9/451* (2018.02); *G06F 21/629* (2013.01)

(58) Field of Classification Search
CPC combination set(s) only.
See application file for complete search history.

(56) References Cited

U.S. PATENT DOCUMENTS

| | | |
|---|---|---|
| 3,148,500 A | 9/1964 | Thomas |
| 4,205,628 A | 6/1980 | Null |

(Continued)

FOREIGN PATENT DOCUMENTS

| | | |
|---|---|---|
| AU | 2010249319 A1 | 6/2012 |
| AU | 2015101019 A4 | 9/2015 |

(Continued)

OTHER PUBLICATIONS

Applicant-Initiated Interview Summary received for U.S. Appl. No. 16/997,588, dated Jan. 29, 2021, 3 pages.

(Continued)

*Primary Examiner* — Hien L Duong
(74) *Attorney, Agent, or Firm* — Dentons US LLP

(57) ABSTRACT

An electronic device changes the current user interface of a respective type of user interface from a first user interface to a second user interface. An individual uses their personal device to set up and configure a device for another user.

48 Claims, 62 Drawing Sheets

(51) Int. Cl.
  *G04G 21/04*  (2013.01)
  *G04G 21/08*  (2010.01)
  *G06F 21/62*  (2013.01)

(56) References Cited

U.S. PATENT DOCUMENTS

| | | | |
|---|---|---|---|
| 4,803,487 A | 2/1989 | Willard et al. | |
| 4,847,819 A | 7/1989 | Hong | |
| 4,945,521 A | 7/1990 | Klaus | |
| 5,124,959 A | 6/1992 | Yamazaki et al. | |
| 5,208,790 A | 5/1993 | Sato et al. | |
| 5,220,541 A | 6/1993 | Vuilleumier | |
| 5,455,808 A | 10/1995 | Grupp et al. | |
| 5,500,835 A | 3/1996 | Born | |
| 5,508,979 A | 4/1996 | Eisenegger | |
| 5,617,031 A | 4/1997 | Tuttle | |
| 5,659,693 A | 8/1997 | Hansen et al. | |
| 5,793,366 A | 8/1998 | Mano et al. | |
| 5,825,353 A | 10/1998 | Will | |
| 5,845,257 A | 12/1998 | Fu et al. | |
| 5,853,327 A | 12/1998 | Gilboa | |
| 5,892,519 A | 4/1999 | Hirai et al. | |
| 5,986,655 A | 11/1999 | Chiu et al. | |
| 5,999,195 A | 12/1999 | Santangeli | |
| 6,043,818 A | 3/2000 | Nakano et al. | |
| 6,084,598 A | 7/2000 | Chekerylla | |
| 6,128,012 A | 10/2000 | Seidensticker et al. | |
| 6,160,767 A | 12/2000 | Ho | |
| 6,167,353 A | 12/2000 | Piernot et al. | |
| 6,190,174 B1 | 2/2001 | Lam et al. | |
| 6,279,018 B1 | 8/2001 | Kudrolli et al. | |
| 6,359,837 B1 | 3/2002 | Tsukamoto | |
| 6,359,839 B1 | 3/2002 | Schenk et al. | |
| 6,429,896 B1 | 8/2002 | Aruga et al. | |
| 6,441,824 B2 | 8/2002 | Hertzfeld et al. | |
| 6,449,219 B1 | 9/2002 | Hepp et al. | |
| 6,452,597 B1 | 9/2002 | Goldberg et al. | |
| 6,477,117 B1 | 11/2002 | Narayanaswami et al. | |
| 6,496,780 B1 | 12/2002 | Harris et al. | |
| 6,522,347 B1 | 2/2003 | Sakai et al. | |
| 6,525,997 B1 | 2/2003 | Narayanaswami et al. | |
| 6,539,243 B1 | 3/2003 | Kimura et al. | |
| 6,539,343 B2 | 3/2003 | Zhao et al. | |
| 6,549,218 B1 | 4/2003 | Gershony et al. | |
| 6,556,222 B1 | 4/2003 | Narayanaswami | |
| 6,690,623 B1 | 2/2004 | Maano | |
| 6,728,533 B2 | 4/2004 | Ishii et al. | |
| 6,809,724 B1 | 10/2004 | Shiraishi et al. | |
| 6,809,759 B1 | 10/2004 | Chiang | |
| 6,819,867 B2 | 11/2004 | Mayer et al. | |
| 6,871,076 B2 | 3/2005 | Samn et al. | |
| 6,889,138 B1 | 5/2005 | Krull et al. | |
| 7,203,380 B2 | 4/2007 | Chiu et al. | |
| 7,257,254 B2 | 8/2007 | Tunney et al. | |
| 7,302,650 B1 | 11/2007 | Allyn et al. | |
| 7,378,954 B2 | 5/2008 | Wendt et al. | |
| 7,463,304 B2 | 12/2008 | Murray | |
| 7,479,949 B2 | 1/2009 | Jobs et al. | |
| 7,515,509 B2 | 4/2009 | Klein et al. | |
| 7,515,903 B1 | 4/2009 | Cast | |
| 7,619,615 B1 | 11/2009 | Donoghue et al. | |
| 7,637,204 B2 | 12/2009 | Sumser et al. | |
| 7,653,883 B2 | 1/2010 | Hotelling et al. | |
| 7,656,393 B2 | 2/2010 | King et al. | |
| 7,751,285 B1 | 7/2010 | Cain et al. | |
| 7,773,460 B2 | 8/2010 | Holt | |
| 7,843,471 B2 | 11/2010 | Doan et al. | |
| 7,843,769 B2 | 11/2010 | Ishida et al. | |
| 7,898,542 B1 | 3/2011 | Yu et al. | |
| 7,905,815 B2 | 3/2011 | Ellis et al. | |
| 7,907,476 B2 | 3/2011 | Lee | |
| 8,189,087 B2 | 5/2012 | Misawa et al. | |
| 8,196,043 B2 | 6/2012 | Crow et al. | |
| 8,238,876 B2 | 8/2012 | Teng et al. | |
| 8,245,143 B2 | 8/2012 | Yach et al. | |
| 8,364,855 B2 | 1/2013 | James et al. | |
| 8,405,663 B2 | 3/2013 | Wikkerink et al. | |
| 8,462,997 B2 | 6/2013 | Soldan et al. | |
| 8,595,649 B2 | 11/2013 | Sherrard et al. | |
| 8,624,836 B1 | 1/2014 | Miller et al. | |
| 8,675,084 B2 | 3/2014 | Bolton et al. | |
| 8,725,842 B1 | 5/2014 | Al-Nasser | |
| 8,742,890 B2 | 6/2014 | Gocho et al. | |
| 8,762,895 B2 | 6/2014 | Mehta et al. | |
| 8,847,903 B2 | 9/2014 | Stokes et al. | |
| 8,854,925 B1 | 10/2014 | Lee et al. | |
| 8,894,462 B2 | 11/2014 | Huang et al. | |
| 8,924,894 B1 | 12/2014 | Yaksick et al. | |
| 8,938,394 B1 | 1/2015 | Faaborg et al. | |
| 8,948,819 B2 | 2/2015 | Yun et al. | |
| 8,963,894 B2 | 2/2015 | Klassen et al. | |
| 8,983,539 B1 | 3/2015 | Kim et al. | |
| 9,070,092 B2 | 6/2015 | Shieh et al. | |
| 9,082,314 B2 | 7/2015 | Tsai | |
| 9,141,270 B1 | 9/2015 | Stuart et al. | |
| 9,146,124 B2 | 9/2015 | Parada et al. | |
| 9,152,211 B2 | 10/2015 | Gunn et al. | |
| 9,152,212 B2 | 10/2015 | Gunn | |
| 9,171,268 B1 * | 10/2015 | Penilla | B60L 53/305 |
| 9,172,866 B2 | 10/2015 | Ito et al. | |
| 9,173,052 B2 | 10/2015 | Hauser et al. | |
| 9,197,738 B2 | 11/2015 | Peev et al. | |
| 9,237,855 B2 | 1/2016 | Hong et al. | |
| 9,239,605 B1 | 1/2016 | Nanda et al. | |
| 9,259,615 B2 | 2/2016 | Weast et al. | |
| 9,369,537 B1 | 6/2016 | Mathew et al. | |
| 9,405,766 B2 | 8/2016 | Robbin et al. | |
| 9,423,868 B2 | 8/2016 | Iwasaki | |
| 9,451,144 B2 | 9/2016 | Dye | |
| 9,459,781 B2 | 10/2016 | Kocienda et al. | |
| 9,544,563 B1 | 1/2017 | Cheng et al. | |
| 9,547,419 B2 | 1/2017 | Yang et al. | |
| 9,547,425 B2 | 1/2017 | Kocienda et al. | |
| 9,568,891 B2 | 2/2017 | Adams et al. | |
| 9,574,896 B2 | 2/2017 | McGavran et al. | |
| 9,582,165 B2 | 2/2017 | Wilson et al. | |
| 9,594,354 B1 * | 3/2017 | Kahn | A61B 5/742 |
| 9,600,178 B2 | 3/2017 | Yun et al. | |
| 9,606,695 B2 | 3/2017 | Matas | |
| 9,628,950 B1 | 4/2017 | Noeth et al. | |
| 9,652,741 B2 | 5/2017 | Goldberg et al. | |
| 9,753,436 B2 | 9/2017 | Ely et al. | |
| 9,794,397 B2 | 10/2017 | Min et al. | |
| 9,820,323 B1 | 11/2017 | Young et al. | |
| 9,832,697 B2 | 11/2017 | Kotecha et al. | |
| 9,892,715 B2 | 2/2018 | Komulainen et al. | |
| 9,942,463 B2 | 4/2018 | Kuo et al. | |
| 9,973,674 B2 | 5/2018 | Dye et al. | |
| 10,019,599 B1 | 7/2018 | Moran et al. | |
| 10,062,133 B1 | 8/2018 | Mishra et al. | |
| 10,135,905 B2 | 11/2018 | Chaudhri et al. | |
| 10,182,138 B2 | 1/2019 | Motika et al. | |
| 10,216,392 B2 | 2/2019 | Zhao | |
| 10,299,300 B1 | 5/2019 | Young | |
| 10,304,347 B2 | 5/2019 | Wilson et al. | |
| 10,324,590 B2 | 6/2019 | Yang et al. | |
| 10,356,070 B2 * | 7/2019 | Cha | H04W 12/04 |
| 10,466,881 B2 | 11/2019 | Sasaki et al. | |
| 10,489,508 B2 | 11/2019 | Zhai et al. | |
| 10,524,300 B2 | 12/2019 | Ueda et al. | |
| 10,620,590 B1 | 4/2020 | Guzman et al. | |
| 10,643,246 B1 * | 5/2020 | Suprasadachandran Pillai | G06Q 30/0269 |
| 10,684,592 B2 | 6/2020 | Chang et al. | |
| 10,721,711 B2 * | 7/2020 | Kirov | H04W 68/005 |
| 10,788,797 B1 | 9/2020 | Guzman et al. | |
| 10,817,981 B1 | 10/2020 | Belkin | |
| 10,852,905 B1 | 12/2020 | Guzman et al. | |
| 10,878,782 B1 | 12/2020 | Guzman et al. | |
| 10,908,559 B1 | 2/2021 | Guzman et al. | |
| 10,936,345 B1 | 3/2021 | Guzman et al. | |
| 11,050,873 B2 * | 6/2021 | Kim | G08C 17/02 |
| 11,061,372 B1 | 7/2021 | Chen et al. | |
| 2001/0030597 A1 | 10/2001 | Inoue et al. | |

(56) References Cited

U.S. PATENT DOCUMENTS

| | | |
|---|---|---|
| 2001/0031622 A1 | 10/2001 | Kivela et al. |
| 2002/0054066 A1 | 5/2002 | Kikinis et al. |
| 2002/0054541 A1 | 5/2002 | Hall et al. |
| 2002/0059623 A1 | 5/2002 | Rodriguez et al. |
| 2002/0068600 A1 | 6/2002 | Chihara et al. |
| 2002/0081976 A1 | 6/2002 | Fujisawa et al. |
| 2002/0131331 A1 | 9/2002 | Molander et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0002391 A1 | 1/2003 | Biggs et al. |
| 2003/0025802 A1 | 2/2003 | Mayer, Jr. et al. |
| 2003/0027621 A1 | 2/2003 | Libby et al. |
| 2003/0067497 A1 | 4/2003 | Pichon et al. |
| 2003/0128237 A1 | 7/2003 | Sakai |
| 2003/0151982 A1 | 8/2003 | Brewer et al. |
| 2003/0164847 A1 | 9/2003 | Zaima et al. |
| 2003/0171984 A1 | 9/2003 | Wodka et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0044953 A1 | 3/2004 | Watkins et al. |
| 2004/0047244 A1 | 3/2004 | Tino et al. |
| 2004/0066710 A1 | 4/2004 | Yuen et al. |
| 2004/0075700 A1 | 4/2004 | Liu et al. |
| 2004/0100389 A1 | 5/2004 | Naito et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0117601 A1 | 6/2005 | Anderson et al. |
| 2005/0134695 A1 | 6/2005 | Deshpande et al. |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0198319 A1 | 9/2005 | Chan et al. |
| 2005/0200611 A1 | 9/2005 | Goto et al. |
| 2005/0237194 A1 | 10/2005 | VoBa et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0035628 A1 | 2/2006 | Miller et al. |
| 2006/0079973 A1 | 4/2006 | Bacharach et al. |
| 2006/0085765 A1 | 4/2006 | Peterson et al. |
| 2006/0092770 A1 | 5/2006 | Demas |
| 2006/0135064 A1 | 6/2006 | Cho et al. |
| 2006/0166708 A1 | 7/2006 | Kim et al. |
| 2006/0214935 A1 | 9/2006 | Boyd et al. |
| 2006/0217104 A1 | 9/2006 | Cho |
| 2007/0004451 A1 | 1/2007 | Anderson |
| 2007/0006096 A1 | 1/2007 | Kim et al. |
| 2007/0021153 A1 | 1/2007 | Novak |
| 2007/0025711 A1 | 2/2007 | Marcus et al. |
| 2007/0040810 A1 | 2/2007 | Dowe et al. |
| 2007/0052851 A1 | 3/2007 | Ochs et al. |
| 2007/0055947 A1 | 3/2007 | Qstojic et al. |
| 2007/0057775 A1 | 3/2007 | O'Reilly et al. |
| 2007/0094330 A1 | 4/2007 | Russell et al. |
| 2007/0096283 A1 | 5/2007 | Ljung et al. |
| 2007/0101279 A1 | 5/2007 | Chaudhri et al. |
| 2007/0109417 A1 | 5/2007 | Hyttfors et al. |
| 2007/0113181 A1 | 5/2007 | Blattner et al. |
| 2007/0143495 A1 | 6/2007 | Porat |
| 2007/0146344 A1 | 6/2007 | Martin et al. |
| 2007/0165103 A1 | 7/2007 | Arima et al. |
| 2007/0191008 A1 | 8/2007 | Bucher et al. |
| 2007/0211042 A1 | 9/2007 | Kim et al. |
| 2007/0213955 A1 | 9/2007 | Ishida et al. |
| 2007/0236475 A1 | 10/2007 | Wherry |
| 2007/0239754 A1 | 10/2007 | Schnitman et al. |
| 2007/0254640 A1 | 11/2007 | Bliss |
| 2007/0259654 A1 | 11/2007 | Oijer |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0004113 A1 | 1/2008 | Avery et al. |
| 2008/0071885 A1 | 3/2008 | Hardy et al. |
| 2008/0077673 A1 | 3/2008 | Thomas et al. |
| 2008/0082930 A1 | 4/2008 | Omernick et al. |
| 2008/0095470 A1 | 4/2008 | Chao et al. |
| 2008/0120029 A1 | 5/2008 | Zelek et al. |
| 2008/0127268 A1 | 5/2008 | Bergeron et al. |
| 2008/0130421 A1 | 6/2008 | Akaiwa et al. |
| 2008/0150959 A1 | 6/2008 | Marui et al. |
| 2008/0151700 A1 | 6/2008 | Inoue et al. |
| 2008/0165136 A1 | 7/2008 | Christie et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0201647 A1 | 8/2008 | Lagerstedt et al. |
| 2008/0214191 A1 | 9/2008 | Yach et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0259829 A1 | 10/2008 | Rosenblatt |
| 2008/0270934 A1 | 10/2008 | Firebaugh et al. |
| 2008/0284855 A1 | 11/2008 | Umeyama et al. |
| 2009/0012988 A1 | 1/2009 | Brown |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0060170 A1 | 3/2009 | Coughlan et al. |
| 2009/0068984 A1* | 3/2009 | Burnett .......... H04M 1/663 455/408 |
| 2009/0070675 A1 | 3/2009 | Li |
| 2009/0077497 A1 | 3/2009 | Cho et al. |
| 2009/0088207 A1 | 4/2009 | Sweeney et al. |
| 2009/0102933 A1 | 4/2009 | Harris et al. |
| 2009/0143114 A1 | 6/2009 | Vargas et al. |
| 2009/0144391 A1 | 6/2009 | Jung et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0249247 A1 | 10/2009 | Tseng et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0284476 A1 | 11/2009 | Bull et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0311993 A1 | 12/2009 | Horodezky |
| 2009/0312059 A1 | 12/2009 | Pratt et al. |
| 2009/0315671 A1 | 12/2009 | Gocho et al. |
| 2009/0319467 A1 | 12/2009 | Berg et al. |
| 2009/0325630 A1 | 12/2009 | Tiitola et al. |
| 2009/0327886 A1 | 12/2009 | Whytock et al. |

(56) References Cited

U.S. PATENT DOCUMENTS

| | | |
|---|---|---|
| 2010/0026640 A1 | 2/2010 | Kim et al. |
| 2010/0060586 A1 | 3/2010 | Pisula et al. |
| 2010/0064255 A1 | 3/2010 | Rottier et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0125785 A1 | 5/2010 | Moore et al. |
| 2010/0138764 A1 | 6/2010 | Hatambeiki et al. |
| 2010/0146437 A1 | 6/2010 | Woodcock et al. |
| 2010/0149090 A1 | 6/2010 | Morris et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0162160 A1 | 6/2010 | Stallings et al. |
| 2010/0167712 A1 | 7/2010 | Stallings et al. |
| 2010/0178873 A1 | 7/2010 | Lee et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge et al. |
| 2010/0228836 A1 | 9/2010 | Lehtovirta et al. |
| 2010/0235726 A1 | 9/2010 | Ording et al. |
| 2010/0243516 A1 | 9/2010 | Martin et al. |
| 2010/0257469 A1 | 10/2010 | Kim et al. |
| 2010/0281374 A1 | 11/2010 | Schulz et al. |
| 2010/0284389 A1 | 11/2010 | Ramsay et al. |
| 2010/0287513 A1 | 11/2010 | Singh et al. |
| 2010/0289723 A1 | 11/2010 | London |
| 2010/0289910 A1 | 11/2010 | Kamshilin et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0022294 A1 | 1/2011 | Apley |
| 2011/0025719 A1 | 2/2011 | Yanase et al. |
| 2011/0029750 A1 | 2/2011 | Jang et al. |
| 2011/0029870 A1 | 2/2011 | May et al. |
| 2011/0047014 A1 | 2/2011 | De |
| 2011/0058052 A1 | 3/2011 | Bolton et al. |
| 2011/0059769 A1 | 3/2011 | Brunolli |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0081860 A1 | 4/2011 | Brown et al. |
| 2011/0083111 A1 | 4/2011 | Forutanpour et al. |
| 2011/0098928 A1 | 4/2011 | Hoffman et al. |
| 2011/0106921 A1 | 5/2011 | Brown et al. |
| 2011/0109540 A1 | 5/2011 | Milne et al. |
| 2011/0115932 A1 | 5/2011 | Shin et al. |
| 2011/0130168 A1 | 6/2011 | Vendrow et al. |
| 2011/0138329 A1 | 6/2011 | Wells et al. |
| 2011/0151415 A1 | 6/2011 | Darling et al. |
| 2011/0153628 A1 | 6/2011 | Basu et al. |
| 2011/0157046 A1 | 6/2011 | Lee et al. |
| 2011/0159469 A1 | 6/2011 | Hwang et al. |
| 2011/0159927 A1 | 6/2011 | Choi |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris et al. |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1* | 9/2011 | Prakash .............. H04W 12/08 455/411 |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0019400 A1 | 1/2012 | Patel et al. |
| 2012/0028707 A1 | 2/2012 | Raitt et al. |
| 2012/0044062 A1 | 2/2012 | Jersa et al. |
| 2012/0047447 A1 | 2/2012 | Haq |
| 2012/0051560 A1 | 3/2012 | Sanders |
| 2012/0059787 A1 | 3/2012 | Brown et al. |
| 2012/0062470 A1 | 3/2012 | Chang et al. |
| 2012/0069206 A1 | 3/2012 | Hsieh |
| 2012/0071146 A1 | 3/2012 | Shrivastava et al. |
| 2012/0079375 A1 | 3/2012 | Ogino et al. |
| 2012/0084729 A1 | 4/2012 | Lin et al. |
| 2012/0089300 A1 | 4/2012 | Wolterman et al. |
| 2012/0092383 A1 | 4/2012 | Hysek et al. |
| 2012/0110438 A1 | 5/2012 | Peraza et al. |
| 2012/0115608 A1 | 5/2012 | Pfeifer et al. |
| 2012/0116550 A1 | 5/2012 | Hoffman et al. |
| 2012/0117507 A1 | 5/2012 | Tseng et al. |
| 2012/0120277 A1 | 5/2012 | Tsai et al. |
| 2012/0124499 A1 | 5/2012 | Tsai et al. |
| 2012/0154156 A1 | 6/2012 | Kuntzel |
| 2012/0182226 A1 | 7/2012 | Tuli |
| 2012/0192094 A1 | 7/2012 | Goertz et al. |
| 2012/0197523 A1 | 8/2012 | Kirsch et al. |
| 2012/0198531 A1 | 8/2012 | Ort et al. |
| 2012/0218201 A1 | 8/2012 | Tamas et al. |
| 2012/0231849 A1 | 9/2012 | Yamashita et al. |
| 2012/0236037 A1 | 9/2012 | Lessing et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0287290 A1 | 11/2012 | Jain et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0316777 A1 | 12/2012 | Kitta et al. |
| 2012/0319984 A1 | 12/2012 | Borovsky et al. |
| 2012/0320141 A1 | 12/2012 | Bowen et al. |
| 2012/0324390 A1 | 12/2012 | Tao et al. |
| 2013/0007665 A1 | 1/2013 | Chaudhri et al. |
| 2013/0017846 A1 | 1/2013 | Schoppe |
| 2013/0019175 A1 | 1/2013 | Kotler et al. |
| 2013/0021236 A1 | 1/2013 | Bender et al. |
| 2013/0027341 A1 | 1/2013 | Mastandrea |
| 2013/0030892 A1 | 1/2013 | Liu et al. |
| 2013/0038771 A1 | 2/2013 | Brunner et al. |
| 2013/0044072 A1 | 2/2013 | Kobayashi et al. |
| 2013/0050263 A1 | 2/2013 | Khoe et al. |
| 2013/0055147 A1 | 2/2013 | Vasudev et al. |
| 2013/0057472 A1 | 3/2013 | Dizac et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0065482 A1 | 3/2013 | Trickett et al. |
| 2013/0069893 A1 | 3/2013 | Brinda et al. |
| 2013/0076591 A1 | 3/2013 | Sirpal et al. |
| 2013/0076757 A1 | 3/2013 | Pritting |
| 2013/0082965 A1 | 4/2013 | Wada et al. |
| 2013/0085931 A1 | 4/2013 | Runyan |
| 2013/0093904 A1 | 4/2013 | Wagner et al. |
| 2013/0106603 A1 | 5/2013 | Weast et al. |
| 2013/0107674 A1 | 5/2013 | Gossweiler et al. |
| 2013/0111550 A1* | 5/2013 | Naveh .................. H04L 63/102 726/3 |
| 2013/0111579 A1 | 5/2013 | Newman et al. |
| 2013/0116967 A1 | 5/2013 | Akcasu et al. |
| 2013/0117693 A1 | 5/2013 | Anderson et al. |
| 2013/0125016 A1 | 5/2013 | Pallakoff et al. |
| 2013/0132888 A1 | 5/2013 | Tijssen |
| 2013/0134212 A1 | 5/2013 | Chang et al. |

(56) References Cited

U.S. PATENT DOCUMENTS

| | | |
|---|---|---|
| 2013/0138272 A1 | 5/2013 | Louise-babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0166679 A1 | 6/2013 | Kuwahara et al. |
| 2013/0185813 A1 | 7/2013 | Shim et al. |
| 2013/0191785 A1 | 7/2013 | Wu et al. |
| 2013/0201098 A1 | 8/2013 | Schilit et al. |
| 2013/0205194 A1 | 8/2013 | Decker et al. |
| 2013/0215044 A1 | 8/2013 | Ahn et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0222271 A1 | 8/2013 | Alberth et al. |
| 2013/0223279 A1 | 8/2013 | Tinnakornsrisuphap et al. |
| 2013/0225152 A1 | 8/2013 | Matthews et al. |
| 2013/0232443 A1 | 9/2013 | Ryu et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0286251 A1 | 10/2013 | Wood et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0332856 A1 | 12/2013 | Sanders et al. |
| 2013/0339436 A1 | 12/2013 | Gray |
| 2013/0345980 A1 | 12/2013 | Van Os et al. |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0013414 A1 | 1/2014 | Bruck et al. |
| 2014/0015546 A1 | 1/2014 | Frederick et al. |
| 2014/0022183 A1 | 1/2014 | Ayoub et al. |
| 2014/0022399 A1 | 1/2014 | Rashid et al. |
| 2014/0033100 A1 | 1/2014 | Noda et al. |
| 2014/0037107 A1 | 2/2014 | Marino et al. |
| 2014/0037109 A1 | 2/2014 | Ban |
| 2014/0040831 A1 | 2/2014 | Akasaka et al. |
| 2014/0043367 A1 | 2/2014 | Sakaino et al. |
| 2014/0047525 A1 | 2/2014 | Bonhoff |
| 2014/0055495 A1 | 2/2014 | Kim et al. |
| 2014/0059493 A1 | 2/2014 | Kim et al. |
| 2014/0068755 A1* | 3/2014 | King .................. G06F 21/53 726/19 |
| 2014/0073252 A1 | 3/2014 | Lee et al. |
| 2014/0074570 A1 | 3/2014 | Hope et al. |
| 2014/0075003 A1 | 3/2014 | Tanaka et al. |
| 2014/0075311 A1 | 3/2014 | Boettcher et al. |
| 2014/0078371 A1 | 3/2014 | Kinoshita |
| 2014/0082533 A1 | 3/2014 | Kelley et al. |
| 2014/0084857 A1 | 3/2014 | Liu et al. |
| 2014/0094224 A1 | 4/2014 | Lozovoy et al. |
| 2014/0101169 A1 | 4/2014 | Kurata et al. |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0149859 A1 | 5/2014 | Dyken et al. |
| 2014/0156801 A1 | 6/2014 | Fernandes et al. |
| 2014/0157189 A1 | 6/2014 | Morita |
| 2014/0157321 A1 | 6/2014 | Kurita et al. |
| 2014/0160033 A1 | 6/2014 | Brikman et al. |
| 2014/0160304 A1 | 6/2014 | Gator et al. |
| 2014/0164544 A1 | 6/2014 | Gagneraud |
| 2014/0164907 A1 | 6/2014 | Jung et al. |
| 2014/0167986 A1 | 6/2014 | Parada et al. |
| 2014/0173439 A1 | 6/2014 | Gutierrez et al. |
| 2014/0173455 A1 | 6/2014 | Shimizu et al. |
| 2014/0180582 A1 | 6/2014 | Pontarelli et al. |
| 2014/0184524 A1 | 7/2014 | Schiefer et al. |
| 2014/0189578 A1 | 7/2014 | Shuttleworth et al. |
| 2014/0189584 A1 | 7/2014 | Weng et al. |
| 2014/0191715 A1 | 7/2014 | Wechlin et al. |
| 2014/0200691 A1 | 7/2014 | Lee et al. |
| 2014/0201655 A1 | 7/2014 | Mahaffey et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0229752 A1 | 8/2014 | Lee et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0269614 A1 | 9/2014 | Maguire et al. |
| 2014/0273975 A1 | 9/2014 | Barat et al. |
| 2014/0276244 A1 | 9/2014 | Kamyar |
| 2014/0282068 A1 | 9/2014 | Levkovitz et al. |
| 2014/0282103 A1 | 9/2014 | Jerry |
| 2014/0282153 A1 | 9/2014 | Christiansen et al. |
| 2014/0282254 A1 | 9/2014 | Feiereisen et al. |
| 2014/0289660 A1 | 9/2014 | Min et al. |
| 2014/0293755 A1 | 10/2014 | Geiser et al. |
| 2014/0304664 A1 | 10/2014 | Lee et al. |
| 2014/0310350 A1* | 10/2014 | Borggaard .............. H04W 8/20 709/204 |
| 2014/0310598 A1 | 10/2014 | Sprague et al. |
| 2014/0310618 A1 | 10/2014 | Venkatesh |
| 2014/0317543 A1 | 10/2014 | Kim |
| 2014/0320387 A1 | 10/2014 | Eriksson et al. |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0337450 A1 | 11/2014 | Choudhary et al. |
| 2014/0337748 A1 | 11/2014 | Lee |
| 2014/0342792 A1 | 11/2014 | Markus |
| 2014/0343843 A1 | 11/2014 | Yanku |
| 2014/0344723 A1 | 11/2014 | Malik et al. |
| 2014/0347275 A1 | 11/2014 | Jung et al. |
| 2014/0359477 A1 | 12/2014 | Chen |
| 2014/0359481 A1 | 12/2014 | Graham et al. |
| 2014/0362105 A1 | 12/2014 | Kocienda et al. |
| 2014/0365113 A1 | 12/2014 | Yue et al. |
| 2014/0368719 A1 | 12/2014 | Gando et al. |
| 2014/0370807 A1 | 12/2014 | Pierce et al. |
| 2014/0371887 A1 | 12/2014 | Hoffman et al. |
| 2014/0380187 A1 | 12/2014 | Lewin et al. |
| 2014/0380229 A1 | 12/2014 | Volodin et al. |
| 2015/0015500 A1 | 1/2015 | Lee et al. |
| 2015/0017956 A1 | 1/2015 | Jeong |
| 2015/0019981 A1* | 1/2015 | Petitt, Jr. ................ G06F 3/0482 715/738 |
| 2015/0019982 A1* | 1/2015 | Petitt, Jr. ................ G08B 5/36 715/738 |
| 2015/0022438 A1 | 1/2015 | Hong |
| 2015/0022674 A1 | 1/2015 | Koss et al. |
| 2015/0026615 A1 | 1/2015 | Choi et al. |

(56) References Cited

U.S. PATENT DOCUMENTS

| | | |
|---|---|---|
| 2015/0026647 A1 | 1/2015 | Park et al. |
| 2015/0033136 A1 | 1/2015 | Sasaki et al. |
| 2015/0035762 A1 | 2/2015 | Lu |
| 2015/0037545 A1 | 2/2015 | Sun |
| 2015/0049033 A1 | 2/2015 | Kim et al. |
| 2015/0049233 A1 | 2/2015 | Choi |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0061972 A1 | 3/2015 | Kang et al. |
| 2015/0062130 A1 | 3/2015 | Ho |
| 2015/0065035 A1 | 3/2015 | Son et al. |
| 2015/0067580 A1 | 3/2015 | Um et al. |
| 2015/0067596 A1 | 3/2015 | Brown et al. |
| 2015/0071043 A1 | 3/2015 | Kubota |
| 2015/0082193 A1 | 3/2015 | Wallace et al. |
| 2015/0083970 A1 | 3/2015 | Koh et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1 | 4/2015 | Pan |
| 2015/0105125 A1 | 4/2015 | Min et al. |
| 2015/0106221 A1* | 4/2015 | Tapley .................. G06Q 30/08 705/26.3 |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0131121 A1 | 5/2015 | Kang |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0189162 A1 | 7/2015 | Kuo et al. |
| 2015/0194050 A1 | 7/2015 | Lee |
| 2015/0194137 A1 | 7/2015 | Wyatt |
| 2015/0205509 A1 | 7/2015 | Scriven et al. |
| 2015/0205511 A1 | 7/2015 | Vinna et al. |
| 2015/0207922 A1 | 7/2015 | Kobayashi et al. |
| 2015/0217163 A1 | 8/2015 | Amis et al. |
| 2015/0243246 A1 | 8/2015 | Mun et al. |
| 2015/0248235 A1 | 9/2015 | Offenberg et al. |
| 2015/0253740 A1 | 9/2015 | Nishijima et al. |
| 2015/0254875 A1 | 9/2015 | Zhang |
| 2015/0261493 A1 | 9/2015 | Lemmon et al. |
| 2015/0264202 A1 | 9/2015 | Pawlowski |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0287403 A1 | 10/2015 | Holzer Zaslansky et al. |
| 2015/0297185 A1 | 10/2015 | Mccormack et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0339261 A1* | 11/2015 | Jha ...................... H04W 12/088 709/248 |
| 2015/0346694 A1 | 12/2015 | Hoobler et al. |
| 2015/0355830 A1 | 12/2015 | Chaudhri et al. |
| 2015/0358043 A1 | 12/2015 | Jeong et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0379476 A1 | 12/2015 | Chaudhri et al. |
| 2016/0004393 A1 | 1/2016 | Faaborg et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0022202 A1 | 1/2016 | Peterson et al. |
| 2016/0027420 A1 | 1/2016 | Eronen |
| 2016/0028869 A1 | 1/2016 | Bhatt |
| 2016/0034133 A1 | 2/2016 | Wilson |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0043905 A1 | 2/2016 | Fiedler |
| 2016/0044091 A1 | 2/2016 | Doumet |
| 2016/0048283 A1 | 2/2016 | Yang et al. |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1* | 2/2016 | Jo ........................ G04G 9/0064 715/763 |
| 2016/0054892 A1 | 2/2016 | Kim et al. |
| 2016/0058337 A1 | 3/2016 | Blahnik et al. |
| 2016/0061613 A1 | 3/2016 | Jung et al. |
| 2016/0062450 A1 | 3/2016 | Han et al. |
| 2016/0062540 A1 | 3/2016 | Yang et al. |
| 2016/0062567 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062606 A1 | 3/2016 | Vega et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0116941 A1 | 4/2016 | Kuwabara et al. |
| 2016/0134737 A1 | 5/2016 | Pulletikurty |
| 2016/0134840 A1 | 5/2016 | Mcculloch |
| 2016/0142763 A1* | 5/2016 | Kim ..................... H04L 41/0853 725/80 |
| 2016/0156597 A1 | 6/2016 | Meng et al. |
| 2016/0165037 A1* | 6/2016 | Youn .................... H04W 8/005 455/557 |
| 2016/0170731 A1 | 6/2016 | Maddern et al. |
| 2016/0180568 A1 | 6/2016 | Bullivant et al. |
| 2016/0188179 A1 | 6/2016 | Roh |
| 2016/0188181 A1 | 6/2016 | Smith et al. |
| 2016/0191511 A1* | 6/2016 | Tijerina .............. H04L 63/0853 726/7 |
| 2016/0195864 A1 | 7/2016 | Kim |
| 2016/0202866 A1 | 7/2016 | Zambetti |
| 2016/0209939 A1 | 7/2016 | Zambetti et al. |
| 2016/0217601 A1 | 7/2016 | Tsuda et al. |
| 2016/0246566 A1 | 8/2016 | Fullerton et al. |
| 2016/0259489 A1 | 9/2016 | Yang |
| 2016/0260414 A1 | 9/2016 | Yang |
| 2016/0261675 A1 | 9/2016 | Block et al. |
| 2016/0266548 A1 | 9/2016 | Akiyama |
| 2016/0269176 A1 | 9/2016 | Pang et al. |
| 2016/0283094 A1 | 9/2016 | Choi |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0337206 A1 | 11/2016 | Bugenhagen et al. |
| 2016/0342327 A1 | 11/2016 | Chi et al. |
| 2016/0345039 A1 | 11/2016 | Billmeyer |
| 2016/0357354 A1 | 12/2016 | Chen et al. |
| 2016/0357386 A1 | 12/2016 | Choi |
| 2016/0358311 A1 | 12/2016 | Chen et al. |
| 2017/0006210 A1 | 1/2017 | Dye et al. |
| 2017/0011210 A1* | 1/2017 | Cheong ................ A61B 5/681 |
| 2017/0031648 A1 | 2/2017 | So et al. |
| 2017/0034253 A1 | 2/2017 | Jiang et al. |
| 2017/0039535 A1 | 2/2017 | Park et al. |
| 2017/0046024 A1 | 2/2017 | Dascola et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0082983 A1 | 3/2017 | Katzer et al. |
| 2017/0083188 A1 | 3/2017 | Yang et al. |
| 2017/0109011 A1 | 4/2017 | Jiang |
| 2017/0123571 A1 | 5/2017 | Huang et al. |
| 2017/0123640 A1 | 5/2017 | Wilson et al. |

(56) References Cited

U.S. PATENT DOCUMENTS

| | | |
|---|---|---|
| 2017/0134321 A1 | 5/2017 | Ushio et al. |
| 2017/0134553 A1 | 5/2017 | Jeon et al. |
| 2017/0134872 A1 | 5/2017 | Silva et al. |
| 2017/0149795 A1* | 5/2017 | Day, II .............. H04W 12/086 |
| 2017/0156110 A1 | 6/2017 | Ueno et al. |
| 2017/0160098 A1 | 6/2017 | Mcgavran et al. |
| 2017/0160898 A1 | 6/2017 | Lee et al. |
| 2017/0176950 A1 | 6/2017 | Jung et al. |
| 2017/0185373 A1 | 6/2017 | Kim et al. |
| 2017/0195772 A1 | 7/2017 | Han et al. |
| 2017/0205854 A1 | 7/2017 | Zenoff |
| 2017/0209766 A1 | 7/2017 | Riley et al. |
| 2017/0230236 A1* | 8/2017 | Kim .................. H04L 7/0008 |
| 2017/0255169 A1 | 9/2017 | Lee et al. |
| 2017/0257426 A1 | 9/2017 | Wilbur et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1* | 11/2017 | Robinson .............. G06F 3/0482 |
| 2017/0322713 A1 | 11/2017 | Hwang et al. |
| 2017/0325196 A1 | 11/2017 | Cho et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357426 A1 | 12/2017 | Wilson et al. |
| 2017/0357427 A1 | 12/2017 | Wilson et al. |
| 2017/0357477 A1 | 12/2017 | Im et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0069957 A1 | 3/2018 | Mushikabe et al. |
| 2018/0074462 A1 | 3/2018 | Helder et al. |
| 2018/0081515 A1 | 3/2018 | Block et al. |
| 2018/0088537 A1 | 3/2018 | Murai |
| 2018/0088797 A1 | 3/2018 | Mcatee et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0137266 A1 | 5/2018 | Kim et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0181381 A1 | 6/2018 | Michaely et al. |
| 2018/0259915 A1 | 9/2018 | Hosoi et al. |
| 2018/0262677 A1 | 9/2018 | Dye et al. |
| 2018/0275739 A1 | 9/2018 | Minami et al. |
| 2018/0288560 A1* | 10/2018 | Naik ................. G04G 9/06 |
| 2018/0316783 A1 | 11/2018 | Ye et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0329587 A1 | 11/2018 | Ko et al. |
| 2018/0335927 A1 | 11/2018 | Anzures et al. |
| 2018/0341448 A1 | 11/2018 | Behzadi et al. |
| 2018/0343023 A1 | 11/2018 | Park et al. |
| 2018/0352435 A1* | 12/2018 | Donley .............. H04L 9/14 |
| 2018/0374429 A1 | 12/2018 | Nakamura |
| 2019/0037004 A1 | 1/2019 | Chaudhri et al. |
| 2019/0069244 A1 | 2/2019 | Jeon et al. |
| 2019/0121300 A1 | 4/2019 | Peterson et al. |
| 2019/0129661 A1 | 5/2019 | Hirota et al. |
| 2019/0146422 A1 | 5/2019 | Meyer et al. |
| 2019/0187861 A1 | 6/2019 | Yang |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0250813 A1 | 8/2019 | Block et al. |
| 2019/0265849 A1 | 8/2019 | Yang et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0306607 A1 | 10/2019 | Clayton et al. |
| 2019/0339860 A1 | 11/2019 | Chen et al. |
| 2019/0340348 A1* | 11/2019 | Yu ..................... G06F 1/163 |
| 2019/0349469 A1* | 11/2019 | Skogen ................ H04L 67/22 |
| 2019/0372862 A1 | 12/2019 | Carrigan et al. |
| 2020/0042311 A1* | 2/2020 | Shin .................. G16H 40/40 |
| 2020/0050332 A1 | 2/2020 | Yang et al. |
| 2020/0125037 A1 | 4/2020 | Jo et al. |
| 2020/0133206 A1 | 4/2020 | Jo et al. |
| 2020/0159374 A1 | 5/2020 | Yang et al. |
| 2020/0213437 A1 | 7/2020 | Bhatt |
| 2020/0249632 A1 | 8/2020 | Olwal et al. |
| 2020/0342144 A1* | 10/2020 | Alameh ................ G06F 21/6245 |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0359204 A1* | 11/2020 | Hawkins .............. H04W 4/80 |
| 2020/0379413 A1 | 12/2020 | Chen et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2021/0042028 A1 | 2/2021 | Block et al. |
| 2021/0048929 A1 | 2/2021 | Agnoli et al. |
| 2021/0149694 A1 | 5/2021 | Guzman et al. |
| 2021/0216654 A1 | 7/2021 | Ko et al. |
| 2021/0263702 A1 | 8/2021 | Carrigan |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2021/0373718 A1 | 12/2021 | Yang et al. |
| 2022/0043626 A1 | 2/2022 | Carrigan |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707 412 A2 | 6/2014 |
| CN | 1337638 A | 2/2002 |
| CN | 1397904 A | 2/2003 |
| CN | 1536511 A | 10/2004 |
| CN | 1556955 A | 12/2004 |
| CN | 1705346 A | 12/2005 |
| CN | 1997957 A | 7/2007 |
| CN | 101243383 A | 8/2008 |
| CN | 101382438 A | 3/2009 |
| CN | 101427574 A | 5/2009 |
| CN | 101433034 A | 5/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 202309894 U | 7/2012 |
| CN | 102687176 A | 9/2012 |
| CN | 102750070 A | 10/2012 |
| CN | 102830795 A | 12/2012 |
| CN | 102833345 A | 12/2012 |
| CN | 103399480 A | 11/2013 |
| CN | 103415084 A | 11/2013 |
| CN | 103562832 A | 2/2014 |
| CN | 103607660 A | 2/2014 |
| CN | 103649897 A | 3/2014 |
| CN | 103778082 A | 5/2014 |
| CN | 103839023 A | 6/2014 |
| CN | 103902165 A | 7/2014 |
| CN | 103914238 A | 7/2014 |

(56) References Cited

FOREIGN PATENT DOCUMENTS

| | | | |
|---|---|---|---|
| CN | 103970208 | A | 8/2014 |
| CN | 103973899 | A | 8/2014 |
| CN | 104024987 | A | 9/2014 |
| CN | 203930358 | U | 11/2014 |
| CN | 104205785 | A | 12/2014 |
| CN | 104272854 | A | 1/2015 |
| CN | 104281405 | A | 1/2015 |
| CN | 104281430 | A | 1/2015 |
| CN | 104346297 | A | 2/2015 |
| CN | 104487929 | A | 4/2015 |
| CN | 104501043 | A | 4/2015 |
| CN | 104580576 | A | 4/2015 |
| CN | 104956182 | A | 9/2015 |
| CN | 105204931 | A | 12/2015 |
| CN | 105260049 | A | 1/2016 |
| CN | 105264479 | A | 1/2016 |
| CN | 105335087 | A | 2/2016 |
| CN | 105388966 | A | 3/2016 |
| CN | 105389078 | A | 3/2016 |
| CN | 105389107 | A | 3/2016 |
| CN | 105453016 | A | 3/2016 |
| CN | 105959906 | A | 9/2016 |
| CN | 205608658 | U | 9/2016 |
| CN | 106056848 | A | 10/2016 |
| CN | 106060772 | A | 10/2016 |
| CN | 106486044 | A | 3/2017 |
| CN | 106605201 | A | 4/2017 |
| CN | 106851528 | A | 6/2017 |
| CN | 106936929 | A | 7/2017 |
| CN | 107239101 | A | 10/2017 |
| CN | 107643677 | A | 1/2018 |
| CN | 107852572 | A | 3/2018 |
| CN | 109313655 | A | 2/2019 |
| CN | 109690445 | A | 4/2019 |
| DE | 202017105858 | U1 | 3/2018 |
| EP | 0579093 | A1 | 1/1994 |
| EP | 0831629 | A2 | 3/1998 |
| EP | 0836074 | A2 | 4/1998 |
| EP | 1406176 | A1 | 4/2004 |
| EP | 1614992 | A1 | 1/2006 |
| EP | 1659504 | A2 | 5/2006 |
| EP | 1674889 | A1 | 6/2006 |
| EP | 1674977 | A2 | 6/2006 |
| EP | 1705883 | A1 | 9/2006 |
| EP | 1750242 | A2 | 2/2007 |
| EP | 1832969 | A2 | 9/2007 |
| EP | 1855170 | A2 | 11/2007 |
| EP | 1858238 | A2 | 11/2007 |
| EP | 1953663 | A1 | 8/2008 |
| EP | 2096413 | A1 | 9/2009 |
| EP | 2120115 | A2 | 11/2009 |
| EP | 2194508 | A1 | 6/2010 |
| EP | 2204702 | A1 | 7/2010 |
| EP | 2290922 | A1 | 3/2011 |
| EP | 2306692 | A1 | 4/2011 |
| EP | 2312512 | A1 | 4/2011 |
| EP | 2360902 | A2 | 8/2011 |
| EP | 2367098 | A2 | 9/2011 |
| EP | 2413577 | A2 | 2/2012 |
| EP | 2423810 | A1 | 2/2012 |
| EP | 2426902 | A1 | 3/2012 |
| EP | 2428947 | A2 | 3/2012 |
| EP | 2466260 | A1 | 6/2012 |
| EP | 2523439 | A1 | 11/2012 |
| EP | 2600215 | A1 | 6/2013 |
| EP | 2629483 | A1 | 8/2013 |
| EP | 2632131 | A1 | 8/2013 |
| EP | 2720442 | A1 | 4/2014 |
| EP | 2738640 | A2 | 6/2014 |
| EP | 2892240 | A1 | 7/2015 |
| EP | 2942932 | A1 | 11/2015 |
| EP | 2990887 | A2 | 3/2016 |
| EP | 2993602 | A1 | 3/2016 |
| EP | 3032537 | A2 | 6/2016 |
| EP | 3056949 | A1 | 8/2016 |
| EP | 3057342 | A1 | 8/2016 |
| EP | 3073703 | A1 | 9/2016 |
| EP | 3101958 | A1 | 12/2016 |
| EP | 3276905 | A1 | 1/2018 |
| EP | 3376342 | A1 | 9/2018 |
| EP | 3379853 | A1 | 9/2018 |
| EP | 3401770 | A1 | 11/2018 |
| GB | 2402105 | A | 12/2004 |
| GB | 2475669 | A | 6/2011 |
| JP | 53-31170 | A | 3/1978 |
| JP | 56-621 | A | 1/1981 |
| JP | 3007616 | U | 2/1995 |
| JP | 8-110955 | A | 4/1996 |
| JP | 9-251084 | A | 9/1997 |
| JP | 11-160470 | A | 6/1999 |
| JP | 11-183183 | A | 7/1999 |
| JP | 11-232013 | A | 8/1999 |
| JP | 3062531 | B2 | 7/2000 |
| JP | 2001-309455 | A | 11/2001 |
| JP | 2001-318852 | A | 11/2001 |
| JP | 2002-73486 | A | 3/2002 |
| JP | 2002-507718 | A | 3/2002 |
| JP | 2002-271451 | A | 9/2002 |
| JP | 2003-296246 | A | 10/2003 |
| JP | 2004-28918 | A | 1/2004 |
| JP | 2004-184396 | A | 7/2004 |
| JP | 2005-521890 | A | 7/2005 |
| JP | 2005-339017 | A | 12/2005 |
| JP | 2009-502048 | A | 1/2009 |
| JP | 2009-147889 | A | 7/2009 |
| JP | 2010-124181 | A | 6/2010 |
| JP | 2010-257051 | A | 11/2010 |
| JP | 3168099 | U | 6/2011 |
| JP | 2011-159172 | A | 8/2011 |
| JP | 2011-217000 | A | 10/2011 |
| JP | 2012-53642 | A | 3/2012 |
| JP | 2012-505478 | A | 3/2012 |
| JP | 2012-147432 | A | 8/2012 |
| JP | 2012-517630 | A | 8/2012 |
| JP | 2012-203832 | A | 10/2012 |
| JP | 2012-531607 | A | 12/2012 |
| JP | 2013-3671 | A | 1/2013 |
| JP | 2013-29925 | A | 2/2013 |
| JP | 2013-92989 | A | 5/2013 |
| JP | 2014-053692 | A | 3/2014 |
| JP | 2014-123169 | A | 7/2014 |
| JP | 2014-123197 | A | 7/2014 |
| JP | 2014-519126 | A | 8/2014 |
| JP | 2014-216868 | A | 11/2014 |
| JP | 2015-210587 | A | 11/2015 |
| JP | 2016-13151 | A | 1/2016 |
| JP | 2017-531230 | A | 10/2017 |
| JP | 2018-514838 | A | 6/2018 |
| JP | 2018-113544 | A | 7/2018 |
| JP | 2018-116067 | A | 7/2018 |
| KR | 20-0425314 | Y1 | 9/2006 |
| KR | 10-2007-0025292 | A | 3/2007 |
| KR | 10-2008-0058246 | A | 6/2008 |
| KR | 10-2009-0112132 | A | 10/2009 |
| KR | 10-2013-0109466 | A | 10/2013 |
| KR | 10-2014-0025552 | A | 3/2014 |
| KR | 10-2014-0064687 | A | 5/2014 |
| KR | 10-2015-0038711 | A | 4/2015 |
| KR | 10-2015-0081140 | A | 7/2015 |
| KR | 10-2017-0032471 | A | 3/2017 |
| KR | 10-2017-0076452 | A | 7/2017 |
| KR | 10-2017-0082698 | A | 7/2017 |
| KR | 10-2018-0011581 | A | 2/2018 |
| KR | 10-2019-0020850 | A | 3/2019 |
| KR | 10-2019-0022883 | A | 3/2019 |
| KR | 10-2019-0071285 | A | 6/2019 |
| TW | 498240 | B | 8/2002 |
| TW | 546942 | B | 8/2003 |
| TW | 200512616 | A | 4/2005 |
| TW | 200850058 | A | 12/2008 |
| TW | 200915698 | A | 4/2009 |
| TW | 201012152 | A | 3/2010 |
| TW | I348803 | B | 9/2011 |
| TW | 201215086 | A | 4/2012 |

(56) References Cited

FOREIGN PATENT DOCUMENTS

| | | |
|---|---|---|
| TW | 201232486 A | 8/2012 |
| TW | M474482 U | 3/2014 |
| TW | 201419115 A | 5/2014 |
| TW | 201509168 A | 3/2015 |
| WO | 1998/40795 A1 | 9/1998 |
| WO | 2001/71433 A1 | 9/2001 |
| WO | 2002/054157 A1 | 7/2002 |
| WO | 03/085460 A2 | 10/2003 |
| WO | 2006/012343 A2 | 2/2006 |
| WO | 2006/112641 A1 | 10/2006 |
| WO | 2007/008321 A2 | 1/2007 |
| WO | 2007/018881 A2 | 2/2007 |
| WO | 2007/105937 A1 | 9/2007 |
| WO | 2007/142703 A1 | 12/2007 |
| WO | 2007/149731 A1 | 12/2007 |
| WO | 2009/137419 A2 | 11/2009 |
| WO | 2009/140095 A2 | 11/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/063516 A1 | 6/2011 |
| WO | 2012/021507 A2 | 2/2012 |
| WO | 2012/161434 A2 | 11/2012 |
| WO | 2012/170446 A2 | 12/2012 |
| WO | 2012/172970 A1 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/171734 A2 | 10/2014 |
| WO | 2014/189197 A1 | 11/2014 |
| WO | 2015/023419 A1 | 2/2015 |
| WO | 2015/061831 A1 | 5/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213937 A1 | 12/2017 |
| WO | 2018/032085 A1 | 2/2018 |
| WO | 2018/048510 A1 | 3/2018 |
| WO | 2018/048700 A1 | 3/2018 |
| WO | 2018/084802 A1 | 5/2018 |
| WO | 2018/098136 A1 | 5/2018 |
| WO | 2018/198136 A1 | 11/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Intention to Grant received for Danish Patent Application No. PA202070609, dated Jan. 14, 2021, 2 pages.
International Search Report and Written Opinion received for PCT Patent Application No. PCT/US2020/045814, dated Jan. 20, 2021, 16 pages.
Notice of Allowance received for Japanese Patent Application No. 2019-151358, dated Jan. 22, 2021, 4 pages (1 page of English Translation and 3 pages of Official Copy).
Notice of Allowance received for U.S. Appl. No. 16/585,714, dated Jan. 27, 2021, 2 pages.
Office Action received for European Patent Application No. 16837432.0, dated Jan. 27, 2021, 7 pages.
Office Action received for Korean Patent Application No. 10-2019-7029673, dated Sep. 3, 2020, 9 pages (4 pages of English Translation and 5 pages of Official Copy).
Phlam, Dev, "Clockwork Tomato Presentation", Retrieved from the Internet: URL: https://www.youtube.com/watch?v=2IQDx9REn0E, Apr. 29, 2016, 6 pages.
Applicant-Initiated Interview Summary received for U.S. Appl. No. 15/405,122, dated Dec. 22, 2020, 5 pages.
Applicant-Initiated Interview Summary received for U.S. Appl. No. 16/723,583, dated Dec. 28, 2020, 6 pages.
International Preliminary Report on Patentability received for PCT Patent Application No. PCT/US2019/024792, dated Dec. 17, 2020, 9 pages.
Non-Final Office Action received for U.S. Appl. No. 16/583,994, dated Dec. 23, 2020, 17 pages.
Office Action received for Danish Patent Application No. PA202070609, dated Dec. 10, 2020, 8 pages.
Office Action received for Korean Patent Application No. 10-2020-7026036, dated Dec. 7, 2020, 8 pages (3 pages of English Translation and 5 pages of Official Copy).
Singh Lovepreet, "Samsung Galaxy Watch: Howto Change Watch Face—Tips and Tricks", Online available at: https://www.youtube.com/watch?pp=desktop&v=IN7gPxTZ1qU, Dec. 4, 2018, 1 page.
VIDS Tube, "Bitmoji Clockface on Fitbit Versa Sense/Versa 3/Versa 2", Available online at https://www.youtube.com/watch?v=4V_xDnSLeHE, Jun. 30, 2019, 1 page.
Woolsey Amanda, "HowTo Customize The Clock on the Apple Watch", Available online at: https://www.youtube.com/watch?v=t-3Bckdd9B4, Apr. 25, 2015, 1 page.
Applicant-Initiated Interview Summary received for U.S. Appl. No. 16/749,929, dated Oct. 13, 2020, 4 pages.
Barbosa Jonathan, "Weather Clock 2.1 for Android", APKPure, Online Available at: https://apkpure.com/weather-clock/com.urbandroid.wclock, Oct. 15, 2015, 3 pages.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
Intention to Grant received for European Patent Application No. 15787091.6, dated Sep. 30, 2020, 7 pages.
Non-Final Office Action received for U.S. Appl. No. 15/421,865, dated Oct. 7, 2020, 20 pages.
Non-Final Office Action received for U.S. Appl. No. 16/659,507, dated Oct. 7, 2020, 16 pages.
Office Action received for Korean Patent Application No. 10-2020-7001340, dated Sep. 24, 2020, 19 pages (8 pages of English Translation and 11 pages of Official Copy).
Applicant-Initiated Interview Summary received for U.S. Appl. No. 16/418,786, dated Mar. 30, 2021, 4 pages.
Applicant-Initiated Interview Summary received for U.S. Appl. No. 16/861,651, dated Mar. 25, 2021, 6 pages.
Final Office Action received for U.S. Appl. No. 15/421,865, dated Mar. 19, 2021, 20 pages.
Final Office Action received for U.S. Appl. No. 16/997,588, dated Mar. 30, 2021, 23 pages.
Notice of Allowance received for Korean Patent Application No. 10-2021-7002597, dated Feb. 25, 2021, 5 pages (1 page of English Translation and 4 pages of Official Copy).
Notice of Allowance received for U.S. Appl. No. 16/583,981, dated Mar. 26, 2021, 10 pages.
Office Action received for Chinese Patent Application No. 201680013193.1, dated Feb. 1, 2021, 8 pages (3 pages of English Translation and 5 pages of Official Copy).

(56) References Cited

OTHER PUBLICATIONS

Advisory Action received for U.S. Appl. No. 16/582,020, dated Aug. 3, 2020, 4 pages.
Applicant-Initiated Interview Summary received for U.S. Appl. No. 16/144,264, dated Jul. 22, 2020, 5 pages.
European Search Report received for European Patent Application No. 20172197.4, dated Jul. 28, 2020, 4 pages.
Final Office Action received for U.S. Appl. No. 16/147,523, dated Aug. 4, 2020, 15 pages.
Office Action received for Australian Patent Application No. 2018201089, dated Jul. 23, 2020, 4 pages.
Office Action received for Chinese Patent Application No. 201680047983.1, dated Jul. 1, 2020, 6 pages (3 pages of English Translation and 3 pages of Official Copy).
Applicant-Initiated Interview Summary received for U.S. Appl. No. 16/583,994, dated May 28, 2021, 5 pages.
Certificate of Examination received for Australian Patent Application No. 2020102158, dated Jun. 8, 2021, 2 pages.
Examiner's Answer to Appeal Brief received for U.S. Appl. No. 14/846,511, dated Jun. 14, 2021, 15 pages.
Final Office Action received for U.S. Appl. No. 16/401,934, dated Jun. 14, 2021, 30 pages.
Jean, "Our Pact Parental Control Review", Available online at https://www.bewebsmart.com/parental-controls/our-pact-parental-control-review/, Jun. 25, 2016, 25 pages.
Non-Final Office Action received for U.S. Appl. No. 16/389,722, dated Jun. 3, 2021, 17 pages.
Non-Final Office Action received for U.S. Appl. No. 17/041,350, dated Jun. 10, 2021, 24 pages.
Notice of Allowance received for Japanese Patent Application No. 2020-074878, dated May 28, 2021, 4 pages (1 page of English Translation and 3 pages of Official Copy).
Office Action received for Australian Patent Application No. 2021202834, dated May 28, 2021, 2 pages.
Office Action received for European Patent Application No. 20192404.0, dated Jun. 8, 2021, 7 pages.
Search Report received for Netherlands Patent Application No. 2015236, dated Apr. 21, 2021, 19 pages (13 pages of English Translation and 6 pages of Official Copy).
Advisory Action received for U.S. Appl. No. 16/389,722, dated Mar. 9, 2021, 5 pages.
Decision to Grant received for Danish Patent Application No. PA201970596, dated Feb. 26, 2021, 2 pages.
Office Action received for Australian Patent Application No. 2020239670, dated Mar. 3, 2021, 4 pages.
Office Action received for Danish Patent Application No. PA201970599, dated Mar. 1, 2021, 4 pages.
Supplemental Notice of Allowance received for U.S. Appl. No. 14/815,890, dated Mar. 10, 2021, 2 pages.
Applicant-Initiated Interview Summary received for U.S. Appl. No. 15/421,865, dated Dec. 15, 2020, 6 pages.
Decision to Grant received for European Patent Application No. 15787091.6, dated Dec. 3, 2020, 2 pages.
Final Office Action received for U.S. Appl. No. 16/389,722, dated Dec. 8, 2020, 18 pages.
Intention to Grant Received for Danish Patent Application No. PA201970596, dated Dec. 1, 2020, 2 pages.
Non-Final Office Action received for U.S. Appl. No. 16/401,934, dated Dec. 11, 2020, 26 pages.
Non-Final Office Action received for U.S. Appl. No. 16/997,588, dated Dec. 14, 2020, 21 pages.
Notice of Allowance received for U.S. Appl. No. 16/749,929, dated Dec. 16, 2020, 2 pages.
Office Action received for Australian Patent Application No. 2020102158, dated Dec. 8, 2020, 9 pages.
Office Action received for Australian Patent Application No. 2020204506, dated Dec. 7, 2020, 6 pages.
Office Action received for European Patent Application No. 16762356.0, dated Dec. 11, 2020, 7 pages.

Office Action received for European Patent Application No. 20192404.0, dated Dec. 2, 2020, 8 pages.
Applicant Initiated Interview Summary received for U.S. Appl. No. 16/584,445, dated Mar. 17, 2020, 5 pages.
Applicant-Initiated Interview Summary received for U.S. Appl. No. 16/147,523, dated Oct. 26, 2020, 3 pages.
Applicant-Initiated Interview Summary received for U.S. Appl. No. 16/584,281, dated Mar. 9, 2020, 5 pages.
Applicant-Initiated Interview Summary received for U.S. Appl. No. 16/584,281, dated Sep. 14, 2020, 6 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
International Search Report and Written Opinion received for PCT Patent Application No. PCT/US2020/031536, dated Sep. 23, 2020, 18 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,714, dated Apr. 16, 2020, 18 pages.
Non-Final Office Action received for U.S. Appl. No. 16/585,721, dated Dec. 27, 2019, 25 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.
Notice of Allowance received for U.S. Appl. No. 16/584,445, dated Oct. 21, 2020, 6 pages.
Notice of Allowance received for U.S. Appl. No. 16/585,714, dated Sep. 25, 2020, 15 pages.
Notice of Allowance received for U.S. Appl. No. 16/585,721, dated Sep. 30, 2020, 15 pages.
Office Action and Search Report received for Danish Patent Application No. PA201970598, dated Jan. 28, 2020, 6 pages.
Office Action received for Chinese Patent Application No. 201680013193.1, dated Sep. 7, 2020, 6 pages (3 pages of English Translation and 3 pages of Official Copy).
Office Action received for Chinese Patent Application No. 201910906898.1, dated Sep. 9, 2020, 8 pages (3 pages of English Translation and 5 pages of Official Copy).
Office Action received for Danish Patent Application No. PA201970596, dated May 6, 2020, 4 pages.
Office Action received for Danish Patent Application No. PA201970598, dated Oct. 9, 2020, 4 pages.
Office Action received for Danish Patent Application No. PA201970599, dated Jan. 23, 2020, 6 pages.
Office Action received for Danish Patent Application No. PA201970599, dated May 27, 2020, 4 pages.
Office Action received for Japanese Patent Application No. 2020-074878, dated Sep. 7, 2020, 13 pages (7 pages of English Translation and 6 pages of Official Copy).
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.

(56) References Cited

OTHER PUBLICATIONS

Search Report and Opinion received for Danish Patent Application No. PA201970599, dated Nov. 8, 2019, 12 pages.
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Jul. 14, 2020, 5 pages.
Decision to Grant received for Danish Patent Application No. PA201770791, dated Jul. 7, 2020, 2 pages.
Decision to Grant received for European Patent Application No. 15747595.5, dated Jul. 16, 2020, 2 pages.
Notice of Acceptance received for Australian Patent Application No. 2017277813, dated Jun. 16, 2020, 3 pages.
Notice of Allowance received for Japanese Patent Application No. 2019-096219, dated Jun. 26, 2020, 4 pages (1 page of English Translation and 3 pages of Official Copy).
Notice of Allowance received for Korean Patent Application No. 10-2018-7018904, dated Jun. 26, 2020, 4 pages (1 page of English Translation and 3 pages of Official copy).
Notice of Allowance received for U.S. Appl. No. 15/554,204, dated Jul. 13, 2020, 10 pages.
Notice of Allowance received for U.S. Appl. No. 16/585,399, dated Jul. 21, 2020, 9 pages.
Applicant Initiated Interview Summary received for U.S. Appl. No. 16/582,020, dated Jul. 9, 2021, 4 pages.
Applicant-Initiated Interview Summary received for U.S. Appl. No. 15/405,122, dated Jul. 7, 2021, 4 pages.
Applicant-Initiated Interview Summary received for U.S. Appl. No. 17/031,654, dated Feb. 1, 2021, 2 pages.
Corrected Notice of Allowance received for U.S. Appl. No. 16/583,994, dated Jul. 6, 2021, 3 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Notice of Acceptance received for Australian Patent Application No. 2020239670, dated Jul. 2, 2021, 3 pages.
Notice of Acceptance received for Australian Patent Application No. 2021202836, dated Jun. 25, 2021, 3 pages.
Notice of Allowance received for Chinese Patent Application No. 201780033973.7, dated Jul. 7, 2021, 5 pages (1 page of English Translation and 4 pages of Official Copy).
Notice of Allowance received for Japanese Patent Application No. 2020-551465, dated Jun. 28, 2021, 4 pages (1 page of English Translation and 3 pages of Official Copy).
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Australian Patent Application No. 2019267413, dated Jun. 29, 2021, 3 pages.
Office Action received for Australian Patent Application No. 2020239774, dated Jun. 28, 2021, 8 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for European Patent Application No. 17810723.1, dated Jul. 9, 2021, 8 pages.
Office Action received for European Patent Application No. 20172197.4, dated Jul. 8, 2021, 5 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.

Wade Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Applicant Initiated Interview Summary received for U.S. Appl. No. 16/389,722, dated Feb. 11, 2021, 4 pages.
Final Office Action received for U.S. Appl. No. 16/723,583, dated Feb. 5, 2021, 15 pages.
Notice of Acceptance received for Australian Patent Application No. 2019208225, dated Jan. 21, 2021, 3 pages.
Notice of Allowance received for Chinese Patent Application No. 201510479088.4, dated Jan. 21, 2021, 2 pages (1 page of English Translation and 1 page of Official Copy).
Office Action received for Australian Patent Application No. 2020309093, dated Jan. 21, 2021, 3 pages.
Office Action received for Chinese Patent Application No. 201780033973.7, dated Jan. 22, 2021, 27 pages (11 pages of English Translation and 16 pages of Official Copy).
Feist Jonathan, "Android customization- Howto Create a Custom Clock Widget Using Zooper Widget", Android Authority, Available Online at: https://www.androidauthority.com/zooper-widget-clock-366476/, May 15, 2014, pp. 1-13.
Decision to Refuse received for European Patent Application No. 17184710.6, dated Jun. 16, 2020, 9 pages.
Applicant-Initiated Interview Summary received for U.S. Appl. No. 16/281,838, dated Jun. 2, 2020, 5 pages.
Notice of Allowance received for Chinese Patent Application No. 201510481525.6, dated May 27, 2019, 2 pages (1 page of English Translation and 1 page of Official Copy).
Office Action received for Chinese Patent Application No. 201510481525.6, dated Aug. 29, 2018, 10 pages (5 pages of English Translation and 5 pages of Official copy).
Office Action received for Chinese Patent Application No. 201510481525.6, dated Nov. 29, 2017, 9 pages (3 pages of English Translation and 6 pages of Official Copy).
Intention to Grant received for European Patent Application No. 15730925.3, dated May 28, 2020, 10 pages.
Minutes of Oral Proceedings received for European Patent Application No. 15730925.3, dated May 26, 2020, 11 pages.
Office Action received for Chinese Patent Application No. 201910990432.4, dated May 18, 2020, 15 pages (9 pages of English Translation and 6 pages of Official Copy).
Corrected Notice of Allowance received for U.S. Appl. No. 16/583,981, dated Apr. 6, 2021, 3 pages.
Non-Final Office Action received for U.S. Appl. No. 15/405,122, dated Apr. 2, 2021, 35 pages.
Non-Final Office Action received for U.S. Appl. No. 16/582,020, dated Apr. 5, 2021, 29 pages.
Office Action received for Korean Patent Application No. 10-2020-7001340, dated Mar. 26, 2021, 13 pages (6 pages of English Translation and 7 pages of Official Copy).
Final Office Action received for U.S. Appl. No. 16/418,786, dated Jan. 13, 2021, 14 pages.
Notice of Allowance received for U.S. Appl. No. 16/585,714, dated Jan. 8, 2021, 8 pages.
Office Action received for Australian Patent Application No. 2019208225, dated Dec. 21, 2020, 3 pages.
Office Action received for Chinese Patent Application No. 201910990432.4, dated Dec. 28, 2020, 6 pages (3 pages of English Translation and 3 pages of Official Copy).
Search Report and Opinion received for Danish Patent Application No. PA202070610, dated Jan. 8, 2021, 9 pages.
Baar Marius, "Fitbit Ace—Unboxing, Setup and 24 Hour Test", YouTube [online] [video], Marius Baar, Oct. 24, 2018, [retrieved on Jan. 6, 2021], Retrieved from <https://youtu.be/ekvkfqOyrls>. See especially 4:44., Oct. 24, 2018, 3 pages.
My Mate Vince, "Setting up the Fitbit Alta HR Activity Tracker on Apple iOS", Online available at: - <https://youtu.be/FdwRF4lfvFc>, Jun. 18, 2017, 3 pages.
Wearablezone, "How To Set Up Your Fitbit Profile", Online available at: <https://youtu.be/jsWPtcDWiJM>, Jun. 6, 2016, 3 pages.
Xdream, "TickTalk Video User Manual", YouTube [online] [video], Xdream, 2017 online available at: - <https://youtu.be/jYhq3DwmVzo>, Mar. 17, 2017, 3 pages.

(56) References Cited

OTHER PUBLICATIONS

International Search Report and Written Opinion received for PCT Patent Application No. PCT/US2020/030079, dated Sep. 4, 2020, 18 pages.
Non-Final Office Action received for U.S. Appl. No. 15/405,122, dated Sep. 24, 2020, 30 pages.
Notice of Allowance received for U.S. Appl. No. 15/798,235, dated Sep. 22, 2020, 8 pages.
3C Blogger Kisplay Share, Samsung GALAXY Tab S Hands-on SideSync 3.0 is Amazing, Jul. 4, 2014, 4 pages (Official Copy Only) (See Communication under 37 CFR§ 1.98(a) (3)).
Advisory Action received for U.S. Appl. No. 14/841,606, dated Feb. 28, 2019, 3 pages.
Advisory Action received for U.S. Appl. No. 14/815,898, dated Aug. 30, 2016, 3 pages.
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 14/863,099, dated Sep. 8, 2016, 3 pages.
Advisory Action received for U.S. Appl. No. 15/421,865, dated Apr. 16, 2020, 7 pages.
Advisory Action received for U.S. Appl. No. 15/554,204, dated Mar. 12, 2020, 3 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Andro Dollar, "Huawei Watch GT Always on Mode UPDATE is finally here! ????", Online Availabe at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen with WidgetLocker", Online Available at: http://appstap192.blogspot.com/2012/01/create-minimal-lock-screen-with.html, Jan. 18, 2012, 6 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.
APK Root, "Butterfly 3D Live Wallpaper 1.0 APK", Available at <http://net-suckga-ilauncher2.apk-dl.com/butterfly-3d-live-wallpaper>, Feb. 26, 2013, 7 pages.
Applicant Initiated Interview Summary received for U.S. Appl. No. 14/846,511, dated Apr. 20, 2020, 4 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-Initiated interview Summary received for U.S. Appl. No. 15/405,122, mailed on May 21, 2020, 5 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated interview Summary received for U.S. Appl. No. 15/798,235, mailed on Feb. 3, 2020, 3 pages.
Applicant-Initiated Interview Summary received for U.S. Appl. No. 16/147,523, mailed on Apr. 27, 2020, 3 pages.
Avdonin, Nikita, "Astroviewer 3D", Available at K:https:jjwww.youtube.comjwatch?v=zYOtslx3JHY/>, Nov. 5, 2013, 2 pages.

Axiang's Network Notebook, Deep Analysis on Samsung's 2013 New Flagship: tell you what kind of mobile phone Galaxy S4 is!,available at https://axiang.cc/archives/6115, Apr. 22, 2013, 4 pages (Official Copy Only) (See Communication under 37 CFR § 1.98(a) (3)).
Big Phil TV, "Gear S3 Watch faces with great always on display (A 0 D)", Available online at: https://www.youtube.com/watch?v=2cxMnrMiGU8, Apr. 5, 2017, 3 pages.
Bogdanov, Alexei, "SKMEI 1016", XP054977588, Available online at KURL:https://www.youtube.com/watch?v=E4q4Fug05Fw>, Jun. 21, 2014, 2 pages KOfficial Copy only) (See Communication under 37 CFR § 1.98(a) (3)).
Brief Communication regarding Oral Proceedings received for European Patent Application No. 15730925.3, mailed on Feb. 18, 2020, 7 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication regarding Oral Proceedings received for European Patent Application No. 17206177.2, mailed on Nov. 21, 2019, 5 pages.
Brightness on lock screen, Online Available at https://www.reddit.eom/r/galaxys10/comments/b4d5fb/brightness_on_lock_screen/, 1 page.
Cancellation of Oral Proceedings received for European Patent Application No. 17206177.2, mailed on Dec. 4, 2019, 2 pages.
Castellini, Rick, "Google Earth", Retrieved from <https://www.youtube.com/watch?v=bgjMSBXsFZQ>, Feb. 12, 2013, 3 pages.
Cengic, Suad, "Samsung Gear S3—Display Always On! Cool!", Available online at: https://www.youtube.com/watch?v=ceeDinbPwOY, Mar. 10, 2017, 3 pages.
Chenzai, "Apple, please don't screw up notifications on the Apple Watch", Available online at:- https://digi.tech.qq.eom/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Clark, Josh, "Designing Great iPhone Apps", O'Reilly Japan Co., O'Reilly Tim, vol. 1, May 24, 2012, 5 pages (Official Copy only) (See Communication under 37 CFR§ 1.98(a) (3)).
Corrected Notice of Allowance received for U.S. Appl. No. 14/641,251, dated Jun. 17, 2016, 2 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 14/839,897, dated Jan. 23, 2019, 6 pages.
Corrected Notice of Allowance received for U.S. Appl. No. 14/839,903, dated Feb. 13, 2019, 2 pages.
Corrected Notice of Allowance received for U.S. Appl. No. 14/839,903, dated Mar. 1, 2019, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/355,956, dated Jan. 3, 2020, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.

(56) References Cited

OTHER PUBLICATIONS

Cyr, Jim, "Apple Watch—Customize Modular Watch Face", available online at https://www.youtube.com/watch?v=02W93HbKIK8, May 13, 2015, 2 pages.
Dan, "Get This Look: 'Minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, dated Jul. 19, 2019, 18 pages.
Decision on Appeal received for U.S. Appl. No. 14/774,664, dated Sep. 12, 2019, 8 pages.
Decision on Appeal received for U.S. Appl. No. 14/863,099, dated Aug. 22, 2019, 9 pages.
Decision on Opposition received for Australian Patent Application No. 2015298710, dated Aug. 9, 2019, 4 pages.
Decision on Opposition received for Australian Patent Application No. 2015298710, dated Aug. 20, 2018, 20 pages.
Decision to Grant received for Danish Patent Application No. PA201570664, dated Feb. 20, 2017, 2 pages.
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant Received for Danish Patent Application No. PA201770397, dated Feb. 6, 2018, 2 pages.
Decision to Grant received for European Patent Application No. 15712218.5, dated Jun. 7, 2018, 2 pages.
Decision to Refuse received for European Patent Application No. 15730924.6, dated Mar. 15, 2019, 12 pages.
Deluxe Moon—Guide, available online at:- https://web.archive.org/web/20130520161057/http://www.lifewaresolutions.com/deluxe_moon_guide_ip.html, May 20, 2013, 5 pages.
Dharmasena, Anusha, "iMessage-send as text message Option", YouTube, Available online at: <https://www.youtube.com/watch?v=hXG-MdlW6FA>, Feb. 18, 2013, 1 page.
Digital alarm clock app for Android, Goggle play store digital alarm clock description page, Mar. 25, 2015, 3 pages.
Droid Life, "How to: Use Always-on Apps with Android Wear", Available online at https://www.youtube.com/watch?v=-xYB9EBTaA, Jun. 26, 2015, 3 pages.
EBPMAN Tech Reviews, "LG G3 Tips: How to customize the clock face", Available online at: https://www.youtube.com/watch?v=evraMWFb1fY, Jul. 25, 2014, 1 page.
European Search Report received for European Patent Application No. 17206177.2, dated Apr. 30, 2018, 4 pages.
Evgenyevich, Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/774,664, dated May 31, 2018, 28 pages.
Examiner's Answer to Appeal Brief received for U.S. Appl. No. 14/815,890, dated Mar. 20, 2020, 16 pages.
Examiner's Answer to Appeal Brief received for U.S. Appl. No. 14/863,099, dated Jul. 28, 2017, 31 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 16762356.0, dated Nov. 9, 2018, 10 Pages.
Extended European Search Report received for European Patent Application No. 16837432.0, dated Mar. 11, 2019, 10 pages.
Extended European Search Report received for European Patent Application No. 17810723.1, dated Nov. 12, 2019, 9 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/774,664, dated Aug. 25, 2017, 23 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/839,897, dated Jan. 10, 2018, 16 pages.
Final Office Action received for U.S. Appl. No. 14/841,606, dated Sep. 7, 2018, 34 pages.
Final Office Action received for U.S. Appl. No. 14/846,511, dated May 10, 2018, 21 pages.
Final Office Action received for U.S. Appl. No. 14/846,511, dated Jun. 5, 2019, 24 pages.
Final Office Action received for U.S. Appl. No. 14/863,099, dated Apr. 21, 2016, 20 pages.
Final Office Action received for U.S. Appl. No. 15/268,115, dated Oct. 11, 2017, 48 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/554,204, dated Oct. 31, 2019, 22 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 15/881,544, dated Jan. 29, 2019, 14 pages.
Final Office Action received for U.S. Appl. No. 16/582,020, dated Apr. 28, 2020, 31 pages.
Final Office Action received for U.S. Appl. No. 14/815,879, dated Mar. 24, 2016, 46 pages.
Final Office Action received for U.S. Appl. No. 14/839,903, dated Sep. 18, 2018, 11 pages.
First Action Interview received for U.S. Appl. No. 14/815,890, dated Aug. 12, 2016, 3 pages.
Fitbit surge Fitness Watch, Manual version 1.0, May 7, 2015, 48 pages.
Franks Tech Help, "DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.
Fuchphone Extras, "LG G Watch—Designs | Watch Faces", Available online at https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Fukuda, Kazuhiro, "Xperia Z1 Perfect Manual", Sotec Co., Ltd., No. 1, Nov. 15, 2013, pp. 217-218.
Gazer, "iPhone 4S Super Manual", Shuwa System Co., SAITO Kazukuni, vol. 1, Jun. 6, 2013, 7 pages (Official Copy only) (See Communication under 37 CFR § 1.98(a) (3)).
Geary, David, "Programming HTML5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.eom/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.

(56) References Cited

OTHER PUBLICATIONS

Google Earth on Android—AndroidCentral.com, Available online at:-https://www.youtube.com/watch?v=1WxN1RunrE4, Feb. 22, 2010, 1 page.
Gottabemobile, "How to Change Watch Faces on Android Wear", available online at URL : https://www.youtube.com/watch?v=B8iRGkGq6a8, Jul. 9, 2014, 4 pages.
GT-I9500 (Galaxy S4) User Manual, SAMSUNG, Rev.1.1, May 2013, 14 pages (Official Copy Only) (See Communication under 37 CFR § 1.98(a) (3)).
Intention to Grant received for Danish Patent Application No. PA201570496, dated Feb. 17, 2016, 6 pages.
Intention to Grant received for Danish Patent Application No. PA201570773, dated Mar. 9, 2018, 2 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant Received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant received for European Patent Application No. 15712218.5, dated Jan. 24, 2018, 7 pages.
Intention to Grant received for European Patent Application No. 15747595.5, dated Feb. 17, 2020, 8 pages.
Intention to Grant received for European Patent Application No. 15787091.6, dated Apr. 23, 2020, 7 pages.
Intention to Grant received for European Patent Application No. 17206177.2, dated Feb. 24, 2020, 8 pages.
International Preliminary Report on Patentability received for PCT Application No. PCT/US2016/037686, dated Mar. 1, 2018, 12 pages.
International Preliminary Report on Patentability received for PCT Patent Application No. PCT/US2014/027882, dated Sep. 24, 2015, 8 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/041424, dated Feb. 2, 2017, 13 Pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/047507, dated Mar. 16, 2017, 16 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2018/032164, dated Nov. 21, 2019, 11 pages.
International Search Report and Written Opinion received for PCT Application No. PCT/US2015/034604, dated Nov. 9, 2015, 30 pages.
International Search Report and Written Opinion received for PCT Application No. PCT/US2015/047507, dated Feb. 22, 2016, 22 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/041424, dated Mar. 31, 2016, 18 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2015/055165, dated Apr. 20, 2016, 22 pages.
International Search Report and Written Opinion received for PCT Patent Application No. PCT/US2016/016621, dated May 9, 2016, 12 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2018/032164, dated Oct. 18, 2018, 16 Pages.
International Search Report and Written Opinion received for PCT Patent Application No. PCT/US2019/024792, dated Jul. 18, 2019, 13 pages.

(56) References Cited

OTHER PUBLICATIONS

International Search Report and Written Opinion received for PCT Patent Application No. PCT/US2019/030770, dated Oct. 31, 2019, 23 pages.
International Search Report and Written Opinion received for PCT Patent Application No. PCT/US2015/034607, dated Dec. 1, 2015, 23 pages.
Internet Blog Post, "[PC] Pre-Customization of Black Desert's Characters", Online Available at :- <https://blog.naver.com/hsh6051/220209813968>, Dec. 14, 2014, 41 pages (21 pages of English translation and 20 pages of Official Copy).
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Addition Fees received for PCT Patent Application No. PCT/US2014/027882, dated Aug. 5, 2014, 2 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/041424, dated Nov. 12, 2015, 6 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/047507, dated Jan. 4, 2016, 8 pages.
Invitation to Pay Additional fees received for PCT Patent Application No. PCT/US2015/053353, dated Jan. 21, 2016, 7 pages.
Invitation to pay additional fees received for PCT Patent Application No. PCT/US2015/054223, dated Mar. 9, 2016, 9 pages.
Invitation to Pay Additional Fees received for PCT Patent Application No. PCT/US2015/055165, dated Jan. 18, 2016, 6 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
Invitation to Pay Search Fees received for European Patent Application No. 15753796.0, dated Mar. 24, 2020, 3 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
ITjungles, "iPhone 6: How to Pair with Another Bluetooth Device", Available Online at: https://www.youtube.com/watch?v=9setanYtHAk, Aug. 5, 2015, 3 pages.
Kenney, Briley, "How to Customize a Smartwatch and other Personalization Questions", Available online at: <https://smartwatches.org/learn/customize-smartwatch/>, Jan. 23, 2014, 3 pages.
Kidizoom Smartwatch, Available online at <URL:https://www.vtechnl.com/media/downloads/Kidizoom-Smart-Watch.pdf>, Jun. 24, 2014, 23 pages.
Link to Wayback Machine with link to Google Play showing different layouts of complications associated with a clock face, available online at <https://play.google.com/store/apps/details?id=com.levelup.beautifulwidgets.free&hl=da >, Sep. 9, 2013, 6 pages.
Living Earth, Available at:- http://www.livingearthapp.com/, 2014, 6 pages.
Looking for a launcher that changes the default homescreen or widgets based on wifi, location, or other context, Online Available at. https://www.reddit.com/r/androidapps/comments/35lu90/looking_for_a_iauncher_that _changes_the_default/, 2015, 2 pages.
Minutes of Oral Proceedings received for European Patent Application No. 15730924.6, dated Mar. 13, 2019, 4 pages.
MS Excel 2013, Jan. 29, 2013, 2 pages.
Nerdtalk, "The Best Android Clock Widgets", available at: https://www.youtube.com/watch?v=E1bAprWByfU, Apr. 25, 2011, 1 page.
New, but unsigned- Easy StopWatch for Symbian, XP55393563, Available online at <http://www.allaboutsymbian.com/flow/item/19490_New_but_unsigned-Easy_StopWatc.php>, Mar. 15, 2014, 15 pages.
Night Display (Alarm Clock) App, Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 14/839,913, dated Mar. 2, 2016, 11 pages.
Non-Final Office Action received for U.S. Appl. No. 14/864,011, dated Jan. 21, 2016, 10 pages.
Non-Final Office Action received for U.S. Appl. No. 15/881,544, dated Jun. 7, 2018, 15 pages.
Non-Final Office Action received for U.S. Appl. No. 15/554,204, dated Apr. 17, 2019, 19 pages.
Non-Final Office Action received for U.S. Appl. No. 14/774,664, dated Mar. 7, 2017, 23 pages.
Non-Final Office Action received for U.S. Appl. No. 14/805,403, dated Nov. 16, 2017, 21 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/839,913, dated Jul. 28, 2016, 12 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511, dated Jan. 7, 2020, 25 pages.
Non-Final Office Action received for U.S. Appl. No. 14/846,511, dated Oct. 27, 2017, 15 pages.
Non-Final Office Action received for U.S. Appl. No. 14/863,099, dated Dec. 2, 2015, 12 pages.
Non-final Office Action received for U.S. Appl. No. 14/864,011, dated Jun. 10, 2016, 10 pages.
Non-Final Office Action received for U.S. Appl. No. 15/183,663, dated Jul. 9, 2018, 13 pages.
Non-Final Office Action received for U.S. Appl. No. 15/268,115, dated Apr. 13, 2017, 44 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 15/421,865, dated Mar. 21, 2019, 18 pages.
Non-Final Office Action received for U.S. Appl. No. 15/433,238, dated Nov. 3, 2017, 6 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 16/144,264, dated May 1, 2020, 30 pages.

(56) References Cited

OTHER PUBLICATIONS

Non-Final Office Action received for U.S. Appl. No. 16/147,523, dated Dec. 27, 2019, 11 pages.
Non-Final Office Action received for U.S. Appl. No. 16/281,838, dated Mar. 26, 2020, 18 pages.
Non-Final Office Action received for U.S. Appl. No. 16/389,722, dated Apr. 3, 2020, 15 pages.
Non-Final Office Action received for U.S. Appl. No. 16/407,584, dated Jul. 10, 2019, 8 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Non-Final Office Action received for U.S. Appl. No. 16/749,929, dated May 13, 2020, 11 pages.
Non-Final Office Action received for U.S. Appl. No. 14/846,511, dated Nov. 30, 2018, 22 Pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Acceptance received for Australian Patent Application No. 2015298710, dated Oct. 8, 2019, 3 pages.
Notice of Acceptance received for Australian Patent Application No. 2015385757, dated Jul. 16, 2018, 3 pages.
Notice of Acceptance received for Australian Patent Application No. 2016218318, dated Jul. 3, 2019, 3 pages.
Notice of Acceptance received for Australian Patent Application No. 2016229847, dated Sep. 12, 2018, 3 pages.
Notice of Acceptance received for Australian Patent Application No. 2018247345, dated May 15, 2019, 3 pages.
Notice of Acceptance received for Australian Patent Application No. 2018279037, dated May 13, 2020, 3 pages.
Notice of Allowance received for Chinese Patent Application No. 201510483268.X, dated Nov. 6, 2019, 2 pages (1 page of English translation and 1 page of Official Copy).
Notice of Allowance received for Chinese Patent Application No. 201510483305.7, dated Jan. 8, 2019, 3 pages (1 page of English Translation and 2 pages of Official Copy).
Notice of Allowance received for Chinese Patent Application No. 201510484514.3, dated Jun. 6, 2019, 2 pages (1 page of English Translation and 1 page of Official Copy).
Notice of Allowance received for Chinese Patent Application No. 201520594249.X, dated Jul. 12, 2016, 4 pages (2 pages of English Translation and 2 pages of Official Copy).
Notice of Allowance received for Chinese Patent Application No. 201580046237.6, dated Aug. 29, 2018, 4 pages (1 page of English Translation and 3 pages of Official copy).
Notice of Allowance received for Chinese Patent Application No. 201610084974.1, dated Aug. 5, 2019, 2 pages (1 page of English Translation and 1 page of Official Copy).
Notice of Allowance received for Chinese Patent Application No. 201710657424.9, dated May 8, 2020, 2 pages (1 page of English Translation and 1 page of Official Copy).
Notice of Allowance received for Chinese Patent Application No. 201810037665.8, dated Jul. 9, 2019, 4 pages (1 page of English Translation and 3 pages of Official Copy).
Notice of Allowance received for Chinese Patent Application No. 201810321928.8, dated Sep. 11, 2019, 2 pages (1 page of English Translation and 1 page of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Danish Patent Application No. PA201570771, dated Sep. 2, 2016, 2 pages.
Notice of Allowance received for Danish Patent Application No. PA201570773, dated Apr. 26, 2018, 2 pages.
Notice of Allowance received for Japanese Patent Application No. 2017-505450, dated Mar. 9, 2018, 10 pages (7 pages of English Translation and 3 pages of Official Copy).
Notice of Allowance received for Japanese Patent Application No. 2017-505842, dated Mar. 16, 2020, 4 pages (1 page of English Translation and 3 pages of Official Copy).
Notice of Allowance received for Japanese Patent Application No. 2017-505847, dated May 20, 2019, 4 pages (1 page of English Translation and 3 pages of Official Copy).
Notice of Allowance received for Japanese Patent Application No. 2017-545733, dated Jun. 1, 2018, 4 pages (1 page of English Translation and 3 pages of Official copy).
Notice of Allowance received for Japanese Patent Application No. 2017-545918, dated Jul. 22, 2019, 4 pages (1 page of English Translation and 3 pages of Official Copy).
Notice of Allowance received for Japanese Patent Application No. 2018-074971, dated Apr. 23, 2019, 4 pages (1 page of English Translation and 3 pages of Official Copy).
Notice of Allowance received for Japanese Patent Application No. 2018-126311, dated Feb. 1, 2019, 4 pages (1 page of English Translation and 3 pages of Official copy).
Notice of Allowance received for Japanese Patent Application No. 2018-537840, dated Mar. 19, 2020, 4 pages (1 page of English Translation and 3 pages of Official Copy).
Notice of Allowance received for Korean Patent Application No. 10-2017-7005939, dated Mar. 30, 2018, 5 pages (2 pages of English Translation and 3 pages of Official Copy).
Notice of Allowance received for Korean Patent Application No. 10-2018-7022101, dated Oct. 14, 2019, 4 pages (1 page of English Translation and 3 pages of Official Copy).
Notice of Allowance received for Taiwanese Patent Application No. 104107328, dated Jun. 12, 2017, 3 pages (Official Copy Only) (See Communication under 37 CFR§ 1.98(a) (3)).
Notice of Allowance received for Taiwanese Patent Application No. 104123593, dated Oct. 1, 2018, 4 pages (1 pages of English Translation and 3 pages. Official Copy).
Notice of Allowance received for Taiwanese Patent Application No. 104124962, dated Jul. 27, 2017, 3 pages (Official Copy only) (See Communication under 37 CFR§ 1.98(a) (3)).
Notice of Allowance received for Taiwanese Patent Application No. 104124963, dated Sep. 28, 2017, 5 pages (1 page of English Translation of Search Yeport and 4 pages of Official Copy).
Notice of Allowance received for Taiwanese Patent Application No. 104124995, dated Jul. 27, 2017, 3 pages (Official Copy only) (See Communication under 37 CFR § 1.98(a) (3)).
Notice of Allowance received for Taiwanese Patent Application No. 104124997, dated Jun. 16, 2017, 5 pages (1 page of English Translation of Search report and 4 pages of Official Copy).
Notice of Allowance received for Taiwanese Patent Application No. 104124998, dated Mar. 31, 2017, 3 pages (Official Copy only) (See Communication under 37 CFR § 1.98(a)(3)).
Notice of Allowance received for Taiwanese Patent Application No. 104128700, dated Mar. 27, 2017, 3 pages (Official Copy only) (See Communication under 37 CFR § 1.98(a) (3)).
Notice of Allowance received for Taiwanese Patent Application No. 104133756, dated Nov. 30, 2017, 5 pages (2 pages of English Translation and 3 pages of Official Copy).
Notice of Allowance received for Taiwanese Patent Application No. 104133757, dated Jan. 18, 2017, 3 pages (Official Copy only) (See Communication under 37 CFR § 1.98(a)(3)).
Notice of Allowance received for Taiwanese Patent Application No. 104134740, dated Dec. 8, 2016, 5 pages (1 page of English Translation of Search Report and 4 pages of Official Copy).
Notice of Allowance received for U.S. Appl. No. 14/641,251, dated May 18, 2016, 13 pages.
Notice of Allowance received for U.S. Appl. No. 14/805,403, dated Jul. 11, 2018, 15 pages.
Notice of Allowance received for U.S. Appl. No. 14/815,879, dated Jun. 26, 2017, 8 pages.

(56) References Cited

OTHER PUBLICATIONS

Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/839,889, dated Oct. 30, 2017, 16 pages.
Notice of Allowance received for U.S. Appl. No. 14/839,897, dated Jun. 8, 2018, 11 pages.
Notice of Allowance received for U.S. Appl. No. 14/839,903, dated Jan. 3, 2019, 7 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 15/183,663, dated Jan. 17, 2019, 6 pages.
Notice of Allowance received for U.S. Appl. No. 15/268,115, dated Mar. 7, 2018, 15 pages.
Notice of Allowance received for U.S. Appl. No. 15/355,956, dated Nov. 22, 2019, 29 pages.
Notice of Allowance received for U.S. Appl. No. 15/366,607, dated Apr. 2, 2019, 2 pages.
Notice of Allowance received for U.S. Appl. No. 15/366,607, dated Feb. 21, 2019, 9 pages.
Notice of Allowance received for U.S. Appl. No. 15/433,238, dated May 17, 2018, 7 pages.
Notice of Allowance received for U.S. Appl. No. 15/798,235, dated Apr. 1, 2020, 8 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 15/975,581, dated Oct. 3, 2018, 25 pages.
Notice of Allowance received for U.S. Appl. No. 16/407,584, dated Oct. 28, 2019, 5 pages.
Notice of Allowance received for U.S. Appl. No. 16/585,366, dated Jan. 2, 2020, 6 pages.
Nova Launcher—Lock Screen Edit, Online Available at: https://forums.androidcentral.com/ask-question/835057-nova-launcher-lock-screen-edit.html, Sep. 2017, 2 pages.
Nova, "Tour of the Solar System", Retrieved from <http://www.pbs.org/wgbh/nova/space/tour-solar-system.html>, May 24, 2013, 14 pages.
Nozawa Naoki, et al., "iPad Perfect Manual for iOS 4", JPN, SOTEC Ltd., YANAGISAWA Junichi, Dec. 31, 2010, pp. 189-190 (Official Copy Only) (See Communication under 37 CFR § 1.98(a) (3)).
Obara, YuuTA, "iPhone Application Selection for Univesity Students", Shuwa System Co., SAITO Kazukuni, vol. 1, May 16, 2013, 4 pages (Official Copy only) (See Communication under 37 CFR§ 1.98(a) (3)).
OCTOBA. "Just Install It—Utilizing Method for Android Application Business". ASCII Media Works Co. TAKANO Kiyoshi, vol. 1, Apr. 25, 2013, 6 pages (Official Copy only) (See Communication under 37 CFR § 1.98(a) (3)).
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2015385757, dated Sep. 11, 2017, 3 pages.
Office Action received for Australian Patent Application No. 2016100155, dated May 4, 2016, 7 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016218318, dated Aug. 24, 2018, 5 pages.
Office Action received for Australian Patent Application No. 2016218318, dated Sep. 26, 2018, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2018201089, dated Oct. 11, 2019, 4 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018247345, dated May 6, 2019, 2 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2019208225, dated Mar. 20, 2020, 3 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages (1 page of English Translation and 2 pages of Official copy).

(56) References Cited

OTHER PUBLICATIONS

Office Action received for Chinese Patent Application No. 201510479088.4, dated Apr. 22, 2020, 7 pages (3 pages of English Translation and 4 pages of Official Copy).
Office Action received for Chinese Patent Application No. 201510479088.4, dated Mar. 12, 2018, 20 pages (6 pages of English Translation and 14 pages of Official Copy).
Office Action received for Chinese Patent Application No. 201510479088.4, dated May 7, 2019, 6 pages (3 pages of English Translation and 3 pages of Official Copy).
Office Action received for Chinese Patent Application No. 201510483268.X, dated Apr. 16, 2019, 6 pages (3 pages of English Translation and 3 pages of Official Copy).
Office Action received for Chinese Patent Application No. 201510483268.X, dated Dec. 1, 2017, 11 pages (5 pages of English Translation and 6 pages of Official Copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).
Office action received for Chinese Patent Application No. 201510483305.7, dated Dec. 1, 2017, 13 pages (5 pages of English Translation and 8 pages of Official Copy).
Office Action received for Chinese Patent Application No. 201510484514.3, dated Apr. 4, 2018, 12 pages (5 pages of English Translation and 7 pages of Official Copy).
Office Action received for Chinese Patent Application No. 201510484514.3, dated Dec. 24, 2018, 13 pages (6 pages of English Translation and 7 pages of Official Copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595384.6, dated Dec. 30, 2016, 2 pages (Official Copy only) (See Communication under 37 CFR§ 1.98(a) (3)).
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Dec. 30, 2016, 2 pages (Official Copy only) (See Communication under 37 CFR§ 1.98(a) (3)).
Office Action received for Chinese Patent Application No. 201520595385.0, dated Jul. 22, 2016, 3 pages (1 page of English Translation and 2 pages of Official Copy).
Office Action received for Chinese Patent Application No. 201520595385.0, dated Mar. 25, 2016, 3 pages (1 page of English Translation and 2 pages of Official copy).
Office Action Received for Chinese Patent Application No. 201520595408.8, dated Dec. 9, 2015, 4 pages (2 pages of English Translation and 2 pages of Official Copy).
Office Action Received for Chinese Patent Application No. 201520595408.8, dated Dec. 30, 2016, 2 pages (Official Copy Only) (See Communication under 37 CFR§ 1.98(a) (3)).
Office Action received for Chinese Patent Application No. 201520595408.8, dated Jul. 25, 2016, 3 pages (1 page of English Translation and 2 pages of Official Copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Dec. 30, 2016. 2 pages (Official Copy only) (See Communication under 37 CFR§ 1.98(a) (3)).
Office Action received for Chinese Patent Application No. 201520595538.1, dated Jul. 22, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Office Action received for Chinese Patent Application No. 201580046237.6, dated Feb. 6, 2018, 10 pages (5 pages of English Translation and 5 pages of Official Copy).
Office Action received for Chinese Patent Application No. 201580077218.X, dated Feb. 3, 2020, 23 pages (8 pages of English Translation and 15 pages of Official Copy).
Office Action received for Chinese Patent Application No. 201610084974.1, dated Dec. 5, 2018, 6 pages (3 pages of English Translation and 3 pages of Official Copy).
Office Action received for Chinese Patent Application No. 201610084974.1, dated May 3, 2018, 12 pages (5 pages of English Translation and 7 pages of Official Copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official Copy only) (See Communication under 37 CFR§ 1.98(a) (3)).
Office Action received for Chinese Patent Application No. 201680013193.1, dated Mar. 25, 2020, 21 pages (8 pages of English Translation and 13 pages of Official Copy).
Office Action received for Chinese Patent Application No. 201680047983.1, dated Mar. 18, 2019, 18 pages (6 pages of English Translation and 12 pages of Official Copy).
Office Action received for Chinese Patent Application No. 201680047983.1, dated Nov. 28, 2019, 9 pages (4 pages of English Translation and 5 pages of Official Copy).
Office Action received for Chinese Patent Application No. 201710657424.9, dated Sep. 17, 2019, 23 pages (11 pages of English Translation and 12 pages of Official Copy).
Office Action received for Chinese Patent Application No. 201810037665.8, dated Dec. 7, 2018, 10 pages (5 pages of English Translation and 5 pages of Official Copy).
Office Action received for Chinese Patent Application No. 201810321928.8, dated Jul. 2, 2019, 10 pages (5 pages of English Translation and 5 pages of Official Copy).
Office Action Received for Chinese Patent Application No. 201520594249.X, dated Dec. 9, 2015, 4 pages (2 pages of English Translation and 2 pages of Official Copy).
Office Action Received for Chinese Patent Application No. 201520595384.6, dated Dec. 9, 2015, 4 pages (2 pages of English Translation and 2 pages of Official Copy).
Office Action Received for Chinese Patent Application No. 201520595385.0, dated Dec. 9, 2015, 4 pages (2 pages of English Translation and 2 pages of Official Copy).
Office Action Received for Chinese Patent Application No. 201520595538.1, dated Dec. 9, 2015, 4 pages (2 pages of English Translation and 2 pages of Official Copy).
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.

(56) References Cited

OTHER PUBLICATIONS

Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570499, dated Nov. 1, 2017, 6 pages.
Office Action received for Danish Patent Application No. PA201570499, dated Nov. 3, 2015, 7 pages.
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570664, dated Mar. 15, 2016, 10 pages.
Office Action Received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201570771, dated Jun. 13, 2016, 3 pages.
Office Action received for Danish Patent Application No. PA201570771, dated Mar. 17, 2016, 8 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action Received for Danish Patent Application No. PA201570773, dated Mar. 18, 2016, 9 pages.
Office Action received for Danish Patent Application No. PA201570773, dated Sep. 12, 2016, 3 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670074, dated Apr. 7, 2016, 8 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15712218.5, dated Aug. 3, 2017, 4 pages.
Office Action received for European Patent Application No. 15730924.6, dated Dec. 12, 2017, 8 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 15787091.6, dated Aug. 2, 2019, 8 pages.
Office Action received for European Patent Application No. 15787091.6, dated Oct. 8, 2018, 7 pages.
Office Action received for European Patent Application No. 16837432.0, dated Jan. 10, 2020, 7 pages.
Office Action received for European Patent Application No. 17184710.6, dated Dec. 21, 2018, 7 pages.
Office Action received for European Patent Application No. 17206177.2, dated May 15, 2018, 6 pages.
Office Action received for European Patent Application No. 15730925.3, dated Feb. 27, 2019, 5 pages.
Office Action received for German Patent Application No. 112015003083.2, dated Mar. 9, 2018, 12 pages (5 pages of English Translation and 7 pages of Official Copy).
Office Action received for Japanese Patent Application No. 2018-126311, dated Nov. 2, 2018, 4 pages (2 pages of English Translation and 2 pages of official copy).
Office Action received for Japanese Patent Application No. 2017-505450, dated Jun. 20, 2017, 8 pages (4 pages of English Translation and 4 pages of Official Copy).
Office Action received for Japanese Patent Application No. 2017-505842, dated Feb. 22, 2019, 11 pages (6 pages of English Translation and 5 pages of Official Copy).
Office Action received for Japanese Patent Application No. 2017-505842, dated Sep. 9, 2019, 7 pages (3 pages of English Translation and 4 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2017-545733, dated Feb. 13, 2018, 7 pages (3 pages of English Translation and 4 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2018-074971, dated Jan. 28, 2019, 6 pages (3 pages of English Translation and 3 pages of Official Copy).
Office Action received for Japanese Patent Application No. 2018-537840, dated Jul. 8, 2019, 15 pages (8 pages of English Translation and 7 pages of Official copy).
Office Action received for Korean Patent Application No. 10-2017-7005939, dated Jun. 30, 2017, 6 pages (2 pages of English Translation and 4 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7024570, dated Sep. 28, 2018, 14 pages (6 pages of English Translation and 8 pages of Official copy).
Office Action received for Korean Patent Application No. 10-2018-7018904, dated Aug. 20, 2019, 8 pages (3 pages of English Translation and 5 pages of Official Copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2018-7022101, dated Jul. 9, 2019, 10 pages (5 pages of English Translation and 5 pages of Official Copy).
Office Action received for Korean Patent Application No. 10-2019-7029673, dated Nov. 5, 2019, 10 pages (4 pages of English Translation and 6 pages of Official Copy).
Office Action received for Netherland Patent Application No. 2015245, dated Jan. 24, 2017, 11 pages (1 page of English Translation and 10 pages of Official Copy).
Office Action received for Netherlands Patent Application No. 2015239, dated Oct. 28, 2016, 13 pages (5 pages of English Translation and 8 pages of Official Copy).
Office Action received for Taiwanese Patent Application No. 104123593, dated May 24, 2016, 57 pages (26 pages of English Translation and 31 pages of Official Copy). .

(56) References Cited

OTHER PUBLICATIONS

Office Action received for Taiwanese Patent Application No. 104123593, dated Sep. 13, 2016, 8 pages (3 pages of English Translation and 5 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104124998, dated Nov. 29, 2016, 6 pages (3 pages of English Translation and 3 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104126627, dated Aug. 30, 2018, 22 pages (9 pages of English Translation and 13 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104126627, dated Oct. 16, 2017, 7 pages (3 pages of English Translation and 4 pages of Official Copy).
Office Action received for Taiwanese Patent Application No. 104128700, dated Aug. 31, 2016, 13 pages (6 pages of English Translation and 7 pages of Official Copy).
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official Copy).
Office Action received for Taiwanese Patent Application No. 104133756, dated May 17, 2017, 13 pages (6 pages of English Translation and 7 pages of Official Copy).
Office Action received for Taiwanese Patent Application No. 104133757, dated Jul. 6, 2016, 22 pages (9 pages of English Translation and 13 pages of Official Copy).
Office Action received for Taiwanese Patent Application No. 104107328, dated Dec. 28, 2016, 4 pages (1 page of Search Report and 3 pages of Official Copy).
Omar ROMERO, "Sony Smartwatch 2 Custom Watchfaces Tutorial", Retrieved From: <https://www.youtube.com/watch?v=8odbxqwSQR8>, May 1, 2014, 2 pages.
Online Alarm Clock, https://web.archive.org/web/20150505081746/http://www.online-stopwatch.com/online-alarm-clock, May 5, 2015, 2 pages.
Pentax K20D Operating Manual, http://www.ricoh-imaging.eu/en/operating-manuals-download.html, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Pre-Interview First Office Action received for U.S. Appl. No. 14/815,890, dated May 26, 2016, 4 pages.
Rehman, A, "Install Android 4.2 Gesture-Based Keyboard & Clock App on Jelly Bean 4.1 Or Higher", Excerpts From, Available online at <http://www.addictivetips.com/android/install-android-4-2-keyboard-clock-app-apk-on-jelly-bean-4-1-x/>, Nov. 3, 2012, 4 pages.
Remote Shot for SmartWatch 2, Available online at:-https://play.google.com/store/apps/details?id=net.watea.sw2.rshot&hl=en, Nov. 21, 2017, 3 pages.
Restriction Requirement received for U.S. Appl. No. 14/815,890, dated Feb. 22, 2016, 5 pages, 5 pages.
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Reuse Animations—Synfig Animation Studio, Available online at: https://wiki.synfig.org/index.php?title=Doc:Reuse_Animations&oldid=18173, May 20, 2013, 5 pages.
Search Report and Opinion Received for Netherland Patent Application No. 2015232, dated Jan. 25, 2017, 9 pages (1 page of English Translation and 8 pages of Official Copy).
Search Report and Opinion received for Netherlands Patent Application No. 2015242, dated Jul. 4, 2017, 20 pages (10 pages of English Translation of Search Opinion and 10 pages of official copy).
Search Report and Opinion received for Netherlands Patent Application No. 2018531, dated Jul. 27, 2017, 14 pages (6 pages of English Translation and 8 pages of Official Copy).
Search Report received for Danish Patent Application No. 201570768, dated Mar. 17, 2016, 11 pages.
Shiota, Shinji, "Windows 7 Dojo", Weekly ASCII, Ascii Mediaworks Inc., vol. 798, Aug. 31, 2010, 3 pages.
Smartwatch, "App Earth Space HD Live Wallpaper APK for Smart Watch", Version 1.7, Android version 2.2, Aug. 27, 2013, 1 page.
Solar Walk Free, Vito Technology, Jun. 19, 2014, 9 pages.
Sony, "Live View™ micro display", Extended User Guide, Aug. 2010, 27 pages.
Sony, "Sony SmartWatch", User Guide, Dec. 2011, 18 pages.
Stateoftech, "Samsung Galaxy Gear Tips- Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 17184710.6, mailed on Sep. 17, 2019, 7 pages.
Summons to Attend Oral Proceedings received for European Patent Application No. 17206177.2, mailed on Jun. 3, 2019, 8 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/805,403, dated Oct. 4, 2018, 3 pages.
Supplemental Notice of Allowance received for U.S. Appl. No. 15/433,238, dated Jun. 20, 2018, 2 pages.
Talkandroid, "Android Wear walkthrough", Available online at: https://www.youtube.com/watch?v=4xntpZac4sw, Jun. 30, 2014, 1 page.
Tech, Smith, "Snagit 11 Snagit 11.4 Help", Available at: http://assets.techsmith.com/Downloads/ua-tutorials-snagit-11/Snagit_11.pdf, Jan. 2014, 2 pages.
Techsmith, "Snagit ® 11 Snagit 11.4 Help", available at <http://assets.techsmith.com/Downloads/ua-tutorials-snagit-11/Snagit_11.pdf>, Jan. 2014, 146 pages.
The Simply Alarm app for Pebble, available online at <https://web.archive.org/web/20150517070400> /http://www.rebootsramblings.ca/n/sahhelp/https://www.youtube.com/watch?v=IVp1scQPw08, May 17, 2015, 1 page.
Tropical Fish 14, Available online at: https://www.turbosquid.com/3d-models/tropical-fish-3d-model/388510, Feb. 4, 2008, 2 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.

(56) References Cited

OTHER PUBLICATIONS

UIKit User Interface Catalog: Page Controls, Available online at https://web.archive.org/web/20140703123442/https://developer.apple.com/library/ios/documentation/userexperience/conceptuai/UIKitUICatalog/UIPageControl.html, Dec. 16, 2013, 4 pages.
Viticci, Frederico, "Checking Time Zones with Living Earth—MacStories", Available at <https://www.macstories.net/reviews/checking-time-zones-with-living-earth/>, Dec. 11, 2013, pp. 1-5.
Wade, Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-l-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oidid=648776142, Feb. 25, 2015, 9 pages.
Xiao, et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Xperia ZL2 SOL25, "Instruction Manual", Detailed version, KDDI Corporation, No. 1, vol. 1, Jun. 2014, 4 pages.
Zephyrnix, "Steam's In-Game Home menu", Online Available at: <https://www.youtube.com/watch?v=jLoRFiPkcUw>, See 0;00-1;06, Feb. 15, 2011, 3 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Decision on Acceptance received for Australian Patent Application No. 2018201089, dated Apr. 20, 2021, 28 pages.
Final Office Action received for U.S. Appl. No. 16/861,651, dated Apr. 20, 2021, 14 pages.
Intention to Grant received for Danish Patent Application No. PA201970597, dated Apr. 20, 2021, 2 pages.
Notice of Acceptance received for Australian Patent Application No. 2020204506, dated Apr. 8, 2021, 3 pages.
Office Action received for Danish Patent Application No. PA201970533, dated Apr. 20, 2021, 2 pages.
Office Action received for Danish Patent Application No. PA201970598, dated Apr. 15, 2021, 6 pages.
Office Action received for Korean Patent Application No. 10-2019-7029673, dated Apr. 8, 2021, 7 pages (3 pages of English Translation and 4 pages of Official Copy).
Sony Smartwatch 2 update—new features and watchface creator!!! NEW!!!, Online available at: - https://www.youtube.com/watch?v=k3jjBv7QZSk, May 8, 2014, 3 pages.
Rowinski Dan, "Why the All-In-One Smartwatch Isn't Happening Any Time Soon", Online available at: -https://web.archive.org/web/20140123074218if_/https://readwrite.com/2014/01/20/smartwatch-wearable-fitness-remote-control/, Jan. 20, 2014, 6 pages.
Stateoftech, "Samsung Galaxy Gear Tips—Installing and Customizing Clock Faces", Online available at: - https://www.youtube.com/watch?v=p2GzpL3xlUo, Dec. 12, 2013, 3 pages.
Techcloud, "How to Create Custom Watch Face for Samsung Galaxy Gear Smartwatch just in Few Seconds", Online available at: -https://www.youtube.com/watch?v=6rO-_SREDjQ, Oct. 9, 2013, 3 pages.
Theunlockr, "How to Change the Watch Face on the Galaxy Gear", Online available at: - https://www.youtube.com/watch?v=Z7EBG5aBiZg, Jan. 3, 2014, 3 pages.
Applicant Initiated Interview Summary received for U.S. Appl. No. 16/583,994, dated Apr. 3, 2020, 5 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated Nov. 24, 2020, 4 pages.
Applicant-Initiated Interview Summary received for U.S. Appl. No. 16/659,507, dated Nov. 17, 2020, 3 pages.
Decision on Appeal received for U.S. Appl. No. 14/815,890, dated Nov. 24, 2020, 13 pages.
European Search Report received for European Patent Application No. 20192404.0, dated Nov. 20, 2020, 4 pages.
Final Office Action received for U.S. Appl. No. 16/583,981, dated Apr. 16, 2020, 19 pages.
Final Office Action received for U.S. Appl. No. 16/583,994, dated Jul. 23, 2020, 16 pages.
International Preliminary Report on Patentability received for PCT Patent Application No. PCT/US2019/030770, dated Nov. 19, 2020, 14 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/031575, dated Aug. 20, 2020, 14 pages.
International Search Report and Written Opinion received for PCT Patent Application No. PCT/US2020/035446, dated Nov. 10, 2020, 20 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/045814, dated Nov. 18, 2020, 11 pages.
Non-Final Office Action received for U.S. Appl. No. 16/583,981, dated Dec. 6, 2019, 14 pages.
Non-Final Office Action received for U.S. Appl. No. 16/583,994, dated Dec. 30, 2019, 14 pages.
Non-Final Office Action received for U.S. Appl. No. 16/723,583, dated Aug. 13, 2020, 13 pages.
Non-Final Office Action received for U.S. Appl. No. 16/861,651, dated Nov. 27, 2020, 11 pages.
Notice of Allowance received for Chinese Patent Application No. 201580077218.X, dated Nov. 13, 2020, 2 pages (1 page of English Translation and 1 page of Official Copy).
Notice of Allowance received for U.S. Appl. No. 16/144,264, dated Nov. 16, 2020, 10 pages.
Notice of Allowance received for U.S. Appl. No. 16/584,281, dated Nov. 18, 2020, 8 pages.
Office Action received for Danish Patent Application No. PA201970533, dated Jul. 17, 2020, 6 pages.
Record of Oral Hearing received for U.S. Appl. No. 14/815,890, dated Nov. 20, 2020, 18 pages.

(56) References Cited

OTHER PUBLICATIONS

Result of Consultation received for European Patent Application No. 15730925.3, dated Nov. 24, 2020, 4 pages.
Search Report and Opinion received for Danish Patent Application No. PA201970533, dated Oct. 25, 2019, 9 pages.
Decision to Grant received for European Patent Application No. 17206177.2, dated Aug. 6, 2020, 2 pages.
Final Office Action received for U.S. Appl. No. 14/846,511, dated Aug. 11, 2020, 25 pages.
Invitation to Pay Additional Fees received for PCT Patent Application No. PCT/US2020/030079, dated Jul. 14, 2020, 12 pages.
Corrected Notice of Allowance received for U.S. Appl. No. 15/554,204, dated Aug. 19, 2020, 3 pages.
Office Action received for European Patent Application No. 15753796.0, dated Aug. 4, 2020, 9 pages.
Office Action received for European Patent Application No. 20172197.4, dated Aug. 5, 2020, 6 pages.
Corrected Notice of Allowance received for U.S. Appl. No. 16/281,838, dated Oct. 30, 2020, 2 pages.
Extended European Search Report received for European Patent Application No. 20185974.1, dated Oct. 28, 2020, 7 pages.
Notice of Allowance received for U.S. Appl. No. 16/585,721, dated Oct. 30, 2020, 9 pages.
Notice of Allowance received for U.S. Appl. No. 16/749,929, dated Nov. 4, 2020, 5 pages.
Office Action received for Danish Patent Application No. PA201970597, dated Oct. 29, 2020, 4 pages.
Office Action received for Japanese Patent Application No. 2019-151358, dated Oct. 2, 2020, 5 pages (2 pages of English Translation and 3 pages of Official Copy).
Applicant-Initiated Interview Summary received for U.S. Appl. No. 16/997,588, dated May 12, 2021, 2 pages.
Decision to Grant received for Danish Patent Application No. PA202070609, dated May 3, 2021, 2 pages.
Notice of Allowance received for Chinese Patent Application No. 201980036737.X, dated Apr. 20, 2021, 10 pages (5 pages of English Translation and 5 pages of Official Copy).
Office Action received for Australian Patent Application No. 2020102158, dated Apr. 27, 2021, 5 pages.
Invitation to Pay Additional Fees received for PCT Patent Application No. PCT/US2020/031536, dated Jul. 31, 2020, 9 pages.
Notice of Allowance received for U.S. Appl. No. 16/281,838, dated Aug. 26, 2020, 9 pages.
Supplemental Notice of Allowance received for U.S. Appl. No. 16/585,399, dated Aug. 26, 2020, 2 pages.
Notice of Allowance received for Chinese Patent Application No. 201680013193.1, dated May 7, 2021, 5 pages (1 page of English Translation and 4 pages of Official Copy).
Corrected Notice of Allowance received for U.S. Appl. No. 16/583,981, dated May 17, 2021, 3 pages.
Notice of Allowance received for Chinese Patent Application No. 201680047983.1, dated Apr. 28, 2021, 3 pages (1 page of English Translation and 2 pages of Official Copy).
Notice of Allowance received for Chinese Patent Application No. 201910990432.4, dated Apr. 27, 2021, 2 pages (1 page of English Translation and 1 page of Official Copy).
Notice of Allowance received for Korean Patent Application No. 10-2020-7001340, dated May 10, 2021, 5 pages (2 pages of English Translation and 3 pages of Official Copy).
Notice of Allowance received for U.S. Appl. No. 16/281,838, dated May 20, 2021, 9 pages.
Summons to Attend Oral Proceedings received for European Patent Application No. 16762356.0, dated May 10, 2021, 10 pages.
Applicant-Initiated Interview Summary received for U.S. Appl. No. 16/401,934, dated Feb. 23, 2021, 8 pages.
Notice of Allowance received for U.S. Appl. No. 14/815,890, dated Feb. 12, 2021, 8 pages.
Notice of Allowance received for U.S. Appl. No. 16/659,507, dated Feb. 24, 2021, 7 pages.
Office Action received for Chinese Patent Application No. 201680047983.1, dated Feb. 1, 2021, 6 pages (3 pages of English Translation and 3 pages of Official Copy).
Office Action received for European Patent Application No. 16708003.5, dated Feb. 22, 2021, 10 pages.
Applicant-Initiated Interview Summary received for U.S. Appl. No. 15/421,865, dated Jun. 30, 2021, 6 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Notice of Acceptance received for Australian Patent Application No. 2018201089, dated May 28, 2021, 3 pages.
Notice of Allowance received for U.S. Appl. No. 16/583,994, dated Jun. 24, 2021, 10 pages.
Office Action received for Danish Patent Application No. PA202070610, dated Jun. 18, 2021, 8 pages.
Office Action received for Korean Patent Application No. 10-2021-7013453, dated Jun. 5, 2021, 6 pages (2 pages of English Translation and 4 pages of Official Copy).
Office Action received for Korean Patent Application No. 10-2021-7013454, dated Jun. 5, 2021, 6 pages (2 pages of English Translation and 4 pages of Official Copy).
Phonebuff, "Hybrid Stopwatch & Timer Android App Review", Available Online at https://www.youtube.com/watch?v=B43oCFPiWvY, Apr. 4, 2012, 7 pages.
Rosa et al., "Stripe Generator—a Free Tool for the Web Design Community", Available online at: http://www.stripegenerator.com/, Mar. 28, 2019, 2 pages.
Non-Final Office Action received for U.S. Appl. No. 16/147,523, dated Jul. 21, 2021, 20 pages.
Non-Final Office Action received for U.S. Appl. No. 17/068,386, dated Jul. 15, 2021, 16 pages.
Notice of Acceptance received for Australian Patent Application No. 2020309093, dated Jul. 8, 2021, 3 pages.
Notice of Acceptance received for Australian Patent Application No. 2021202834, dated Jul. 15, 2021, 3 pages.
Notice of Allowance received for U.S. Appl. No. 16/582,020, dated Jul. 27, 2021, 29 pages.
Office Action received for Australian Patent Application No. 2020239749, dated Jul. 16, 2021, 5 pages.
Office Action received for Korean Patent Application No. 10-2020-7028759, dated Jun. 29, 2021, 12 pages (5 pages of English Translation and 7 pages of Official Copy).
Applicant-Initiated Interview Summary received for U.S. Appl. No. 16/147,523, dated Dec. 10, 2021, 4 pages.
Applicant-Initiated Interview Summary received for U.S. Appl. No. 17/031,765, dated Dec. 15, 2021, 4 pages.
Decision to Grant received for European Patent Application No. 15730925.3, dated Dec. 9, 2021, 2 pages.
Final Office Action received for U.S. Appl. No. 16/389,722, dated Dec. 6, 2021, 19 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035446, dated Dec. 9, 2021, 14 pages.
Invitation to Pay Search Fees received for European Patent Application No. 20761084.1, dated Dec. 7, 2021, 3 pages.
Notice of Acceptance received for Australian Patent Application No. 2019267413, dated Nov. 23, 2021, 3 pages.
Notice of Allowance received for U.S. Appl. No. 16/418,786, dated Dec. 9, 2021, 9 pages.
Office Action received for Chinese Patent Application No. 202110453180.9, dated Nov. 8, 2021, 21 pages (11 pages of English Translation and 10 pages of Official Copy).
Result of Consultation received for European Patent Application No. 16762356.0, dated Nov. 29, 2021, 3 pages.
Corrected Notice of Allowance received for U.S. Appl. No. 16/401,934, dated Dec. 23, 2021, 3 pages.
Corrected Notice of Allowance received for U.S. Appl. No. 16/418,786, dated Jan. 5, 2022, 3 pages.

(56) References Cited

OTHER PUBLICATIONS

Decision on Appeal received for U.S. Appl. No. 14/846,511, dated Dec. 29, 2021, 20 pages.
Final Office Action received for U.S. Appl. No. 16/935,002, dated Jan. 5, 2022, 25 pages.
Intention to Grant received for European Patent Application No. 16762356.0, dated Dec. 23, 2021, 8 pages.
Notice of Acceptance received for Australian Patent Application No. 2020269232, dated Dec. 16, 2021, 3 pages.
Office Action received for Australian Patent Application No. 2020250323, dated Dec. 14, 2021, 2 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-7036678, dated Dec. 22, 2021, 6 pages (2 pages of English Translation and 4 pages of Official Copy).
Final Office Action received for U.S. Appl. No. 16/861,651, dated Jan. 26, 2022, 16 pages.
Notice of Acceptance received for Australian Patent Application No. 2020239774, dated Jan. 5, 2022, 3 pages.
Office Action received for European Patent Application No. 20729346.5, dated Jan. 17, 2022, 8 pages.
Office Action received for Japanese Patent Application No. 2020-159825 dated Dec. 10, 2021, 4 pages (2 pages of English Translation and 2 pages of Official Copy).
Office Action received for Japanese Patent Application No. 2020-562622, dated Jan. 7, 2022, 13 pages (6 pages of English Translation and 7 pages of Official Copy).
Ilovex, "Stripe Generator", a tool that makes it easy to create striped materials, Online available at: https://www.ilovex.co.jp/blog/system/webconsulting/stripe-generator.html, May 2, 2012, 3 pages (Official Copy Only) See Communication Under 37 CFR § 1.98(a) (3).
Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) See Communication Under 37 CFR § 1.98(a) (3).
Applicant-Initiated Interview Summary received for U.S. Appl. No. 16/861,651, dated Dec. 29, 2021, 5 pages.
Minutes of Oral Proceedings received for European Patent Application No. 16762356.0, dated Dec. 17, 2021, 5 pages.
Non-Final Office Action received for U.S. Appl. No. 15/421,865, dated Dec. 29, 2021, 23 pages.
Non-Final Office Action received for U.S. Appl. No. 17/188,228, dated Dec. 21, 2021, 14 pages.
Non-Final received for U.S. Appl. No. 17/078,896, dated Dec. 24, 2021, 17 pages.
Office Action received for Chinese Patent Application No. 202110454541.1, dated Oct. 20, 2021, 19 pages (10 pages of English Translation and 9 pages of Official Copy).
Office Action received for Indian Patent Application No. 202017041557, dated Dec. 8, 2021, 8 pages.
Office Action received for Korean Patent Application No. 10-2021-7036246, dated Nov. 26, 2021, 5 pages (2 pages of English Translation and 3 pages of Official Copy).
Notice of Allowance received for Korean Patent Application No. 10-2020-7028759, dated Oct. 19, 2021, 4 pages (1 page of English Translation and 3 pages of Official Copy).
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.
Office Action received for Chinese Patent Application No. 202110011509.6, dated Oct. 11, 2021, 10 pages (5 pages of English Translation and 5 pages of Official Copy).
Office Action received for Korean Patent Application No. 10-2021-7036016, dated Nov. 10, 2021, 13 pages (6 pages of English Translation and 7 pages of Official Copy).
Applicant Initiated Interview Summary received for U.S. Appl. No. 17/031,671, dated Aug. 2, 2021, 5 pages.
Applicant Initiated Interview Summary received for U.S. Appl. No. 17/031,671, dated Nov. 8, 2021, 5 pages.
Applicant-Initiated Interview Summary received for U.S. Appl. No. 16/147,523, dated Sep. 14, 2021, 3 pages.
Applicant-Initiated Interview Summary received for U.S. Appl. No. 16/389,722, dated Sep. 7, 2021, 4 pages.
Applicant-Initiated Interview Summary received for U.S. Appl. No. 16/679,967, dated Oct. 25, 2021, 2 pages.
Applicant-Initiated Interview Summary received for U.S. Appl. No. 16/861,651, dated Sep. 3, 2021, 5 pages.
Applicant-Initiated Interview Summary received for U.S. Appl. No. 16/935,002, dated Sep. 21, 2021, 4 pages.
Applicant-Initiated Interview Summary received for U.S. Appl. No. 16/943,737, dated Sep. 7, 2021, 4 pages.
Applicant-Initiated Interview Summary received for U.S. Appl. No. 17/031,765, dated Sep. 22, 2021, 5 pages.
Applicant-Initiated Interview Summary received for U.S. Appl. No. 17/041,350, dated Aug. 18, 2021, 2 pages.
Applicant-Initiated Interview Summary received for U.S. Appl. No. 17/068,386, dated Sep. 21, 2021, 2 pages.
Corrected Notice of Allowance received for U.S. Appl. No. 16/582,020, dated Aug. 11, 2021, 2 pages.
Decision to Grant received for Danish Patent Application No. PA201970597, dated Aug. 19, 2021, 2 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
Final Office Action received for U.S. Appl. No. 15/405,122, dated Nov. 5, 2021, 45 pages.
Final Office Action received for U.S. Appl. No. 16/147,523, dated Oct. 14, 2021, 22 pages.
Final Office Action received for U.S. Appl. No. 16/679,967, dated Nov. 10, 2021, 14 pages.
Final Office Action received for U.S. Appl. No. 17/031,671, dated Sep. 7, 2021, 27 pages.
Final Office Action received for U.S. Appl. No. 17/031,765, dated Oct. 29, 2021, 34 pages.
Final Office Action received for U.S. Appl. No. 17/041,350, dated Sep. 17, 2021, 25 pages.
Intention to Grant received for European Patent Application No. 15730925.3, dated Aug. 16, 2021, 10 pages.
International Search Report and Written Opinion received for PCT Patent Application No. PCT/US2021/031212, dated Sep. 21, 2021, 21 pages.
International Search Report and Written Opinion received for PCT Patent Application No. PCT/US2021/031669, dated Oct. 13, 2021, 17 pages.
Invitation to Pay Additional Fees received for PCT Patent Application No. PCT/US2021/031212, dated Jul. 28, 2021, 19 pages.
Invitation to Pay Additional Fees received for PCT Patent Application No. PCT/US2021/031669, dated Aug. 19, 2021, 9 pages.
Non-Final Office Action received for U.S. Appl. No. 16/679,967, dated Sep. 2, 2021, 12 pages.
Non-Final Office Action received for U.S. Appl. No. 16/418,786, dated Oct. 4, 2021, 10 pages.
Non-Final Office Action received for U.S. Appl. No. 16/861,651, dated Sep. 30, 2021, 16 pages.
Non-Final Office Action received for U.S. Appl. No. 17/068,386, dated Oct. 28, 2021, 20 pages.
Non-Final Office Action received for U.S. Appl. No. 17/317,042, dated Nov. 10, 2021, 13 pages.
Notice of Allowance received for Chinese Patent Application No. 201910906898.1, dated Oct. 28, 2021, 4 pages (1 page of English Translation and 3 pages of Official Copy).

(56) References Cited

OTHER PUBLICATIONS

Notice of Allowance received for Korean Patent Application No. 10-2019-7029673, dated Aug. 3, 2021, 3 pages (1 page of English Translation and 2 pages of Official Copy).
Notice of Allowance received for Korean Patent Application No. 10-2020-7026036, dated Jul. 26, 2021, 4 pages (1 page of English Translation and 3 pages of Official Copy).
Notice of Allowance received for Korean Patent Application No. 10-2021-7013453, dated Aug. 11, 2021, 5 pages (2 pages of English Translation and 3 pages of Official Copy).
Notice of Allowance received for Korean Patent Application No. 10-2021-7013454, dated Aug. 12, 2021, 4 pages (1 page of English Translation and 3 pages of Official Copy).
Notice of Allowance received for U.S. Appl. No. 16/401,934, dated Nov. 1, 2021, 11 pages.
Notice of Allowance received for U.S. Appl. No. 16/997,588, dated Sep. 30, 2021, 12 pages.
Notice of Allowance received for U.S. Appl. No. 17/087,845, dated Oct. 28, 2021, 9 pages.
Office Action received for Australian Patent Application No. 2020239774, dated Oct. 5, 2021, 3 pages.
Office Action received for Chinese Patent Application No. 201910906898.1, dated Jun. 23, 2021, 6 pages (3 pages of English Translation and 3 pages of Official Copy).
Office Action received for Chinese Patent Application No. 202110194015.6, dated Sep. 28, 2021, 13 pages (6 pages of English Translation and 7 pages of Official Copy).
Office Action received for Danish Patent Application No. PA202070623, dated Aug. 24, 2021, 3 pages.
Office Action received for European Patent Application No. 19722280.5, dated Oct. 4, 2021, 7 pages.
Office Action received for Japanese Patent Application No. 2020-124605, dated Sep. 3, 2021, 5 pages (2 pages of English Translation and 3 pages of Official Copy).
Office Action received for Korean Patent Application No. 10-2021-7025301, dated Oct. 15, 2021, 5 pages (2 pages of English Translation and 3 pages of Official Copy).
Supplemental Notice of Allowance received for U.S. Appl. No. 16/997,588, dated Oct. 22, 2021, 4 pages.
Applicant-Initiated Interview Summary received for U.S. Appl. No. 17/068,386, dated Jan. 13, 2022, 2 pages.
Notice of Acceptance received for Australian Patent Application No. 2020285524, dated Dec. 17, 2021, 3 pages.
Notice of Allowance received for Korean Patent Application No. 10-2021-7039234, dated Dec. 20, 2021, 4 pages (1 page of English Translation and 3 pages of Official Copy).
Office Action received for Japanese Patent Application No. 2020-159823, dated Dec. 23, 2021, 8 pages (4 pages of English Translation and 4 pages of Official Copy).
Applicant-Initiated Interview Summary received for U.S. Appl. No. 17/041,350, dated Feb. 2, 2022, 2 pages.
Final Office Action received for U.S. Appl. No. 16/943,737, dated Feb. 4, 2022, 24 pages.
Non-Final Office Action received for U.S. Appl. No. 17/373,163, dated Jan. 27, 2022, 14 pages.
Notice of Allowance received for Korean Patent Application No. 10-2021-7034748, dated Jan. 27, 2022, 6 pages (2 pages of English Translation and 4 pages of Official Copy).
Notice of Allowance received for U.S. Appl. No. 16/401,934, dated Feb. 2, 2022, 8 pages.
Office Action received for Australian Patent Application No. 2020239749, dated Jan. 21, 2022, 4 pages.
Summons to Attend Oral Proceedings received for European Patent Application No. 20192404.0, dated Feb. 2, 2022, 11 pages.
Applicant-Initiated Interview Summary received for U.S. Appl. No. 16/389,722, dated Feb. 18, 2022, 5 pages.
Applicant-Initiated Interview Summary received for U.S. Appl. No. 16/679,967, dated Feb. 10, 2022, 2 pages.
Office Action received for Australian Patent Application No. 2021202797, dated Feb. 4, 2022, 5 pages.
Office Action received for Danish Patent Application No. PA202070624, dated Feb. 4, 2022, 4 pages.
Office Action received for Danish Patent Application No. PA202070625, dated Feb. 8, 2022, 2 pages.

\* cited by examiner

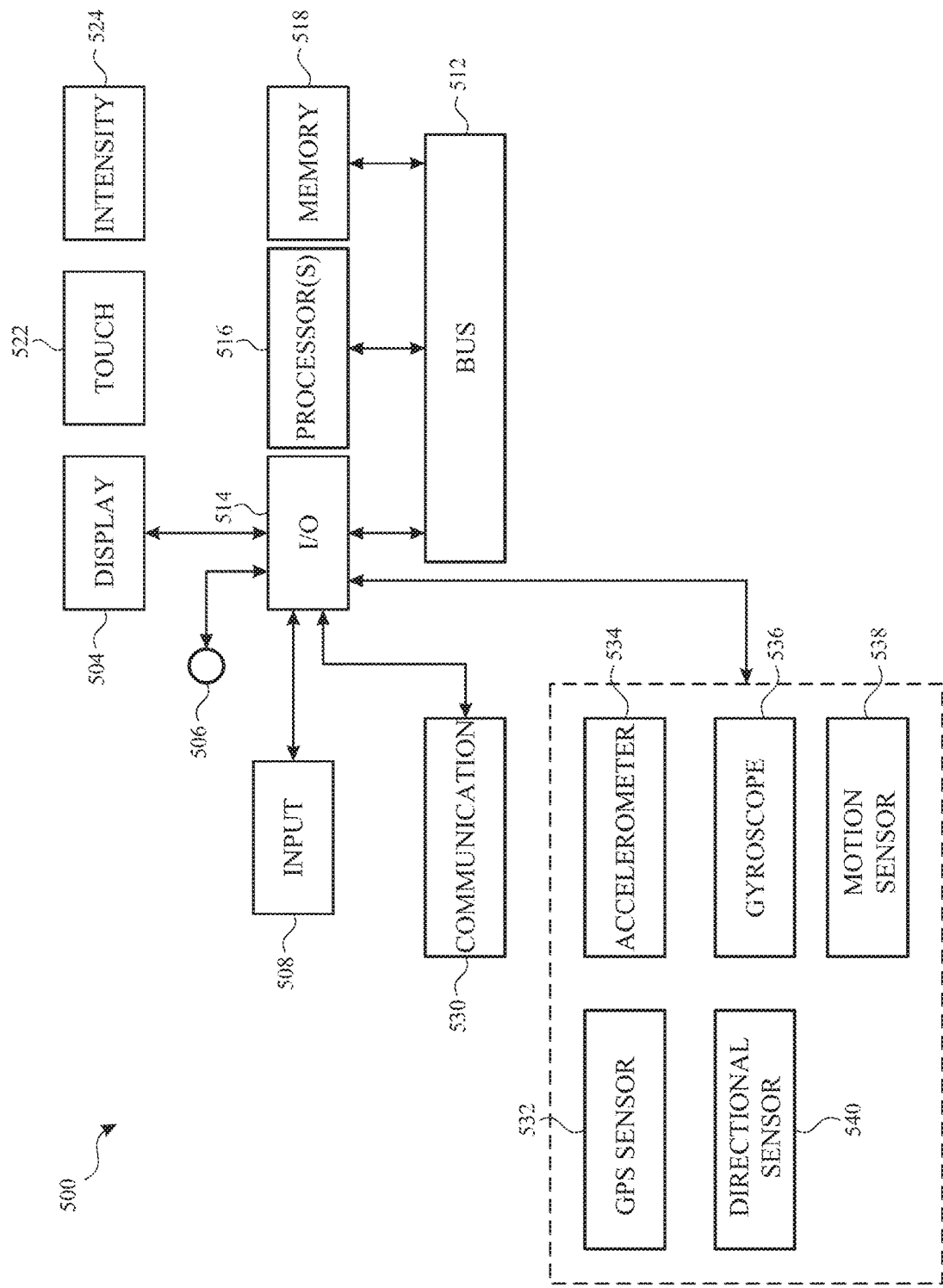

RESTRICTED OPERATION OF AN ELECTRONIC DEVICE

CROSS-REFERENCE TO RELATED APPLICATIONS

This application claims priority to U.S. Provisional Patent Application Ser. No. 62/856,032, entitled "RESTRICTED OPERATION OF AN ELECTRONIC DEVICE", filed Jun. 1, 2019, and U.S. Provisional Patent Application Ser. No. 62/843,788, entitled "RESTRICTED OPERATION OF AN ELECTRONIC DEVICE", filed May 6, 2019, the contents of which are hereby incorporated by reference in their entirety.

FIELD

The present disclosure relates generally to computer user interfaces, and more specifically to techniques for a restricted mode of operation for an electronic device.

BACKGROUND

As computer processing, memory, and display technologies have improved, electronic devices have become capable of providing increased functionality. Reductions in the size of electronic devices such as laptop computers, tablets, smartphones, and smartwatches provide users with constant access to electronic devices and the functionality they provide.

BRIEF SUMMARY

While increased access can allow greater productivity, entertainment, and communication, there are times when modern electronic devices can make it challenging for a user to focus on a task that does not require use of the electronic device. For example, when a person is attending school, studying, working, or reading, the ability to check email, search the internet, receive notifications, or engage in social media activity can divert a person's attention away from the originally intended task.

Features are described below for controlling the functionality of an electronic device, where the device operates according to a restricted mode of operation in which functions that the electronic device is otherwise capable of performing are not immediately available. The restricted mode can provide limited functionality or information (e.g., time and date), while restricting other functions, allowing the user to maintain focus on a current task.

Some techniques for providing a restricted mode of operation for an electronic device, however, are generally cumbersome and inefficient. For example, some existing techniques use a complex and time-consuming user interface, which may include multiple key presses or keystrokes. Existing techniques require more time than necessary, wasting user time and device energy. For example, existing techniques for activating, deactivating, exiting, and/or re-entering a restricted mode are inefficient. This latter consideration is particularly important in battery-operated devices.

Accordingly, the present technique provides electronic devices with faster, more efficient methods and interfaces for a restricted mode of operation for an electronic device. Such methods and interfaces optionally complement or replace other methods for a restricted mode of operation for an electronic device. Such methods and interfaces reduce the cognitive burden on a user and produce a more efficient human-machine interface. For battery-operated computing devices, such methods and interfaces conserve power and increase the time between battery charges.

In accordance with some embodiments, a method comprises: at an electronic device with a display device: displaying, via the display device, a first user interface of a respective type of user interface of the electronic device, where the first user interface of a respective type of user interface includes one or more elements in a first arrangement; detecting a sequence of one or more inputs corresponding to a request to change the current user interface of a respective type of user interface of the electronic device; in response to detecting the sequence of one or more inputs corresponding to the request to change the current user interface of a respective type of user interface of the electronic device, displaying, via the display device, a second user interface of the respective type of user interface as the current user interface of a respective type of user interface of the electronic device, where the second user interface of a respective type of user interface includes one or more elements that are different from the one or more elements of the first user interface of a respective type of user interface and/or are in a different arrangement than the first arrangement of the one or more elements of the first user interface of a respective type of user interface; after changing the current user interface of a respective type of user interface of the electronic device to the second user interface of a respective type of user interface, detecting the occurrence of a condition that corresponds to a trigger for displaying the current user interface of a respective type of user interface of the electronic device; and in response to detecting the occurrence of a condition that corresponds to a trigger for displaying the current user interface of a respective type of user interface of the electronic device: in accordance with a determination that a current time corresponds to a predefined time range, displaying, via the display device, a third user interface of a respective type of user interface different from the first user interface of a respective type of user interface and the second user interface of a respective type of user interface, where the third user interface of a respective type of user interface includes a predefined set of elements different from the one or more elements of the first user interface of a respective type of user interface and the one or more elements of the second user interface of a respective type of user interface, and where the predefined set of elements cannot be changed in response to input detected at the electronic device; and in accordance with a determination that a current time does not correspond to the predefined time range, displaying the second user interface of a respective type of user interface.

In accordance with some embodiments, a non-transitory computer-readable storage medium stores one or more programs configured to be executed by one or more processors of an electronic device with a display device, the one or more programs including instructions for: displaying, via the display device, a first user interface of a respective type of user interface of the electronic device, where the first user interface of a respective type of user interface includes one or more elements in a first arrangement; detecting a sequence of one or more inputs corresponding to a request to change the current user interface of a respective type of user interface of the electronic device; in response to detecting the sequence of one or more inputs corresponding to the request to change the current user interface of a respective type of user interface of the electronic device, displaying, via the display device, a second user interface of the respective type of user interface as the current user interface of a respective type of user interface of the electronic device, where the second user interface of a respective type of user interface includes one or more elements that are different from the one or more elements of the first user interface of a respective type of user interface and/or are in a different arrangement than the first arrangement of the one or more elements of the first user interface of a respective type of user interface; after changing the current user interface of a respective type of user interface of the electronic device to the second user interface of a respective type of user interface, detecting the occurrence of a condition that corresponds to a trigger for displaying the current user interface of a respective type of user interface of the electronic device; and in response to detecting the occurrence of a condition that corresponds to a trigger for displaying the current user interface of a respective type of user interface of the electronic device: in accordance with a determination that a current time corresponds to a predefined time range, displaying, via the display device, a third user interface of a respective type of user interface different from the first user interface of a respective type of user interface and the second user interface of a respective type of user interface, where the third user interface of a respective type of user interface includes a predefined set of elements different from the one or more elements of the first user interface of a respective type of user interface and the one or more elements of the second user interface of a respective type of user interface, and where the predefined set of elements cannot be changed in response to input detected at the electronic device; and in accordance with a determination that a current time does not correspond to the predefined time range, displaying the second user interface of a respective type of user interface.

In accordance with some embodiments, a transitory computer-readable storage medium stores one or more programs configured to be executed by one or more processors of an electronic device with a display device, the one or more programs including instructions for: displaying, via the display device, a first user interface of a respective type of user interface of the electronic device, where the first user interface of a respective type of user interface includes one or more elements in a first arrangement; detecting a sequence of one or more inputs corresponding to a request to change the current user interface of a respective type of user interface of the electronic device; in response to detecting the sequence of one or more inputs corresponding to the request to change the current user interface of a respective type of user interface of the electronic device, displaying, via the display device, a second user interface of the respective type of user interface as the current user interface of a respective type of user interface of the electronic device, where the second user interface of a respective type of user interface includes one or more elements that are different from the one or more elements of the first user interface of a respective type of user interface and/or are in a different arrangement than the first arrangement of the one or more elements of the first user interface of a respective type of user interface; after changing the current user interface of a respective type of user interface of the electronic device to the second user interface of a respective type of user interface, detecting the occurrence of a condition that corresponds to a trigger for displaying the current user interface of a respective type of user interface of the electronic device; and in response to detecting the occurrence of a condition that corresponds to a trigger for displaying the current user interface of a respective type of user interface of the electronic device: in accordance with a determination that a current time corresponds to a predefined time range, displaying, via the display device, a third user interface of a respective type of user interface different from the first user interface of a respective type of user interface and the second user interface of a respective type of user interface, where the third user interface of a respective type of user interface includes a predefined set of elements different from the one or more elements of the first user interface of a respective type of user interface and the one or more elements of the second user interface of a respective type of user interface, and where the predefined set of elements cannot be changed in response to input detected at the electronic device; and in accordance with a determination that a current time does not correspond to the predefined time range, displaying the second user interface of a respective type of user interface.

In accordance with some embodiments, an electronic device comprises: a display device; one or more processors; and memory storing one or more programs configured to be executed by the one or more processors, the one or more programs including instructions for: displaying, via the display device, a first user interface of a respective type of user interface of the electronic device, where the first user interface of a respective type of user interface includes one or more elements in a first arrangement; detecting a sequence of one or more inputs corresponding to a request to change the current user interface of a respective type of user interface of the electronic device; in response to detecting the sequence of one or more inputs corresponding to the request to change the current user interface of a respective type of user interface of the electronic device, displaying, via the display device, a second user interface of the respective type of user interface as the current user interface of a respective type of user interface of the electronic device, where the second user interface of a respective type of user interface includes one or more elements that are different from the one or more elements of the first user interface of a respective type of user interface and/or are in a different arrangement than the first arrangement of the one or more elements of the first user interface of a respective type of user interface; after changing the current user interface of a respective type of user interface of the electronic device to the second user interface of a respective type of user interface, detecting the occurrence of a condition that corresponds to a trigger for displaying the current user interface of a respective type of user interface of the electronic device; and in response to detecting the occurrence of a condition that corresponds to a trigger for displaying the current user interface of a respective type of user interface of the electronic device: in accordance with a determination that a current time corresponds to a predefined time range, displaying, via the display device, a third user interface of a respective type of user interface different from the first user interface of a respective type of user interface and the second user interface of a respective type of user interface, where the third user interface of a respective type of user interface includes a predefined set of elements different from the one or more elements of the first user interface of a respective type of user interface and the one or more elements of the second user interface of a respective type of user interface, and where the predefined set of elements cannot be changed in response to input detected at the electronic device; and in accordance with a determination that a current time does not correspond to the predefined time range, displaying the second user interface of a respective type of user interface.

In accordance with some embodiments, an electronic device comprises: a display device; means for displaying, via the display device, a first user interface of a respective type of user interface of the electronic device, where the first user interface of a respective type of user interface includes one or more elements in a first arrangement; means for detecting a sequence of one or more inputs corresponding to a request to change the current user interface of a respective type of user interface of the electronic device; means for, in response to detecting the sequence of one or more inputs corresponding to the request to change the current user interface of a respective type of user interface of the electronic device, displaying, via the display device, a second user interface of the respective type of user interface as the current user interface of a respective type of user interface of the electronic device, where the second user interface of a respective type of user interface includes one or more elements that are different from the one or more elements of the first user interface of a respective type of user interface and/or are in a different arrangement than the first arrangement of the one or more elements of the first user interface of a respective type of user interface; and means for, after changing the current user interface of a respective type of user interface of the electronic device to the second user interface of a respective type of user interface, detecting the occurrence of a condition that corresponds to a trigger for displaying the current user interface of a respective type of user interface of the electronic device; means for, in response to detecting the occurrence of a condition that corresponds to a trigger for displaying the current user interface of a respective type of user interface of the electronic device: in accordance with a determination that a current time corresponds to a predefined time range, displaying, via the display device, a third user interface of a respective type of user interface different from the first user interface of a respective type of user interface and the second user interface of a respective type of user interface, where the third user interface of a respective type of user interface includes a predefined set of elements different from the one or more elements of the first user interface of a respective type of user interface and the one or more elements of the second user interface of a respective type of user interface, and where the predefined set of elements cannot be changed in response to input detected at the electronic device; and in accordance with a determination that a current time does not correspond to the predefined time range, displaying the second user interface of a respective type of user interface.

In accordance with some embodiments, a method comprises: at an electronic device with a display device: operating the electronic device in a first mode; and while operating the electronic device in the first mode: displaying, via the display device, a user interface of a respective type of user interface; detecting a first sequence of one or more inputs corresponding to a request to exit the first mode, the first sequence of one or more inputs including at least one input that is detected while displaying the user interface of a respective type of user interface; and after detecting at least one of the inputs in the first sequence of one or more inputs and prior to ceasing to operate the electronic device in the first mode, presenting an alert indicating that information indicating that the electronic device has exited the first mode will be reported to another user; after presenting the alert, detecting a second sequence of one or more inputs; and in response to detecting the second sequence of one or more inputs and in accordance with a determination that the second sequence of one or more inputs corresponds to a request to exit the first mode, ceasing to operate the electronic device in the first mode.

In accordance with some embodiments, a non-transitory computer-readable storage medium stores one or more programs configured to be executed by one or more processors of an electronic device with a display device, the one or more programs including instructions for: operating the electronic device in a first mode; and while operating the electronic device in the first mode: displaying, via the display device, a user interface of a respective type of user interface; detecting a first sequence of one or more inputs corresponding to a request to exit the first mode, the first sequence of one or more inputs including at least one input that is detected while displaying the user interface of a respective type of user interface; and after detecting at least one of the inputs in the first sequence of one or more inputs and prior to ceasing to operate the electronic device in the first mode, presenting an alert indicating that information indicating that the electronic device has exited the first mode will be reported to another user; after presenting the alert, detecting a second sequence of one or more inputs; and in response to detecting the second sequence of one or more inputs and in accordance with a determination that the second sequence of one or more inputs corresponds to a request to exit the first mode, ceasing to operate the electronic device in the first mode.

In accordance with some embodiments, a transitory computer-readable storage medium stores one or more programs configured to be executed by one or more processors of an electronic device with a display device, the one or more programs including instructions for: operating the electronic device in a first mode; and while operating the electronic device in the first mode: displaying, via the display device, a user interface of a respective type of user interface; detecting a first sequence of one or more inputs corresponding to a request to exit the first mode, the first sequence of one or more inputs including at least one input that is detected while displaying the user interface of a respective type of user interface; and after detecting at least one of the inputs in the first sequence of one or more inputs and prior to ceasing to operate the electronic device in the first mode, presenting an alert indicating that information indicating that the electronic device has exited the first mode will be reported to another user; after presenting the alert, detecting a second sequence of one or more inputs; and in response to detecting the second sequence of one or more inputs and in accordance with a determination that the second sequence of one or more inputs corresponds to a request to exit the first mode, ceasing to operate the electronic device in the first mode.

In accordance with some embodiments, an electronic device comprises: a display device; one or more processors; and memory storing one or more programs configured to be executed by the one or more processors, the one or more programs including instructions for: operating the electronic device in a first mode; and while operating the electronic device in the first mode: displaying, via the display device, a user interface of a respective type of user interface; detecting a first sequence of one or more inputs corresponding to a request to exit the first mode, the first sequence of one or more inputs including at least one input that is detected while displaying the user interface of a respective type of user interface; and after detecting at least one of the inputs in the first sequence of one or more inputs and prior to ceasing to operate the electronic device in the first mode, presenting an alert indicating that information indicating that the electronic device has exited the first mode will be reported to another user; after presenting the alert, detecting a second sequence of one or more inputs; and in response to detecting the second sequence of one or more inputs and in accordance with a determination that the second sequence of one or more inputs corresponds to a request to exit the first mode, ceasing to operate the electronic device in the first mode.

In accordance with some embodiments, an electronic device comprises: a display device; means for operating the electronic device in a first mode; and means for, while operating the electronic device in the first mode: displaying, via the display device, a user interface of a respective type of user interface; detecting a first sequence of one or more inputs corresponding to a request to exit the first mode, the first sequence of one or more inputs including at least one input that is detected while displaying the user interface of a respective type of user interface; and after detecting at least one of the inputs in the first sequence of one or more inputs and prior to ceasing to operate the electronic device in the first mode, presenting an alert indicating that information indicating that the electronic device has exited the first mode will be reported to another user; after presenting the alert, detecting a second sequence of one or more inputs; and in response to detecting the second sequence of one or more inputs and in accordance with a determination that the second sequence of one or more inputs corresponds to a request to exit the first mode, ceasing to operate the electronic device in the first mode.

In accordance with some embodiments, a method includes, at a first device with a display device: displaying, via the display device, a setup user interface of a setup process for setting up a second device; while displaying, via the display device, the setup user interface, detecting a first user input selecting a respective account to be associated with the second device and while the first device is associated with a first account; and after the respective account has been selected to be associated with the second device and during the setup process, displaying, via the display device, a setup user interface for configuring a respective function of the second device, including: in accordance with a determination that the first account was selected to be associated with the second device, displaying, via the display device, one or more selectable options associated with configuring the respective function of the second device without explicitly identifying a user account associated with the second device; and in accordance with a determination that a second account, different from the first account, was selected to be associated with the second device, displaying, via the display device, the one or more selectable options associated with configuring the respective function of the second device concurrently with an identifier that explicitly identifies the second account.

In accordance with some embodiments, a non-transitory computer-readable storage medium stores one or more programs configured to be executed by one or more processors of a first device with a display device, the one or more programs including instructions for: displaying, via the display device, a setup user interface of a setup process for setting up a second device; while displaying, via the display device, the setup user interface, detecting a first user input selecting a respective account to be associated with the second device and while the first device is associated with a first account; and after the respective account has been selected to be associated with the second device and during the setup process, displaying, via the display device, a setup user interface for configuring a respective function of the second device, including: in accordance with a determination that the first account was selected to be associated with the second device, displaying, via the display device, one or more selectable options associated with configuring the respective function of the second device without explicitly identifying a user account associated with the second device; and in accordance with a determination that a second account, different from the first account, was selected to be associated with the second device, displaying, via the display device, the one or more selectable options associated with configuring the respective function of the second device concurrently with an identifier that explicitly identifies the second account.

In accordance with some embodiments, a transitory computer-readable storage medium stores one or more programs configured to be executed by one or more processors of a first device with a display device, the one or more programs including instructions for: displaying, via the display device, a setup user interface of a setup process for setting up a second device; while displaying, via the display device, the setup user interface, detecting a first user input selecting a respective account to be associated with the second device and while the first device is associated with a first account; and after the respective account has been selected to be associated with the second device and during the setup process, displaying, via the display device, a setup user interface for configuring a respective function of the second device, including: in accordance with a determination that the first account was selected to be associated with the second device, displaying, via the display device, one or more selectable options associated with configuring the respective function of the second device without explicitly identifying a user account associated with the second device; and in accordance with a determination that a second account, different from the first account, was selected to be associated with the second device, displaying, via the display device, the one or more selectable options associated with configuring the respective function of the second device concurrently with an identifier that explicitly identifies the second account.

In accordance with some embodiments, a first device includes a display device; one or more processors; and memory storing one or more programs configured to be executed by the one or more processors, the one or more programs including instructions for: displaying, via the display device, a setup user interface of a setup process for setting up a second device; while displaying, via the display device, the setup user interface, detecting a first user input selecting a respective account to be associated with the second device and while the first device is associated with a first account; and after the respective account has been selected to be associated with the second device and during the setup process, displaying, via the display device, a setup user interface for configuring a respective function of the second device, including: in accordance with a determination that the first account was selected to be associated with the second device, displaying, via the display device, one or more selectable options associated with configuring the respective function of the second device without explicitly identifying a user account associated with the second device; and in accordance with a determination that a second account, different from the first account, was selected to be associated with the second device, displaying, via the display device, the one or more selectable options associated with configuring the respective function of the second device concurrently with an identifier that explicitly identifies the second account.

In accordance with some embodiments, a first device includes a display device; means for displaying, via the display device, a setup user interface of a setup process for setting up a second device; means for, while displaying, via the display device, the setup user interface, detecting a first user input selecting a respective account to be associated with the second device and while the first device is associated with a first account; and means for, after the respective account has been selected to be associated with the second device and during the setup process, displaying, via the display device, a setup user interface for configuring a respective function of the second device, including: in accordance with a determination that the first account was selected to be associated with the second device, displaying, via the display device, one or more selectable options associated with configuring the respective function of the second device without explicitly identifying a user account associated with the second device; and in accordance with a determination that a second account, different from the first account, was selected to be associated with the second device, displaying, via the display device, the one or more selectable options associated with configuring the respective function of the second device concurrently with an identifier that explicitly identifies the second account.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing a restricted mode of operation for an electronic device, thereby increasing the effectiveness, efficiency, and user satisfaction with such devices. Such methods and interfaces may complement or replace other methods for providing a restricted mode of operation for an electronic device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for a restricted mode of operation for an electronic device. For example, while in a restricted mode, functions that the electronic device is otherwise capable of performing are not immediately available. A time range can be defined during which the electronic device (or, optionally, multiple electronic devices associated with a common account) is scheduled to operate in the restricted mode. For example, a parent can set predefined time ranges (e.g., daily school schedules) during which the devices used by the parent's children are to operate in restricted mode. Techniques for activating (e.g., manually activating) the restricted mode at a time when the restricted mode is not otherwise scheduled are also described. In some embodiments, while in the restricted mode, a user can initiate a process on the electronic device to exit (e.g., unlock, leave, deactivate) the restricted mode (at least temporarily). Exiting the restricted mode during a predefined time range can cause a report to be displayed on another device. For example, if a student exits the restricted mode during school hours, a notification will be displayed on a device of the student's parent (e.g., in a report log on the parent's phone).

Such techniques can reduce the cognitive burden on a user who operates a device in a restricted mode, thereby enhancing productivity. Further, such techniques can reduce processor and battery power otherwise wasted on redundant user inputs.

Figure 6A:
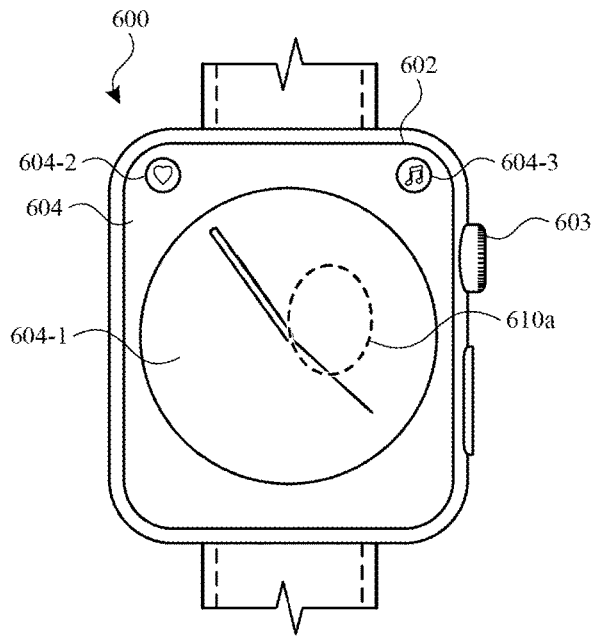
FIGS. 6A-6AC illustrate exemplary user interfaces for operating an electronic device in accordance with some embodiments.
Figure 7:
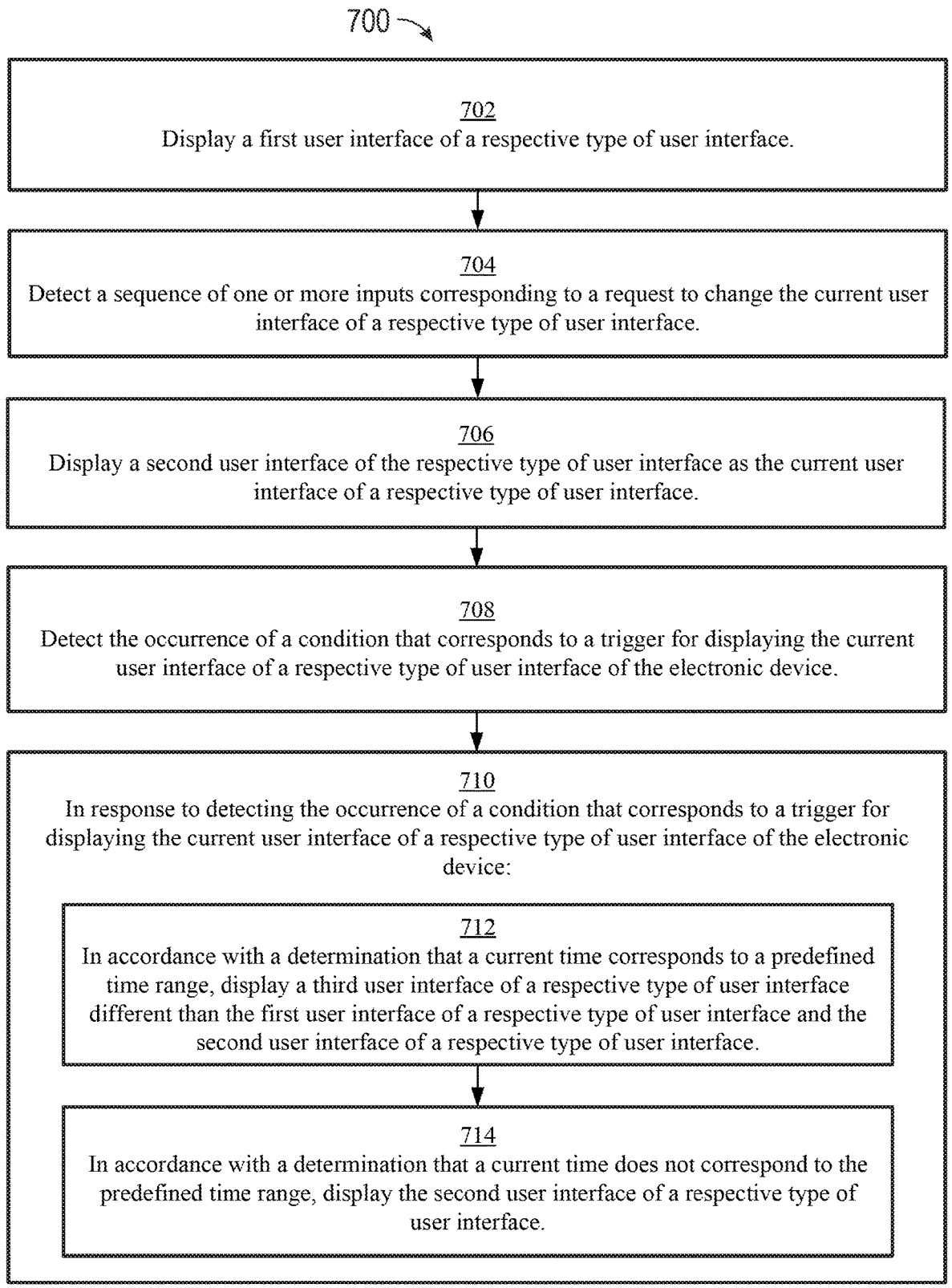
FIG. 7 illustrates an exemplary method in accordance with some embodiments.
Figure 8:
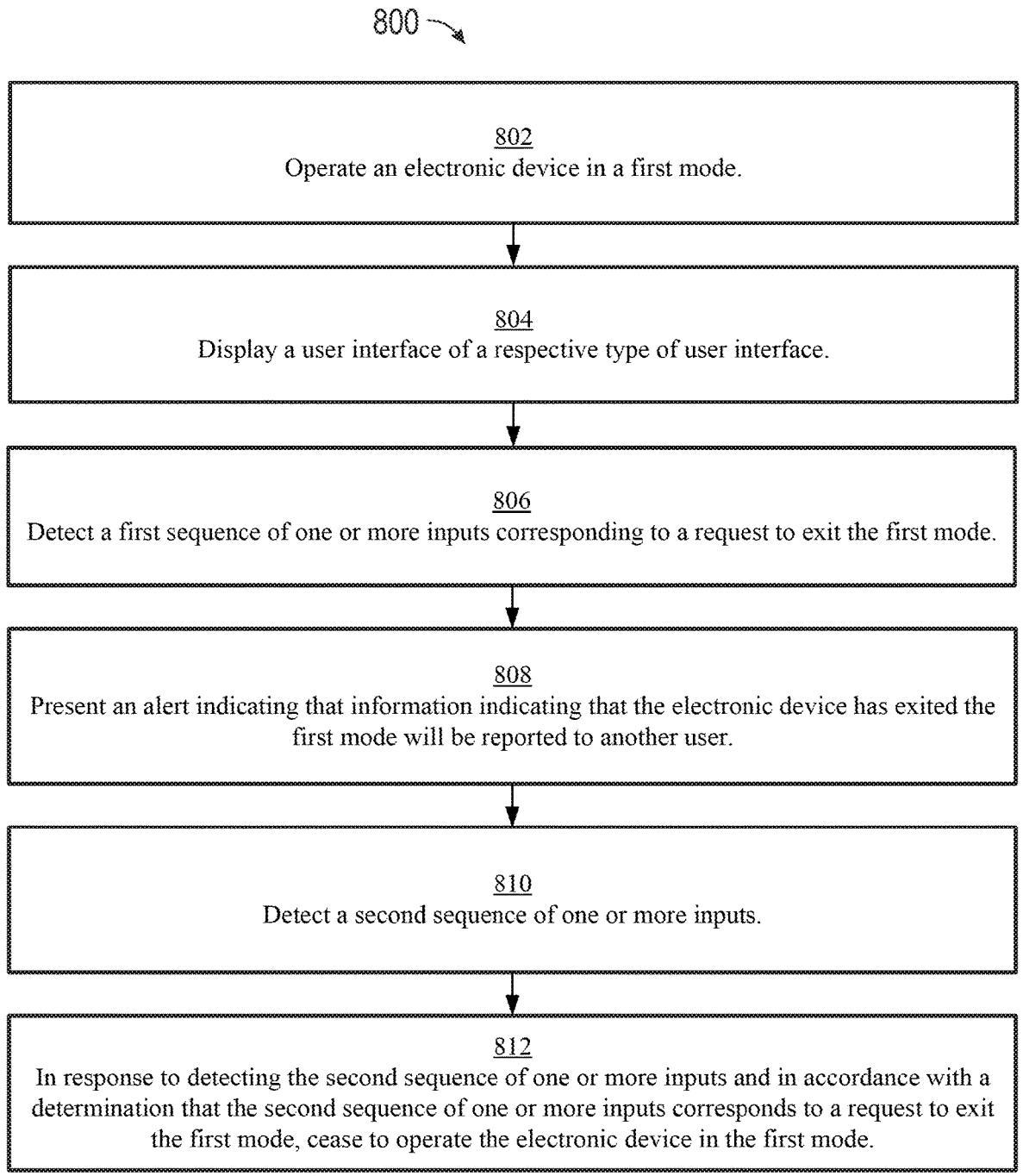
FIG. 8 illustrates an exemplary method in accordance with some embodiments.
Figure 9A:
FIGS. 9A-9AI illustrate exemplary user interfaces for configuring a second electronic device, in accordance with some embodiments.
Figure 10:
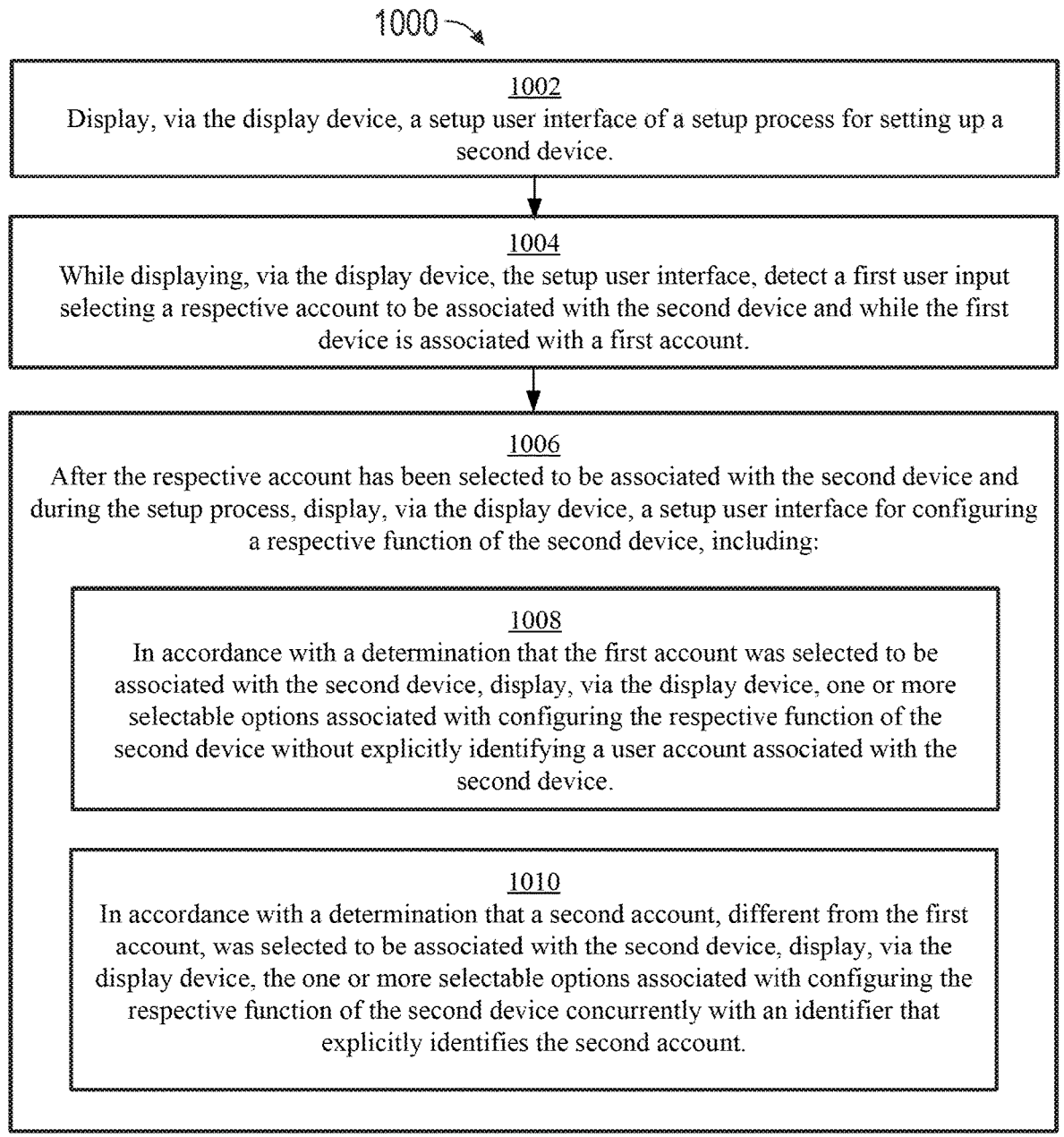
FIG. 10 illustrates an exemplary method for configuring a second electronic device, in accordance with some embodiments.

Below, FIGS. 1A-1B, 2, 3, 4A-4B, and 5A-5H provide a description of exemplary devices for performing the techniques for a restricted mode of operation in accordance with some embodiments. FIGS. 6A-6AC illustrate exemplary user interfaces for a restricted mode of operation in accordance with some embodiments. FIGS. 7-8 are flow diagrams illustrating methods for a restricted mode of operation in accordance with some embodiments. The user interfaces in FIGS. 6A-6AC are used to illustrate the processes described below, including the processes in FIGS. 7-8. FIGS. 9A-9AI illustrate exemplary user interfaces for configuring a second device, in accordance with some embodiments. FIG. 10 is a flow diagram illustrating methods for configuring a second device, in accordance with some embodiments. The user interfaces in FIGS. 9A-9AI are used to illustrate the processes described below, including the processes in FIG. 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
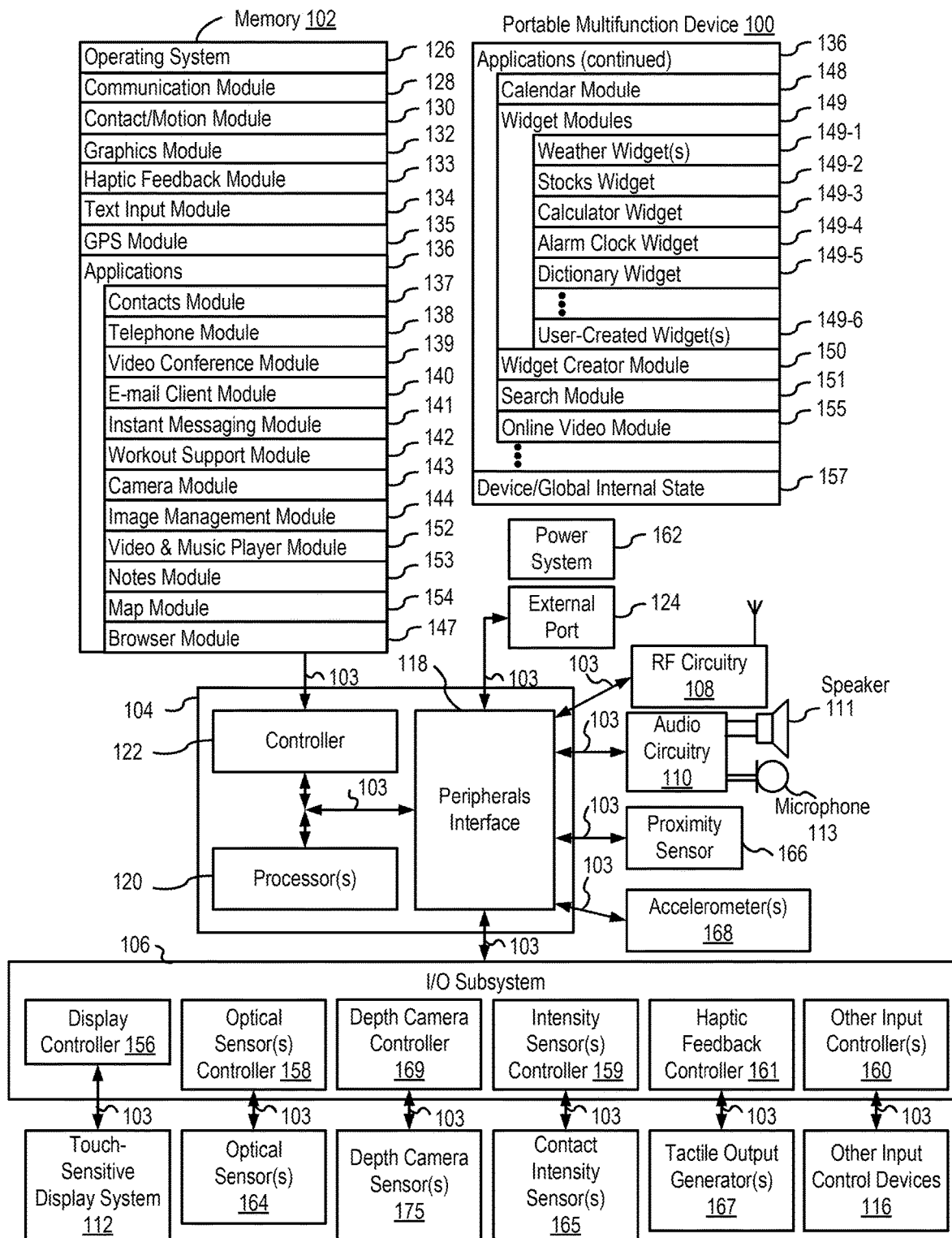
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
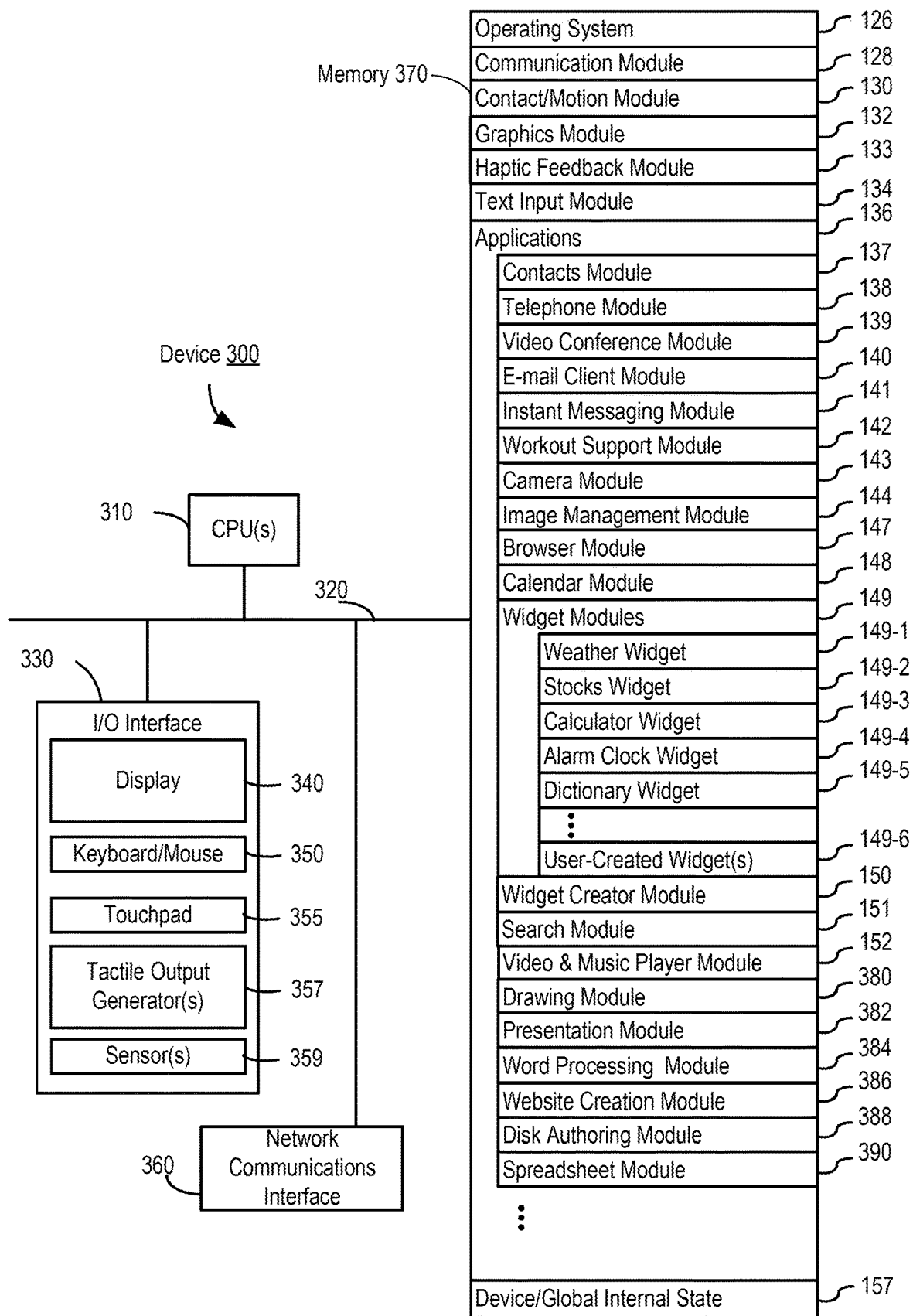
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
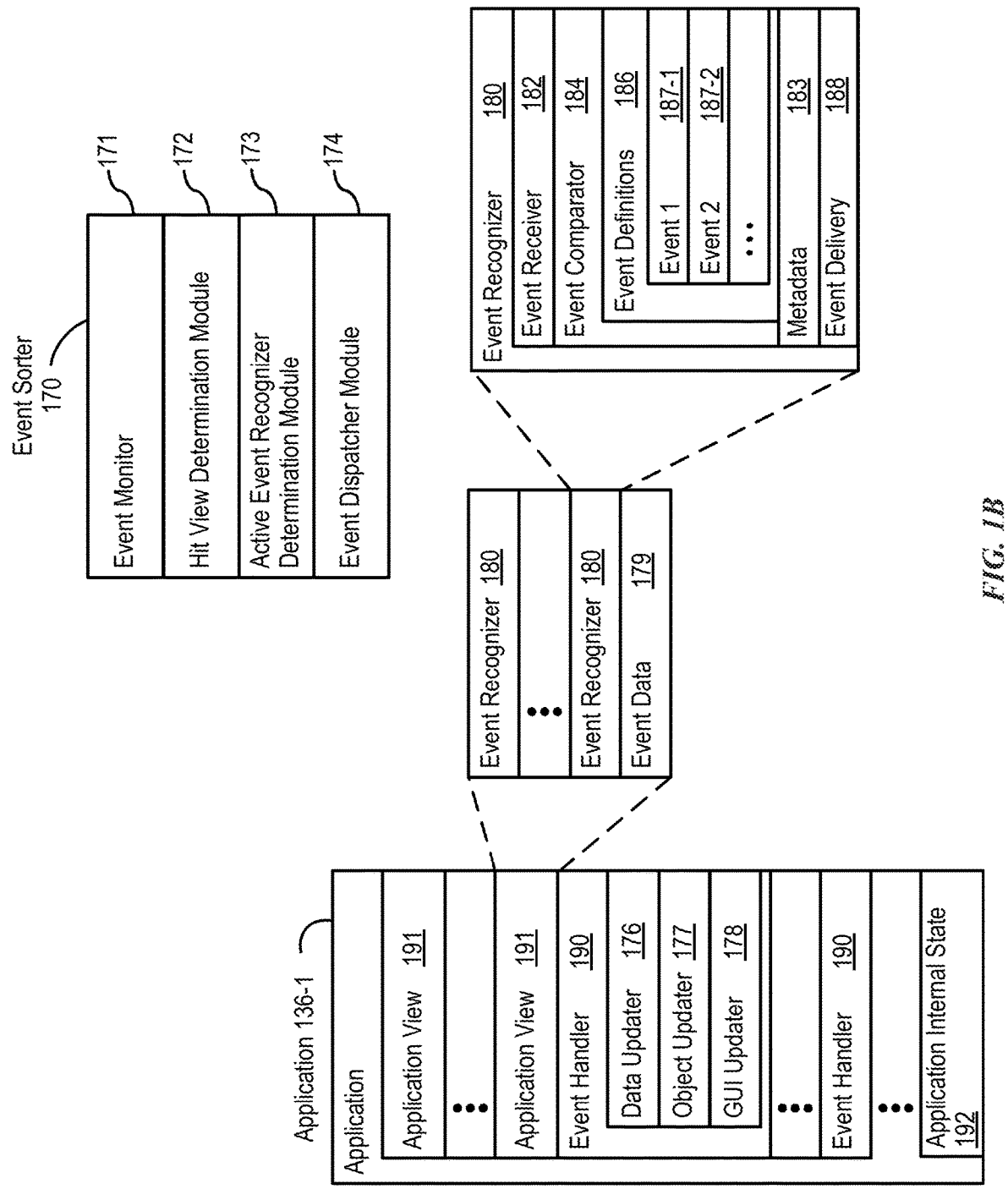
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
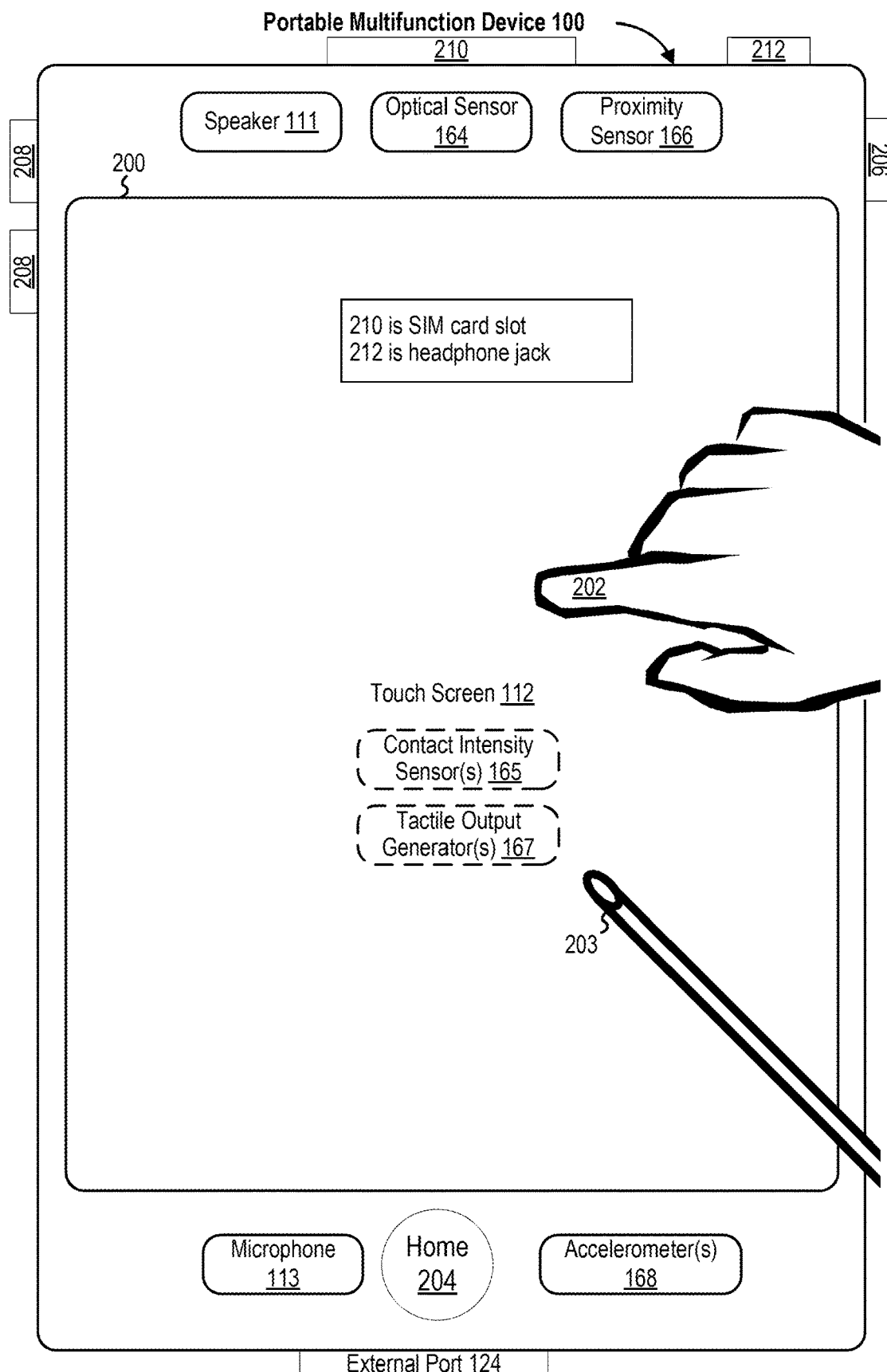
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
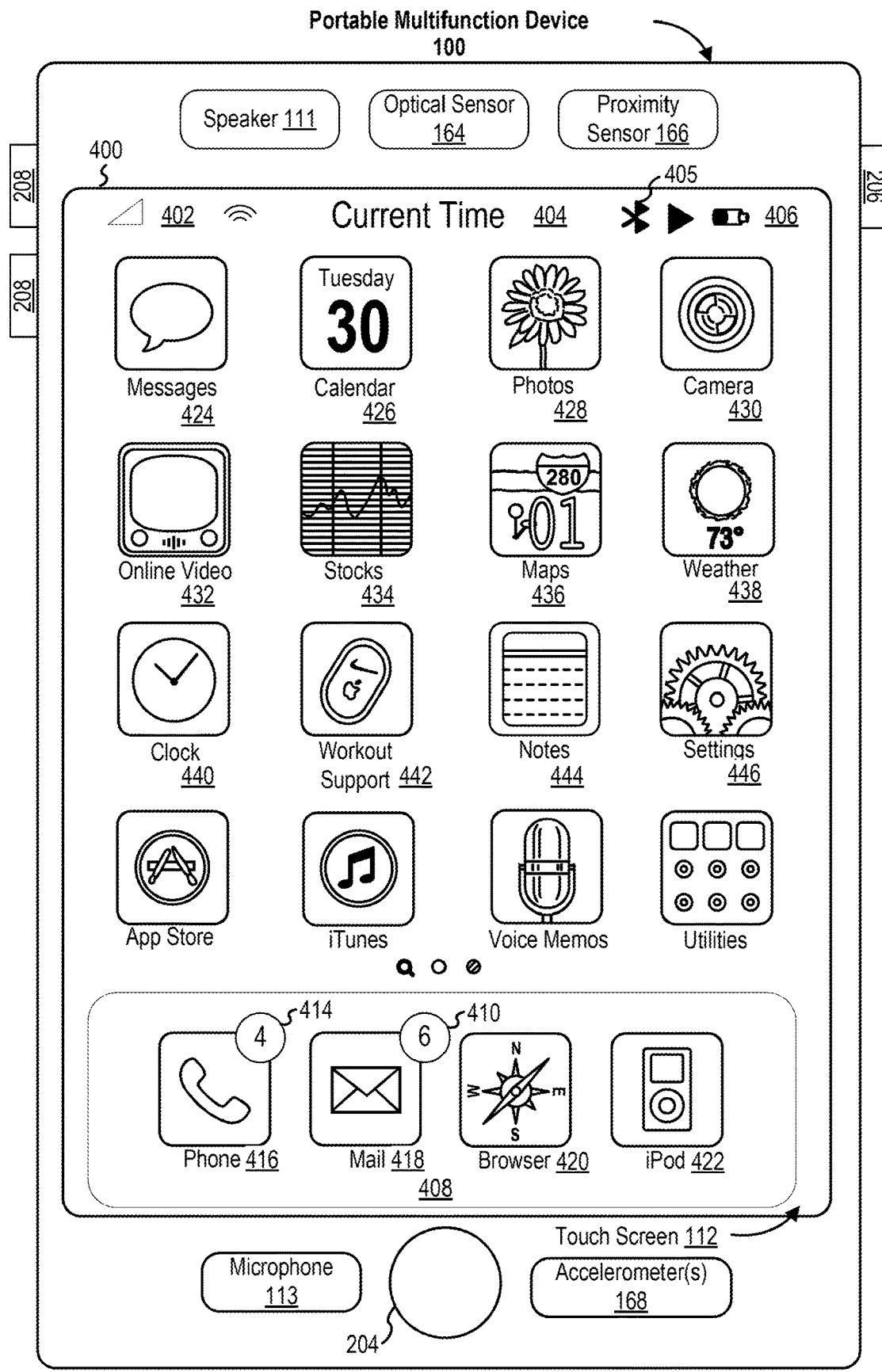
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
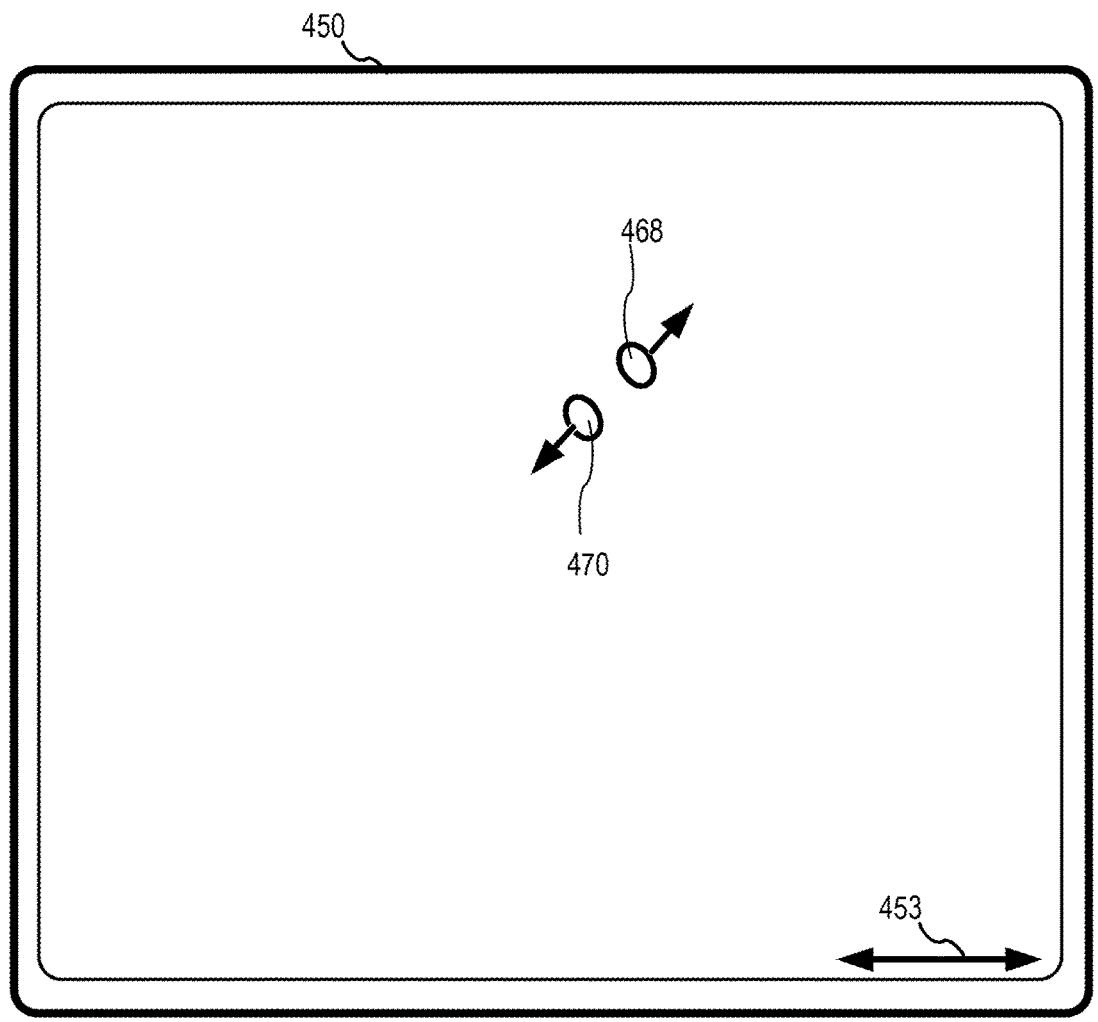
FIG. 4B illustrates an exemplary user interface for a multifunction device with a touch-sensitive surface that is separate from the display in accordance with some embodiments.
Figure 4B:
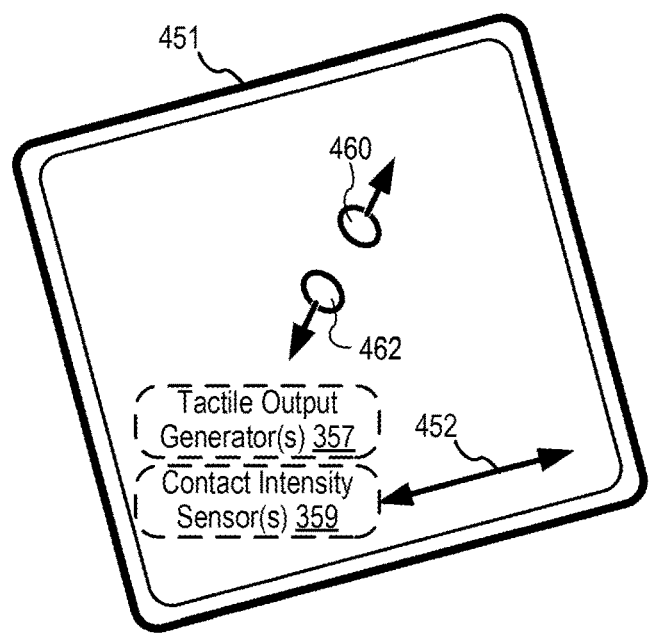

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
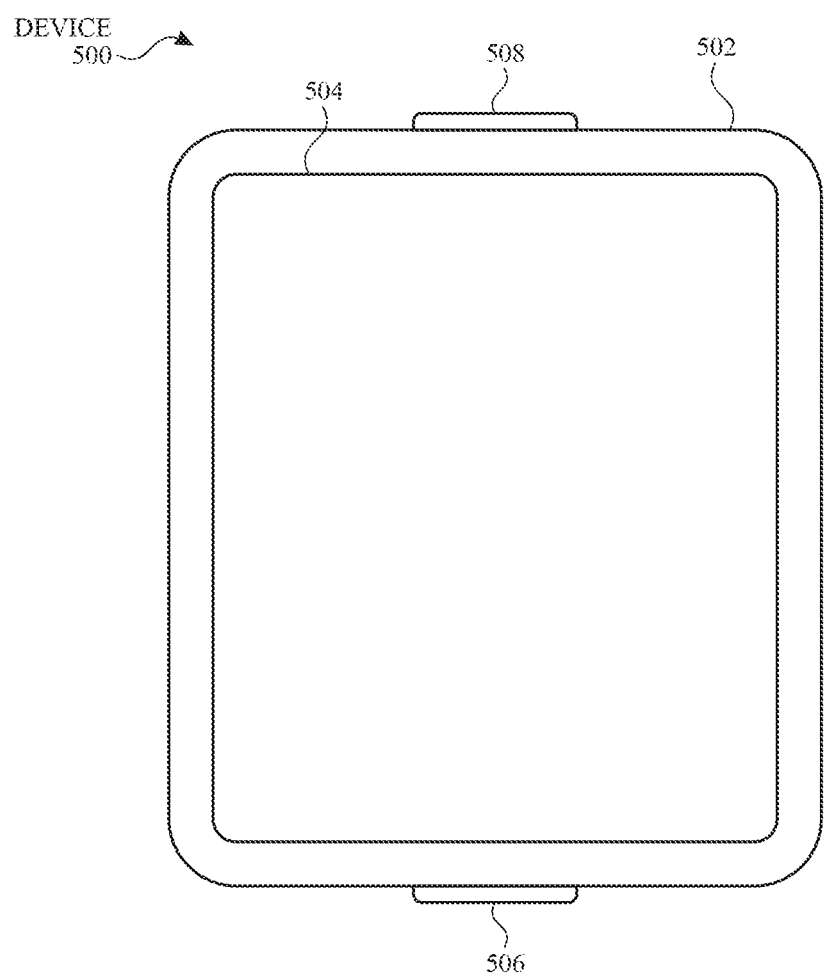
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-800 and 1000 (FIGS. 7-8 and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
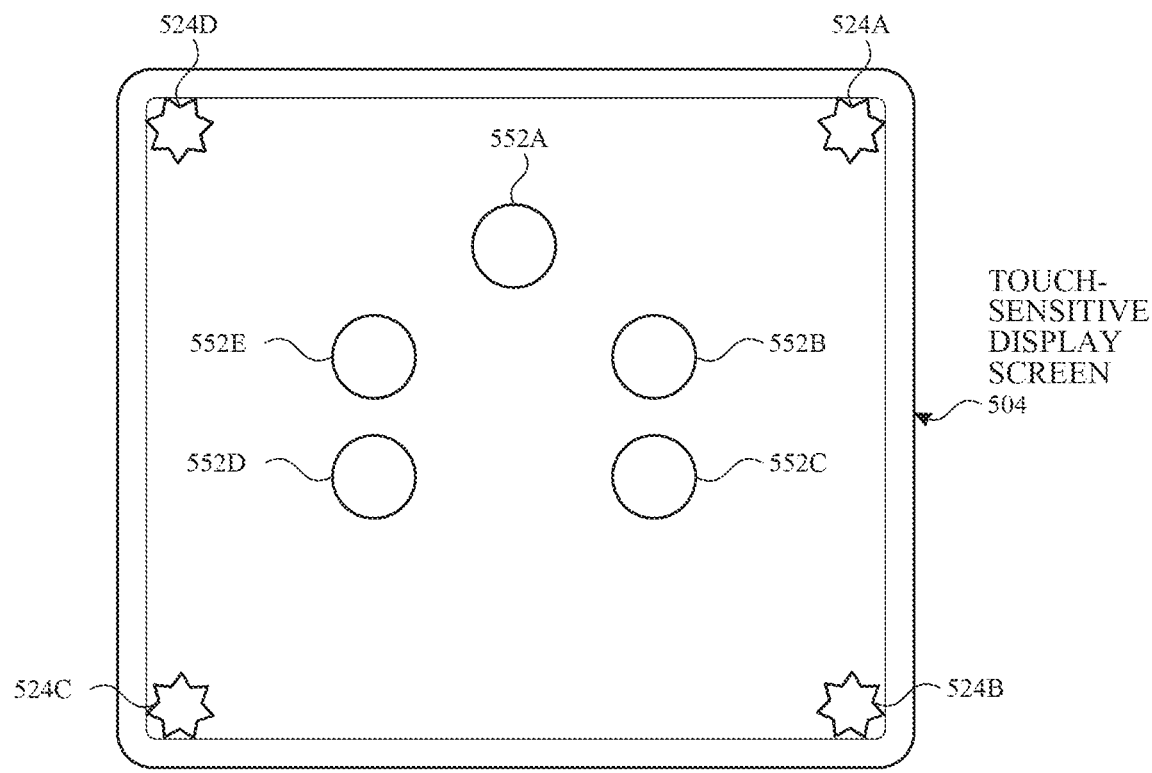
FIGS. 5C-5D illustrate exemplary components of a personal electronic device having a touch-sensitive display and intensity sensors in accordance with some embodiments.
Figure 5C:
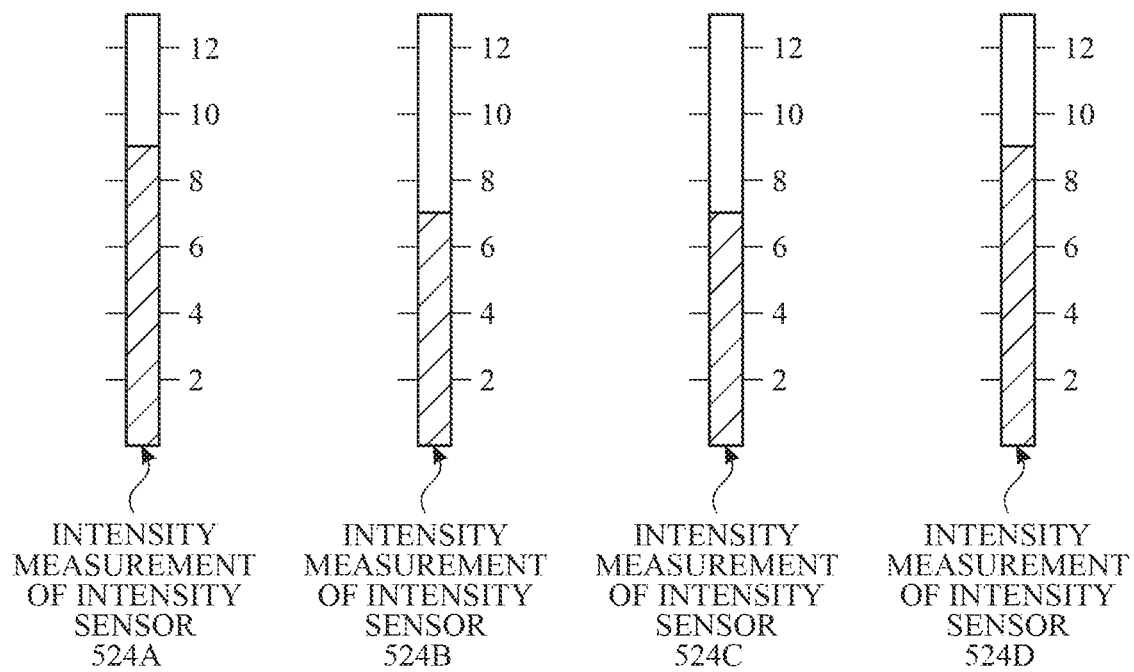
Figure 5D:
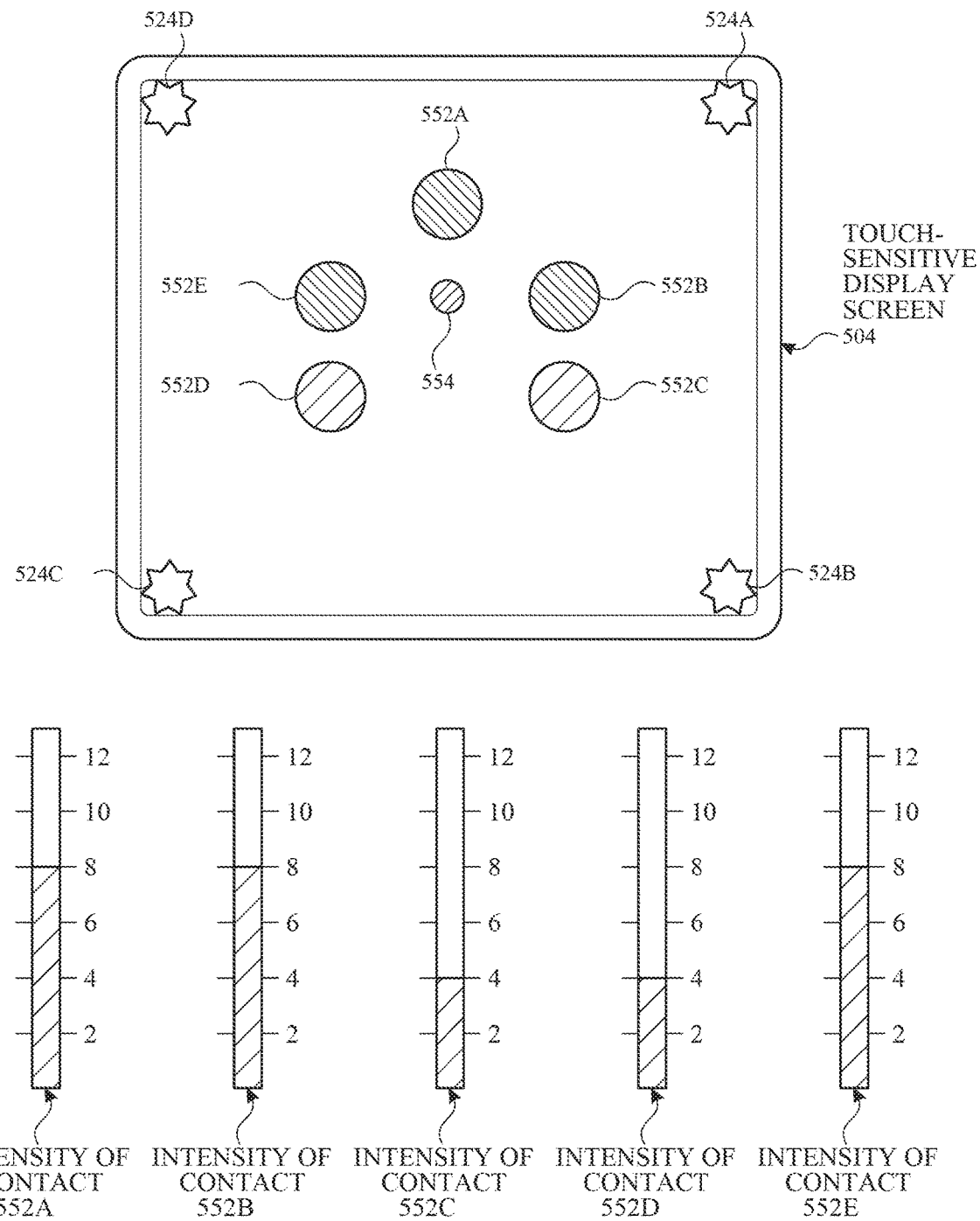

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
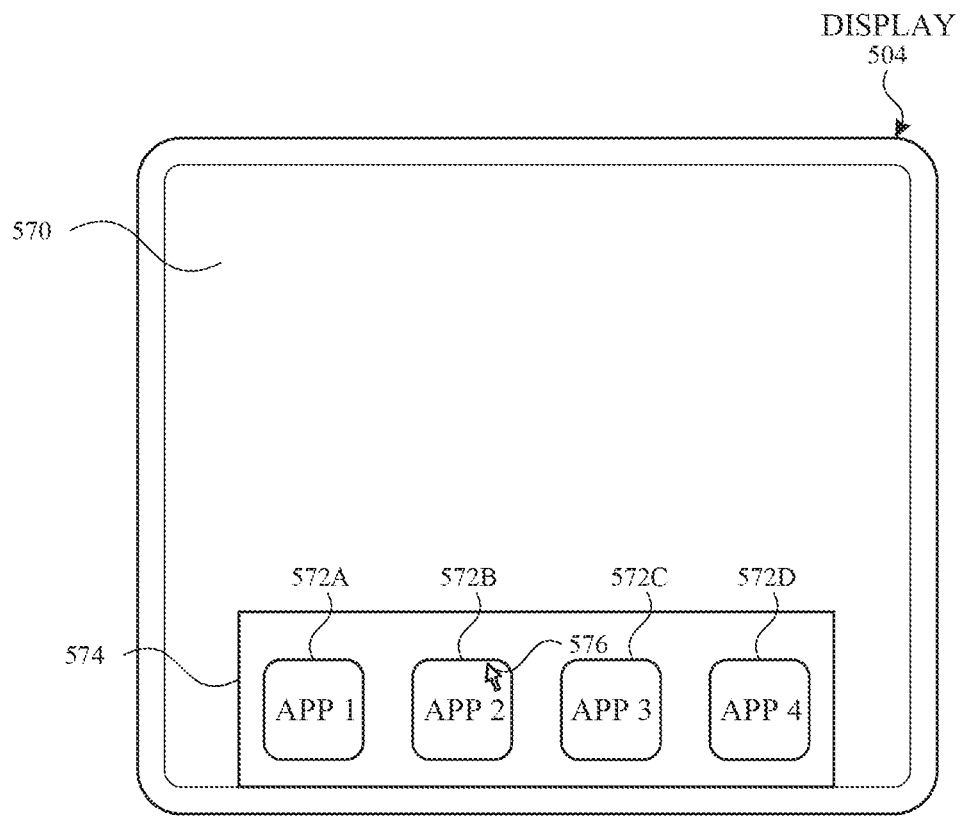
FIGS. 5E-5H illustrate exemplary components and user interfaces of a personal electronic device in accordance with some embodiments.
Figure 5E:
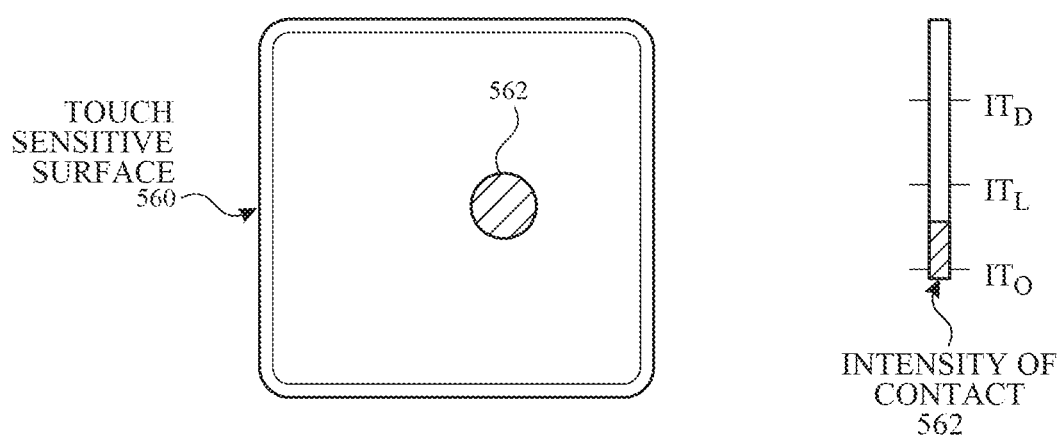
Figure 5F:
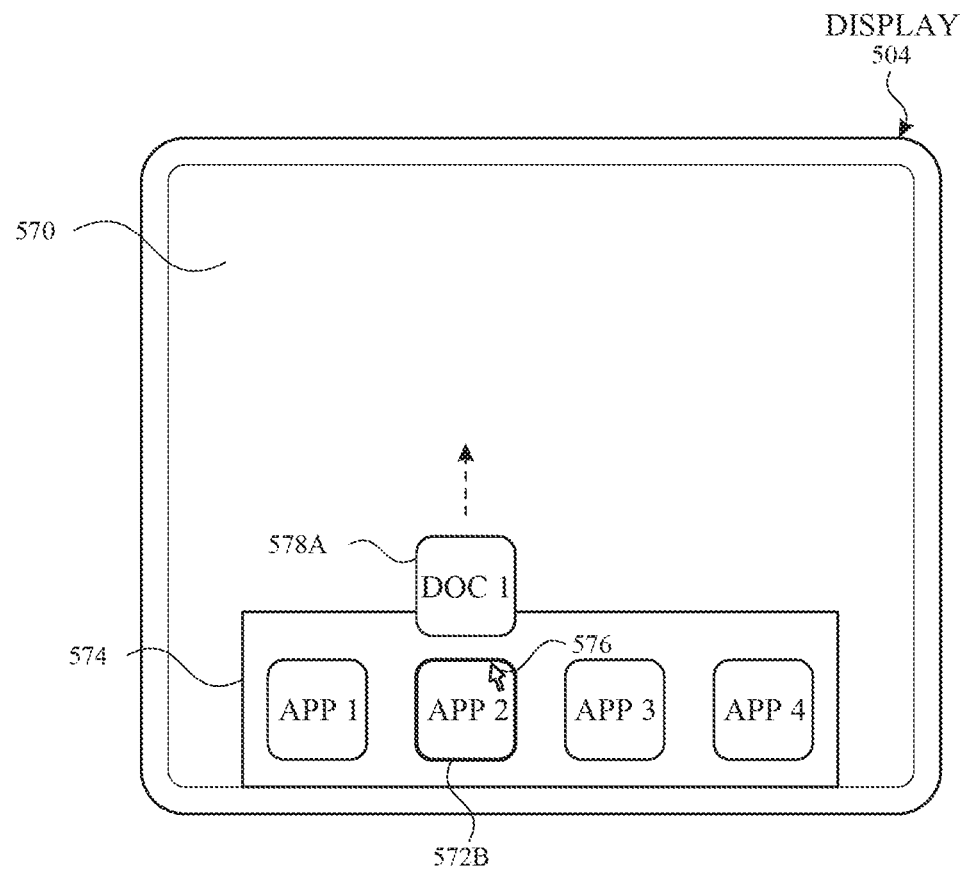
Figure 5F:
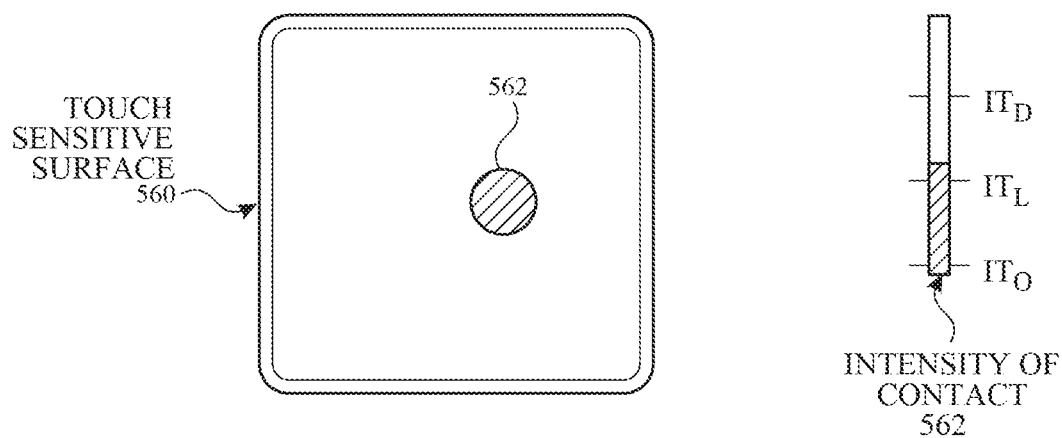
Figure 5G:
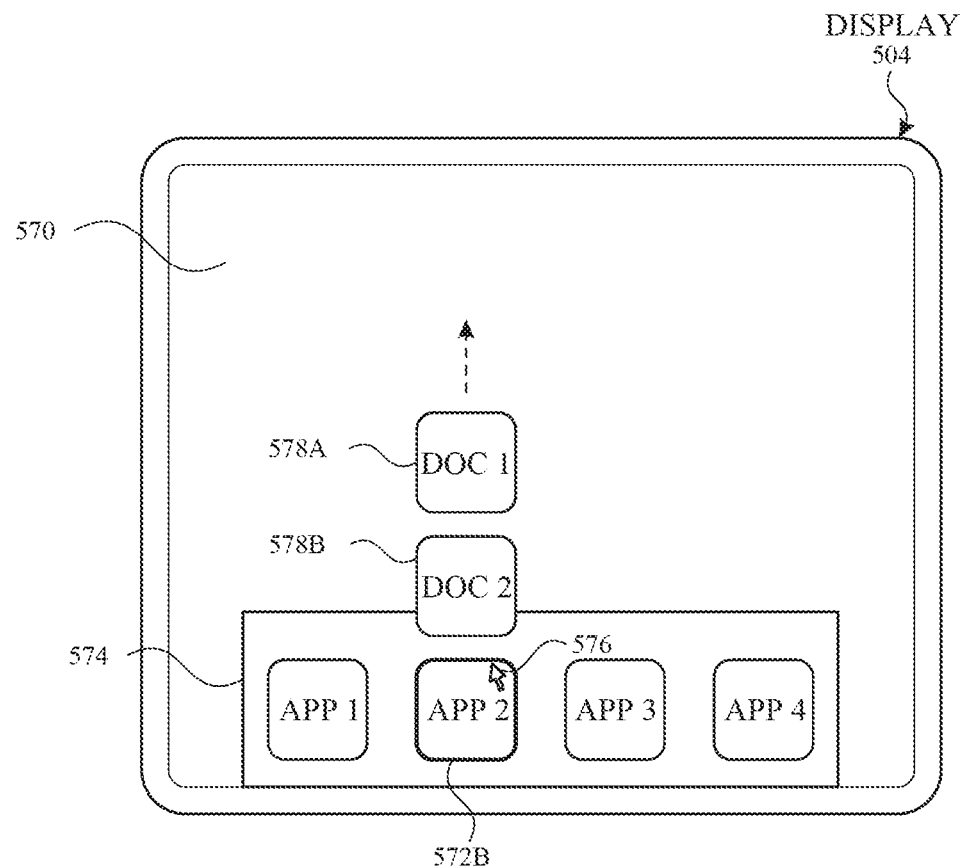
Figure 5G:
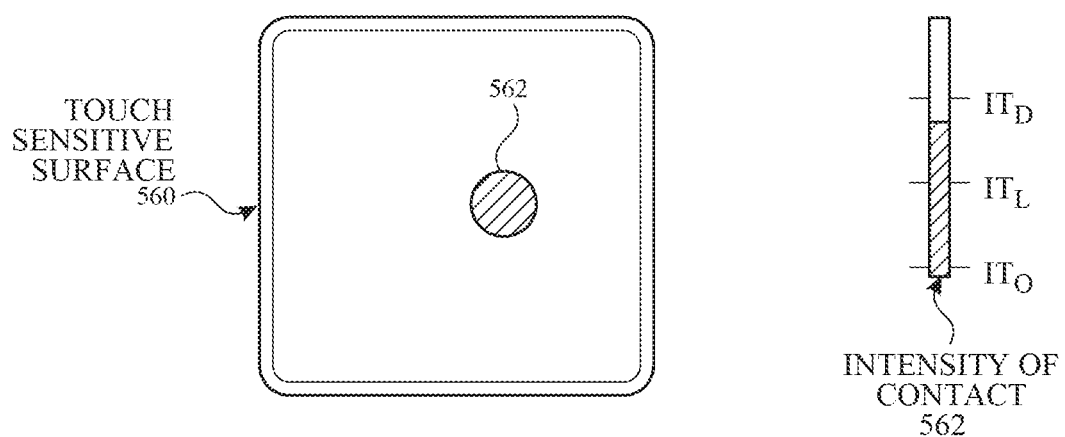
Figure 5H:
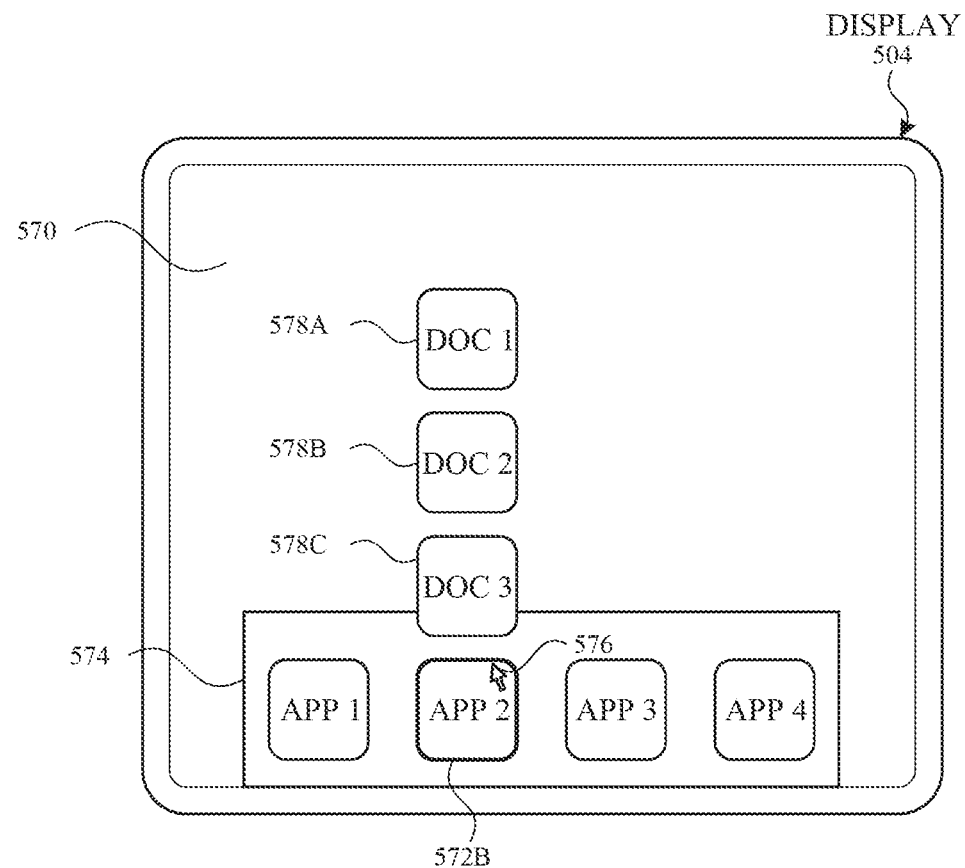
Figure 5H:
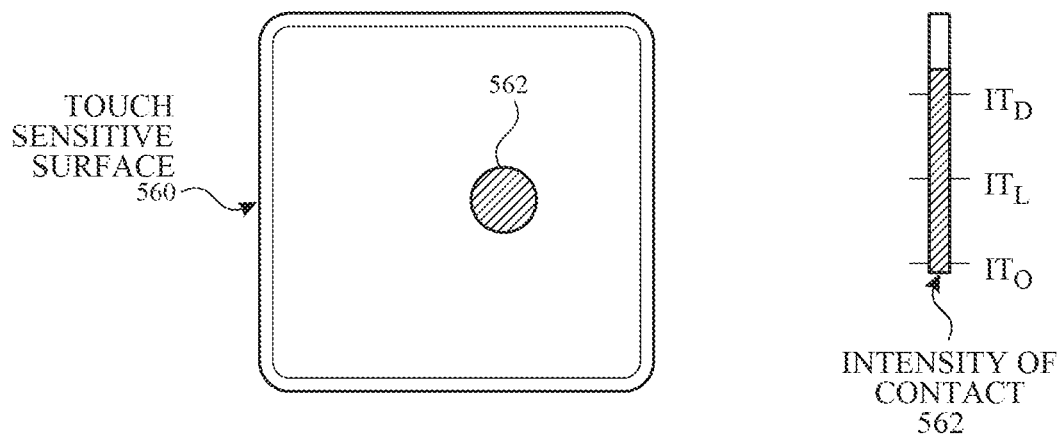

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AC illustrate exemplary user interfaces for a restricted mode of operation, in accordance with some embodiments. The user interfaces in these figures are used to illustrate the processes described below, including the processes in FIGS. 7-8.

FIG. 6A depicts device 600. Device 600 is configured to operate according to a restricted mode (described in greater detail below) and one or more modes other than the restricted mode. In some embodiments, device 600 is device 100, 300, or 500. Device 600 has a display device 602 depicted as a touch-sensitive display (e.g., touchscreen 504). Touch-sensitive display 602 is configured to detect the intensity of contacts. Exemplary components for detecting the intensity of contacts, as well as techniques for their detection, are described in greater detail above. Device 600 has a depressible and rotatable input device 603 configured to rotate relative to a frame or housing of device 600. Depressible and rotatable input device 603 is configured to rotate about an axis that is parallel to the surface of touch-sensitive display 602.

Device 600 is illustrated as a watch (e.g., a smartwatch). As such, some user interfaces illustrated as being displayed by device 600 are referred to as a "clock face" or a "watch face." References to a "clock face" as described herein are not in any way limited to a traditional notion of a "clock face," e.g., a circular display with hour indications and one or more hands to indicate time, or a representation of a digital clock. Any user interface with an indication of time described herein may properly be termed a clock face. Relatedly, a "complication" refers to any clock face feature other than those used to indicate the hours and minutes of a time (e.g., clock hands or hour/minute indications). In some embodiments, complications provide different types of information to a user, such as data obtained from an application. In some embodiments, the information conveyed to a user by a complication is customizable.

Although device 600 is described with reference to a watch, the techniques described below are not limited to clocks, watches, clock faces, and watch faces. The methods and user interfaces described herein can be applied to other devices and interfaces, including, but not limited to, desktop computers, laptop computers, tablet computers, smartphones, or the like.

Figure 6B:
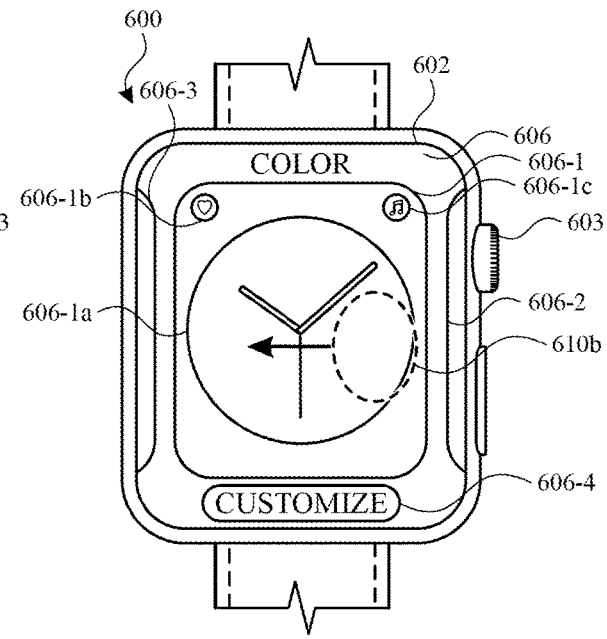
Figure 6C:
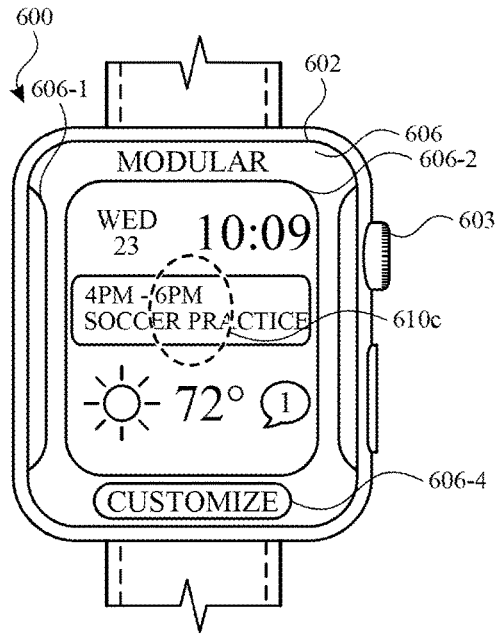

FIGS. 6A-6C illustrate techniques for selecting a user interface of a respective type of user interface. In FIGS. 6A-6C, device 600 is not operating according to a restricted mode (e.g., a mode in which a first set of one or more functions available in an unrestricted mode is not available while in the restricted mode, and in which a second set of one or more functions available in an unrestricted mode is available while in the restricted mode). In some embodiments, the ability to select a user interface of a respective type as described with respect to FIGS. 6A-6C is restricted (e.g., not available) while device 600 is operating according to the restricted mode.

In FIGS. 6A-6C, the respective type of user interface is a clock face. However, the techniques described with reference to FIGS. 6A-6C can be applied to other types of user interfaces. Numerous individual clock faces are possible using the techniques described here. A user may wish to select a particular clock face (e.g., from a saved library of clock faces), depending on a particular context. For example, a user may wish to display a particular clock face during working hours to project a professional appearance, but change the clock face during the weekend to reflect an interest (such as astronomy, exercise, or photography).

In FIG. 6A, device 600 displays clock face 604. Clock face 604 includes analog indication of time 604-1, complication 604-2 corresponding to a health application, and complication 604-3 corresponding to a music application.

In this example, the user wishes to switch from clock face 604 to a different clock face. The user contacts the touch-sensitive display of device 600 with input 610a (e.g., a tap). In response to a determination that input 610a has a characteristic intensity above an intensity threshold, device 600 enters a clock face selection mode, shown on user interface 606 in FIG. 6B. Clock face selection mode allows the user to select a clock face. Device 600 indicates that the user has entered clock face selection mode by visually distinguishing the clock face. User interface 606 visually distinguishes that device 600 has entered clock face selection mode by centering reduced size clock face 606-1 on the display (reduced size clock face 606-1 is based on clock face 604). This indicates to the user that device 600 is in clock face selection mode while giving the user an indication of what the clock face will look like when displayed at full size.

In some embodiments, user interface 606 includes partial views of a second clock face 606-2 and a third clock face 606-3. In some embodiments, when device 600 is in clock face selection mode, device 600 displays a partial view of another clock face, or clock face option, particularly the clock face or clock face option next in a sequence (e.g., of two or more clock faces available for selection in clock face selection mode). This further helps the user understand that additional options are available. In some embodiments, only one clock face is displayed at any time.

In some embodiments, user interface 606 includes paging dots that indicate where the user is within a sequence of available clock faces, as well as how many options are available in the sequence. In clock face selection mode, paging dots may indicate the currently selected clock face, where this clock face falls within a sequence of clock faces, and the total number of clock faces in the sequence. A paging affordance may be advantageous in clock face selection mode to help the user navigate the interface and explore all of the clock face options available.

Clock face selection mode can be used to select a clock face for display, or to select a clock face for editing. In some embodiments, when a clock face such as clock face 606-1 is centered on the display, a user can contact "Customize" affordance 606-4 on touch-sensitive display 602 to select the centered clock face for editing and enter into clock face editing mode (as described below in reference to FIGS. 6E-6G). Coupling clock face edit and selection modes in a single interface can allow the user to select different clock faces and edit them quickly and easily.

A user can select a different clock face (for editing or for display) by providing an input on touch-sensitive display 602. Device 600 detects input 610b (e.g., a swipe) on the touch-sensitive display. In response to detecting input 610b, device 600 updates (e.g., scrolls) user interface 606, as shown in FIG. 6C. User interface 606, as updated, includes second clock face 606-2 centered on the display. In some embodiments, user interface 606, as updated, includes a partial view of clock face 606-1.

Figure 6D:
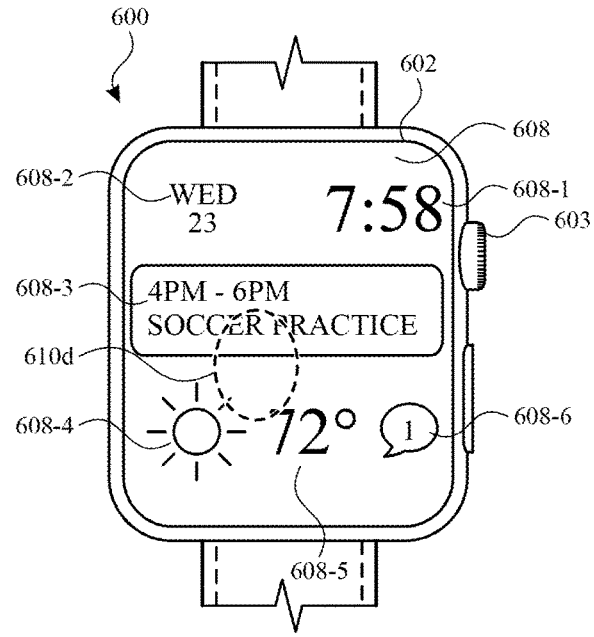
Figure 6E:
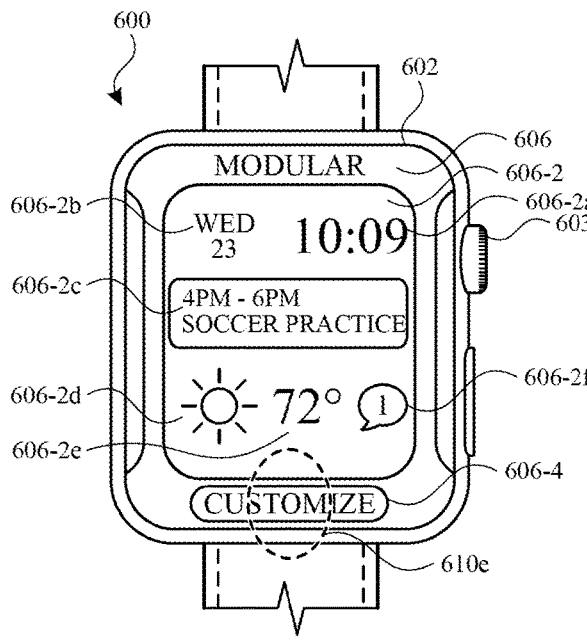
Figure 6F:
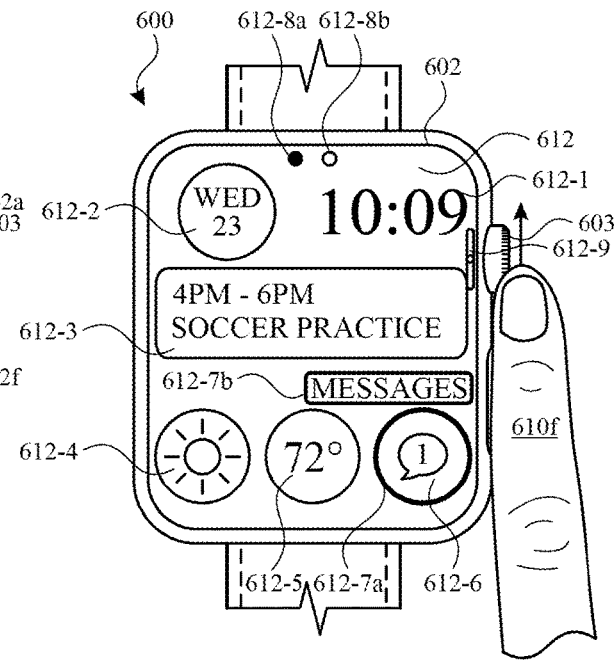
Figure 6G:
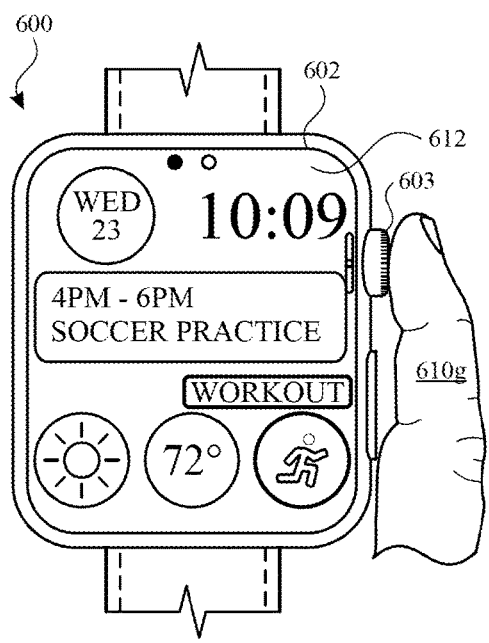

To select clock face 606-2, the user contacts touch-sensitive display 602 on clock face 606-2 (e.g., touch input 610c). In response to detecting input 610c (e.g., a tap), device 600 exits the clock face selection mode and displays full-sized clock face 608 (as shown in FIG. 6D), which is based on clock face 606-2. Clock face 608 includes digital indication of time 608-1 and five complications 608-2 to 608-6. Complication 608-2 corresponds to a calendar application and displays date information from the calendar application; complication 608-3 corresponds to a calendar application (e.g., the same calendar application associated with complication 608-2) and displays calendar event data from the calendar application; complication 608-4 corresponds to a weather application and displays forecast data from the weather application; complication 608-5 corresponds to a weather application (e.g., the same weather application associated with complication 608-4) and displays current temperature data from the weather application; and complication 608-6 corresponds to a messaging application and displays a graphical element (e.g., icon) associated with the messaging application. In some embodiments, the graphical element associated with the messaging application displays data from the messaging application (e.g., a number of new, unread, or missed messages).

Optionally, device 600 provides other methods for selecting a clock face in addition to or in place of the technique described above. In some embodiments, device 600 switches directly from clock face 604 to clock face 608 without entering the clock face selection mode (e.g., without displaying user interface 606). For example, in response to detecting a swipe gesture from right to left on touch-sensitive display 602 while displaying clock face 604 in FIG. 6A, device 600 replaces clock face 604 with clock face 608 (e.g., device 600 ceases display of clock face 604 and displays clock face 608).

Having described various techniques for selecting a user interface of a respective type of user interface (e.g., a clock face), attention is now directed to methods of editing a user interface of a respective type of user interface (e.g., a clock face). FIGS. 6D-6G illustrate techniques for editing a user interface of a respective type of user interface. In FIGS. 6D-6G, device 600 is not operating according to a restricted mode. In some embodiments, the ability to edit a user interface as described with respect to FIGS. 6D-6G is restricted (e.g., not available) while device 600 is operating according to the restricted mode.

In FIG. 6D, device 600 displays clock face 608. Clock face 608 includes complication 608-6 that displays information associated with a messaging application. In this example, the user wishes to change an aspect of clock face 608. Specifically, the user decides to change the application associated with complication 608-6.

The user contacts the touch-sensitive display 602 of device 600 with touch input 610d. In response to a determination that input 610d has a characteristic intensity above an intensity threshold, device 600 enters a clock face edit mode. In some embodiments, clock face edit mode is the same as (or integrated with) the clock face selection mode described above (e.g., a combined clock face selection/edit mode). Clock face edit mode allows the user to edit one or more aspects of a clock face.

In the illustrated embodiments, in response to input 610*d*, device 600 displays user interface 606 described above. User interface 606 shows a reduced size clock face 606-2 based on clock face 608, with reduced size indication of time 606-2*a* and complications 606-2*b* to 606-2*f*. This display indicates to the user that device 600 is in clock face edit mode (or selection mode) while giving the user an indication of what the edited clock face will look like on the display.

The user selects the displayed clock face for editing by contacting "Customize" affordance 606-4 with input 610*e* (e.g., a tap). In response to detecting input 610*e*, device 600 displays user interface 612, which includes a full-size, editable version of clock face 606-2. User interface 612 visually indicates an element of the clock face for editing. As shown on user interface 612, the complication 612-6 (corresponding to element 606-2*f* and complication 608-6) has been selected for editing, as indicated by outline 612-7*a* and title bar 612-7*b*. The other elements of the clock face are retained, as shown by digital indication of time 612-1 and complications 612-2 through 612-5.

In some embodiments, user interface 612 displays paging dots 612-8 that indicate where the user is within a sequence of options, as well as how many options are available in the sequence. In clock face edit mode, paging dots may indicate which editable aspect of the clock face a user is editing, where this aspect falls within a sequence of editable aspects, and the total number of editable aspects in the sequence. Paging dots may be advantageous in clock face edit mode to help the user navigate the interface and explore all of the editable options available within each type of clock face.

In this example, two aspects of the clock face are available for user editing: (1) color scheme and (2) complications. This is depicted by paging dots 612-8*a* and 612-8*b*. Editing the color of a clock face can include, e.g., changing a color of a clock face background (e.g., substituting a color if the clock face background is a particular color, or selecting a different image if the clock face background includes an image), changing a color of part or all of a seconds hand (if included on the clock face), changing a color of an hour and/or minute indication, and/or changing a color of a number or colon in the display of a representation of a digital clock.

User interface 612 is for editing complications, the second editable aspect of the clock face. This is relayed to the user by highlighting paging dot 612-8*b*. By viewing paging dots 612-8, the user recognizes that complications are the second of two editable aspects of this clock face.

The user may move (e.g., rotate) depressible and rotatable input device 603 to cycle through different options for editing different aspects of the clock face. On user interface 612, the user may select different options (e.g., application data) for complication 612-6 through input 610*f* (e.g., movement of depressible and rotatable input device 603). Advantageously, using a rotatable input device to cycle through editing options (rather than using, e.g., a touch interaction) frees up touch interactions with the screen to instead provide other functionalities (e.g., selecting which complication to edit), thus expanding the interactability of the device. Using a rotatable input device is also helpful in cases where smaller elements of the display are being edited, as finer-scale touch gestures can be difficult on a reduced-size display, especially for users with large fingers that can block a user's view of the screen while editing.

Also displayed on user interface 612 is positional indicator 612-9. Positional indicator 612-9 is an indicator of a current position along a series of positions. This can be used, for example, in combination with depressible and rotatable input device 603. On user interface 612, positional indicator 612-9 indicates to the user the position of the currently selected option within a series of all selectable options.

In response to detecting input 610*f*, device 600 edits complication 612-6, in this case by changing the data associated with the complication from messaging application data to workout application data (e.g., an affordance for launching a workout application). This is shown by changing the graphical element displayed at complication 612-6, while still highlighting complication 612-6 with outline 612-7*a* and title bar 612-7*b*. The other elements of the clock face remain the same. Positional indicator 612-9 has been updated to indicate the position of the workout application data in a sequence of data options.

As indicated by paging dot 612-8*b*, the complications are the second editable aspect of this clock face within a sequence of editable aspects. The user may select a first editable aspect (e.g., color) by swiping on the touch-sensitive display (e.g., swiping from left to right). In response to detecting the swipe, device 600 displays a user interface for editing the color scheme of the clock face (e.g., by rotating depressible and rotatable input device 603).

While FIGS. 6D-6G illustrate editing of only complication 612-6, multiple complications can be edited. A user can select a particular complication for editing by contacting the corresponding position of the complication. Outline 612-7*a* then transitions from the previously selected complication or element to the currently selected complication or element and depressible and rotatable input device 603 can then be used to edit the complication or element at the selected location. In some embodiments, an element (e.g., complication) can be selected by swiping the touch-sensitive display, or rotating the depressible and rotatable input device.

As described above, the user can scroll through the available options using movement of the depressible and rotatable input device. However, a user may also wish to scroll through the available options using a second type of input, such as a contact (e.g., a swipe) on the touch-sensitive display. In some embodiments, a user can swipe the touch-sensitive display in a different direction than the swipe used for visually indicating a second element of the clock face for editing (e.g., a downward swipe on the display). For example, to scroll through the available options, the user can swipe in a substantially horizontal direction to scroll through editable aspects (e.g., with swipes moving left-to-right resulting in scrolling through the sequence of editable aspects in one direction, and swipes moving right-to-left resulting in scrolling through the sequence of editable aspects in a different direction). In this example, the user can swipe in a substantially vertical direction to scroll through available options (e.g., with swipes moving downwards resulting in scrolling through the sequence of available options in one direction, and swipes moving upwards resulting in scrolling through the sequence of available options in a different direction). In some embodiments, the user can swipe the display at or near the location of the displayed positional indicator to scroll through the sequence of available options.

Figure 6H:
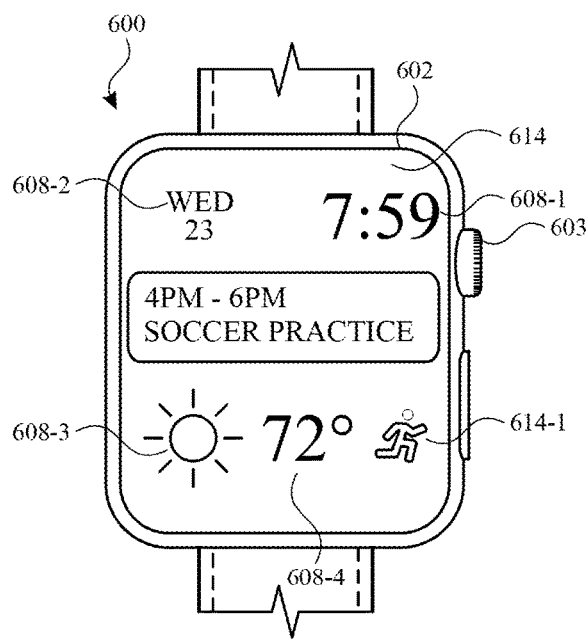

Having finished editing the clock face, the user can now exit clock face edit mode and display the edited clock face on the display. In response to input 610*g* (e.g., depression of depressible and rotatable input device 603), device 600 exits clock face edit mode and displays edited clock face 614, as depicted in FIG. 6H. Edited clock face 614 is the same as clock face 608, except for updated complication 614-1. In some embodiments, in response to input 610*g*, device 600 returns to user interface 606 (e.g., exits clock face edit mode and returns to clock face selection mode), which is updated to display a representation of the edited clock face, and then displays edited clock face 614 (as depicted in FIG. 6H) in response to another user input (e.g., depression of depressible and rotatable input device 603) while displaying user interface 606.

FIGS. 6A-6H illustrate exemplary embodiments of selecting and editing a clock face, but a number of other potential embodiments are possible within the scope of the techniques described herein, where device 600 selects and/or edits a clock face in response to a sequence of one or more inputs. Clock face edit mode allows the user to alter multiple editable aspects of the clock faces described herein. In some embodiments, in response to detecting a swipe on the touch-sensitive display, device 600 selects a second element of the clock face for editing, which in response to detecting another user input (e.g., a movement of the depressible and rotatable input device), may be edited. This allows the user to cycle through different editable aspects of the displayed clock face, such as colors, number and/or type of complications, and display density.

Figure 6I:
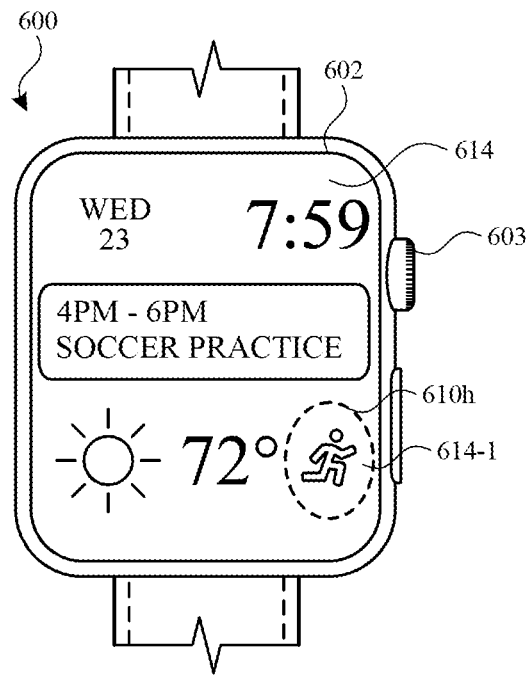

Turning to FIG. 6I, in some embodiments, a complication can be selected to launch an application (e.g., make a background or suspended application active). For example, an affordance representing a complication on a clock face can display a set of information from the corresponding application. However, a user may wish to view additional information from the application, or launch the full application itself. Complication 614-1 represents a workout application and includes an affordance for launching the workout application. To launch the workout application, a user contacts the display at complication 614-1 (e.g., touch 610*h*). In response, device 600 launches the workout application and begins an Outdoor Walk, as depicted on user interface 616 in FIG. 6J. User interface 616 shows the type of workout (Outdoor Walk), distance (0.01 miles), and elapsed time (00:08:52).

Figure 6J:
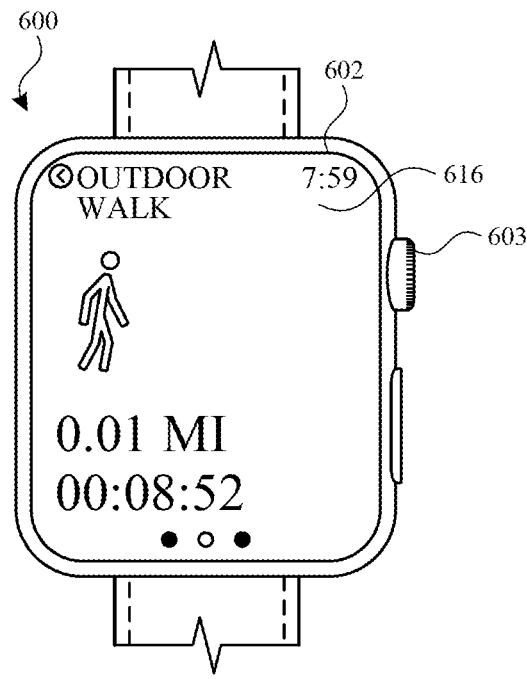

In FIGS. 6I-6J, device 600 is not operating according to a restricted mode. In some embodiments, the ability to launch an application (e.g., a particular application), access an open application, and/or close an application is restricted (e.g., not available) while device 600 is operating according to the restricted mode.

Figure 6K:
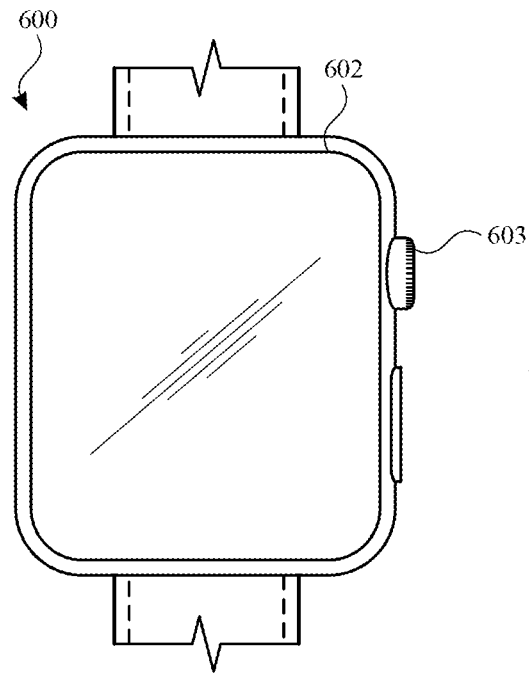

Turning to FIG. 6K, display 602 becomes inactive (e.g., in response to device 600 determining that no input has been received for a predetermined amount of time, in response to detecting a predetermined gesture (e.g., a wrist-down gesture), or in response to detecting an input (e.g., a sequence of one or more inputs that cause display 602 to become inactive)).

While display 602 is inactive, device 600 detects the occurrence of a condition (e.g., a tap, wrist raise, movement of depressible and rotatable input device 603, an application closing, or the like) that corresponds to a trigger for displaying the current clock face of device 600. In response to detecting the occurrence of a condition that corresponds to a trigger for displaying the current clock face, device 600 displays a clock face, where the clock face that is displayed depends on whether or not the current time corresponds to a predefined time range during which device 600 is to operate in a restricted mode. In some embodiments, the current time corresponds to the predefined time range if the current time is within the predefined time range. In some embodiments, the predefined time range is absolute (e.g., from a defined start time (e.g., 9:00 am) to a defined end time (e.g. 3:00 pm) or relative (e.g., within a defined amount of time (e.g., 1 hour) from when a restricted mode is entered).

In some embodiments, the predefined time range is set by a device remote to device 600 (e.g., by device 650 described with reference to FIGS. 6AA-6AC). In some embodiments, the predefined time range is associated with a user account associated with device 600 (e.g., the predefined time range applies to multiple devices associated with a user account).

Figure 6L:
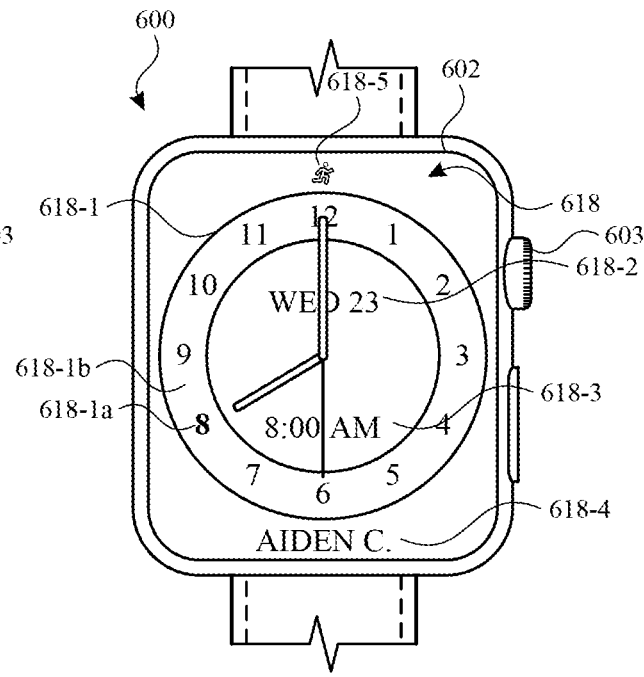

In accordance with a determination that the current time does not correspond to the predefined time range, device 600 does not operate according to a restricted mode and displays clock face 614 (e.g., the currently selected clock face). In some embodiments, rather than displaying the currently-selected clock face, device 600 displays the most recently displayed interface (e.g., user interface 616 in the illustrated example). In accordance with a determination that the current time corresponds to the predefined time range, device 600 operates according to a restricted mode of operation (e.g., enters or activates the restricted mode). The predefined time range in the illustrated embodiment is 8:00 am to 3:00 pm. In FIG. 6L, the current time is 8:00 am, which corresponds to the predefined time range, so device 600 enters the restricted mode.

In some embodiments, operating in the restricted mode includes displaying a restricted user interface. FIG. 6L depicts an embodiment of a restricted user interface, restricted clock face 618. In some embodiments, if clock face 614 (or user interface 616) is displayed when the current time reaches the predefined time range, device 600 ceases display of clock face 614 (or user interface 616) and replaces it with restricted clock face 618. As described in greater detail below, in some embodiments, inputs on display 602 while displaying restricted clock face 618 do not cause a visible response while in restricted mode, nor are notifications provided.

Display of restricted clock face 618 indicates that device 600 is operating in a restricted mode and includes graphical elements (e.g., a predefined set of elements) that are different from the graphical elements of other user interfaces (e.g., clock faces 604, 608, and 614) available for display by device 600. In some embodiments, the graphical elements of restricted clock face 618 cannot be changed (e.g., edited or removed), and additional graphical element cannot be added to restricted clock face 618 (e.g., cannot be added without first existing the restricted mode), in response to input detected at device 600.

In the illustrated embodiment, restricted clock face 618 includes analog indication of time 618-1, indication 618-2 of the date, and digital indication of time 618-3. Element 618-*la* of analog indication of time 618-1 corresponds to a current hour of the current time and is visually emphasized relative to other elements of analog indication of time 618-1 that correspond to hours other than the current hour. Restricted clock face 618 includes an indication 618-4 of a user's name (e.g., full first and last name, first name only, full first name and last initial, initials only (e.g., first and last initial only)). In some embodiments, the user's name is customizable (e.g., via device 600 or an external device).

In the illustrated embodiment, restricted clock face 618 includes a distinguishing graphical element, in particular, large ring 618-1*b* with an outer diameter that is substantially the same as (slightly smaller than) the horizontal dimension (e.g., width) of display device 602 (e.g., the outer diameter of ring 618-1*b* is greater than 90% of the width of the display). Ring 618-1*b* is visually distinguishable in that it is not an arbitrarily defined area of clock face 618. In some embodiments, ring 618-1*b* is a prominent color, such as yellow. In some embodiments, ring 618-1*b* is not included in any other clock faces available on device 600. For example, none of the faces provided in the clock face selection mode described above in, e.g., FIGS. 6B-6C can be changed in response to input detected at the electronic device to include ring 618-1b. In some embodiments, the distinguishing graphical element is displayed via the display device only while the restricted clock face is the current clock face (e.g., the element is unique to the restricted clock face). In some embodiments, the distinguishing element is in a foreground of the restricted clock face (e.g., the distinguishing element is not a background image). Ring 618-1b is merely an example of a distinguishable graphical element—other elements with the general characteristics of ring 618-1b described above (e.g., not available on other clock faces or user interfaces) can be distinguishing graphical elements.

Restricted clock face 618 includes graphical element 618-5 corresponding to the workout application represented by user interface 616. In some embodiments, device 600 continues to run the workout application after entering the restricted mode. Device 600 can continue to run the workout application even while operating in the restricted mode so as not to interrupt an ongoing workout. In some embodiments, device 600 determines what operation to perform (e.g., continue to execute in the background, suspend, pause, or close) with respect to an open application upon entering the restricted mode based on the type of application that is running. For example, device 600 can suspend or close types of applications that can be resumed from a point at which they are stopped (e.g., a user can restart a music track at a point that a music application is paused or stopped), whereas device 600 can continue to execute types of applications (e.g., a workout application) that often cannot be easily resumed (e.g., a workout application cannot accurately track the pace of a runner if the application is closed during the runner's workout).

In the illustrated embodiment of FIG. 6L, in accordance with a determination that an application is open, device 600 displays graphical element 618-5 on restricted clock face 618 to indicate that the workout application is open. In some embodiments, device 600 displays a graphical element for an application on restricted clock face 618 if the application is open and executing in the background (e.g., a background application) but not if the application is suspended or hibernated (e.g., open but not running). In some embodiments, unlike complication 614-1 on clock face 614, graphical element 618-5 cannot be selected to access (e.g., launch or display) the workout application. For example, a touch input on graphical element 618-5 does not cause the workout application to be displayed, and in some embodiments, does not cause any function to be performed (e.g., device 600 does not perform any affirmative operation in response to an input corresponding to selection of graphical element 618-5). In some embodiments, device 600 does not respond to any touch inputs on touch-sensitive display 602 (e.g., device 600 does not enter a clock face selection or editing mode in response to input on touch-sensitive display 602 while restricted clock face 618 is displayed). In some embodiments, device 600 does not provide notifications (e.g., graphical, haptic, audible) of events (e.g., incoming phone calls, emails, text messages, alarm) while in the restricted mode (e.g., while displaying restricted clock face 618).

In some embodiments, device 600 suspends or closes applications that are active when the current time reaches the predefined time range. In some such embodiments, in accordance with a determination that the application is not running (e.g., is closed or suspended), device 600 displays restricted clock face 618 without a graphical element corresponding to the workout application.

In some embodiments, the predefined set of graphical elements of the restricted clock face has a predefined configuration or layout that is different from all other available clock faces (e.g., clock faces 604, 608, and 614). In some embodiments, restricted clock face 618 is not available when device 600 is not in the restricted mode (e.g., restricted clock face 618 is not available in the clock face selection mode illustrated in FIGS. 6B-6C). In some embodiments, a user cannot select the clock face corresponding to the restricted mode. In some embodiments, the restricted clock face is a static system setting.

Figure 6M:
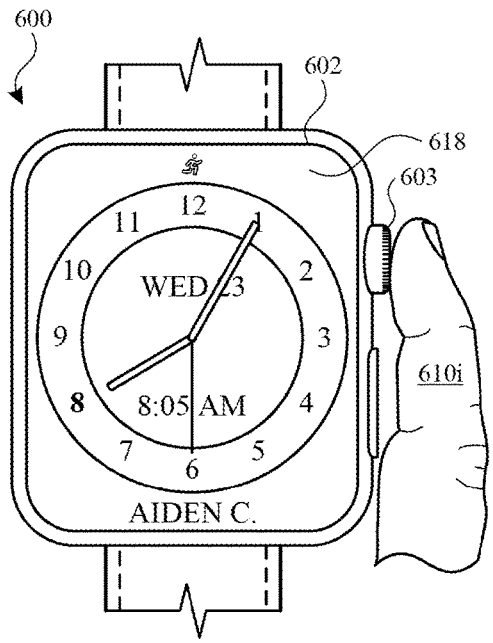
Figure 6N:
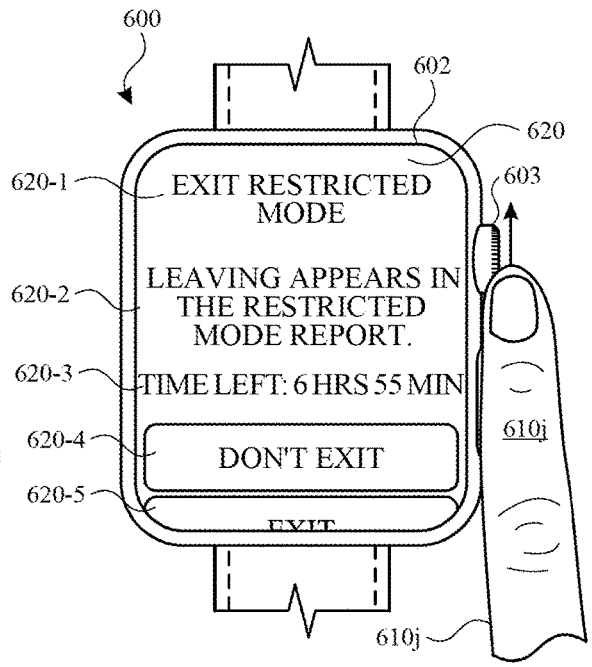
Figure 6O:
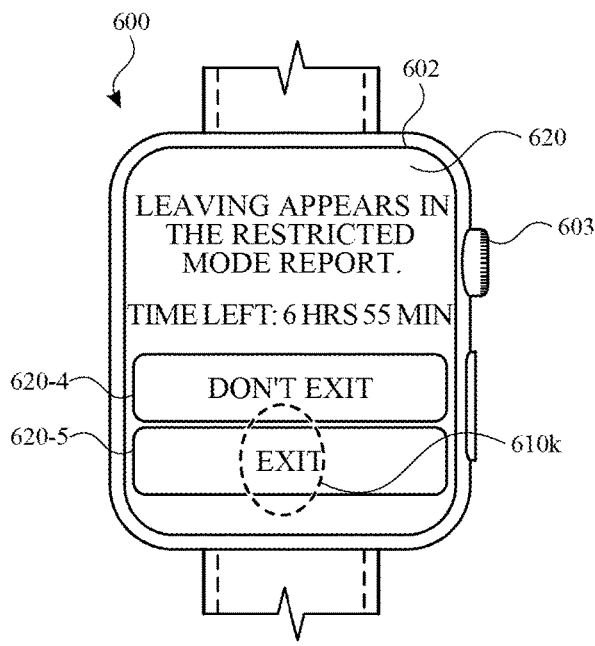

FIGS. 6M-6O illustrate techniques for exiting the restricted mode (also referred to as "unlocking" the restricted mode) according to some embodiments. Exiting the restricted mode allows device 600 to display other clock faces (e.g., customizable and/or changeable clock faces, such as clock faces 604, 608, and 614) and to perform operations that are not available while operating in the restricted mode (e.g., access applications). The techniques for exiting the restricted mode described below are unlikely to be performed accidentally and involve a deliberate effort by the user to exit the restricted mode. In some instances, the deliberate effort involved may deter a user from deactivating the restricted mode and allow the user to maintain focus on a current task. Furthermore, device 600 is prevented from incidentally exiting the restricted mode while also allowing a user to access the full functionality of the device (e.g., if a particular need or emergency arises).

In FIG. 6M, device 600 detects input 610i. In FIG. 6M, input 610i includes a depression of depressible and rotatable input device 603. In some embodiments, input 610i includes a contact on touch-sensitive display 602 (e.g., a contact with a characteristic intensity that is determined to be greater than a threshold intensity) or rotation of depressible and rotatable input device 603.

In response to detecting input 610i, device 600 displays user interface 620 illustrated in FIG. 6N. In FIG. 6N, user interface 620 replaces restricted clock face 618 (e.g., device 600 ceases displaying restricted clock face 618 and displays user interface 620). In some embodiments, device 600 overlays user interface 620 over a portion of restricted clock face 618. User interface 620 includes information related to the restricted mode (e.g., information related to exiting the restricted mode). In the illustrated example, user interface 620 includes title 620-1 ("EXIT RESTRICTED MODE"), alert 620-2 ("Leaving appears in the restricted mode report"), and indication 620-3 of the remaining duration of the restricted mode ("Time Left: 6 HRS 55 MIN"). Displaying how much longer the restricted mode is scheduled is advantageous in circumstances in which the user of device 600 did not set the predefined time range (e.g., if a user's parent set the predefined time range, the user may not otherwise know how long the restricted mode is scheduled to last).

In the illustrated embodiment, alert 620-2 indicates that information indicating that device 600 has exited the restricted mode (e.g., an exit event) will be reported to another user. In the illustrated embodiment, exiting the restricted mode on device 600 is reported to device 650 illustrated in FIG. 6AA. In some embodiments, exiting the restricted mode on device 600 is reported to device 650 in accordance with a determination that device 650 is associated with a user that is to receive information indicating that device 600 exited the restricted mode (e.g., device 650 is associated with a user account of the user that is to receive information indicating that device 600 exited the restricted mode).

In some embodiments, the information indicating that device 600 has exited the restricted mode is reported to another user directly (e.g., via Bluetooth or NFC) from device 600 to the device of the receiving user (e.g., device 650). In some embodiments, the information indicating that device 600 has exited the restricted mode is reported to another user via a common network connection (e.g., Wi-Fi, internet, LAN, etc.).

User interface 620 includes affordance 620-4 for cancelling the exit process (labeled "DON'T EXIT"). In response to selection of affordance 620-4, device 600 remains in the restricted mode, cancels the exit process, and returns to restricted clock face 618 (e.g., ceases displaying user interface 620 and displays restricted clock face 618).

User interface 620 includes affordance 620-5 for exiting (unlocking, leaving) the restricted mode (labeled "EXIT"). In the illustrated embodiment, initially, user interface 620 is partially displayed such that affordance 620-5 is only partially displayed (e.g., a portion of user interface 620 is hidden or not displayed). In some embodiments, affordance 620-5 can be selected while partially displayed. In some embodiments, affordance 620-5 cannot be selection while partially displayed. In some embodiments, affordance 620-5 is completely displayed in response to input 610*i* (e.g., when user interface 620 is initially displayed), without further input. In some embodiments, affordance 620-5 is completely hidden (e.g., not visible in FIG. 6N) when user interface is initially displayed, and a user must provide additional input to display affordance 620-5 (e.g., by scrolling user interface 620 as described below).

In response to detecting input 610*j* (e.g., rotation of depressible and rotatable input device 603, an upward drag gesture on touch-sensitive display 602, a tap gesture on partially displayed affordance 620-5), device 600 scrolls user interface 620, revealing a previously hidden portion of user interface 620 such that affordance 620-5 is completely displayed, as illustrated in FIG. 6O. In some embodiments, in response to detecting input 610*j*, device 600 places focus on affordance 620-5.

In response to detecting selection of affordance 620-5 (e.g., detecting touch input 610*k* on affordance 620-5 or depression of depressible and rotatable input device 603 while focus is on affordance 620-5), device 600 exits the restricted mode and ceases display of user interface 620 (and restricted clock face 618, if still displayed).

In some embodiments, in response to detecting input corresponding to a request to exit the restricted mode (e.g., input 610*k*), device 600 records data representing an indication that device 600 has ceased operating in the restricted mode. In some embodiments, the recorded data includes a time at which device 600 ceased operating in the restricted mode (e.g., in response to detecting input 610*k*) and a duration of time for which device 600 was not operating in the restricted mode (e.g., an amount of time between exiting the restricted mode and re-entering the restricted mode or reaching the end of a predefined time range). For example, device 600 records the data for transmission to device 650 (e.g., the recorded data is transmitted (directly or indirectly) to device 650). In some embodiments, device 600 begins to record data upon exiting the restricted mode and, optionally, continues to record data while device 600 remains outside of the restricted mode. In some embodiments, the data causes a report of the exit event to be displayed at device 650. In some embodiments, the recorded data is transmitted upon device 600 exiting the restricted mode (e.g., in response to detecting input 610*k*). In some embodiments, the recorded data is transmitted upon device 600 re-entering the restricted mode. In some embodiments, the recorded data is transmitted periodically (e.g., five minutes, every hour, or at the end of the day or the end of the week).

Figure 6P:
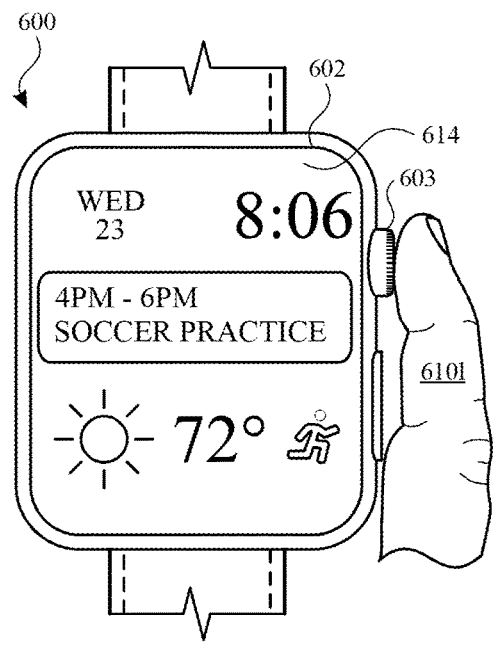

In the illustrated embodiment, upon exiting the restricted mode, device 600 replaces restricted clock face 618 with customizable clock face 614 as the current clock face, as shown in FIG. 6P. In some embodiments, device 600 replaces restricted clock face 618 with a user interface that was most recently displayed prior to entering the restricted mode (e.g., user interface 616 of the workout application).

Upon exiting the restricted mode, device 600 operates according to a "normal" mode that includes functionality not accessible in the restricted mode. For example, while displaying clock face 614 in FIG. 6P, device 600 receives input 610*l* (e.g., depression of depressible and rotatable input device 603). In response to detecting input 610*l*, device 600 displays user interface 622 (e.g., an application springboard) including a plurality of affordances for launching corresponding applications or user interfaces. In contrast to the operation of device 600 while in the restricted mode, user interface 622 is not available directly from restricted clock face 618. As illustrated above, depression of depressible and rotatable input device 603 while restricted clock face 618 is displayed results in display of user interface 620. In the illustrated embodiment, device 600 must exit the restricted mode in order to display user interface 622.

Figure 6Q:
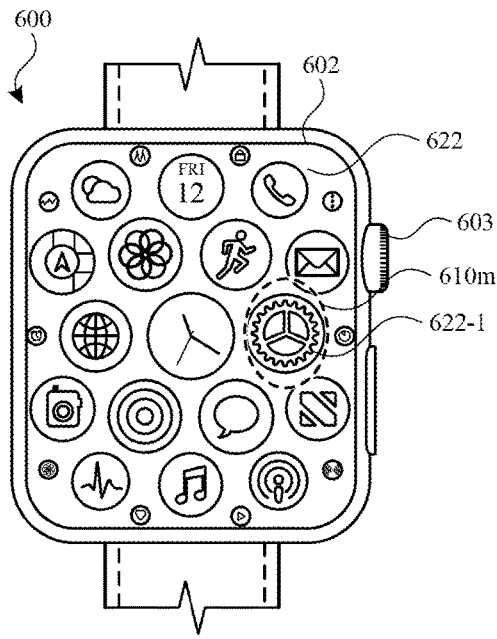
Figure 6R:
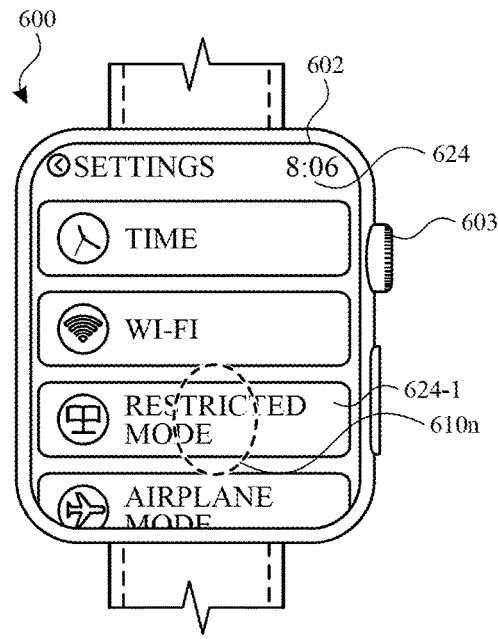

In response to detecting selection of affordance 622-1 (e.g., detecting tap input 610*m* on affordance 622-1), device 600 displays user interface 624 (e.g., settings menu). As illustrated in FIG. 6R, user interface 624 includes affordances associated with various system features, including affordance 624-1 associated with the restricted mode.

Figure 6S:
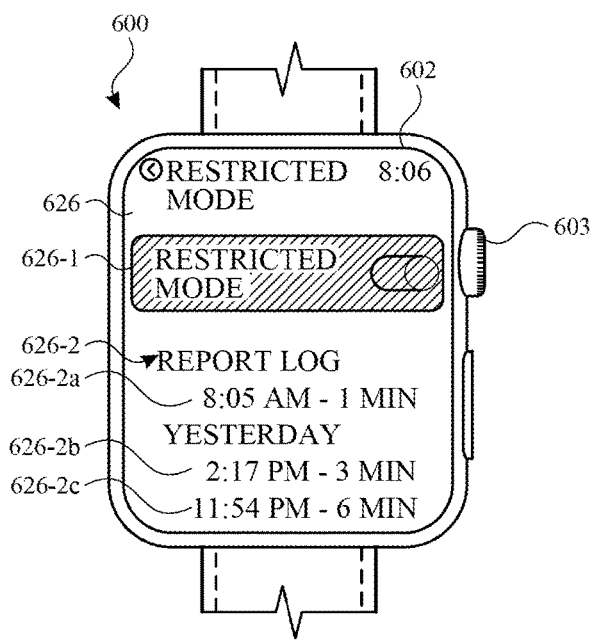

In response to detecting selection of affordance 624-1 (e.g., detecting tap gesture input 610*n*), device 600 displays user interface 626, which includes information related to the restricted mode. User interface 626 includes affordance 626-1 (e.g., toggle button), which indicates the state of the restricted mode and, optionally, can be used for activating and deactivating the restricted mode under certain conditions. As illustrated in FIG. 6S, since the current time corresponds to the predefined time range, affordance 626-1 is deactivated (e.g., cannot be selected), as indicated by being greyed out. In some embodiments, when the current time does not correspond to the predefined time range, the restricted mode can be activated by navigating to user interface 626 (e.g., via the sequence of interfaces and inputs illustrated in FIGS. 6P-6R) and selecting affordance 626-1.

User interface 626 includes a report log 626-2 indicating occurrences of one or more devices exiting a restricted mode (e.g., exit events). Report log 626-2 includes information concerning exit events associated with the restricted mode. Exit event items 626-2*a* through 626-2*c* indicate a time at which the restricted mode was exited (e.g., the time an exit event began) and a duration of the exit event (e.g., the amount of time that a device remained out of the restricted mode during the predefined time range). Exit event item 626-2*a* corresponds to the exit event illustrated in FIGS. 6O-6P, which began at 8:05 and has lasted one minute (since the current time in FIG. 6S is 8:06). In some embodiments, report log 626-2 includes information about exit events from previous days. For example, exit event items 626-2*b* and 626-2*c* provide information about exit events that occurred during a previous day. In some embodiments, report log 626-2 organizes exit event items by day. In some embodiments, report log 626-2 organizes exit event items by restricted mode period (e.g., multiple restricted mode periods can be scheduled in a day). In some embodiments, device 600 aggregates exit events from multiple devices (e.g., devices that share a common account or are associated with a single user). In some embodiments, a predefined time range applies to multiple devices and, optionally, exiting the restricted mode on any of the multiple devices during the predefined time range results in an exit event that is included in the report log. In some embodiments, an exit event item includes an indication of a device associated with the corresponding exit event. In some embodiments, report log 626-2 includes exit event items associated only with device 600.

In the illustrated embodiment, after exiting the restricted mode, device 600 will re-enter the restricted mode (e.g., re-display restricted clock face 618) if certain criteria are met while the current time corresponds to the predefined time range. For example, if an input is not detected within a predetermined amount of time or device 600 detects an input corresponding to a request to deactivate display of content (e.g., a wrist gesture consistent with a user putting his or her wrist down, indicating that the user is not looking at device 600), device re-enters the restricted mode. In some embodiments, device 600 displays restricted clock face 618 at the time of re-entering the restricted mode. In some embodiments, if display 602 is not displaying content at the time the criteria for re-entering the restricted mode are met, device 600 displays restricted clock face 618 upon detecting the occurrence of a condition that corresponds to a trigger for displaying the current clock face of device 600. In some embodiments, the criteria for re-entering the restricted mode includes the condition that corresponds to a trigger for displaying the current clock face of device 600 (e.g., device 600 does not re-enter the restricted mode until receiving a request to display the current clock face, even if other conditions have been met (e.g., inactivity criteria)).

Figure 6T:
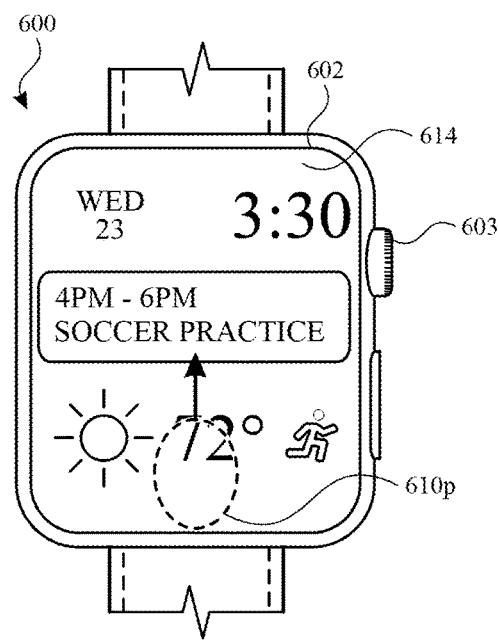
Figure 6U:
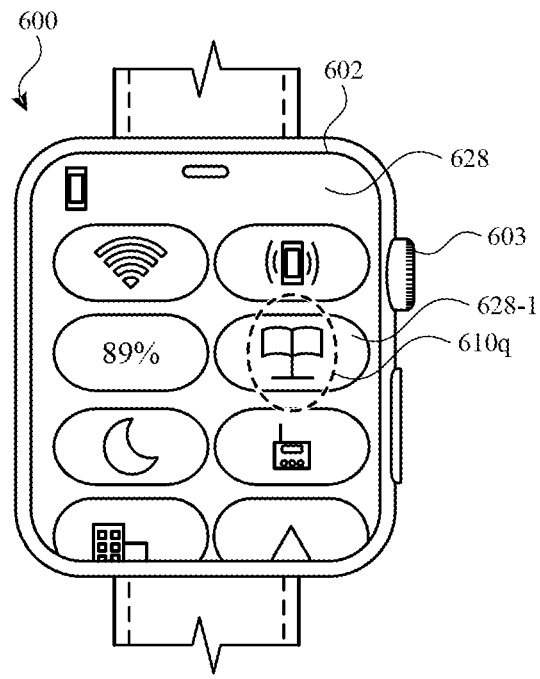

Turning to FIG. 6T, clock face 614 is displayed while device 600 is not operating in the restricted mode and the current time does not correspond to a predefined time range. In response to detecting input 610p (e.g., an upward swipe gesture on touch-sensitive display 602), device 600 displays user interface 628 (e.g., a control interface) with affordances for controlling various functions of device 600, as illustrated in FIG. 6U. In response to detecting selection of affordance 628-1 (e.g., a tap gesture 610q on touch-sensitive display 602 at an affordance corresponding to the restricted mode), device 600 enters the restricted mode and displays restricted clock face 618. In some embodiments, in response to detecting selection of affordance 626-1, device 600 displays user interface 626 as shown in FIG. 6S, except that affordance 626-1 is selectable (e.g., not greyed out), such that selection of affordance 626-1 causes device 600 to enter the restricted mode and display restricted clock face 618. In these ways, a user can voluntarily activate the restricted mode via inputs at device 600. In some embodiments, activating the restricted mode manually as illustrated in FIGS. 6T-6U causes device 600 to remain in the restricted mode indefinitely until a user manually exits the restricted mode. In some embodiments, if a user manually activates the restricted mode and device 600 remains in the restricted mode until the current time corresponds to the predefined time range, device 600 will deactivate the restricted mode upon expiration of the predefined time range (e.g., even if the user has not manually deactivated the restricted mode). In some embodiments, if a user manually activates the restricted mode and device 600 remains in the restricted mode until the current time corresponds to the predefined time range, device 600 will remain in the restricted mode upon expiration of the predefined time range (e.g., until the restricted mode is manually deactivated).

Figure 6V:
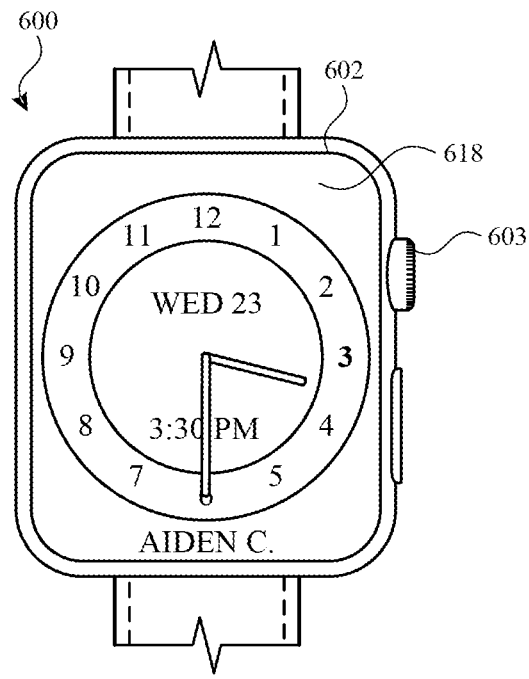
Figure 6W:
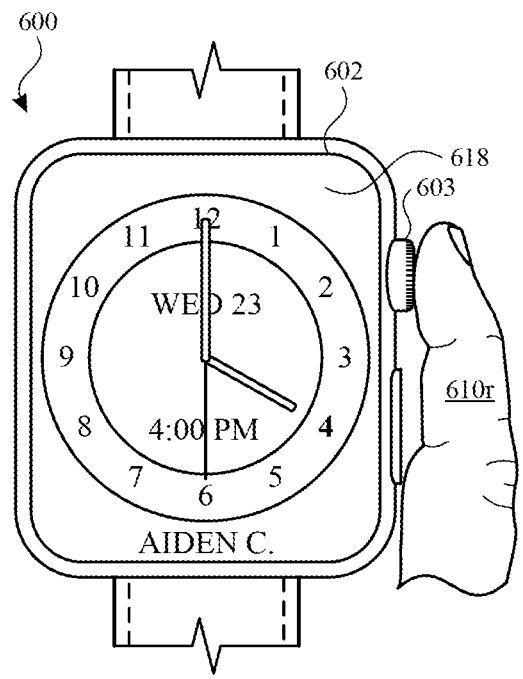

After device 600 enters the restricted mode at 3:30 PM as illustrated in FIG. 6V, device 600 remains in the restricted mode. While device 600 is still in the restricted mode, device 600 detects input 610r (e.g., a depression of depressible and rotatable input device 603) at 4:00 PM, as illustrated in FIG. 6W. In response to detecting input 610r, device 600 displays user interface 630 (FIG. 6X) including information regarding the restricted mode. User interface 630 includes title 630-1 ("EXIT RESTRICTED MODE"), message 630-2 indicating how long device 600 has been in the restricted mode ("YOU'VE BEEN IN RESTRICTED MODE FOR 30 MIN"), and affordances 630-3 and 630-4. In user interface 630, displaying how long device 600 has been in the restricted mode encourages some users to remain in the restricted mode or re-enter the restricted mode in the future (e.g., a user might be rewarded by his or her parents for not using certain features of a device during a time intended for studying).

In contrast to user interface 620 (which is displayed while device 600 is in the restricted mode due to a current time corresponding to a predefined time range), user interface 630 is displayed while device 600 is in the restricted mode due to manual input (e.g., selection of affordance 628-1). That is, in the illustrated embodiment, the response of device 600 to detecting input while operating in the restricted mode (or while displaying restricted clock face 618) depends on the conditions under which the restricted mode was entered (e.g., whether device 600 is operating in the restricted mode due to a predefined condition or voluntarily user input at device 600).

Figure 6X:
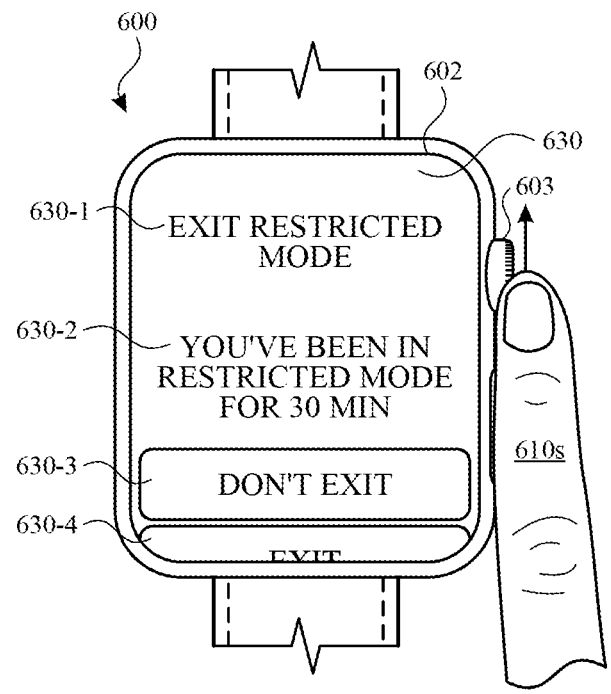
Figure 6Y:
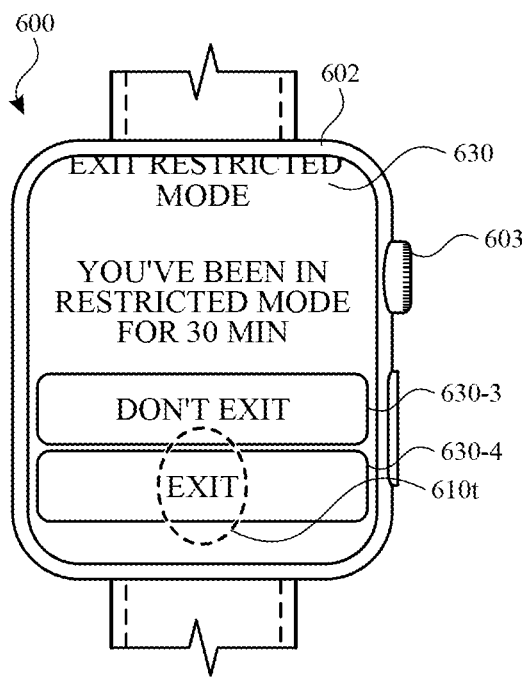

In FIG. 6X, device 600 detects input 610s (e.g., a rotation of depressible and rotatable input device 603). In response to detecting input 610s, device 600 scrolls user interface 630, as shown in FIG. 6Y. In some embodiments, in response to detecting input 610t (e.g., a tap gesture on affordance 630-4), device 600 exits the restricted mode. In some embodiments, after selection of affordance 630-4, device 600 will not automatically re-enter the restricted mode or re-display restricted clock face 618 in response to inactivity criteria being met, e.g., since the restricted mode was entered manually. In some embodiments, device 600 will re-enter the restricted mode and re-display restricted clock face 618 in response to inactivity criteria being met, until the restricted mode is deactivated via affordance 626-1 on user interface 626 in FIG. 6S.

Figure 6Z:
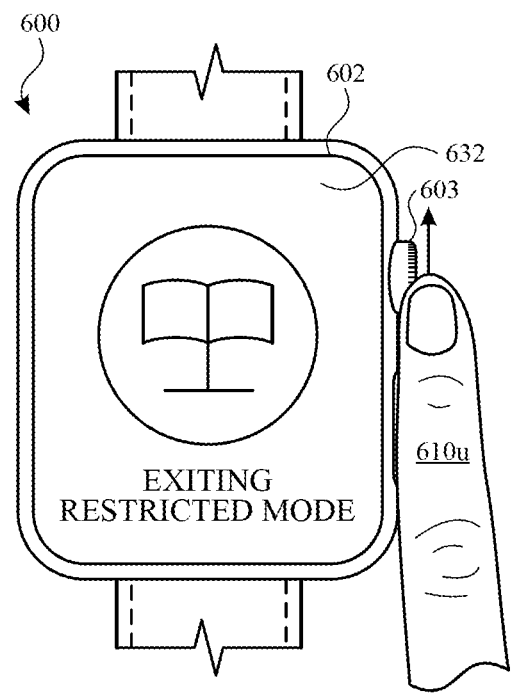
Figure 6A:
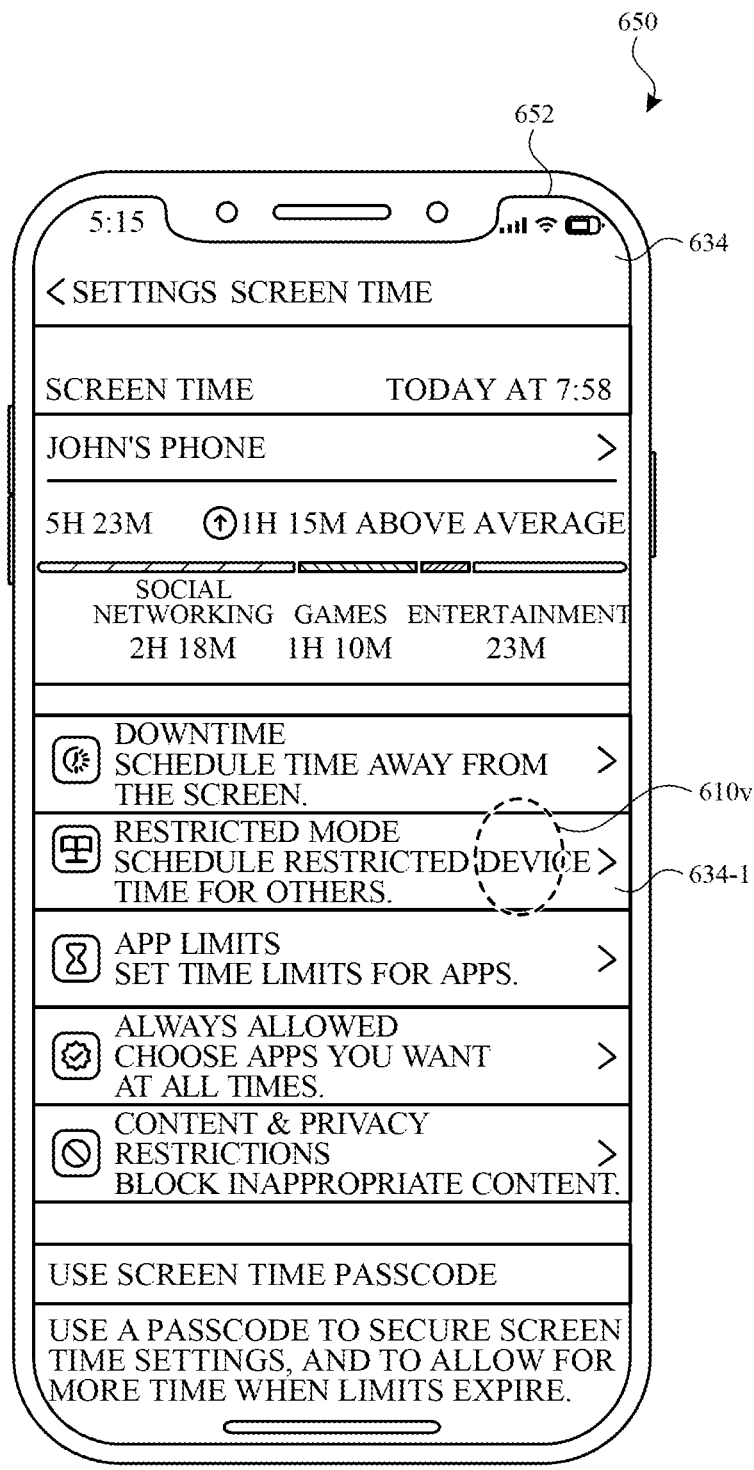
Figure 6A:
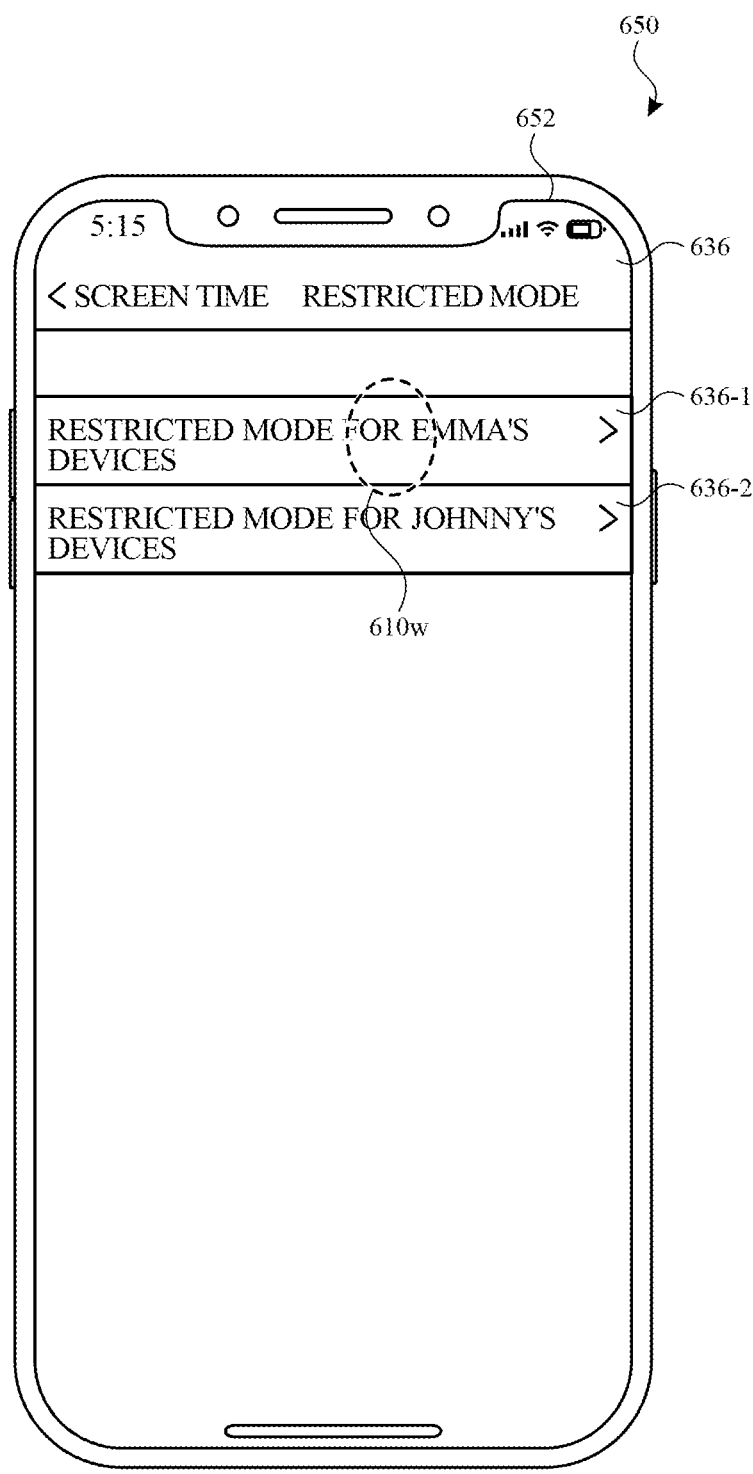
Figure 6A:
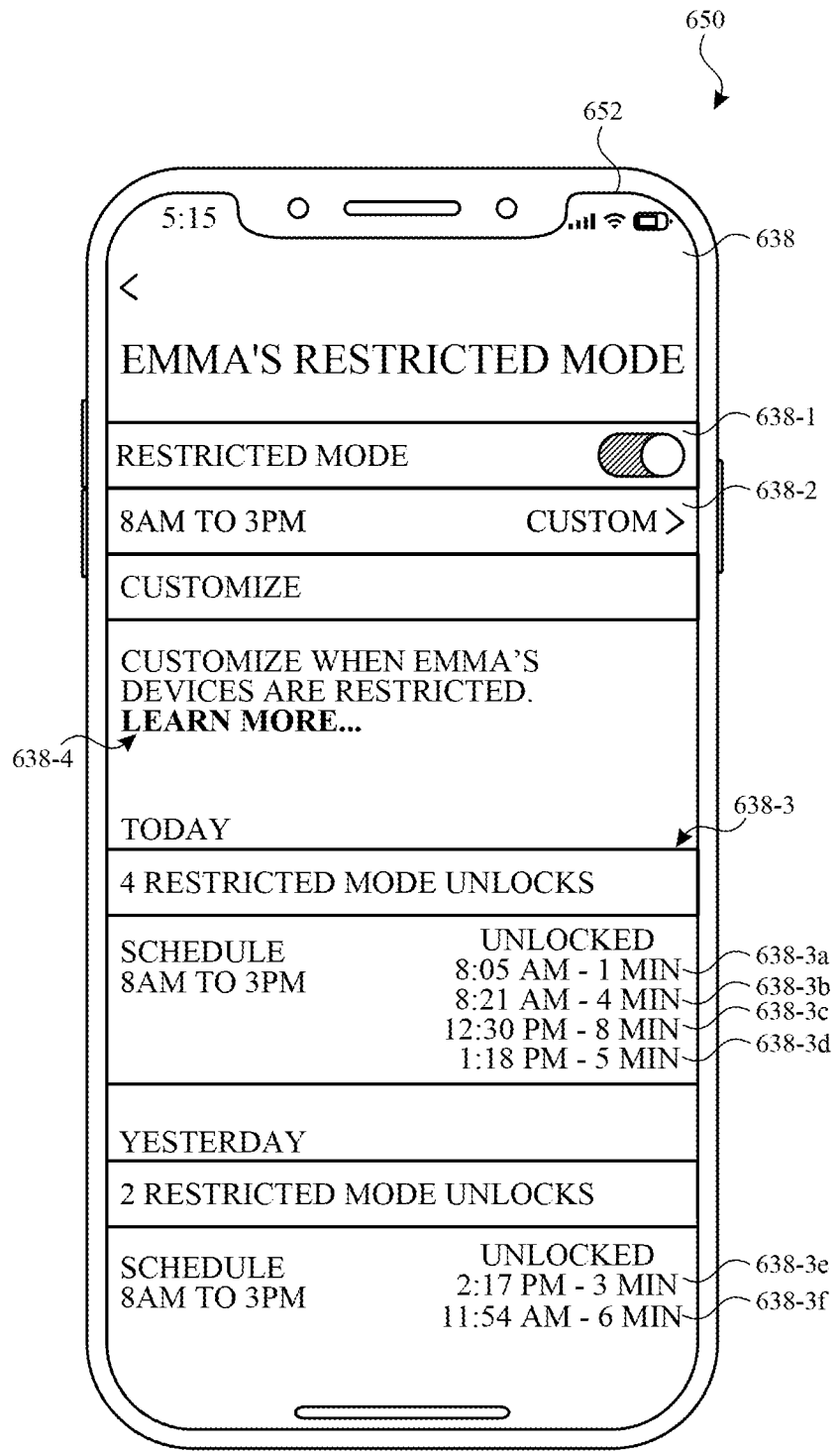

FIG. 6Z illustrates a technique for exiting the restricted mode according to some embodiments. In response to detecting input 610i (FIG. 6M), input 610j (FIG. 6N), input 610r (FIG. 6W), or input 610s (FIG. 6X), device 600 displays user interface 632, which indicates that device 600 is exiting the restricted mode or will exit the restricted mode in response to rotation of depressible and rotatable input device 603. In response to detecting input 610u in FIG. 6Z (e.g., a rotation of depressible and rotatable input device 603), device 600 exits the restricted mode. The technique depicted by FIG. 6Z illustrates that, in some embodiments, device 600 exits the restricted mode in response to a rotation of depressible and rotatable input device 603 directly from restricted clock face 618 or indirectly from restricted clock face 618 (e.g., via user interfaces 620 or 630).

FIGS. 6AA-6AC illustrate techniques for viewing information regarding a restricted mode and setting parameters for a restricted mode (e.g., the restricted mode on device 600).

FIG. 6AA illustrates device 650 (e.g., device 100 or 300). In some embodiments, device 650 is paired with device 600 (e.g., there is a direct communication link between device 600 and 650) and/or associated with an account (e.g., user account) that is also associated with device 600.

In FIG. 6AA, device 650 displays user interface 634 (e.g., a Screen Time settings menu). User interface 634 includes item 634-1 (e.g., an affordance) corresponding to a user interface associated with a restricted mode. In response to detecting selection of item 634-1 (e.g., tap gesture 610*v* on item 634-1), device 650 displays user interface 636 depicted in FIG. 6AB. User interface 636 includes items 636-1 and 636-2 (e.g., affordances) associated with restricted mode information (e.g., settings) corresponding to respective users. For example, item 636-1 corresponds to restricted mode information associated with a user Emma. In the illustrated embodiment, the items are listed according to users (e.g., Emma, Johnny, etc.). In some embodiments, the items are listed according to particular devices (e.g., Emma's watch, Emma's phone, Johnny's watch).

In response to detecting input 610*w* (e.g., a tap gesture on item 636-1), device 650 displays user interface 638 illustrated in FIG. 6AC. User interface 638 includes information for a restricted mode for user Emma. In some embodiments, user interface 638 aggregates data from multiple devices associated with user Emma. In some embodiments, user interface 638 displays information on a per device basis. User interface 638 includes affordance 638-1 (e.g., toggle button) for activating and deactivating a restricted mode for Emma's devices (e.g., devices associated with Emma, devices associated with a user account associated with Emma). In some embodiments, selecting affordance 638-1 turns on a restricted mode for Emma's devices. In some embodiments, turning on the restricted mode via device 650 causes Emma's device(s) to activate a restricted mode (e.g., selecting affordance causes data to be sent to Emma's devices that cause Emma's devices to activate a restricted mode). In some embodiments, turning on the restricted mode via device 650 causes Emma's devices to activate a restricted mode according to a defined schedule. In the illustrated embodiment, a restricted mode for Emma's devices is configured to be activated from 8 AM to 3 PM (e.g., the restricted mode for Emma's devices has a predefined time range of 8 AM to 3 PM such that Emma's devices operate in the restricted mode between 8 AM and 3 PM).

In some embodiments, the settings for a restricted mode can be configured according to a custom schedule. User interface 638 includes affordance 638-4 for displaying information (e.g., instructions) for customizing when Emma's devices are restricted. In response to detecting selection of affordance 638-2 ("CUSTOM"), device 650 displays a user interface for editing/setting a customizable schedule according to which Emma's devices will operate in the restricted mode. For example, device 650 provides a user interface to customize the restricted mode schedule per day (e.g., "8 AM-3 PM on Monday and 7 AM-2:30 PM on Tuesday" or "M-F 7:30 AM-3 PM and Sat-Sun OFF"). In some embodiments, the predefined time range is defined in accordance with a schedule that specifies different time ranges for different days of the week.

User interface 638 includes report log 638-3 showing exit events (referred to in user interface 638 as "UNLOCKS") indicating times and durations when user Emma's devices exited the restricted mode. As described above, devices remote from device 650 (e.g., device 600) can record data representing an indication the remote device has ceased operating in the restricted mode. This data is obtained by device 650 and used to generate report log 638-3. In some embodiments, the recorded data is transmitted (directly or indirectly) to device 650. In some embodiments, the recorded data is obtained when the remote device exits the restricted mode. In some embodiments, the recorded data is obtained when the remote device re-enters the restricted mode. In some embodiments, the recorded data is obtained periodically (e.g., every five minutes, every hour, or at the end of the day or the end of the week).

Report log 638-3 groups exit events by day (e.g., "TODAY", "YESTERDAY"). In some embodiments, user interface 638 can be scrolled to display additional exit events (e.g., exit events for days prior to "YESTERDAY"). In some embodiments, report log 638-3 groups exit events by restricted mode period (e.g., if there is more than one predefined time range in a day (e.g., 8 AM-1 PM and "2 PM-3:30 PM), report log 638-3 groups exit events by predefined time range). Report log 638-3 includes exit event items 638-3*a* through 638-3*f* that indicate the time the restricted mode was exited (unlocked) and the duration of the exit event (e.g., how long the restricted mode was unlocked). In some embodiments, report log 638-3 includes additional information compared to report log 626-2 displayed on device 600 (e.g., since device 650 has a larger display size). For example, in some embodiments, report log 638-3 includes an indication of a device associated with an exit event item (e.g., an icon representing a laptop, phone, or watch to indicate which device (or type of device) exited the restricted mode at the time and duration indicated in the corresponding exit event item). In some embodiments, report log 626-2 displayed on device 600 includes an indication of a device associated with an exit event item.

In some embodiments, if device 650 is associated with the user Emma and is configured to operate in a restricted mode according to the schedule indicated on user interface 638, report log 638-3 includes exit event items corresponding to times and durations when device 650 exited the restricted mode.

FIG. 7 is a flow diagram illustrating a method for operating an electronic device in a restricted mode of operation in accordance with some embodiments. Method 700 is performed at a device (e.g., 100, 300, 500, 600, 650) with a display device. Some operations in method 700 are, optionally, combined, the orders of some operations are, optionally, changed, and some operations are, optionally, omitted.

As described below, method 700 provides an intuitive way for transitioning between user interfaces. The method reduces the cognitive burden on a user for transitioning between user interfaces, thereby creating a more efficient human-machine interface. For battery-operated computing devices, enabling a user to transition between user interfaces automatically and more efficiently conserves power and increases the time between battery charges.

An electronic device (e.g., 600) with a display device (e.g., 602), display (702) via the display device, a first user interface (e.g., 604) (e.g., a first clock face) of a respective type of user interface (e.g., a current clock face) of the electronic device. In some embodiments, the first user interface of a respective type of user interface includes one or more elements (e.g., 604-1, 604-2, 604-3) in a first arrangement (e.g., at least a first element and a second element in a first arrangement). In some embodiments, the first element displays a first type of information (e.g., time) and the second element displays a second type of information (e.g., information from a health or music application). In some embodiments, the first user interface is a graphical user interface including a clock face with an indication of time and, optionally, one or more user interface elements that represent information other than time (e.g., complications).

In some embodiments, the respective type of user interface is a clock face.

In some embodiments, the electronic device detects (704) a sequence (e.g., 610*a*, 610*b*, and/or 610*c*) of one or more inputs (e.g., contacts on a touch-sensitive display and/or activation (e.g., depression or rotation) of a rotatable input mechanism) corresponding to a request to change the current user interface (e.g., a current clock face) of a respective type of user interface of the electronic device (e.g., enter a user interface editing mode and/or a user interface selection mode, edit a visual element of the first user interface or select a different user interface, and confirm selection of the edited or different user interface). In some embodiments, at least one input (e.g., 601*a*) of the sequence of one or more inputs is detected while the first user interface is displayed.

In some embodiments, in response to detecting the sequence of one or more inputs corresponding to the request to change the current user interface of a respective type of user interface of the electronic device, the electronic device displays (706) via the display device, a second user interface (e.g., 608) of the respective type of user interface as the current user interface of a respective type of user interface of the electronic device. In some embodiments, the second user interface of a respective type of user interface includes one or more elements (e.g., 608-1, 608-2, 608-3, 608-4, 608-5, and 608-6) that are different from the one or more elements of the first user interface of a respective type of user interface and/or are in a different arrangement than the first arrangement of the one or more elements of the first user interface of a respective type of user interface (e.g., the second user interface is an edited (customized) version of the first user interface (e.g., user-selected colors and/or complications for a predefined layout). In some embodiments, the second user interface is a different style of user interface (e.g., the user can customize the user interface by selecting a particular (the second) user interface). In some embodiments, a style of user interface is defined by user interface elements on the user interface (e.g., number and types of complications), layout of the user interface (e.g., arrangement of elements), or the indication of time (e.g., digital or analog, in the case of a clock face). In some embodiments, the sequence of one or more inputs correspond to selection of features of the second user interface.

Displaying a second user interface with one or more elements that are different from the one or more elements of the first user interface and/or are in a different arrangement than the first arrangement of the one or more elements of the first user interface in response to detecting a sequence of one or more inputs provides additional control options and customization of the user interface of the device. Providing additional control options and customization of the user interface enhances the operability of the device and makes the user-device interface more efficient (e.g., by providing a relevant interface and helping the user to provide proper inputs and reducing user mistakes when operating/interacting with the device) which, additionally, reduces power usage and improves battery life of the device by enabling the user to use the device more quickly and efficiently.

In some embodiments, the second user interface of a respective type of user interface includes a first affordance (e.g., 614-1) corresponding to an application (e.g., a workout application). In some embodiments, while displaying the second user interface of a respective type of user interface, the electronic device detects an input (e.g., 610*h*) corresponding to selection of the first affordance. In some embodiments, in response to detecting the input corresponding to selection of the first affordance, the electronic device launches the application (e.g., 616). In some embodiments, in contrast to the second user interface, a user interface (e.g., 618) corresponding to a restricted mode includes no graphical elements (e.g., affordances) that can be selected to launch corresponding applications or functions.

In some embodiments, while displaying the second user interface of a respective type of user interface, the electronic device detects a third sequence of one or more inputs (e.g., contacts on a touch-sensitive display and/or activation (e.g., depression or rotation) of a rotatable input mechanism). In some embodiments, in response to detecting the third sequence of one or more inputs while displaying the second user interface of a respective type of user interface, the electronic device performs an operation (e.g., opens an application, displays a dock of recently opened or designated (e.g., favorite) applications, displays an application springboard (e.g., 622, a plurality of icons for launching corresponding applications), displays a notification center (e.g., a list of notifications), transitions to a system space different from the current system space, edits the current user interface or enter a user interface editing or selection mode, or launches an application corresponding to a complication). In some embodiments, a Do Not Disturb mode is enabled when a restricted mode is active. In some embodiments, while displaying a third user interface (e.g., restricted clock face 618) of a respective type of user interface, the electronic device detects the third sequence of one or more inputs (e.g., the same type of inputs in the same order that were detected while displaying the second user interface). In some embodiments, in response to detecting the third sequence of one or more inputs while displaying the third user interface of a respective type of user interface, the electronic device foregoes performance of the operation. In some embodiments, operations that can be performed while the electronic device is not operating in a restricted mode (e.g., sending e-mail and text messages, accessing a web browsing application, presenting notifications) cannot be performed while the electronic device is operating in a restricted mode (e.g., the electronic device must exit the restricted mode in order to be able to perform the operations). In some embodiments, the performance of an operation is modified while in the restricted mode (e.g., notification of a phone call is presented only after multiple call attempts are received instead of on a first attempt).

In some embodiments, prior to detecting an occurrence of a condition that corresponds to a trigger for displaying the current user interface of a respective type of user interface of the electronic device, the electronic device displays a user interface (e.g., 616) of a first application (e.g., an application that is other than an application for generating clock faces; an application that is not part of the operating system). In some embodiments, displaying the third user interface (e.g., 618) of a respective type of user interface includes ceasing to display the user interface of the first application. In some embodiments, ceasing to display the user interface of the first application includes suspending the first application or closing the first application.

In some embodiments, after changing the current user interface of a respective type of user interface of the electronic device to the second user interface of a respective type of user interface, the electronic device detects (708) the occurrence of a condition (e.g., a tap, wrist raise, press of a button, closing of an application, or the like) that corresponds to a trigger for displaying the current user interface of a respective type of user interface of the electronic device.

In some embodiments, in response (710) to detecting the occurrence of a condition that corresponds to a trigger for displaying the current user interface of a respective type of user interface of the electronic device: in accordance with a determination that a current time corresponds to a predefined time range (e.g., the current time is within a predefined time range; absolute time range (e.g., 9 am-3 pm) and/or relative time range (e.g., within a defined amount of time (e.g., 1 hour) from an event or a defined time), the electronic device displays (712) via the display device, a third user interface (e.g., 618) of a respective type of user interface (e.g., a third clock face) different from the first user interface of a respective type of user interface and the second user interface of a respective type of user interface (e.g., if the second user interface is displayed when the current time reaches the predefined time range, cease display of the second user interface and replace the second user interface with the third user interface).

Displaying a third user interface of a respective type of user interface different from the first user interface of a respective type of user interface and the second user interface of a respective type of user interface in accordance with a determination that a current time corresponds to a predefined time range performs an operation when a set of conditions has been met without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third user interface of a respective type of user interface includes a predefined set of elements (e.g., 618-1, 618-2, 618-3, and 618-4) different from the one or more elements of the first user interface of a respective type of user interface and the one or more elements of the second user interface of a respective type of user interface. In some embodiments, the predefined set of elements cannot be changed (e.g., edited or removed) in response to input detected at the electronic device. In some embodiments, the predefined set of user interface elements (e.g., 618-1, 618-2, 618-3, and 618-4) of the third user interface has a predefined configuration or layout that is different from a configuration or layout of the first set of user interface elements of the second user interface. In some embodiments, the third user interface corresponds to a restricted mode and is not available when the restricted mode is not activated (e.g., the third user interface is not available in the face selection mode). In some embodiments, a user cannot select which user interface the third user interface will be (e.g., the user cannot select which user interface will be displayed in the restricted mode). In some embodiments, the third user interface is a static system setting. In some embodiments, features of the third user interface cannot be edited using the electronic device, regardless of whether the restricted mode is active or not (e.g., the third user interface is not available in the face edit mode, or is displayed in edit mode but cannot actually be edited).

In some embodiments, while the current time corresponds to the predefined time range and while the electronic device is operating in a first mode (e.g., a restricted mode), the electronic device detects a fifth sequence of one or more inputs (e.g., 610*i*, 610*j*, 610*k*, 610*r*, 610*s*, 610*t*) (e.g., a sequence of inputs for exiting the restricted mode; e.g., contacts on a touch-sensitive display and/or activation (e.g., depression or rotation) of a rotatable input mechanism). In some embodiments, the fifth sequence of one or more inputs includes at least one input (e.g., 610*i*, 610*r*) that is detected while displaying the third user interface of a respective type of user interface (e.g., the sequence of one or more inputs begins while the user interface is displayed). In some embodiments, in response to detecting the third sequence of one or more inputs, the electronic device exits the first mode (e.g., FIGS. 6O-6P). In some embodiments, exiting the first mode includes displaying the second user interface (e.g., 614) of a respective type of user interface.

In some embodiments, while the current time corresponds to the predefined time range (e.g., the current time is still within the designated window for the restricted mode) and while the third user interface of a respective type of user interface is not displayed (e.g., FIGS. 6P-6S; the device has detected a request to exit the third user interface and exit the restricted mode and has done so), the electronic device detects (e.g., automatically detects, detects without user inputs) that third interface of a respective type of user interface redisplay criteria are met. In some embodiments, the third user interface redisplay criteria include one or more of the following criterion: user inputs have not been detected within a predetermined amount of time or detecting an input corresponding to a request to deactivate display of content on the display device of the electronic device. In some embodiments, in response to detecting that the third user interface of a respective type of user interface redisplay criteria are met, the electronic device displays (e.g., redisplays) the third user interface of a respective type of user interface.

In some embodiments, the third user interface of a respective type of user interface includes an analog indication of time (e.g., 618-1) and a digital indication of time (e.g., 618-3). In some embodiments, the third user interface includes an indication of the date (e.g., 618-2).

In some embodiments, an element (e.g., 618-1*a*) of the analog indication of time corresponding to a current hour of the current time is visually emphasized relative to elements of the analog indication of time corresponding to hours other than the current hour.

In some embodiments, after ceasing to display the first user interface (e.g., 616) for the first application, the electronic device continues to run the first application in the background (e.g., even if the electronic device would not be allowed to start the first application during the restricted mode in which the third user interface is displayed, the electronic device continues to run the first application in the background to enable the electronic device to finish the operation that was being performed by the first application). In some embodiments, when the operation that was being performed by the first application is completed, the electronic device does not allow a new operation to be initiated for the first application while in the restricted mode. For example, if the user is running a workout tracking operation for a workout application, the user is able to complete the workout but is not able to start recording a new workout during the predefined time range corresponding to the third user interface (e.g., in the restricted mode). In some embodiments, if the application is displayed in the foreground when the current time reaches the predefined time range, the electronic device displays the third user interface and continues to run the application in the background.

In some embodiments, displaying the third user interface of a respective type of user interface includes: in accordance with a determination that the first application is running in the background, displaying the third user interface of a respective type of user interface with a graphical element (e.g., 618-5) corresponding to the first application (e.g., an icon indicating that the first application is running in the background). In some embodiments, displaying the third user interface of a respective type of user interface includes: in accordance with a determination that the first application is not running (e.g., is closed or suspended), displaying the third user interface of a respective type of user interface without the graphical element corresponding to the first application. Displaying the third user interface without the graphical element corresponding to the first application provides feedback about the state of the first application (e.g., that the first application is no longer running).

In some embodiments, the third user interface of a respective type of user interface includes an indication of a user's name (e.g., 618-4; full first and last name, first name only, full first name and last initial, initials only (e.g., first and last initial only)). In some embodiments, the user's name is customizable (e.g., via the electronic device or an external device). In some embodiments, the third user interface of a respective type of user interface includes a digital indication of time (e.g., 618-3).

In some embodiments, the predefined set of elements includes the entire third user interface of a respective type of user interface (e.g., since the predefined set of user interface elements of the third user interface cannot be changed in response to input detected at the electronic device while operating in the restricted mode, none of the elements of the third user interface can be changed in response to input detected at the electronic device) and additional elements cannot be added to the third user interface of a respective type of user interface. In some embodiments, one or more elements (e.g., 618-4) of the third user interface (e.g., the user interface for the restricted mode) are based on a user associated with the electronic device. For example, the third user interface includes an indication of a user's name in some examples. In some embodiments, the name that appears on the third user interface can be changed by editing a name associated with the electronic device (e.g., the entire device, via a system level setting), but cannot be changed at the "user interface" level (e.g., in the clock face edit mode). In some embodiments, a user cannot add, edit, or remove complications of the third user interface (e.g., clock face). In some embodiments, a user cannot add, edit, or remove the indication of time of the third user interface. In some embodiments, an input (e.g., a contact on a touch-sensitive surface that is maintained longer than a threshold amount of time (a long press) or a contact with a characteristic intensity greater than a threshold intensity (a hard press)) used to enter a user interface selection mode (e.g., clock face selection mode) or a user interface edit mode (e.g., clock face edit mode) when received while displaying other user interfaces does not cause the electronic device to enter the same mode when the same input is received while displaying the third user interface.

In some embodiments, the third user interface of a respective type of user interface includes a distinguishing element (e.g., 618-1*b*) (e.g., a graphical element; a yellow ring with an outer diameter that is substantially the same as a dimension of the display device (e.g., the outer diameter is greater than 90% of the width of the display)). In some embodiments, the distinguishing element is a visually distinguishable portion of the third user interface of a respective type of user interface (e.g., the first element is not an arbitrarily defined area) and the distinguishing element is not included in the first user interface of a respective type of user interface or the second user interface of a respective type of user interface. In some embodiments, the first user interface and the second user interface (or any user interface other than the third user interface) cannot be changed in response to input detected at the electronic device to include the distinguishing element. In some embodiments, the distinguishing element is displayed via the display device only while the third user interface is the current user interface (e.g., the first element is unique to the third user interface). In some embodiments, the distinguishing element is in a foreground of the third user interface (e.g., the distinguishing element is not a background image).

In some embodiments, in response (710) to detecting the occurrence of a condition that corresponds to a trigger for displaying the current user interface of a respective type of user interface of the electronic device: in accordance with a determination that a current time does not correspond to the predefined time range, the electronic device displays (714) the second user interface of a respective type of user interface.

Displaying the second user interface in accordance with a determination that a current time does not correspond to the predefined time range performs an operation when a set of conditions has been met without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the current time does not correspond to the predefined time range (e.g., the current time is not within a window for the restricted mode): the electronic device displays, via the display device, a user interface (e.g., 628) (e.g., control center) including an affordance (e.g., 628-1) for activating a restricted mode. In some embodiments, activating the restricted mode includes displaying the third user interface. In some embodiments, the electronic device detects an input (e.g., 610*q*) corresponding to selection of the affordance for activating the restricted mode. In some embodiments, in response to detecting the input corresponding to selection of the affordance for activating the restricted mode, the electronic device operates the electronic device in the restricted mode (e.g., the restricted mode can be activated via user input at the electronic device). In some embodiments, the predefined time range during which the electronic device is to operate in the restricted mode cannot be changed (e.g., edited or turned on or off) via input at the electronic device (e.g., the predefined time range can only be set using an external electronic device).

In some embodiments, the electronic device detects a second sequence (e.g., 610*a*) of one or more inputs (e.g., tapping on a location where a complication is located on the first user interface of the second user interface). In some embodiments, in response to detecting the third sequence of one or more inputs: in accordance with the second sequence of one or more inputs being detected while displaying the first user interface of a respective type of user interface, the electronic device performs an operation (e.g., launch an application corresponding to a selected complication). In some embodiments, in response to detecting the second sequence of one or more inputs: in accordance with the second sequence of one or more inputs being detected while displaying the third user interface of a respective type of user interface, the electronic device foregoes performance of the operation. In some embodiments, the electronic device foregoes all operations (e.g., in response to the same input that causes the operation that is performed when the first user interface is displayed, the electronic device does not perform any operation when the third user interface is displayed, not just the operation performed when the first user interface is displayed). In some embodiments, the electronic device performs a second operation, different from the operation, in response to detecting the second sequence of one or more inputs while the third user interface is displayed.

In some embodiments, after displaying the third user interface of a respective type of user interface (e.g., while or after operating in the restricted mode), the electronic device detects the occurrence of an inactivity condition (e.g., screen time-out or wrist down motion). In some embodiments, after displaying the third user interface of a respective type of user interface (e.g., while or after operating in the restricted mode), in response to detecting the occurrence of the inactivity condition, the electronic device deactivates the display device (e.g., ceasing to display content on the display, dimming the display, putting the display to sleep, de-energizing illumination elements of the display device, etc.). In some embodiments, the display is a touchscreen display and deactivating the display includes ceasing to display content, without deactivating touch-sensing elements of the display. In some embodiments, after displaying the third user interface of a respective type of user interface (e.g., while or after operating in the restricted mode), after deactivating the display device, the electronic device detects the occurrence of a condition (e.g., a tap, wrist raise, press of a button, closing of an application, or the like) that corresponds to a trigger for displaying a current user interface of a respective type of user interface of the electronic device.

In some embodiments, after displaying the third user interface of a respective type of user interface (e.g., while or after operating in the restricted mode), in response to detecting the occurrence of a condition that corresponds to a trigger for displaying the current user interface of a respective type of user interface of the electronic device: in accordance with a determination that a current time corresponds to the predefined time range (e.g., the current time is within the restricted mode window), the electronic device displays the third user interface (e.g., 618) of a respective type of user interface (e.g., display the face associated with the restricted mode). In some embodiments, after displaying the third user interface of a respective type of user interface (e.g., while or after operating in the restricted mode), in response to detecting the occurrence of a condition that corresponds to a trigger for displaying the current user interface of a respective type of user interface of the electronic device: in accordance with a determination that a current time does not correspond to the predefined time range (e.g., the current time is not within the restricted mode window), the electronic device displays the second user interface (e.g., 608) of a respective type of user interface (e.g., display a user interface that is not available in the restricted mode (e.g., a customizable user interface)).

In some embodiments, while displaying the third user interface of a respective type of user interface, the electronic device detects a fourth sequence (e.g., 610i, 610j, 610k or 610r, 610s, 610t) of one or more inputs (e.g., contacts on a touch-sensitive display and/or activation (e.g., depression or rotation) of a rotatable input mechanism). In some embodiments, the fourth sequence of one or more inputs correspond to a process for exiting the restricted mode, which allows the electronic device to switch from the predefined third user interface to a customizable user interface (e.g., the first or second user interface).

In some embodiments, in response to detecting at least one of the inputs in the fourth sequence of one or more inputs, the electronic device displays an exit user interface (e.g., 620, 630) (e.g., the interface is overlaid over a portion of the third user interface or replaces the third user interface) with information for transition from a first mode, to a second mode, where the second mode includes one or more functions not accessible while in the first mode (e.g., switch to separate user interface with title ("Exit Restricted Mode"), notice message ("Leaving appears in the School Time report", "Time Left: 8 min", or "You've been in Restricted Mode for 2 hr and 5 min"), and Exit/Don't Exit affordances; user inputs of the fourth sequence can include a press of a button, rotation of a rotatable input mechanism, or a tap on the display).

Displaying a user interface with information for transition from a first mode to a second mode, where the second mode includes one or more functions not accessible while in the first mode provides improved feedback (e.g., by informing a user about a significant change in operation). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, ceasing to operate the electronic device in the first mode includes switching to an operational mode in which operations that are unavailable in the first mode can be performed. In some embodiments, ceasing to operate the electronic device in the first mode includes displaying a different user interface with functionality not available in the initial user interface.

In some embodiments, the exit user interface includes a first portion that includes an affordance (e.g., 620-5, 630-4) for exiting the first mode. In some embodiments, the electronic device detects an input (e.g., 610k, 610t) corresponding to selection of the affordance for existing the first mode. In some embodiments, in response to detecting the input corresponding to selection of the affordance for exiting the first mode, the electronic device displays the second user interface of a respective type of user interface (e.g., tap on exit affordance or press a depressible and rotatable input mechanism while exit affordance is in focus to cease operating the electronic device in the first mode and return to the second user interface).

Displaying the second user interface of a respective type of user interface (e.g., instead of the third user interface associated with the first mode) in response to detecting an input corresponding to selection of an affordance for exiting the first mode allows a user to provide an affirmative input to exit the first mode. Displaying the affordance for exiting the first mode provides feedback to the user about the affirmative input that can be taken to exit the first mode. Allowing a user to provide an affirmative input improves feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the exit user interface without displaying the first portion of the exit user interface that includes the affordance for exiting the first mode (e.g., the user interface includes multiple portions that are not simultaneously displayed), the electronic device detects an input (e.g., 610*j*, 610*s*) corresponding to a request to scroll the exit user interface. In some embodiments, in response to detecting the input corresponding to a request to scroll the user interface, the electronic device scrolls the user interface (e.g., 620, 630) to display the first portion of the user interface that includes the affordance for exiting the first mode (e.g., initially, the exit affordance is slightly or completely off screen so the user has to scroll before selecting it to avoid accidental activation).

Scrolling the user interface to display the first portion of the user interface that includes the affordance for exiting the first mode in response to detecting a user input adds an additional action to perform the exiting process. Adding an additional input in this instance enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface that includes the affordance for exiting the first mode is displayed in response to detecting the at least one of the inputs in a sequence of one or more inputs. In some embodiments, the user interface that includes the affordance for exiting the first mode is displayed concurrently with presenting an alert (e.g., 620-2) indicating that the information indicating that the electronic device has exited the first mode will be reported to another user (e.g., button is slightly off screen so user has to scroll before selecting it to avoid accidental activation).

In some embodiments, detecting the fourth sequence of one or more inputs for exiting the restricted mode includes detecting a rotation of a rotatable input mechanism (e.g., 603). In some embodiments, in response to detecting the rotation of the rotatable input mechanism, the electronic device displays the second user interface of a respective type of user interface (e.g., and ceases to operate the electronic device in the first mode). In some embodiments, the electronic device exits the first mode in response to rotation of the rotatable input mechanism while the third user interface is displayed. In some embodiments, the electronic device replaces the third user interface with a different user interface (e.g., 620) in response to a first input and then exits the first mode in response to rotation of the rotatable input mechanism while the different user interface is displayed (e.g., the rotation of the rotatable input mechanism is a confirmation input).

Note that details of the processes described above with respect to method 700 (e.g., FIG. 7) are also applicable in an analogous manner to the methods described below. For example, methods 800 and 1000 optionally include one or more of the characteristics of the various methods described above with reference to method 700. For example, operations 702-706 related to changing a user interface are optionally performed prior to operation 802 of method 800. As another example, operations 708-712 can be used to display a user interface of a respective type of user interface in operation 804 of method 800. For brevity, these details are not repeated below.

FIG. 8 is a flow diagram illustrating a method for providing alerts using an electronic device in accordance with some embodiments. Method 800 is performed at a device (e.g., 100, 300, 500, 600, 650) with a display device. Some operations in method 800 are, optionally, combined, the orders of some operations are, optionally, changed, and some operations are, optionally, omitted.

As described below, method 800 provides an intuitive way for providing alerts. The method reduces the cognitive burden on a user for reporting alerts, thereby creating a more efficient human-machine interface. For battery-operated computing devices, enabling a user to provide alerts, faster, automatically, and more efficiently conserves power and increases the time between battery charges.

An electronic device (e.g., 600) with a display device (e.g., 602) operates (802) in a first mode (e.g., a restricted mode in which a majority of operations available in other modes of operation of the electronic device are not available).

In some embodiments, while operating the electronic device in the first mode: the electronic device displays (804), via the display device (e.g., 602), a user interface (e.g., 618) of a respective type of user interface (e.g., a clock face).

In some embodiments, while operating the electronic device in the first mode: the electronic device detects (806) a first sequence (e.g., 610*i*, 610*j*, 610*k*) of one or more inputs (e.g., contacts on a touch-sensitive display and/or activation (e.g., depression or rotation) of a rotatable input mechanism) corresponding to a request to exit the first mode, the first sequence of one or more inputs including at least one input (e.g., 610*i*) that is detected while displaying the user interface of a respective type of user interface (e.g., the sequence of one or more inputs begins while the user interface is displayed).

In some embodiments, the respective type of user interface is a clock face (e.g., 618).

In some embodiments, the electronic device includes a touch-sensitive surface device (e.g., separate from or as a part of the display device), and the first sequence of one or more inputs includes a tap gesture on the touch-sensitive surface (e.g., touch-sensitive display).

In some embodiments, the electronic device includes a rotatable and depressible input mechanism (e.g., 603) that is rotatable relative to a housing of the electronic device (e.g., the rotatable and depressible input mechanism rotates around an axis parallel to a display of the display device), and the first sequence of one or more inputs includes a depression of the rotatable and depressible input mechanism.

In some embodiments, while operating the electronic device in the first mode: after (e.g., in response to) detecting at least one of the inputs in the first sequence of one or more inputs and prior to ceasing to operate the electronic device in the first mode, the electronic device presents (808) an alert (e.g., 620-2) indicating that information indicating that the electronic device has exited the first mode will be reported to another user.

Presenting an alert indicating that information indicating that the electronic device has exited the first mode will be reported to another user provides improved feedback to the user about the effects of proceeding with exiting the first mode of the electronic device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after (e.g., in response to) detecting at least one of the inputs in the first sequence of one or more inputs and prior to ceasing to operate the electronic device in the first mode, the electronic device displays, via the display device, an indication (e.g., 630-2) of a duration that the electronic device has been operating in the first mode. In some embodiments, the indication of the duration that the electronic device has been continuously operating in the first mode is displayed concurrently with presenting the alert indicating that information indicating that the electronic device has exited the first mode will be reported to another user.

In some embodiments, while operating the electronic device in the first mode: after presenting the alert, the electronic device detects (810) a second sequence (e.g., 610j, 610k) of one or more inputs. In some embodiments, the second sequence of one or more inputs is a rotation of a rotatable mechanism of the electronic device. In some embodiments, the alert includes an affordance (e.g., 620-5) for exiting the first mode, and the second sequence of one or more inputs includes an input corresponding to selection of the affordance.

Including an affordance for exiting the first mode provides improved visual feedback about the input(s) that can be used to exit the first mode. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the affordance is an exit affordance. In some embodiments, the selection of the affordance is a tap on the exit affordance or a press of a depressible input mechanism while the exit affordance is in focus. In some embodiments, the exit affordance is displayed in response to detecting the at least one of the inputs in the first sequence of one or more inputs. In some embodiments, the exit affordance is displayed concurrently with presenting the alert indicating that the information indicating that the electronic device has exited the first mode will be reported to another user.

In some embodiments, presenting the alert includes displaying an alert user interface (e.g., 620) (e.g., overlaid over a portion of the user interface or replacing the user interface), and the alert user interface includes a first portion that includes the affordance for exiting the first mode. In some embodiments, while displaying the alert user interface without displaying the first portion of the alert user interface that includes the affordance for exiting the first mode (e.g., the user interface includes multiple portions that are not simultaneously displayed), the electronic device detects an input (e.g., 610j) corresponding to a request to scroll the alert user interface. In some embodiments, in response to detecting the input corresponding to a request to scroll the alert user interface, the electronic device scrolls the alert user interface to display the first portion of the alert user that includes the affordance for exiting the first mode (e.g., initially, the exit affordance is slightly or completely off screen so the user has to scroll before selecting it to avoid accidental activation). In some embodiments, the user interface is displayed in response to detecting the at least one of the inputs in the first sequence of one or more inputs. In some embodiments, the user interface is displayed concurrently with presenting the alert indicating that the information indicating that the electronic device has exited the first mode will be reported to another user.

In some embodiments, while operating the electronic device in the first mode: in response to detecting the second sequence of one or more inputs and in accordance with a determination that the second sequence of one or more inputs corresponds to a request to exit the first mode, the electronic device ceases (812) to operate the electronic device in the first mode (e.g., exits the first mode). In some embodiments, ceasing to operate the electronic device in the first mode includes switching to an operational mode in which operations that are unavailable in the first mode can be performed. In some embodiments, ceasing to operate the electronic device in the first mode includes displaying a different user interface (e.g., 618) with functionality not available in the initial user interface.

Exiting the first mode allows the electronic device to perform additional functionality and provides improved feedback to user inputs. Allowing the electronic device to perform additional functionality and providing improved feedback to user inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the second sequence of one or more inputs and in accordance with a determination that the second sequence of one or more inputs corresponds to a request to exit the first mode, the electronic device records (e.g., for transmission to a second electronic device; begins to record (e.g., continues to record while the device remains outside of the first mode) data representing an indication that the electronic device has ceased operating in the first mode (e.g., the recorded data is transmitted to an external device; the data causes a report of the exit event to be displayed at an external device). In some embodiments, the information is transmitted upon exiting the first mode (e.g., in response to detecting the second sequence of one or more inputs and in accordance with a determination that the second sequence of one or more inputs corresponds to a request to exit the first mode). In some embodiments, the information is not transmitted upon exiting the first mode (e.g., the information is transmitted when the restricted mode is entered again or at the end of the day or the end of the week).

In some embodiments, recording the data representing an indication that the electronic device has ceased operating in the first mode includes recording a time at which the electronic device ceased operating in the first mode in response to detecting the second sequence of one or more inputs, and a duration of time for which the electronic device was not operating in the first mode (e.g., an amount of time between exiting the first mode and re-entering the first mode).

Recording data representing an indication that the electronic device has ceased operating in the first mode allows the electronic device to notify another user (e.g., a parent) that the electronic device has ceased operating in the first mode. In some embodiments, the data is recorded automatically, reducing the number of inputs needed to notify another user. Providing the ability to notify another user while reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays, via the display device, a report log (e.g., 626-2) indicating one or more occurrences of an electronic device exiting a restricted mode (e.g., the first mode on the electronic device). In some embodiments, a restricted mode on another device is technically a different mode (e.g., a different version of the first mode), but exiting of the restricted mode on the other device is indicated in the report log. In some embodiments, the report log includes an indication of the time at which the electronic device ceased operating in the first mode in response to detecting the second sequence of one or more inputs and an indication of the duration of time for which the electronic device was not operating in the first mode (e.g., in a settings menu). In some embodiments, the time and duration information is available while the electronic device is operating in the first mode. In some embodiments, the time and duration information are not available while the electronic device is operating in the first mode, but are available when the electronic device is not operating in the first mode. In some embodiments, the time and duration information are displayed in response to a sequence of one or more inputs (e.g., by navigating to a Settings menu).

In some embodiments, the report log further includes an indication of a time at which a second electronic device (e.g., a smartphone, tablet, or another watch associated with the user) ceased operating in a restricted mode and an indication of a duration of time for which the second electronic device was not operating in the restricted mode. In some embodiments, the report log is displayed on another device (e.g., a device with an account associated with the electronic device and the second device). In some embodiments, the report log is displayed in a settings menu through which a user can also adjust settings of the restricted mode (on/off, restricted times, etc.).

In some embodiments, the electronic device detects a third sequence of one or more inputs (e.g., contacts on a touch-sensitive display and/or activation (e.g., depression or rotation) of a rotatable input mechanism). In some embodiments, in response to detecting the third sequence of one or more inputs: in accordance with a determination that the electronic device is not operating in the first mode, the electronic device performs an operation (e.g., opens an application, displays a dock of recently opened or designated (e.g., favorite) applications, displays an application springboard (e.g., a plurality of icons for launching corresponding apps), display a notification center (e.g., a list of notifications), transitions to a system space different from the current system space, edits the current user interface or enters a user interface editing or selection mode, launches an application corresponding to a complication). In some embodiments, in response to detecting the third sequence of one or more inputs: in accordance with a determination that the electronic device is operating in the first mode, the electronic device foregoes performance of the operation. In some embodiments, operations that can be performed while the electronic device is not operating in the first mode cannot be performed in the first mode (e.g., the electronic device must exit the first mode in order to be able to perform the operations).

Note that details of the processes described above with respect to method 800 (e.g., FIG. 8) are also applicable in an analogous manner to the methods described above. For example, methods 700 and 1000 optionally include one or more of the characteristics of the various methods described above with reference to method 800.

For example, some or all of operations 806-812 related to presenting an alert and exiting the first mode are optionally performed while or subsequent to displaying the third user interface in operation 712 of method 700. As another example, operations 708-712 can be used to display a user interface of a respective type of user interface in operation 804 of method 700.

FIGS. 9A-9AI illustrate exemplary user interfaces for configuring an external device, in accordance with some embodiments. The user interfaces in these figures are used to illustrate the processes described below, including the processes in FIG. 10.

FIG. 9A depicts device 900, which is a smartphone with display 902. Display 902 includes a touch-sensitive surface on which device 900 can detect user gestures (e.g., tap, swipe, drag). In some embodiments, device 900 includes one or more features of device 100, 300, or 500.

At FIG. 9A, device 900 displays user interface 904 for guiding a user through a setup process for an external device (e.g., smartwatch, device 600). User interface 904 includes options for choosing the intended user of the smartwatch, and thus the user account to be associated with the smartwatch. In particular, user interface 904 includes affordance 906a, which, when selected, initiates a setup process for configuring the external device to be associated with a first user account (e.g., a user account that is already associated with device 900). Additionally, user interface 904 includes affordance 906b, which, when selected, initiates a setup process for configuring the external device to be associated with a second user account (e.g., a user account other than the user account that is already associated with device 900).

As shown in FIG. 9A, the user performs a tap gesture to identify someone other than the user of device 900 as the intended user of the external device. As a result, device 900 detects input 908 at affordance 906b. In response to detecting input 908, device 900 initiates a setup process for configuring the external device to be associated with the second user account.

In some embodiments, instead of detecting input 908 at affordance 906b, device 900 detects an input (e.g., a tap gesture) at affordance 906a. In some embodiments, in response to detecting the input at affordance 906a, device 900 initiates a setup process for configuring the external device to be associated with the first user account (e.g., the user account of device 900).

Figure 9B:
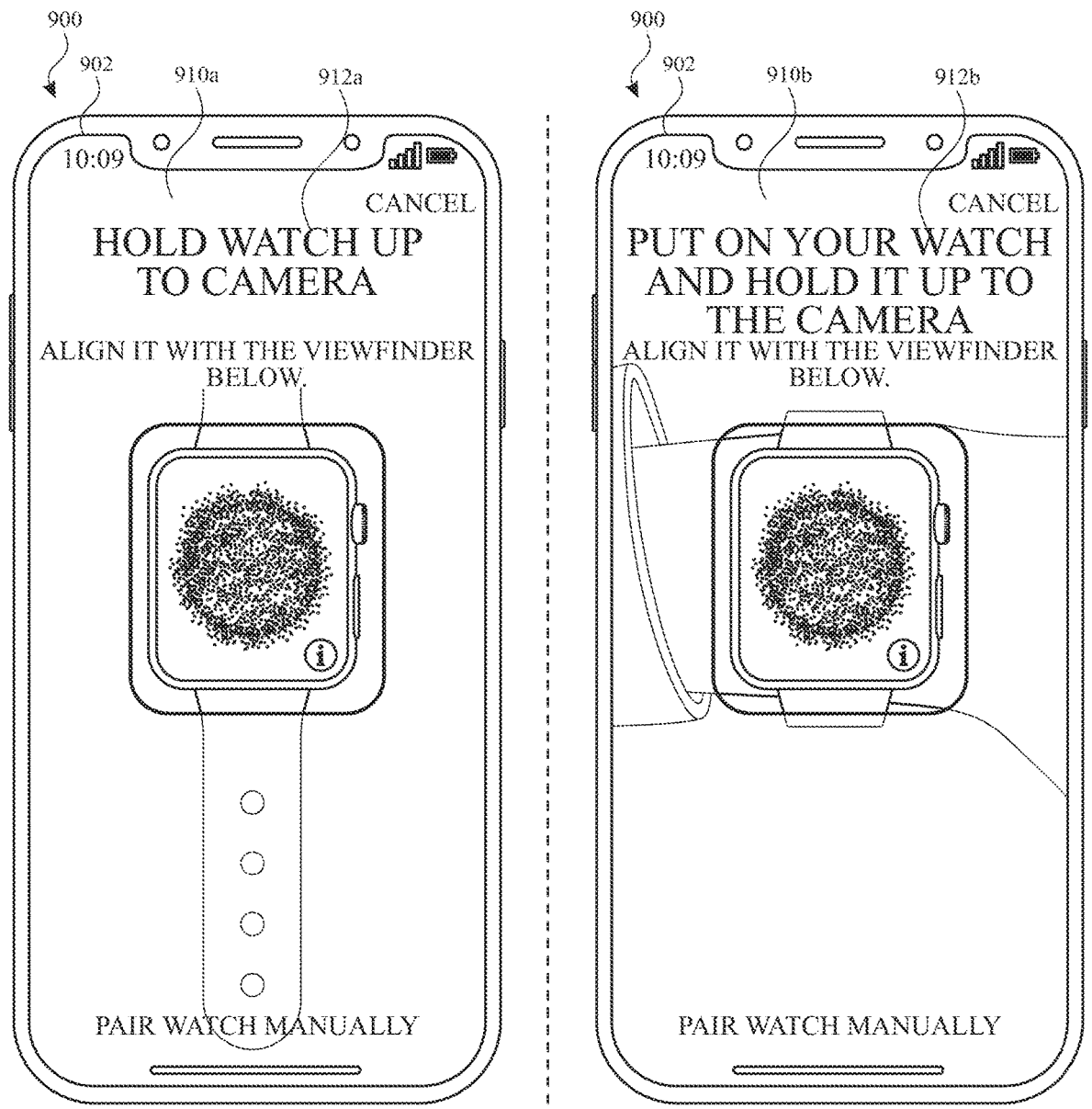

As depicted on the left side of FIG. 9B, after initiating the setup process for configuring the external device to be associated with the second user account, device 900 displays user interface 910a for pairing the external device to device 900. User interface 910a includes content 912a, which prompts the user to hold the external device up to the camera of device 900.

As depicted on the right side of FIG. 9B, in some embodiments, after initiating the setup process for configuring the external device to be associated with the first user account instead of the second user account, device 900 displays user interface 910b for pairing the external device to device 900. User interface 910b includes content 912b, which differs from content 912a in that it prompts the user to wear the external device in addition to prompting the user to hold the external device up to the camera of device 900. Content 912b prompts the user to wear the external device because the external device is being configured for the user of device 900. In contrast, content 912a does not prompt the user to wear the external device because the external device is not being configured for the user of device 900.

Figure 9C:
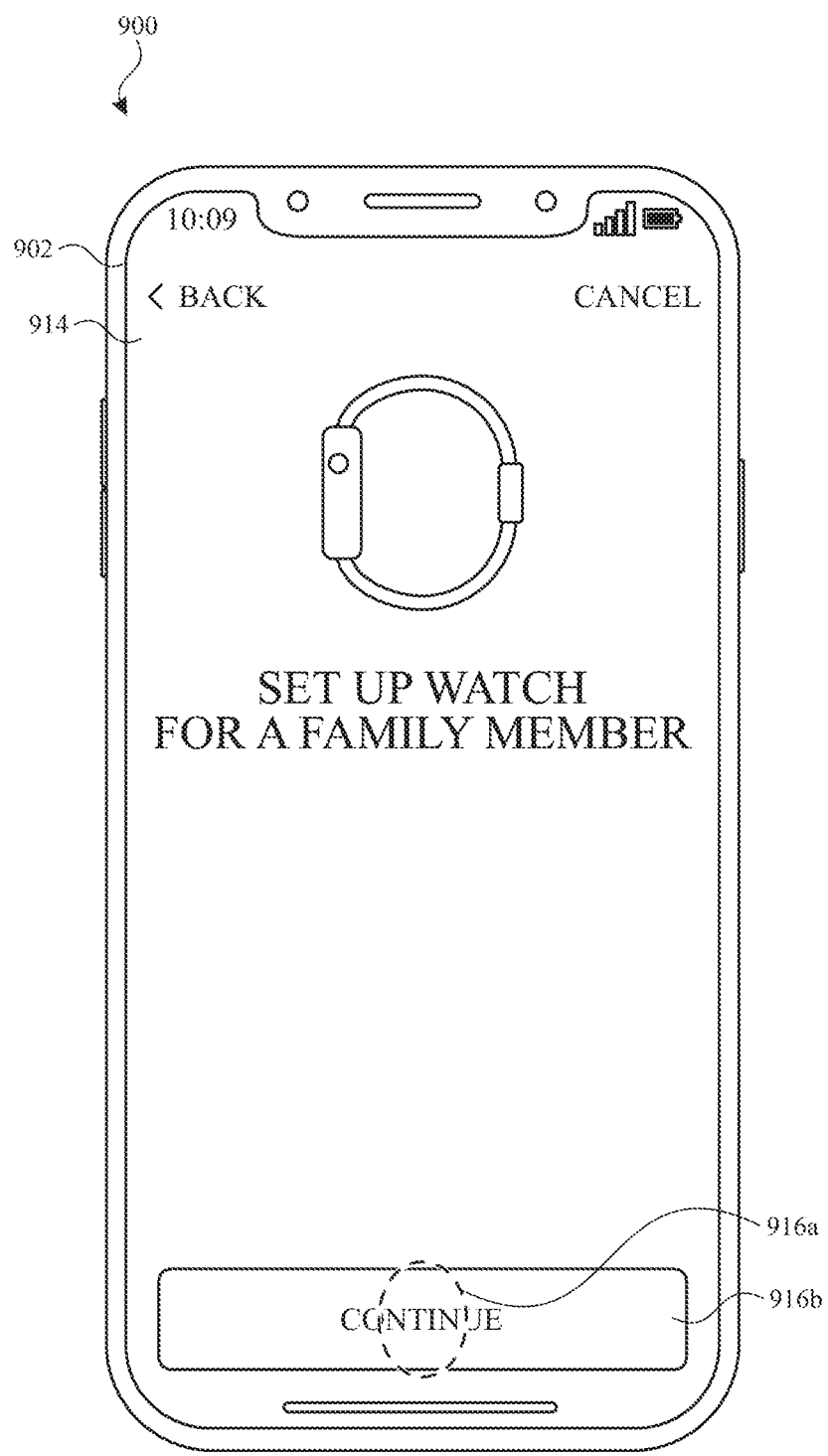

At FIG. 9C, after the external device is paired (or in wireless communication) with device 900, device 900 continues with the setup process and displays user interface 914 for continuing with configuring the external device to be associated with the second user account. User interface 914 includes a visual indication that the external device is being setup for a family member (e.g., someone other than the user of device 900) without explicitly identifying the family member, as device 900 does not yet have this identifying information. While displaying user interface 914, device 900 detects input 916*a* at affordance 916*b* and, in response, continues with the setup process.

Figure 9D:
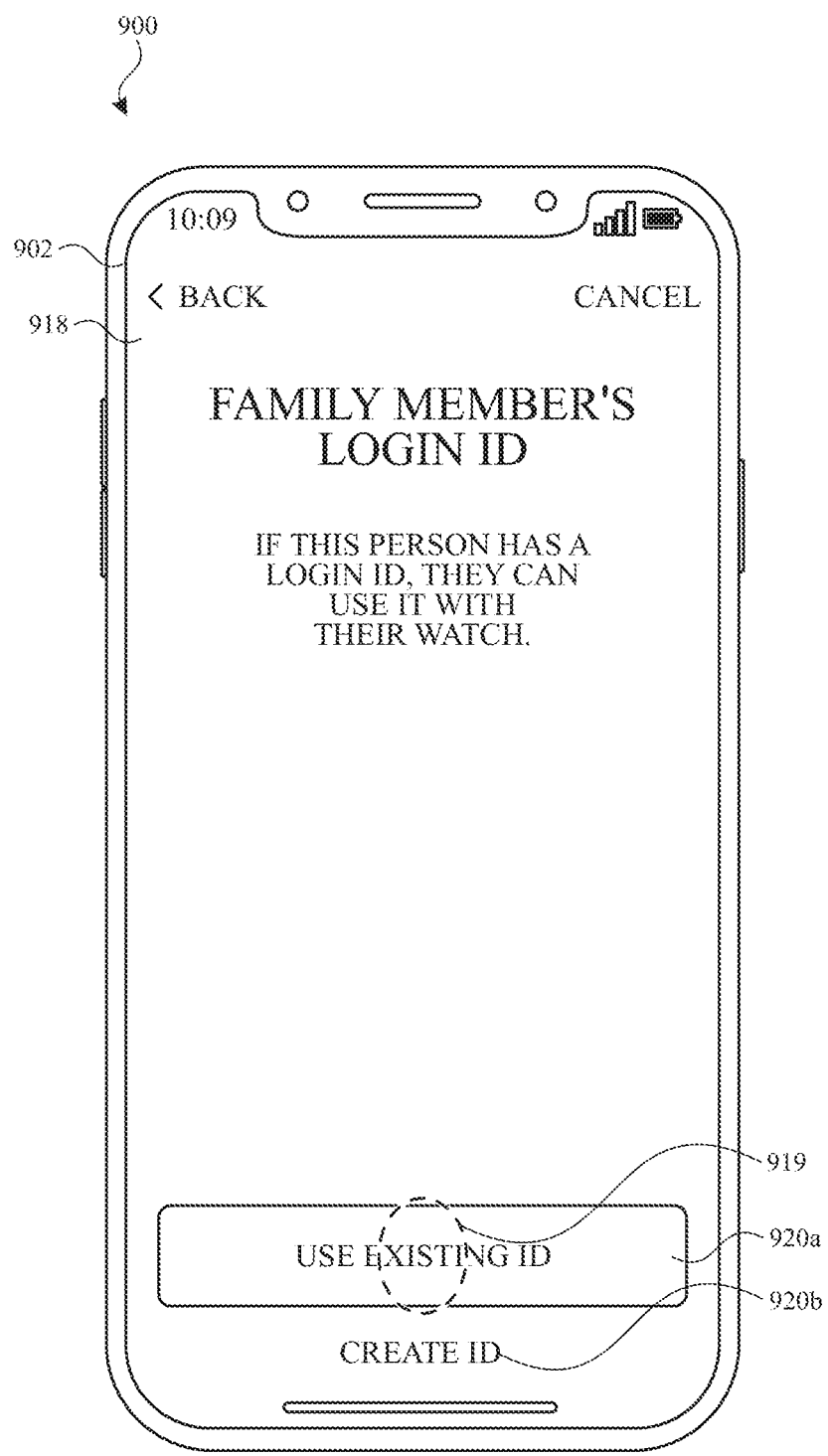

At FIG. 9D, after detecting input 916*a*, device 900 displays user interface 918 for associating a user account with the external device. User interface 918 includes affordances 920*a*-920*b*. In some embodiments, device 900 detects an input (e.g., tap gesture) at affordance 920*b*. In some embodiments, in response to detecting the input at affordance 920*b*, device 900 displays one or more text fields for receiving information to create a new user account.

Returning to FIG. 9D, because the intended user of the external device has an existing user account, the user performs a tap gesture to associate the external device with an existing user account. As a result, device 900 detects input 919 at affordance 920*a*. In response to detecting input 919, device 900 initiates a process for selecting an existing user account.

Figure 9E:
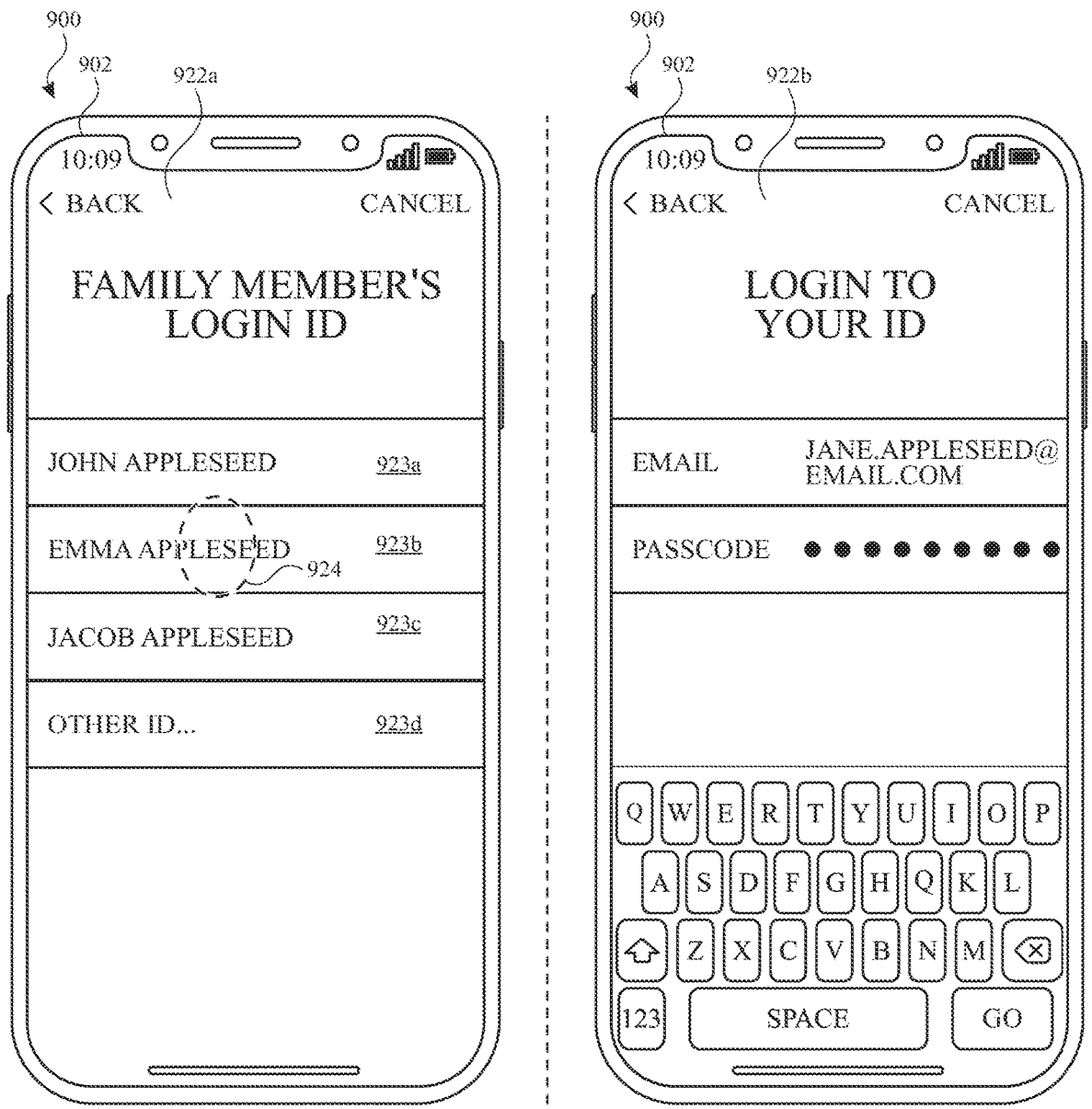

As depicted on the left side of FIG. 9E, after initiating the process for selecting an existing user account, device 900 displays user interface 922*a*. User interface 922*a* includes representations 923*a*-923*c* of existing user accounts and option 923*d*, which, when selected, results in displaying one or more text fields for receiving information to identify an existing user account. In some embodiments, the existing user accounts (e.g., corresponding to representations 923*a*-923*c*) are associated with the user account of device 900. For example, the existing user accounts and the user account of device 900 are part of the same group (e.g., family group).

As depicted on the right side of FIG. 9E, in some embodiments, device 900 displays user interface 922*b* instead of user interface 922*a* when the external device is being configured to be associated with the first user account. In particular, after initiating the process for selecting an existing user account, device 900 displays user interface 922*b*, which prompts the user for login information (e.g., credentials, password) corresponding to the first user account instead of, for example, displaying representations 923*a*-923*c*.

Returning to the left side of FIG. 9E, the user performs a tap gesture to select the user account belonging to Emma Appleseed as the second user account. As a result, device 900 detects input 924 at representation 923*b*.

Figure 9F:
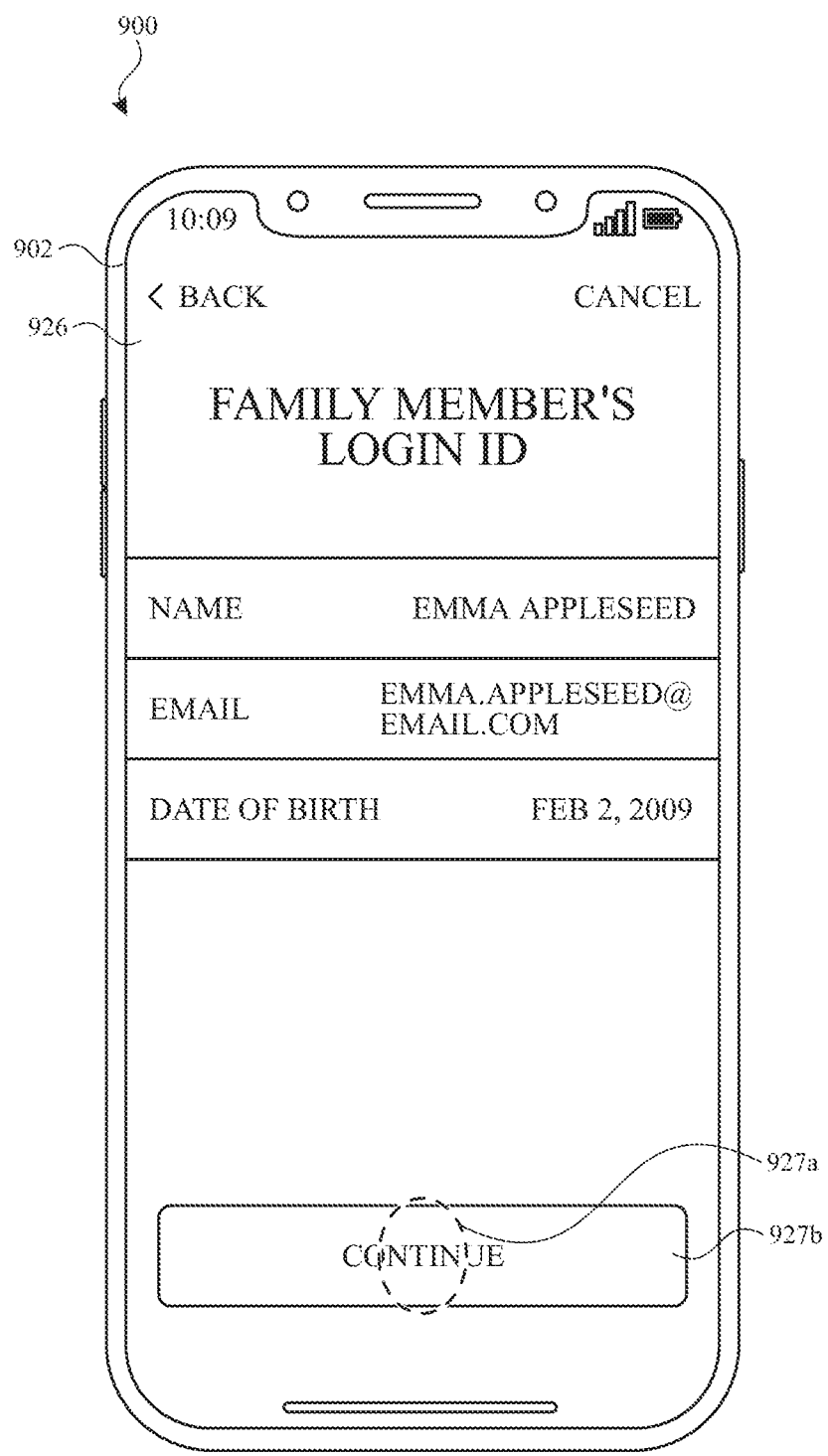

At FIG. 9F, in response to detecting input 924, device 900 continues with the setup process and displays user interface 926 with information (e.g., name, email address, date of birth) corresponding to the second user account (e.g., the user account belonging to Emma Appleseed). In some embodiments, the information is displayed in one or more text fields that can be edited via user input. It is noted that the information corresponding to the second user account is now available to device 900, thereby enabling personalization for user interfaces later in the setup process. Returning to FIG. 9F, the user performs a tap gesture to confirm the selection. As a result, device 900 detects input 927*a* at affordance 927*b*. In response to detecting input 927*a*, device 900 confirms the selection of Emma's user account.

Figure 9G:
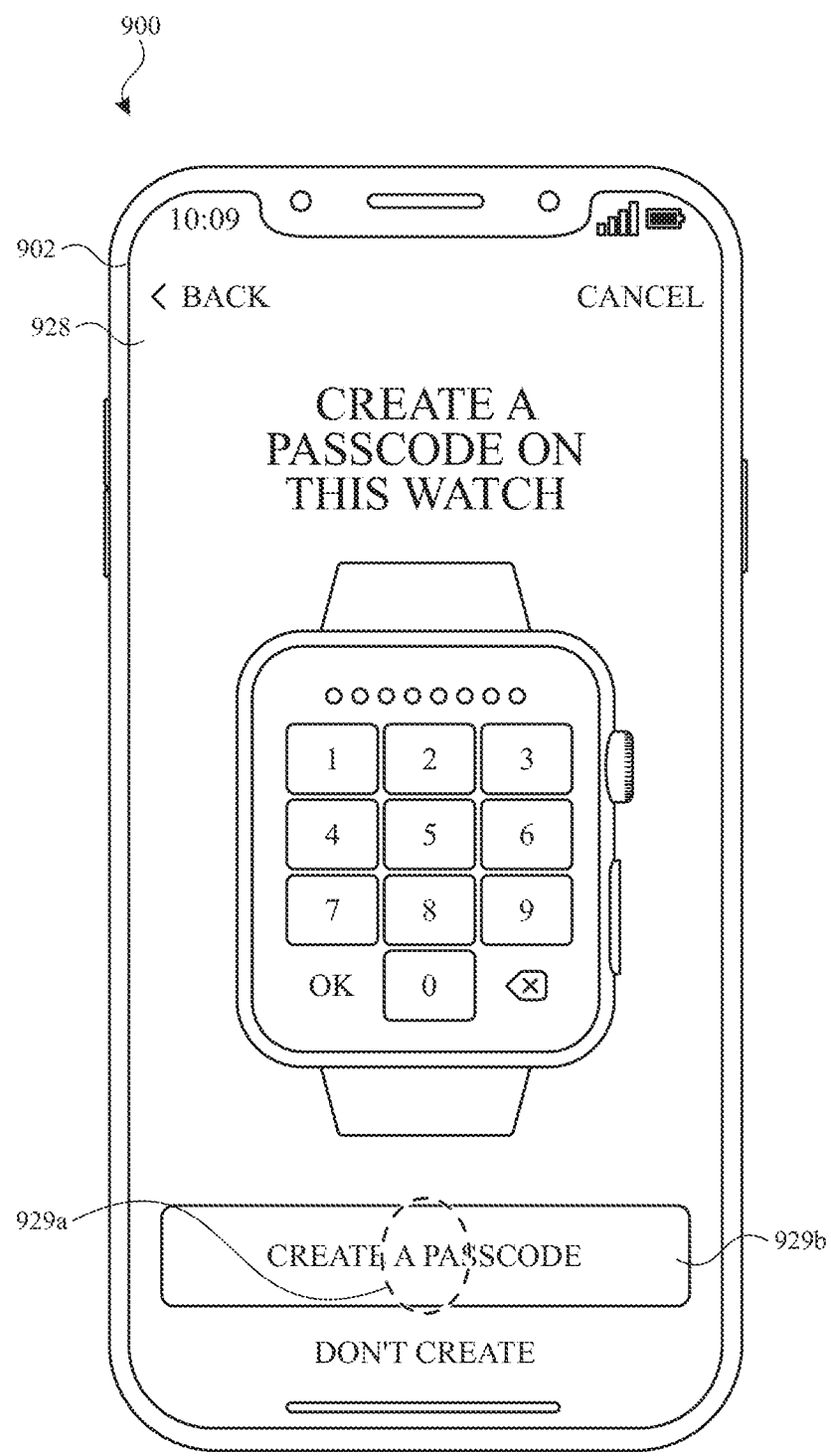

At FIG. 9G, after confirming the selection of Emma's user account, device 900 displays user interface 928 for creating a passcode (e.g., security information) at the external device. The user performs a tap gesture to initiate a process for creating the passcode. As a result, device 900 detects input 929*a* at affordance 929*b*. In some embodiments, in response to detecting input 929*a*, device 900 determines whether the age of the user corresponding to the second user account is below a threshold age (e.g., 6, 12, 18).

Figure 9H:
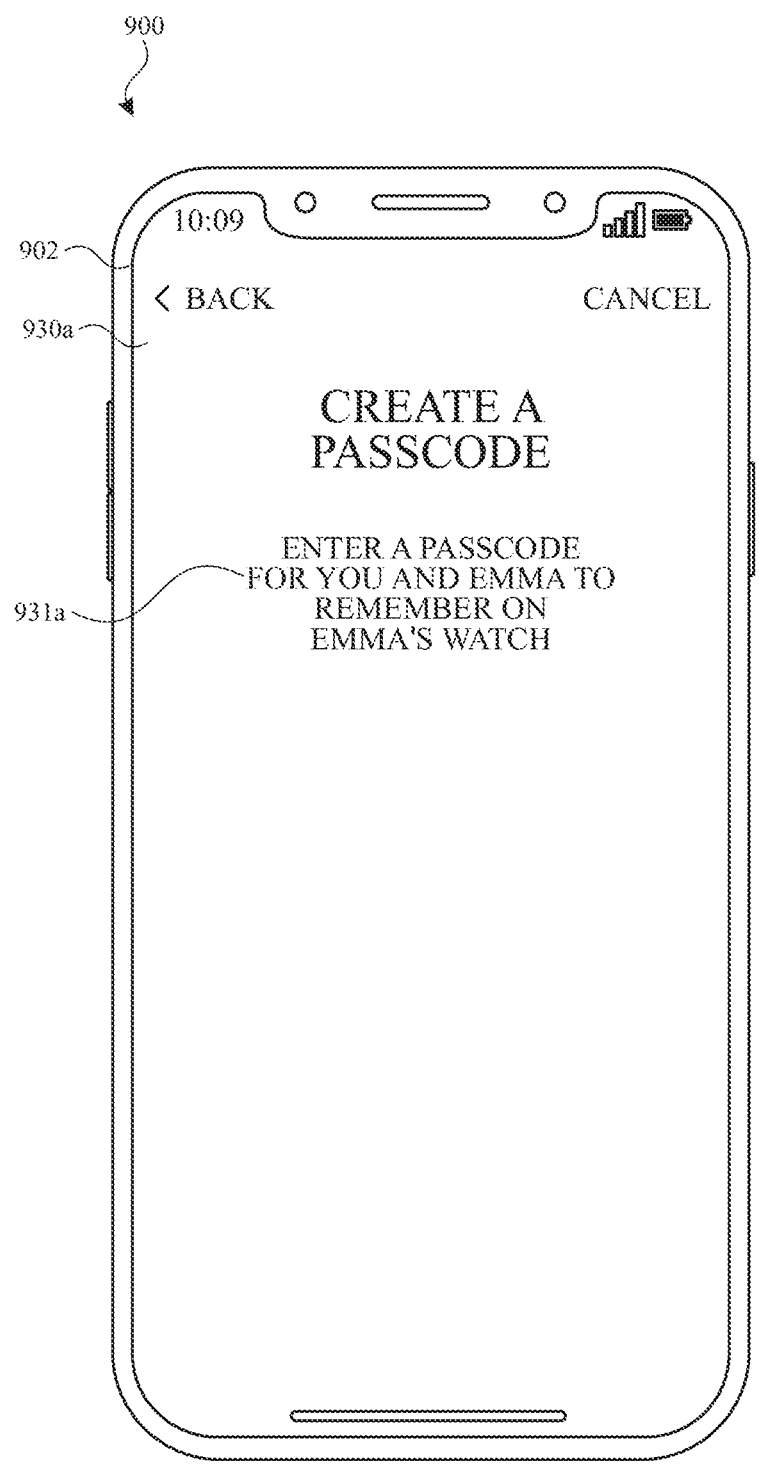
Figure 9I:
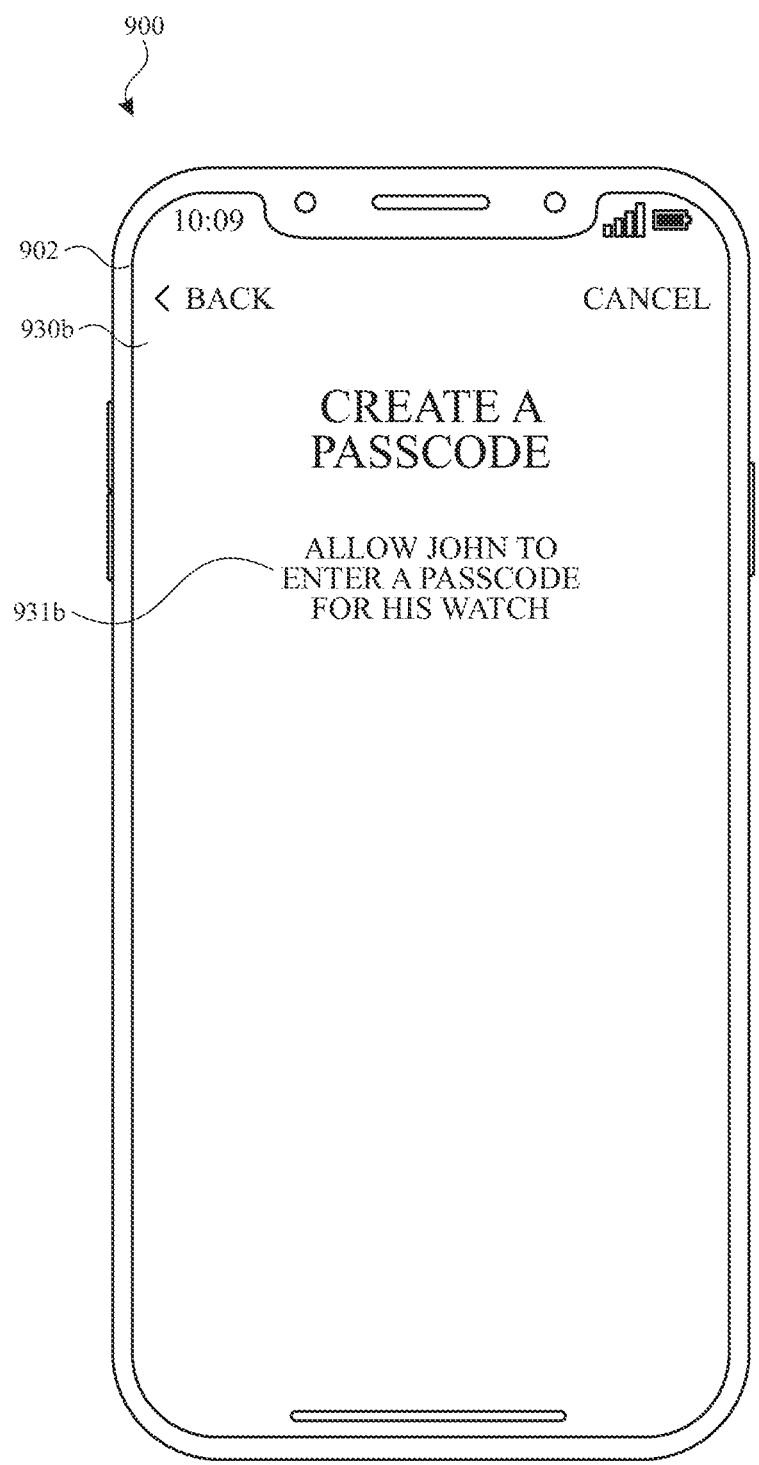

If the age of the user corresponding to the second user account is less than the threshold age, device 900 displays user interface 930*a* with content 931*a*, as shown in FIG. 9H. Content 931*a* prompts the user of device 900 to enter a passcode at the external device on behalf of the user corresponding to the second user account. In contrast, in some embodiments, if the age of the user corresponding to the second user account is at least the threshold age, device 900 displays user interface 930*b* with content 931*b*, as shown in FIG. 9I. Content 931*b* prompts the user of device 900 to have the user corresponding to the second user account (e.g., John) enter a passcode at the external device. In some embodiments, if the external device is being configured to be associated with the first user account, device 900 does not display user interface 930*a* or 930*b*, and instead prompts the user to enter a passcode for the user of device 900 (e.g., instead of on behalf of some other user).

Returning to FIGS. 9H-9I, in some embodiments, after the passcode has been entered, device 900 determines whether the second user account is already associated with a device (e.g., smartphone) that is capable of being paired with the external device (e.g., smartwatch). In some embodiments, if the external device is being configured to be associated with the first user account, device 900 does not make this determination.

Figure 9J:
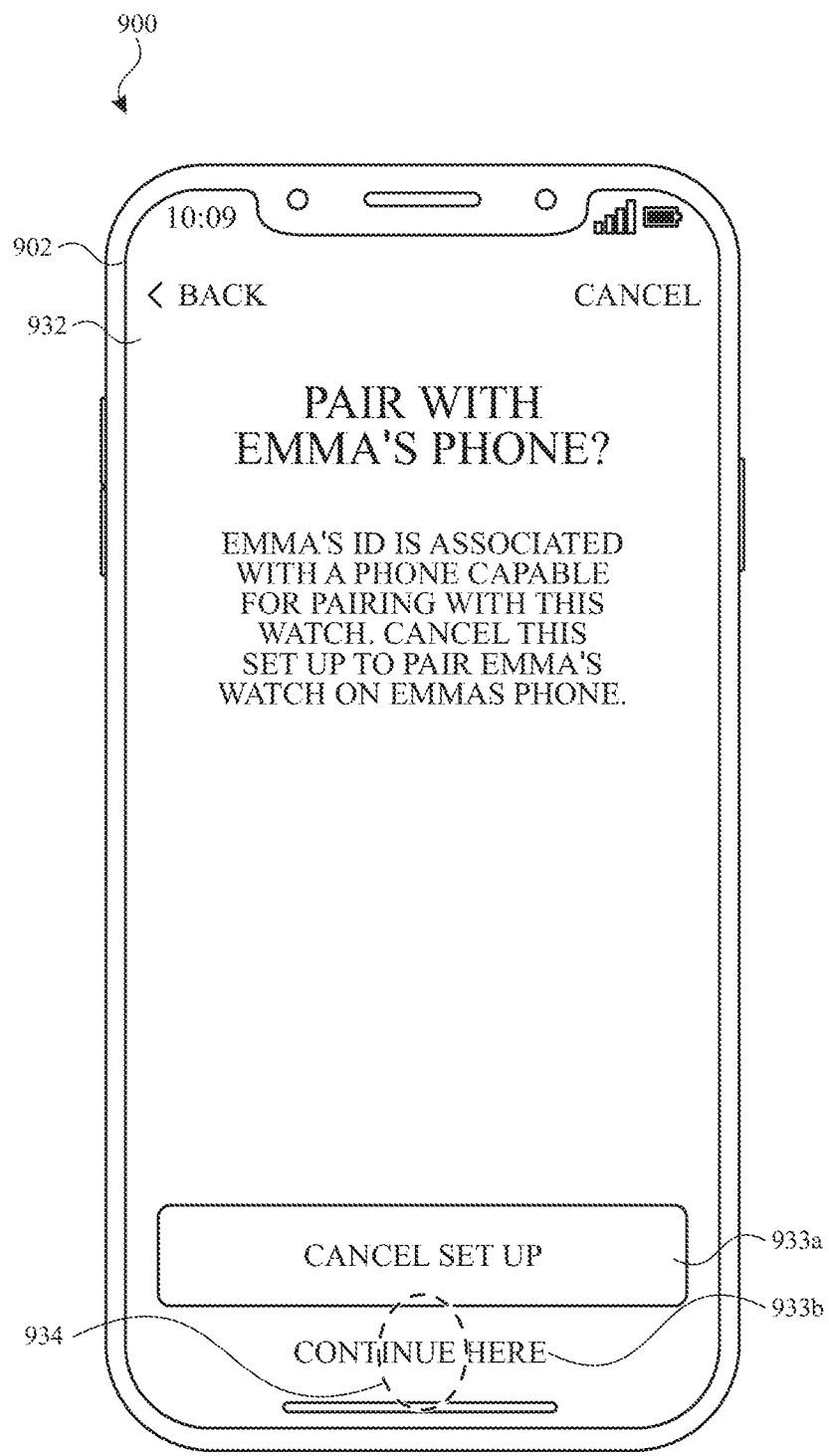

At FIG. 9J, if the second user account is already associated with a device capable of being paired with the external device, device 900 displays user interface 932*a* with options to either continue or abort the setup process. In some embodiments, user interface 932*a* does not include the option (e.g., affordance 933*b*) to continue with the setup process. In some embodiments, if the second user account is not already associated with such a device, device 900 forgoes displaying user interface 932*a* and continues with the setup process (e.g., proceeds to displaying the user interface 936 in FIG. 9K).

Returning to FIG. 9J, the user performs a tap gesture to continue with the setup process. As a result, device 900 detects input 934 at affordance 933*b*. In response to detecting input 934, device 900 continues with the setup process.

Figure 9K:
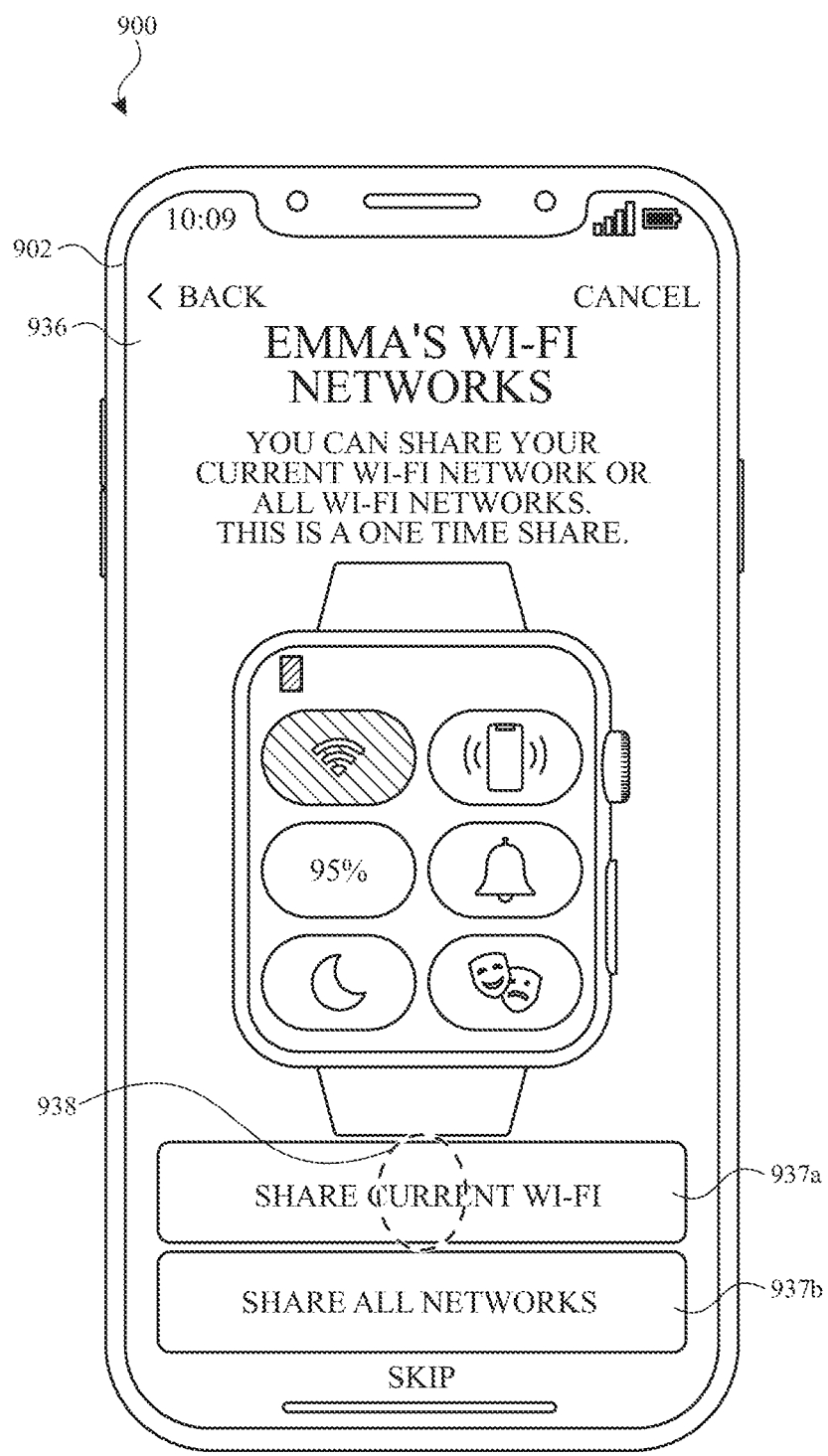

At FIG. 9K, continuing with the setup process, device 900 displays user interface 936 for sharing wireless network information with the external device. User interface 936 includes affordance 937*a*, which, when selected, initiates a process for transmitting current wireless network information to the external device, where the current wireless network information includes a network ID and password for the wireless network that device 900 is currently signed into. Additionally, user interface 936 includes affordance 937*b*, which, when selected, initiates a process for transmitting wireless network information to the external device, where the wireless network information includes all network IDs and passwords stored on device 900. In some embodiments, device 900 does not include one of affordance 937*a* or affordance 937*b*. In some embodiments, device 900 does not display user interface 936 if the external device is being configured to be associated with the first user account.

Returning to FIG. 9K, the user performs a tap gesture to share the current wireless network information. As a result, device 900 detects input 938 at affordance 937a and, in response, initiates a process for transmitting the current wireless network information to the external device.

Figure 9L:
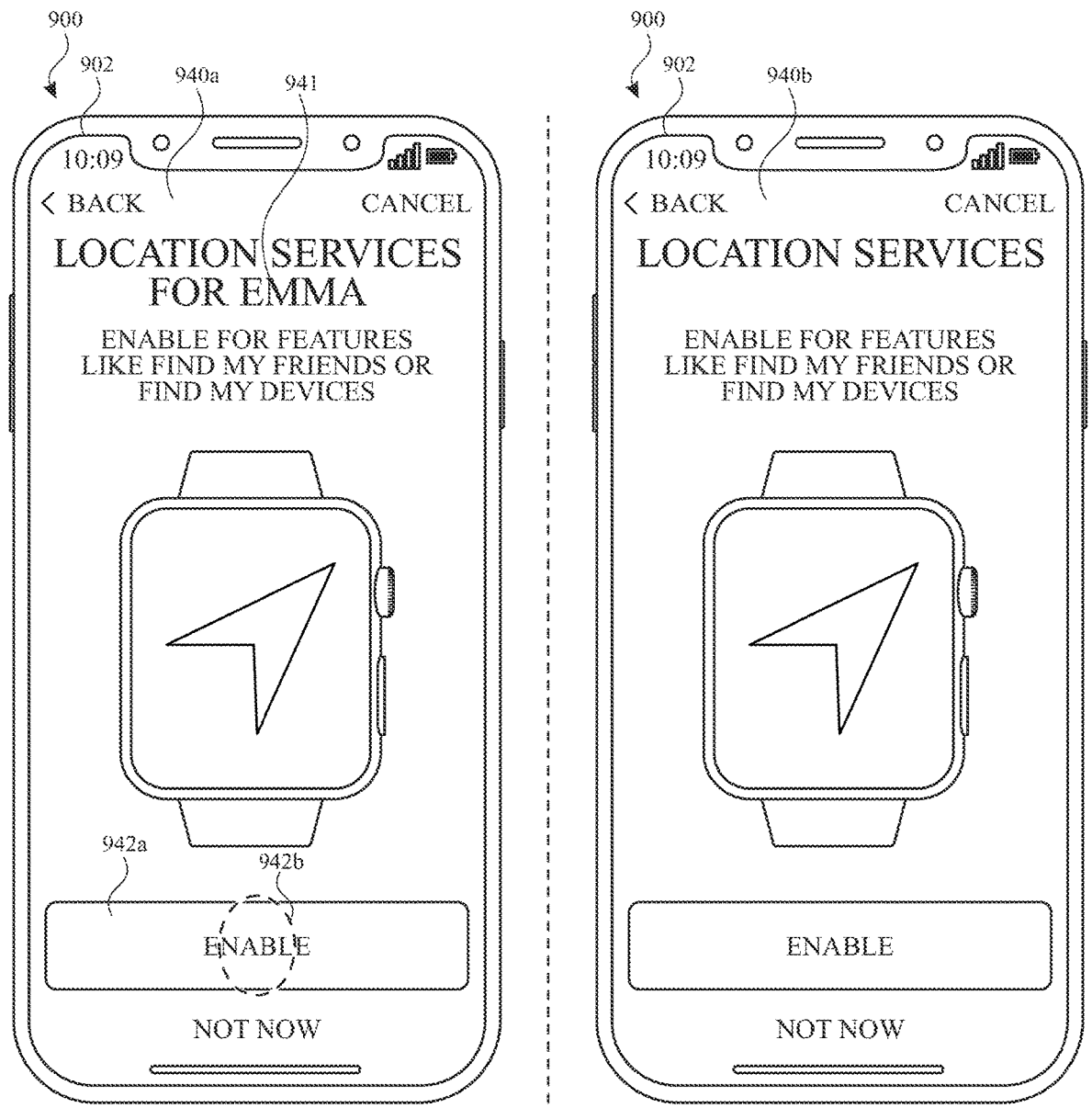

As depicted on the left side of FIG. 9L, after transmitting the wireless network information, device 900 continues with the setup process and displays user interface 940a for enabling location services. As discussed above, device 900 has information about the second user account (e.g., the name of the user associated with the second user account). Using this information, device 900 displays user interface 940a with name 941, which identifies the user account for which the external device is being configured. Providing identifying information during the setup process can be helpful to the user of device 900, as it reminds the user of that the external device is being set up for someone else (e.g., Emma Appleseed).

As depicted on the right side of FIG. 9L, in some embodiments, device 900 displays user interface 940b instead of user interface 940a if the external device is being configured to be associated with the first user account (e.g., a user account associated with the user of device 900). Since the external device is being setup for the user of device 900, user interface 940b does not include information (e.g., name 941) that identifies the intended user of the external device.

To enable location services, the user performs a tap gesture at affordance 942a. As a result, device 900 detects input 942b at affordance 942a, as shown on the left side of FIG. 9L. In response to detecting input 942b, device 900 initiates a process for enabling location services at the external device.

Figure 9M:
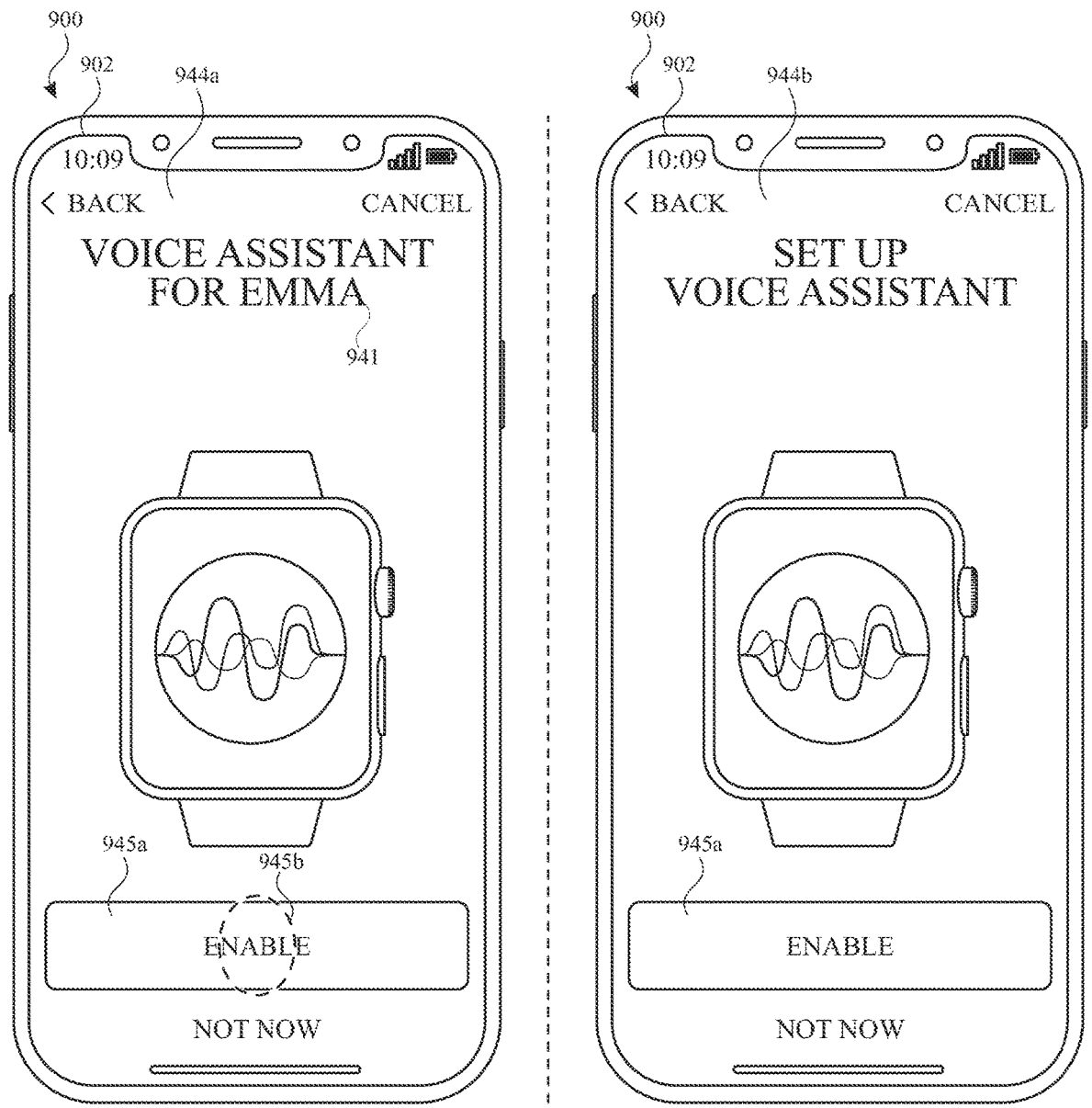

As depicted on the left side of FIG. 9M, after initiating the process for enabling location services, device 900 displays user interface 944a for enabling a voice assistant at the external device. The user performs a tap gesture to enable the voice assistant. As a result, device 900 detects input 945b at affordance 945a. In response to detecting input 945b, device 900 initiates a process for enabling a voice assistant at the external device. Similar to FIG. 9L, device 900 displays a different user interface (e.g., 944b) without name 941 if the setup process is for configuring the external device to be associated with the first user account (e.g., a user account associated with the user of device 900).

Figure 9N:
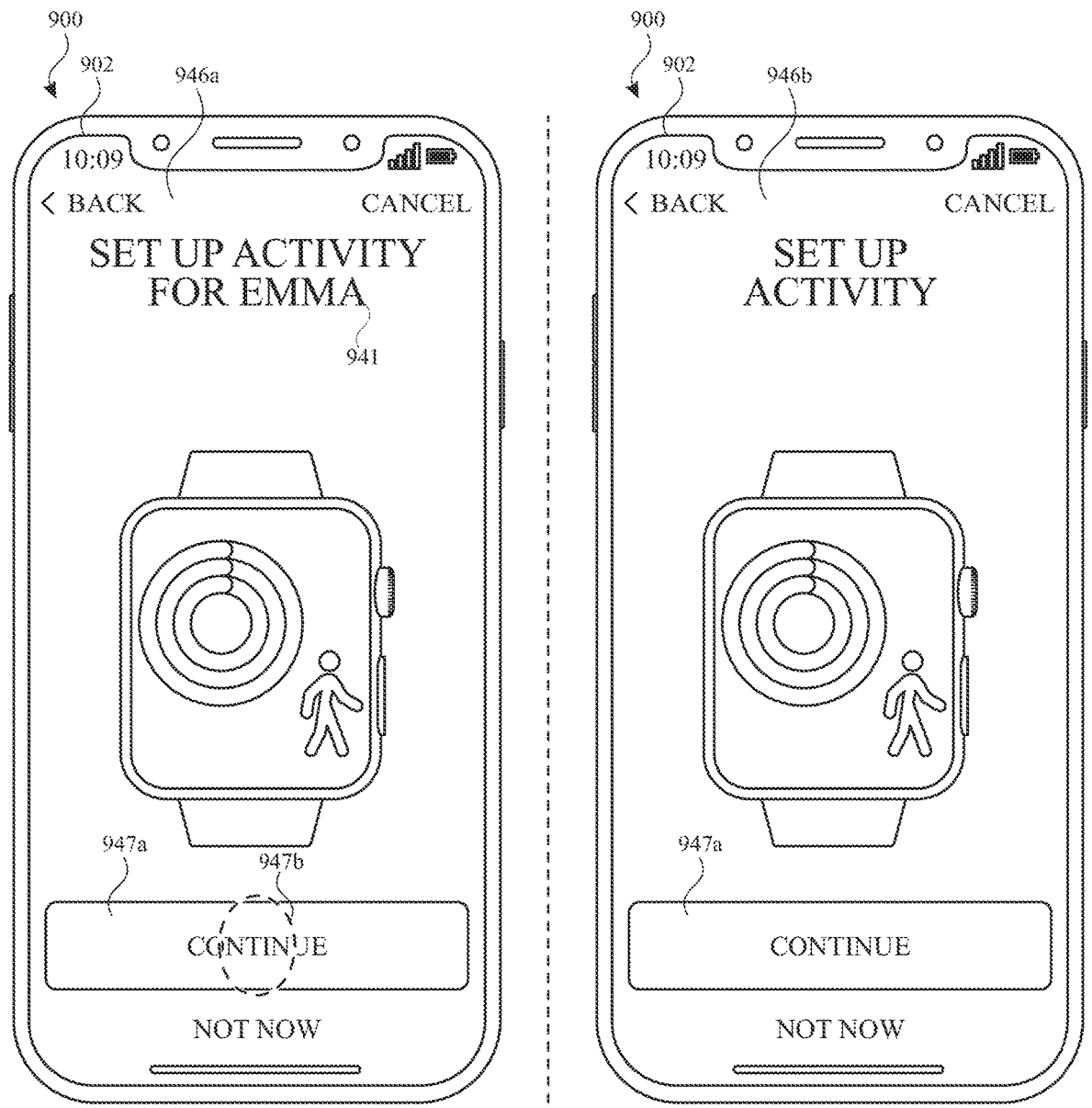

After initiating the process for enabling the voice assistant, device 900 displays user interface 946a for setting up activity features at the external device, as depicted on the left side of FIG. 9N. The user performs a tap gesture to setup the activity features. As a result, device 900 detects input 947b at affordance 947a. In response to detecting input 945b, device 900 initiates a process for setting up activity features at the external device. Similar to FIG. 9L, device 900 displays a different user interface (e.g., 946b) without name 941 if the setup process is for configuring the external device to be associated with the first user account (e.g., a user account associated with the user of device 900).

Figure 9O:
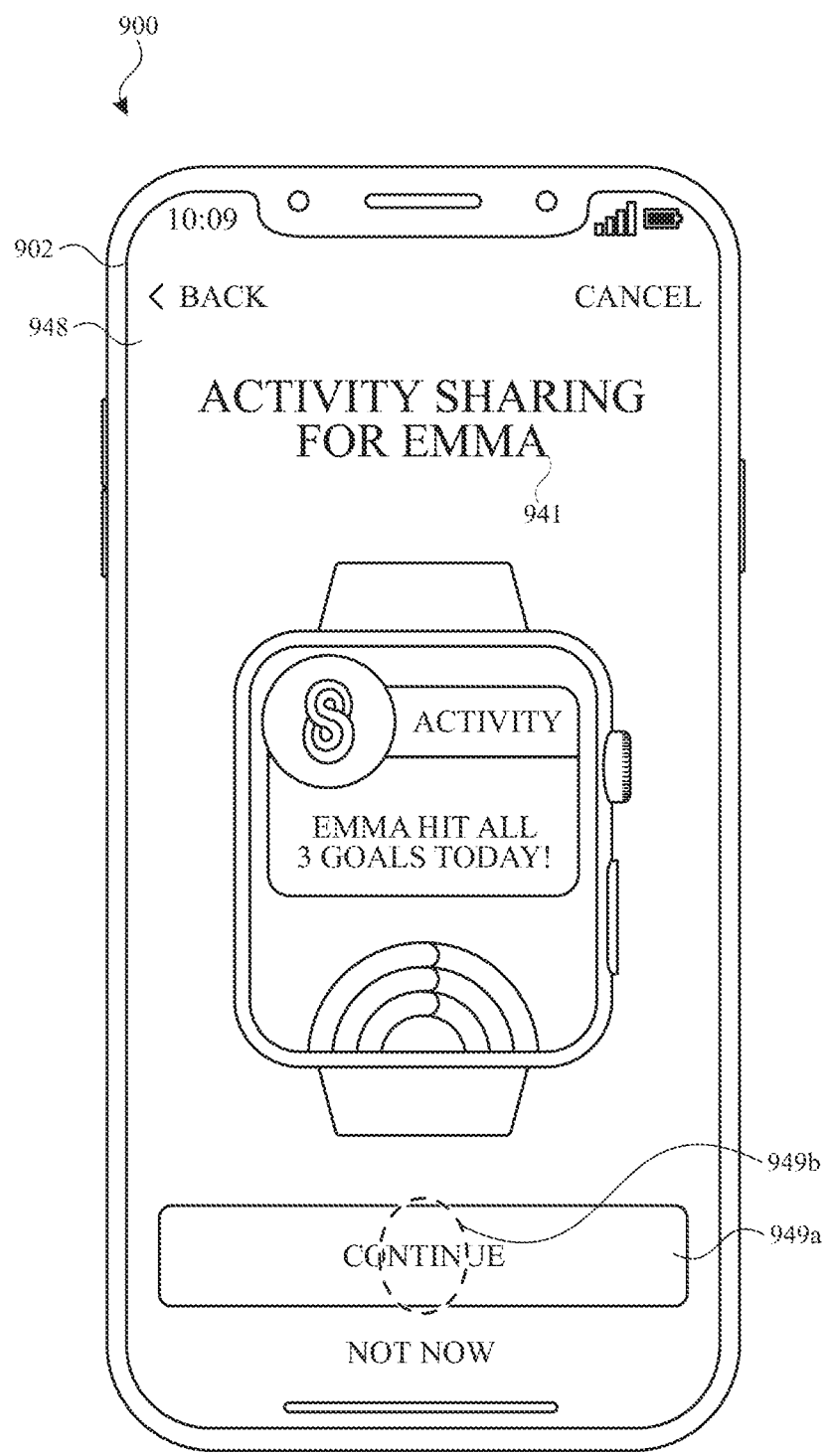

At FIG. 9O, after initiating the process for setting up activity features, device 900 displays user interface 948 for configuring activity sharing between the external device and device 900. In some embodiments, device 900 does not display user interface 948 if the external device is being configured to be associated with the first user account. Returning to FIG. 9O, device 900 detects input 949b (e.g., tap gesture) at affordance 949a.

Figure 9P:
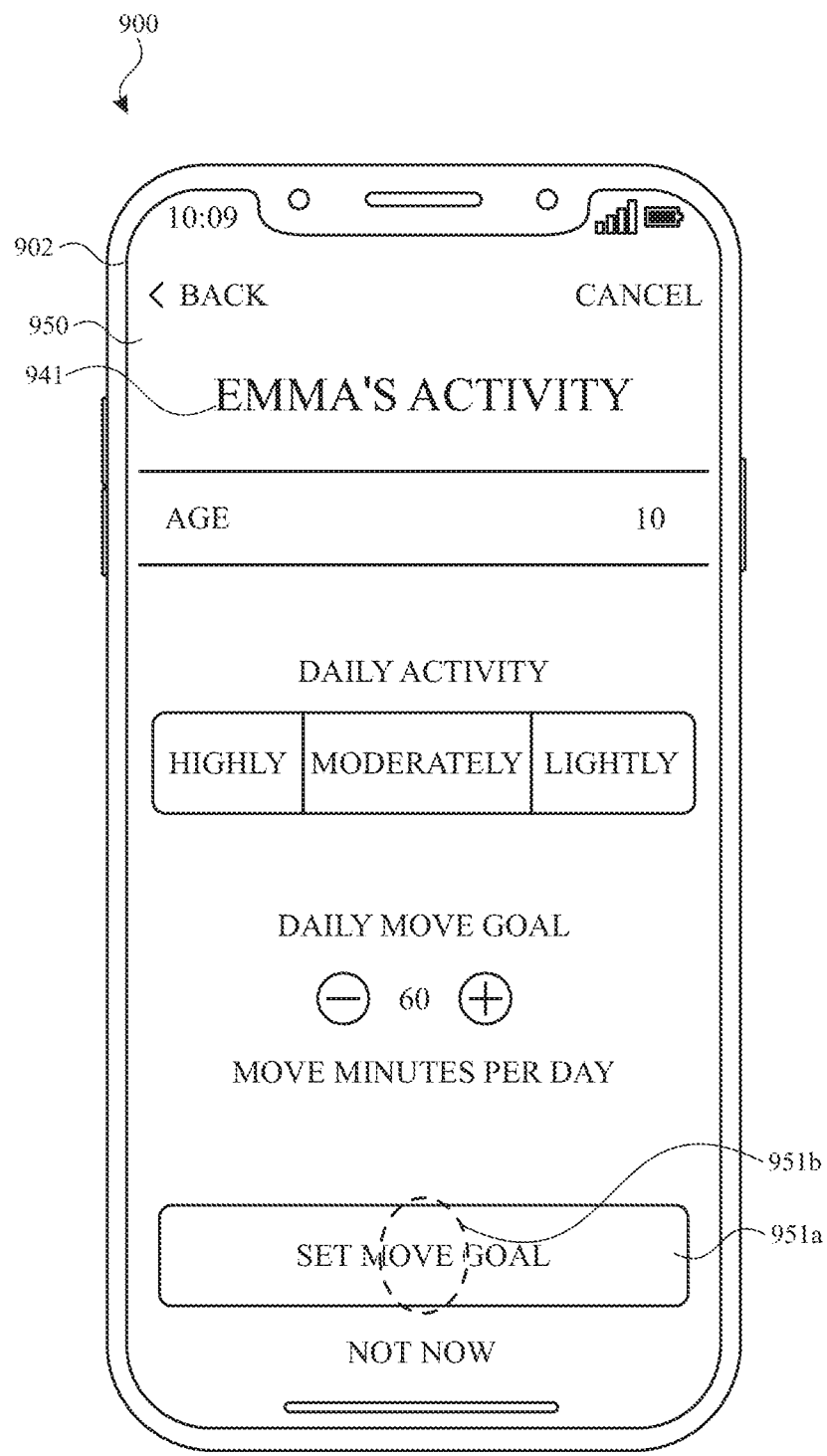

At FIG. 9P, in response to detecting input 949b, device 900 displays user interface 950 for setting a daily move goal for Emma. The user chooses a daily move goal and performs a tap gesture to set the daily move goal at the external device. As a result, device 900 detects input 951b at affordance 951a. In response to detecting input 951b, device 900 initiates a process for configuring the external device with the chosen daily move goal.

Figure 9Q:
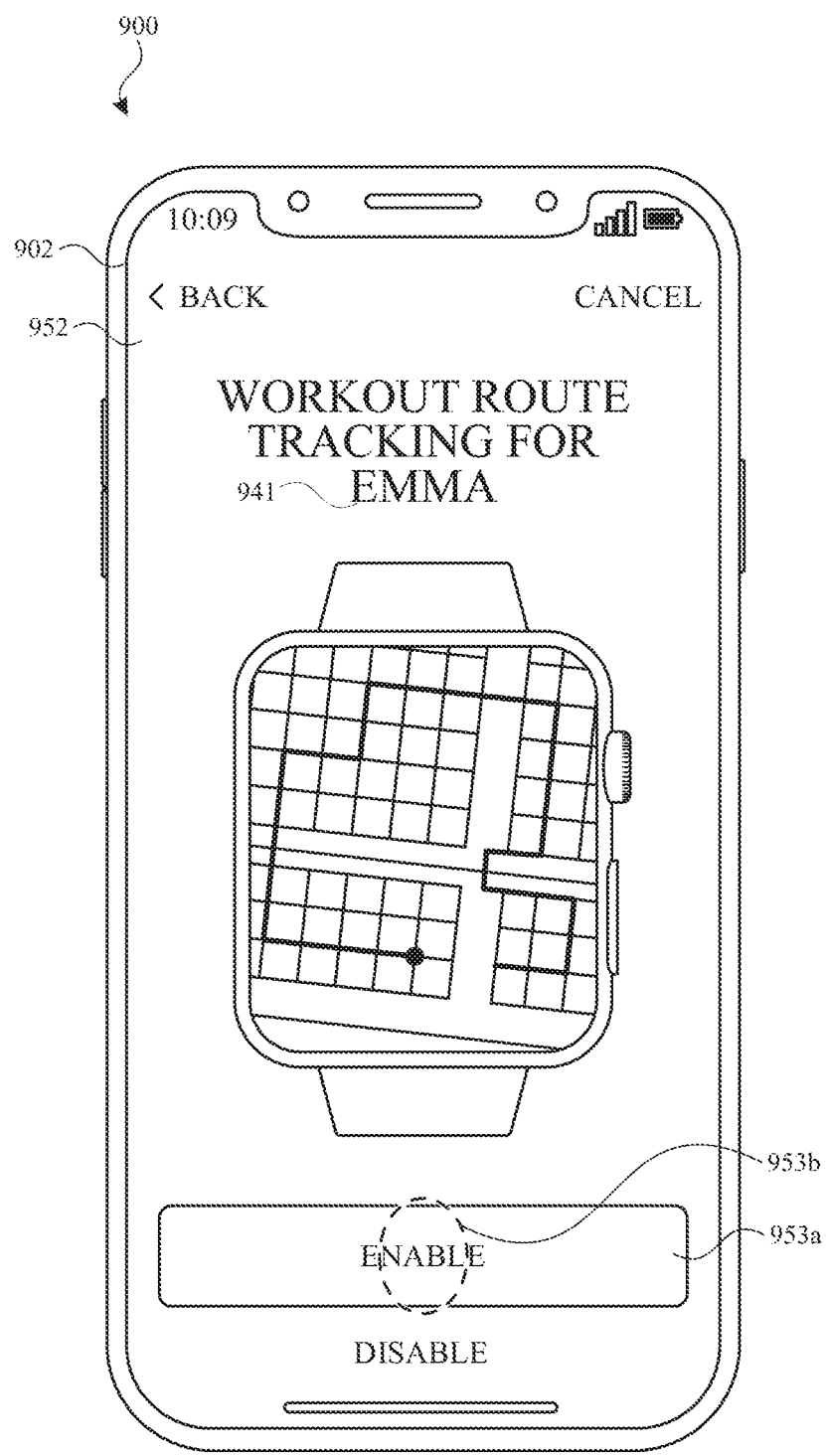

At FIG. 9Q, after initiating the process for configuring the external device with the chosen daily move goal, device 900 displays user interface 952 for enabling workout route tracking. Device 900 detects input 953b (e.g., tap gesture) at affordance 953a. In response to detecting input 953b, device 900 initiates a process for enabling workout route tracking at the external device.

Figure 9R:
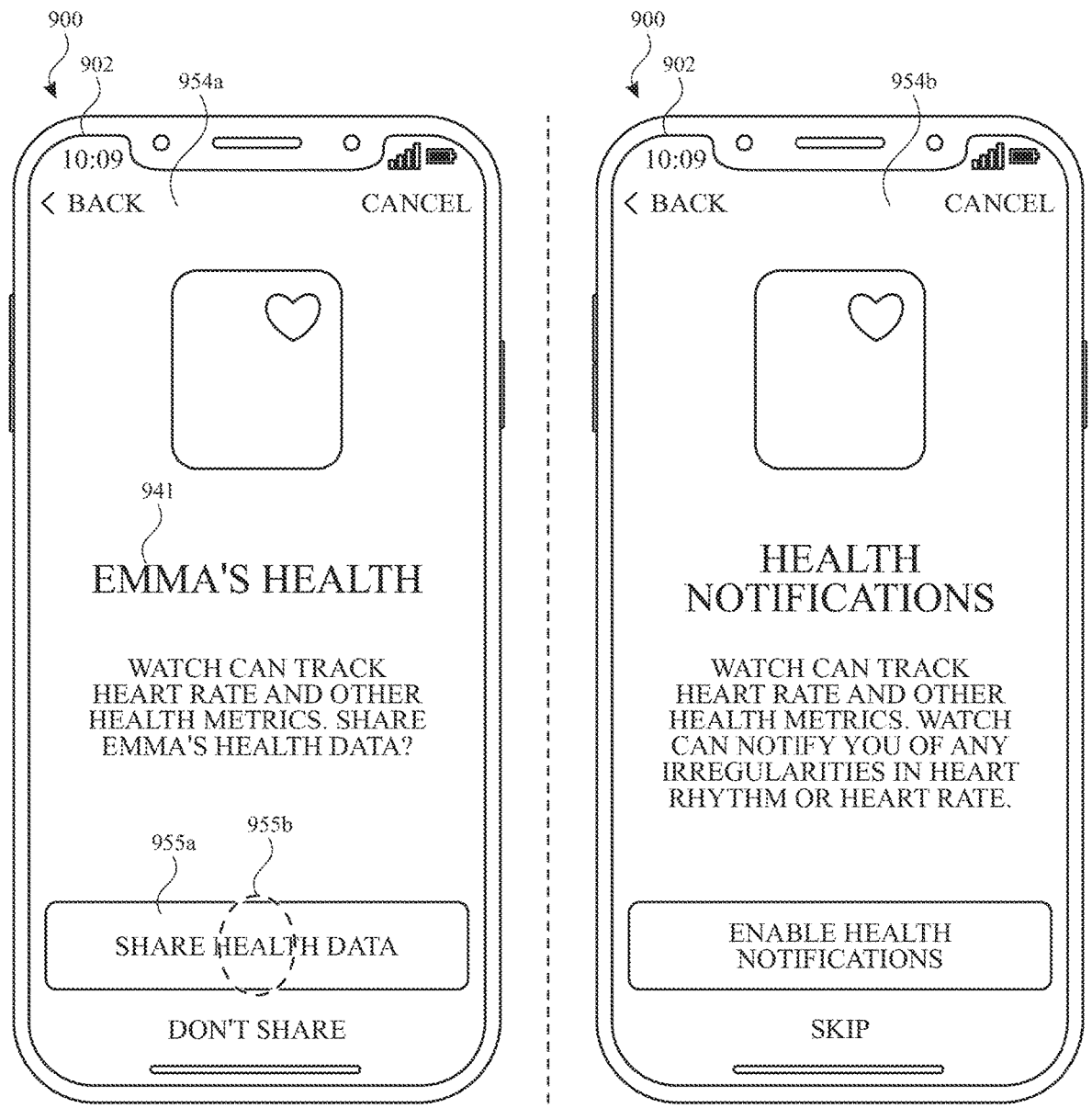

As depicted on the left side of FIG. 9R, after initiating a process for enabling workout route tracking, device 900 displays user interface 954a for enabling sharing of health data between the external device and device 900. Device 900 detects input 955b (e.g., tap gesture) at affordance 955a. In response to detecting input 955b, device 900 initiates a process for enabling sharing of health data between the external device and device 900. Similar to FIG. 9L, device 900 displays a different user interface (e.g., 954b) without name 941 if the setup process is for configuring the external device to be associated with the first user account (e.g., a user account associated with the user of device 900).

Figure 9S:
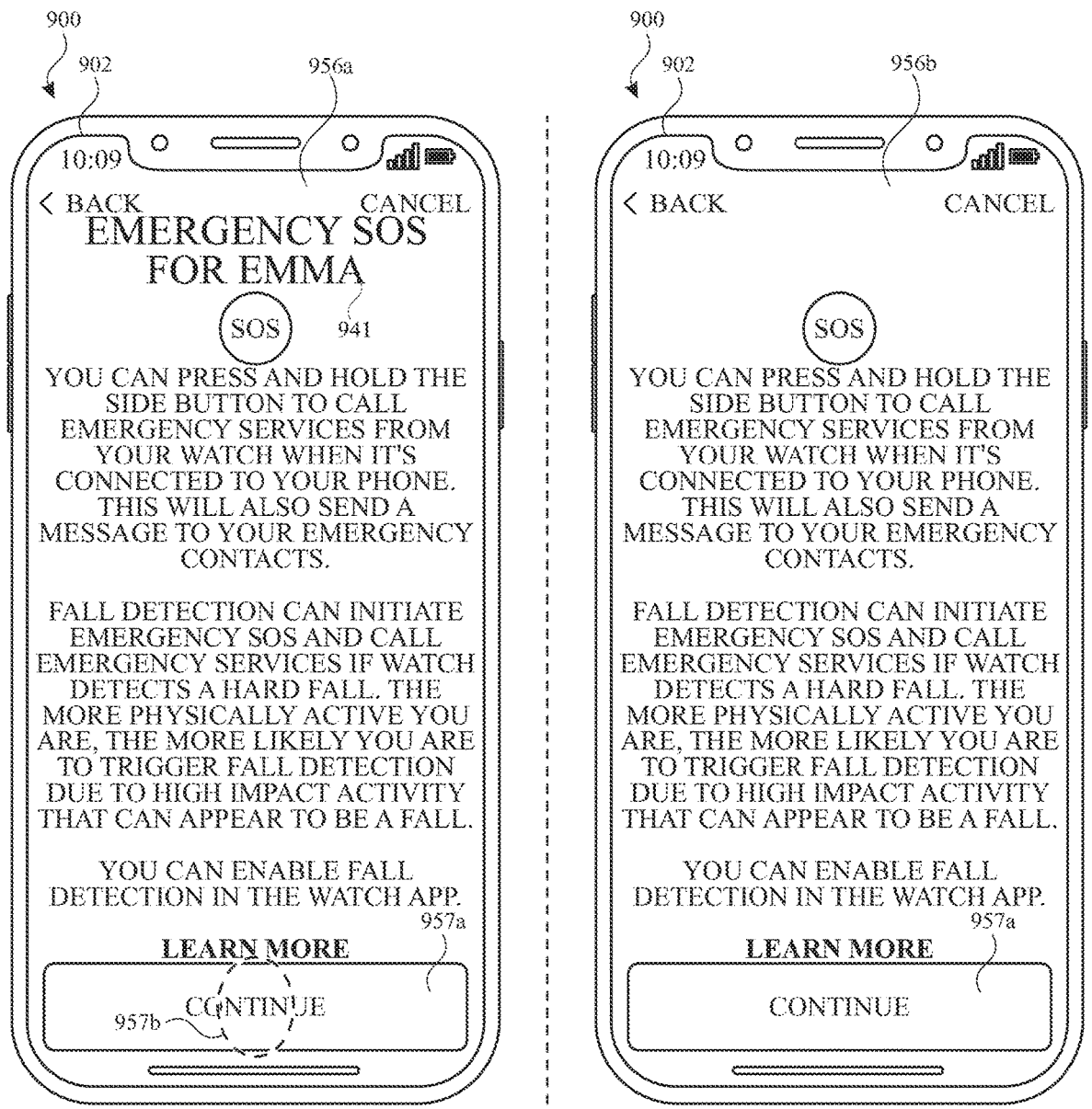

At FIG. 9S, after initiating a process for enabling sharing of health data between the external device and device 900, device 900 displays user interface 956a for enabling emergency features at the external device. Device 900 detects input 957b (e.g., tap gesture) at affordance 957a. In response to detecting input 957b, device 900 initiates a process for enabling emergency features at the external device. Similar to FIG. 9L, device 900 displays a different user interface (e.g., 956b) without name 941 if the setup process is for configuring the external device to be associated with the first user account (e.g., a user account associated with the user of device 900).

Figure 9T:
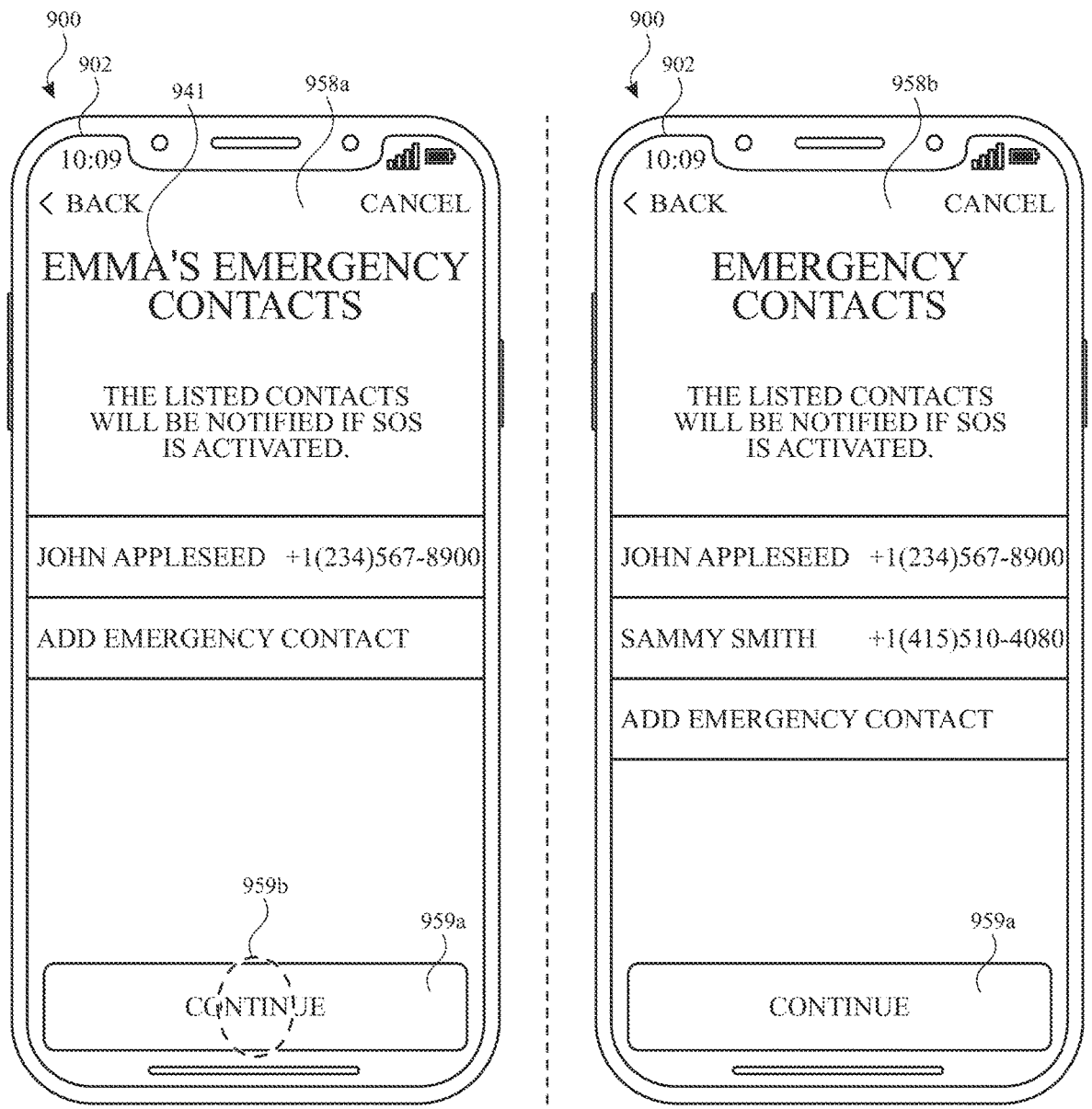

At FIG. 9T, after initiating a process for enabling emergency features at the external device, device 900 displays user interface 958a for identifying emergency contacts. Device 900 detects input 959b (e.g., tap gesture) at affordance 959a. In response to detecting input 959b, device 900 enters the identified emergency contacts. Similar to FIG. 9L, device 900 displays a different user interface (e.g., 958b) without name 941 if the setup process is for configuring the external device to be associated with the first user account (e.g., a user account associated with the user of device 900).

Figure 9U:
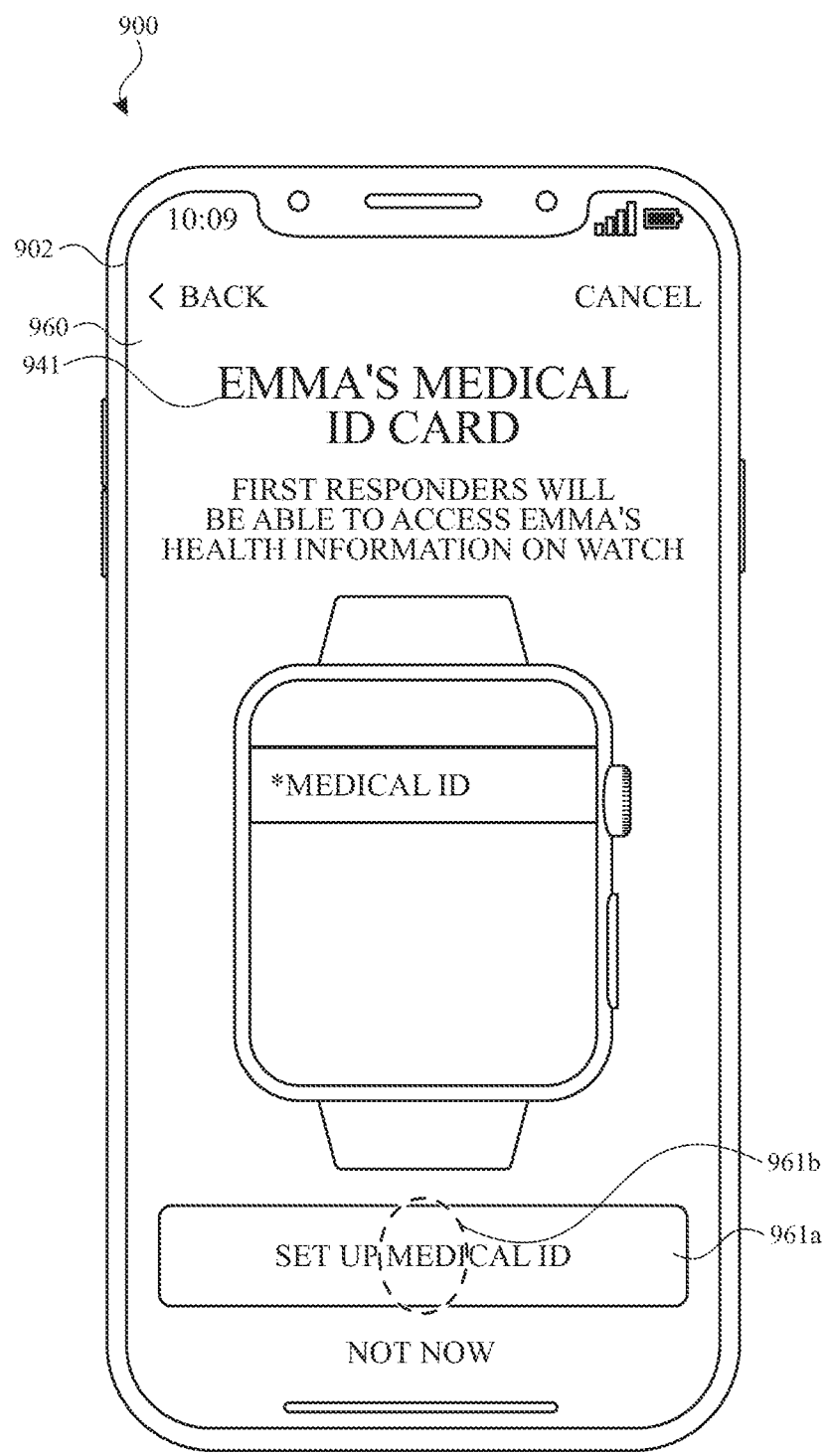
Figure 9V:
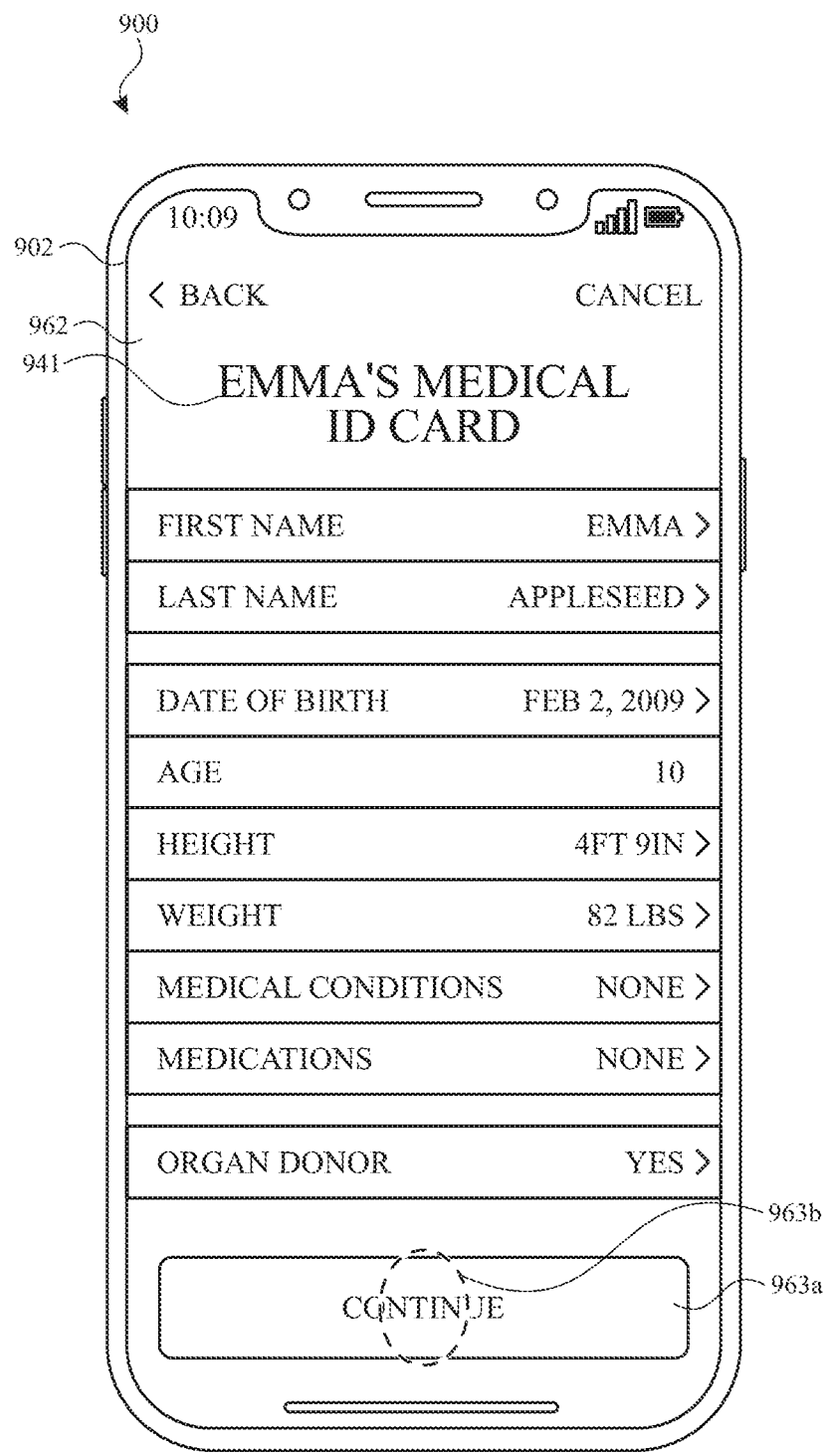

At FIGS. 9U-9V, device 900 detects one or more inputs (e.g., 961b, 963b) for configuring the external device with a digital medical ID card. While displaying user interface 960, device 900 detects input 961b (e.g., tap gesture) at affordance 961a. In response to detecting input 961b, device 900 displays user interface 962. While displaying user interface 962, device 900 detects input 963b (e.g., tap gesture) at affordance 963a. In response to detecting input 963b, device 900 initiates a process for configuring the external device with a digital medical ID card.

Figure 9W:
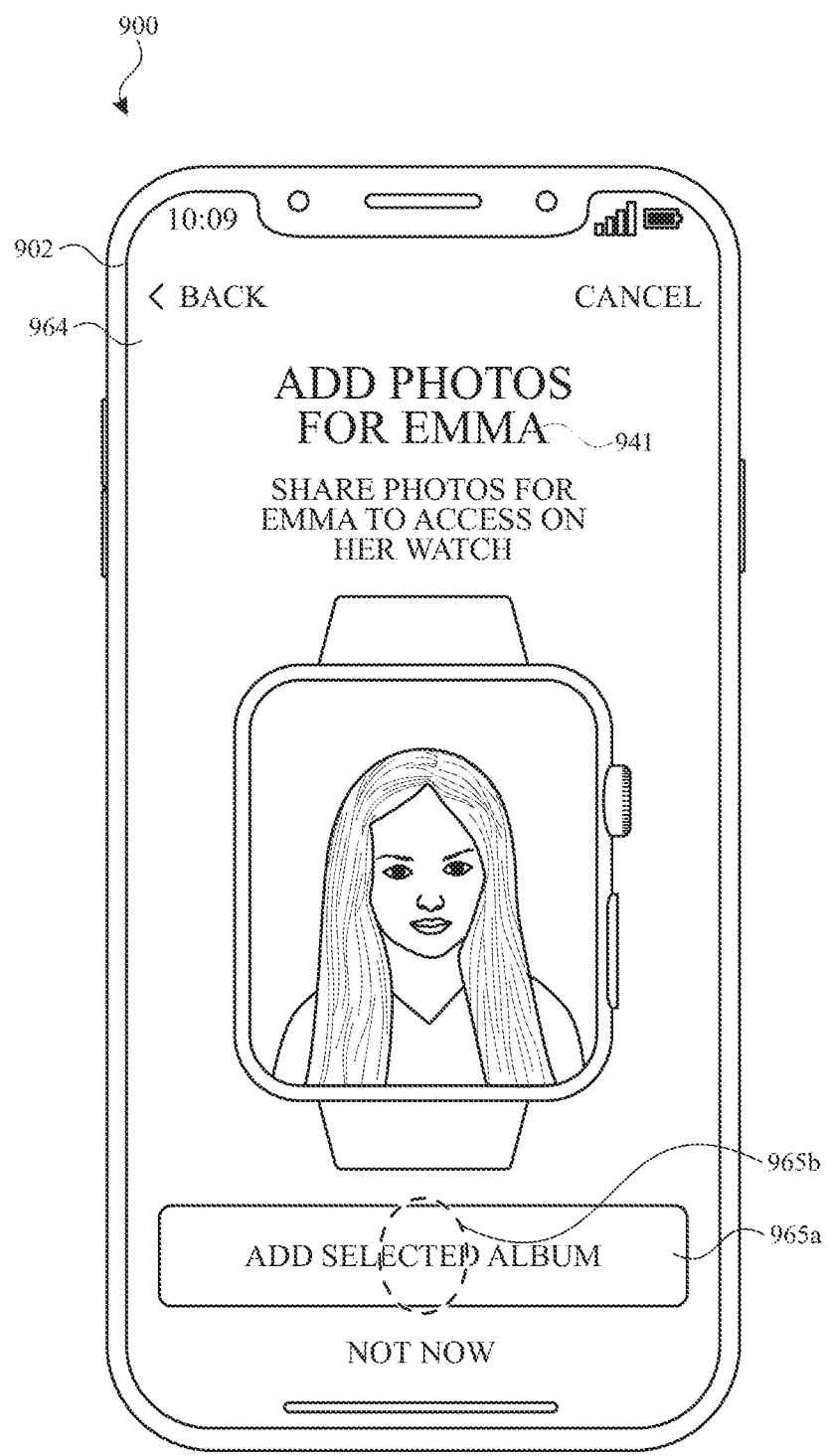
Figure 9X:
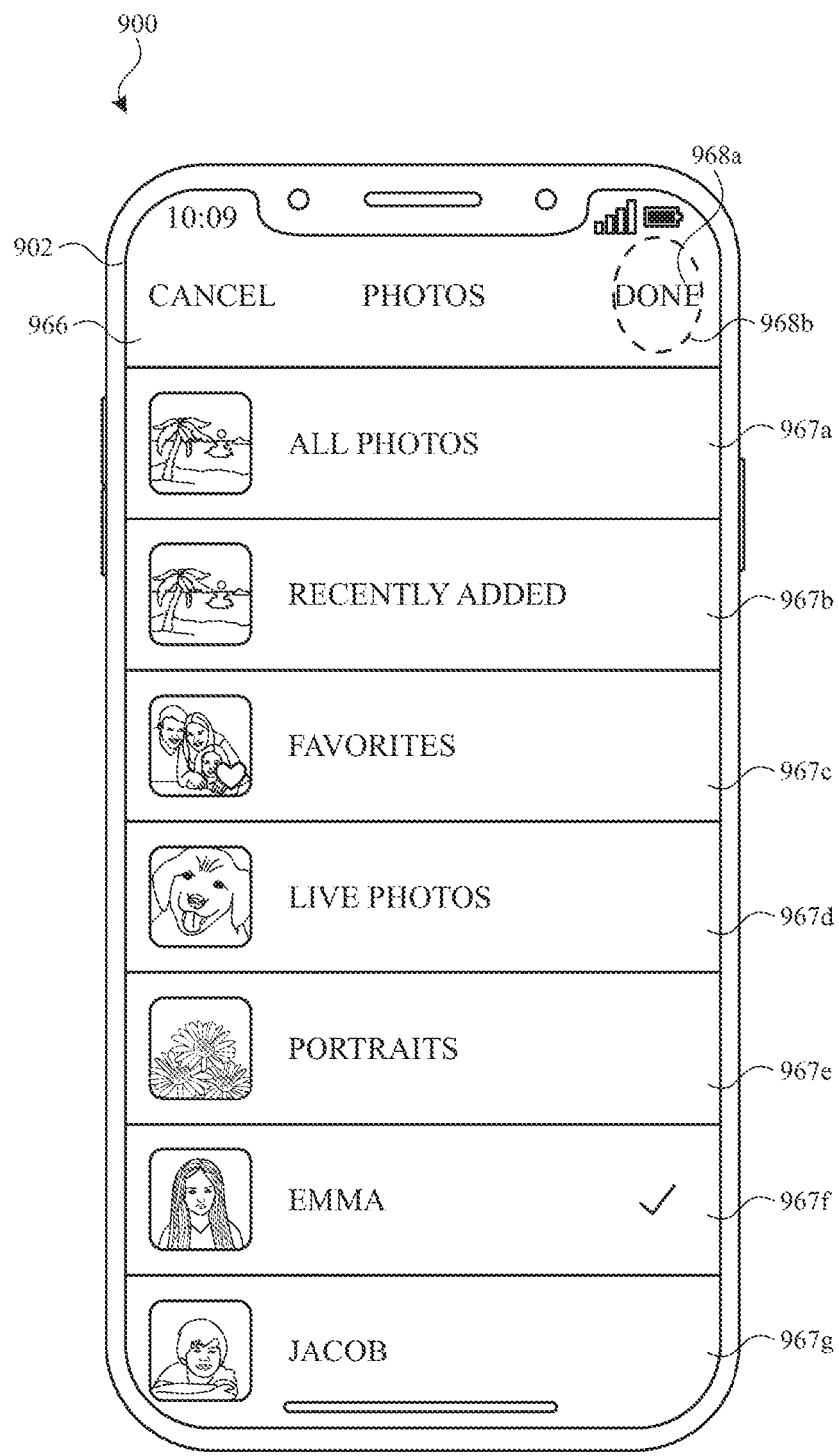

At FIGS. 9W-9X, after initiating the process for configuring the external device with a digital medical ID card, device 900 detects one or more inputs (e.g., 965b, 958b) for adding photos to the external device. While displaying user interface 964, device 900 detects input 965b (e.g., tap gesture) at affordance 965a. In response to detecting input 965b, device 900 displays user interface 966 with representations 967a-967g of photo albums. The user selects representation 967f to add the "Emma" album and its collection of photos to the external device. Once representation 967f is selected, device 900 detects input 968b (e.g., tap gesture) at done button 968a. In response to detecting input 968b, device 900 initiates a process for adding the selected album to the external device. In some embodiments, the selected album continues to remain synced indefinitely between device 900 and the external device (e.g., if a photo is added to the selected album at device 900, that photo is also added to the external device).

Figure 9Y:
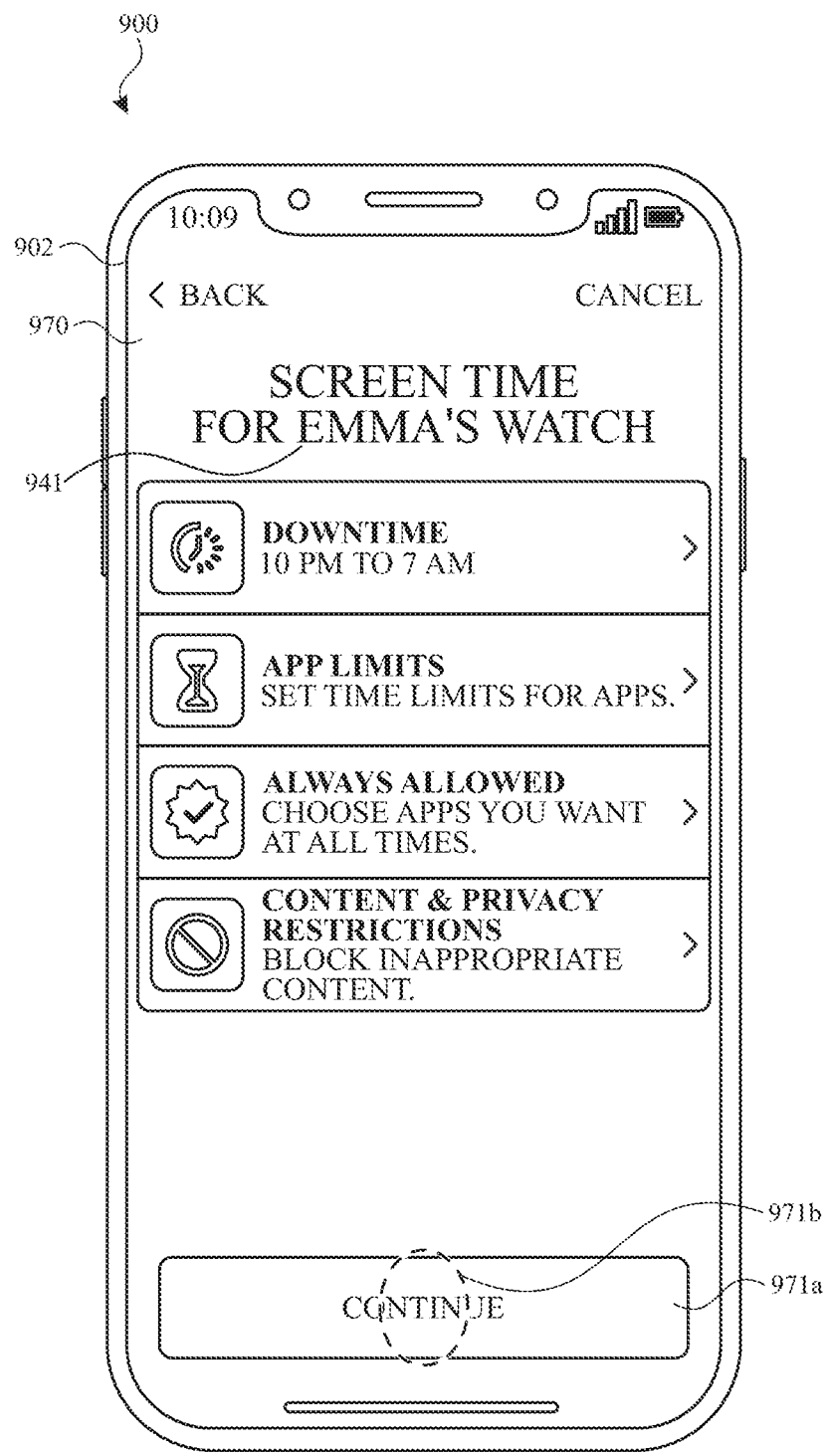

At FIG. 9Y, after initiating the process for adding the selected photo album to the external device, device 900 continues with the setup process and displays user interface 970 for configuring application restrictions at the external device. While displaying user interface 970, device 900 detects input 971b (e.g., tap gesture) at affordance 971a. In response to detecting input 971b, device 900 initiates a process for configuring the external device with specified application restrictions.

Figure 9Z:
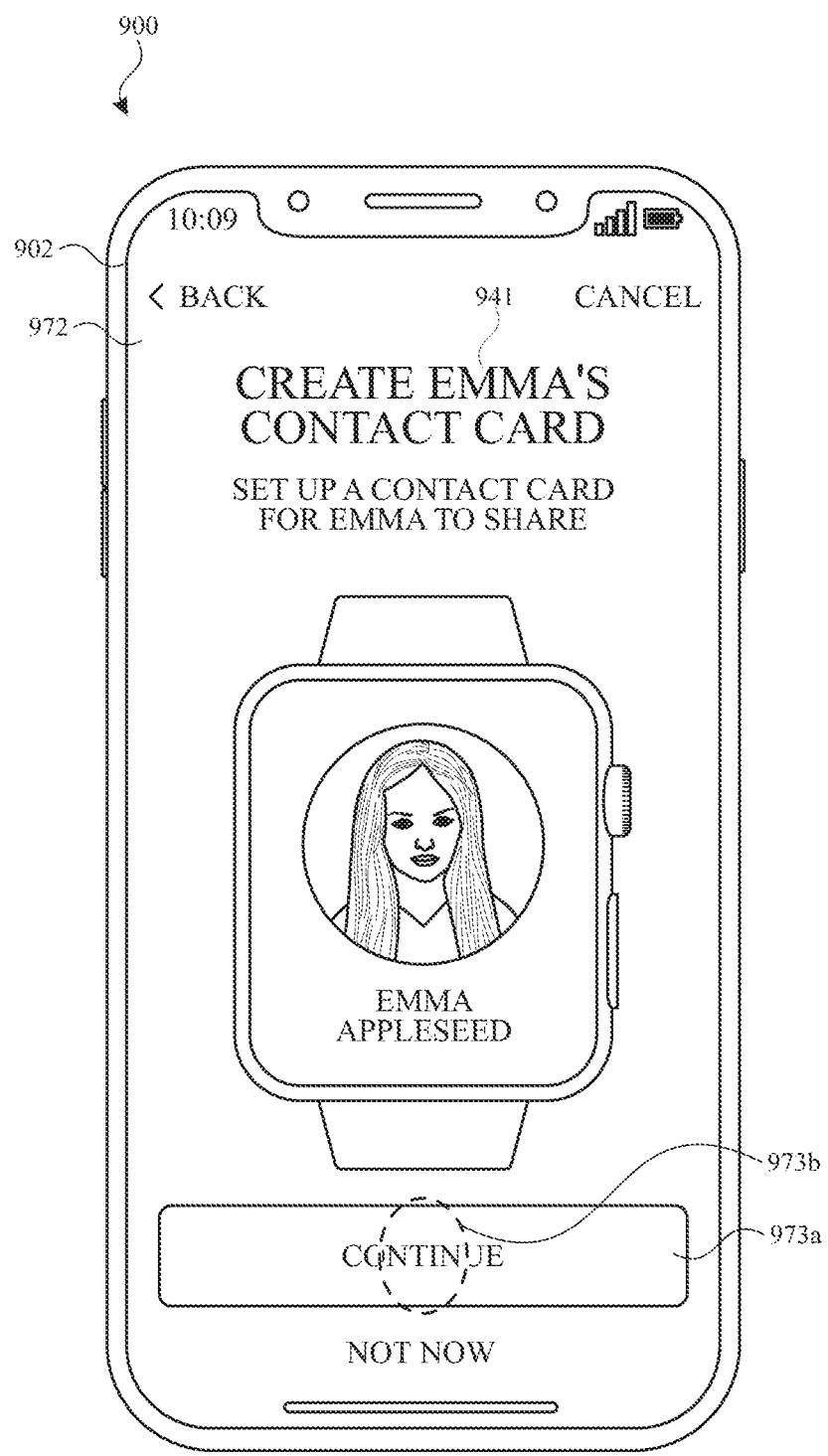
Figure 9A:
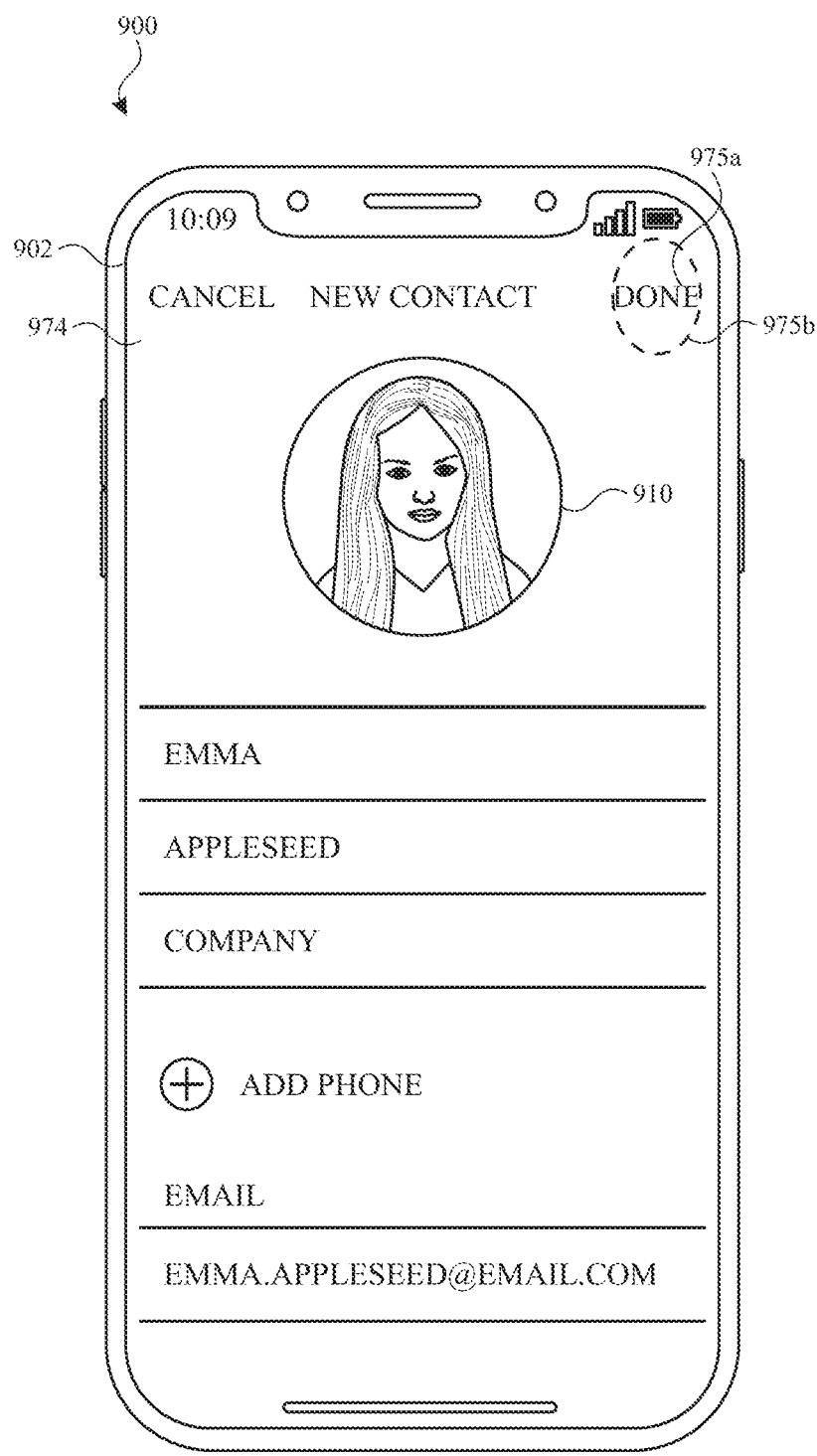
Figure 9A:
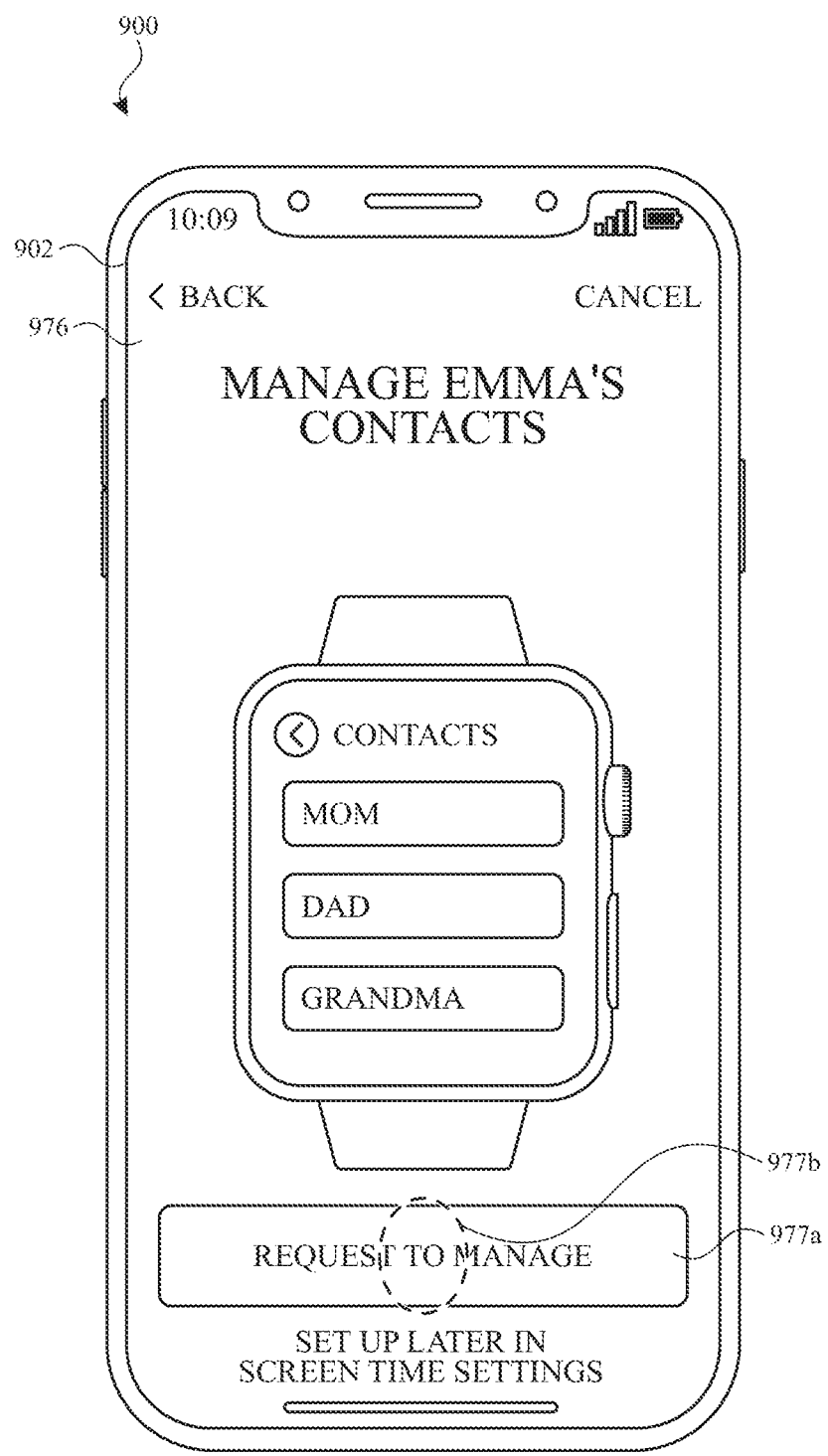
Figure 9A:
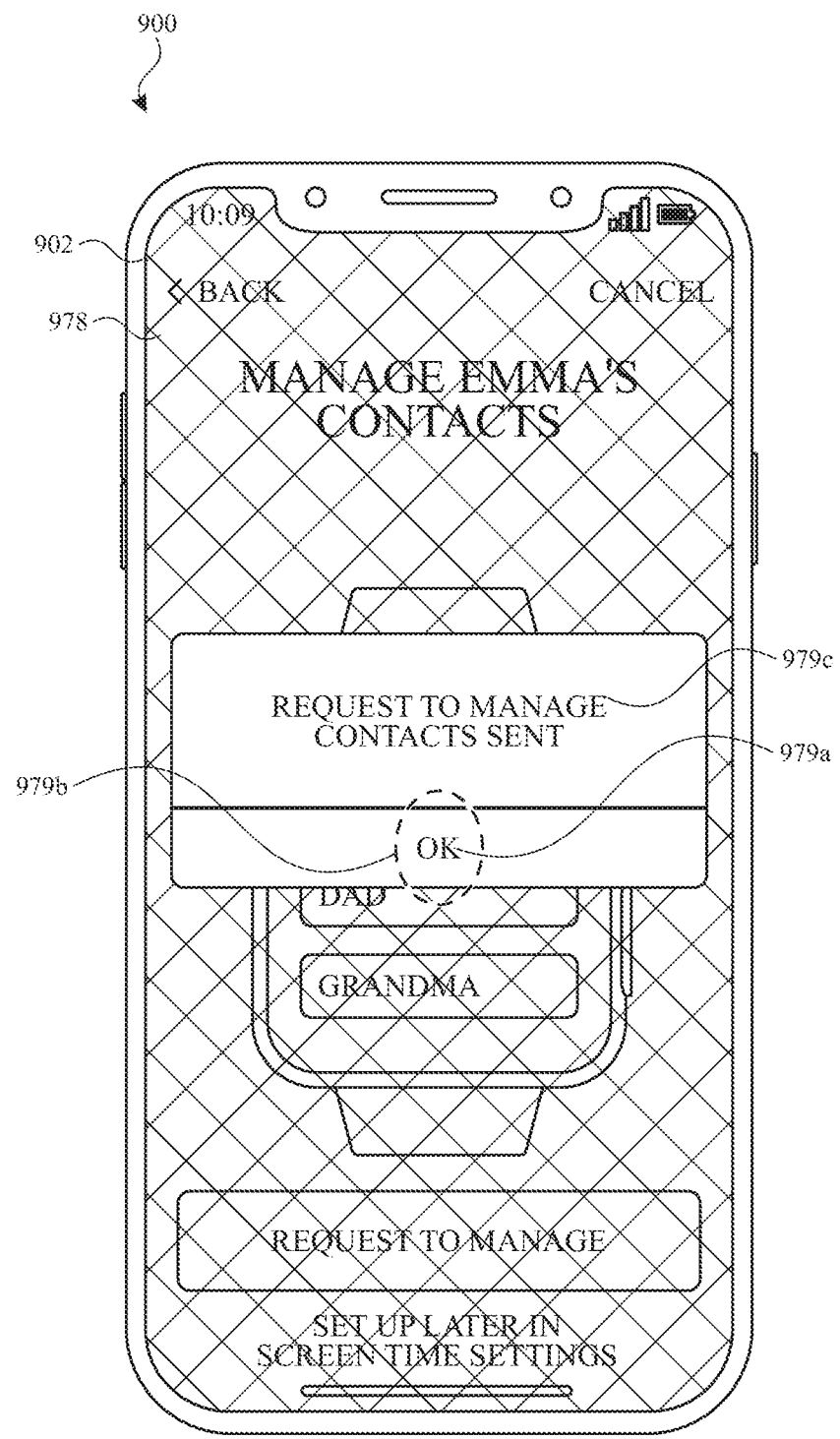
Figure 9A:
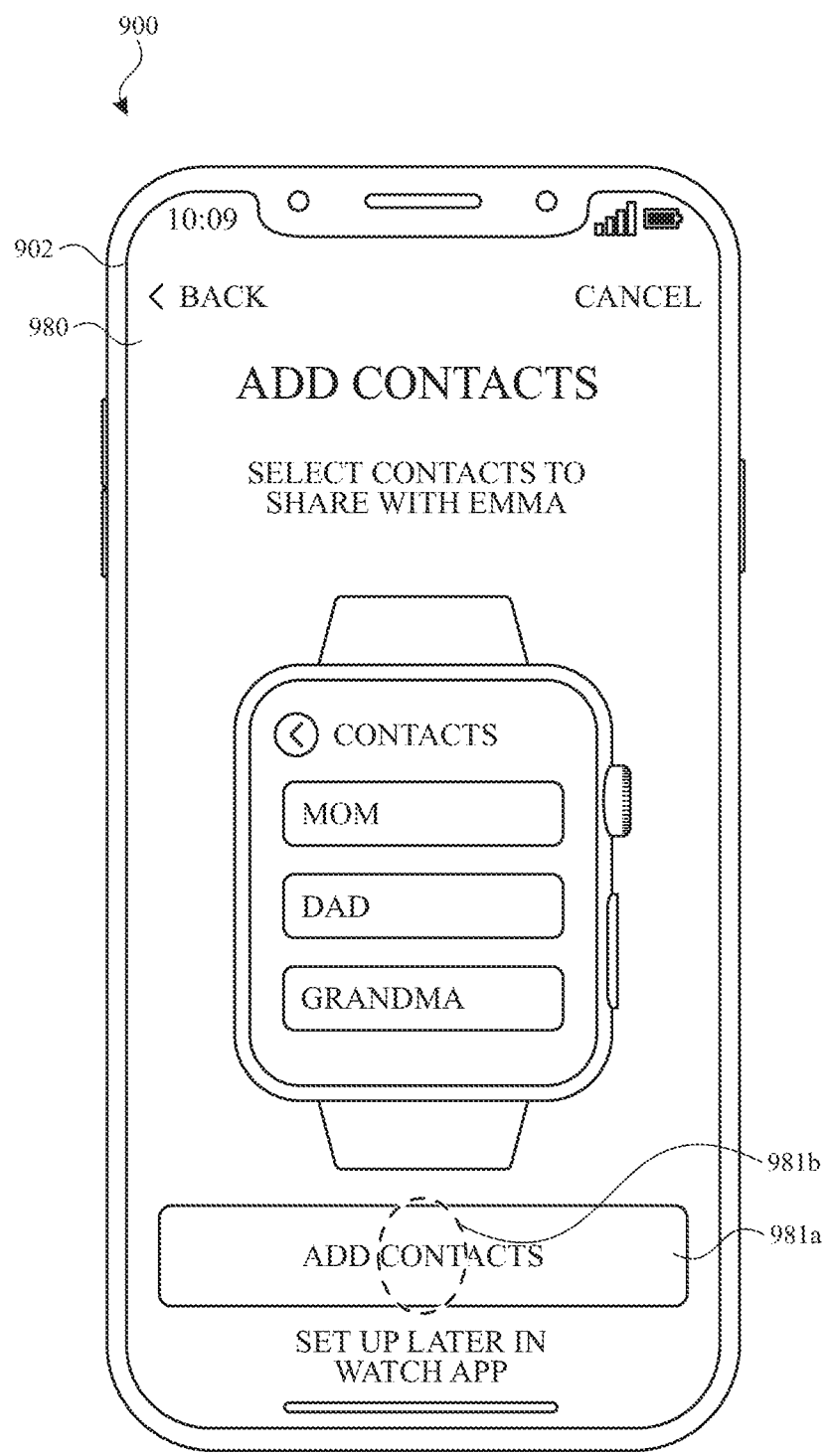
Figure 9A:
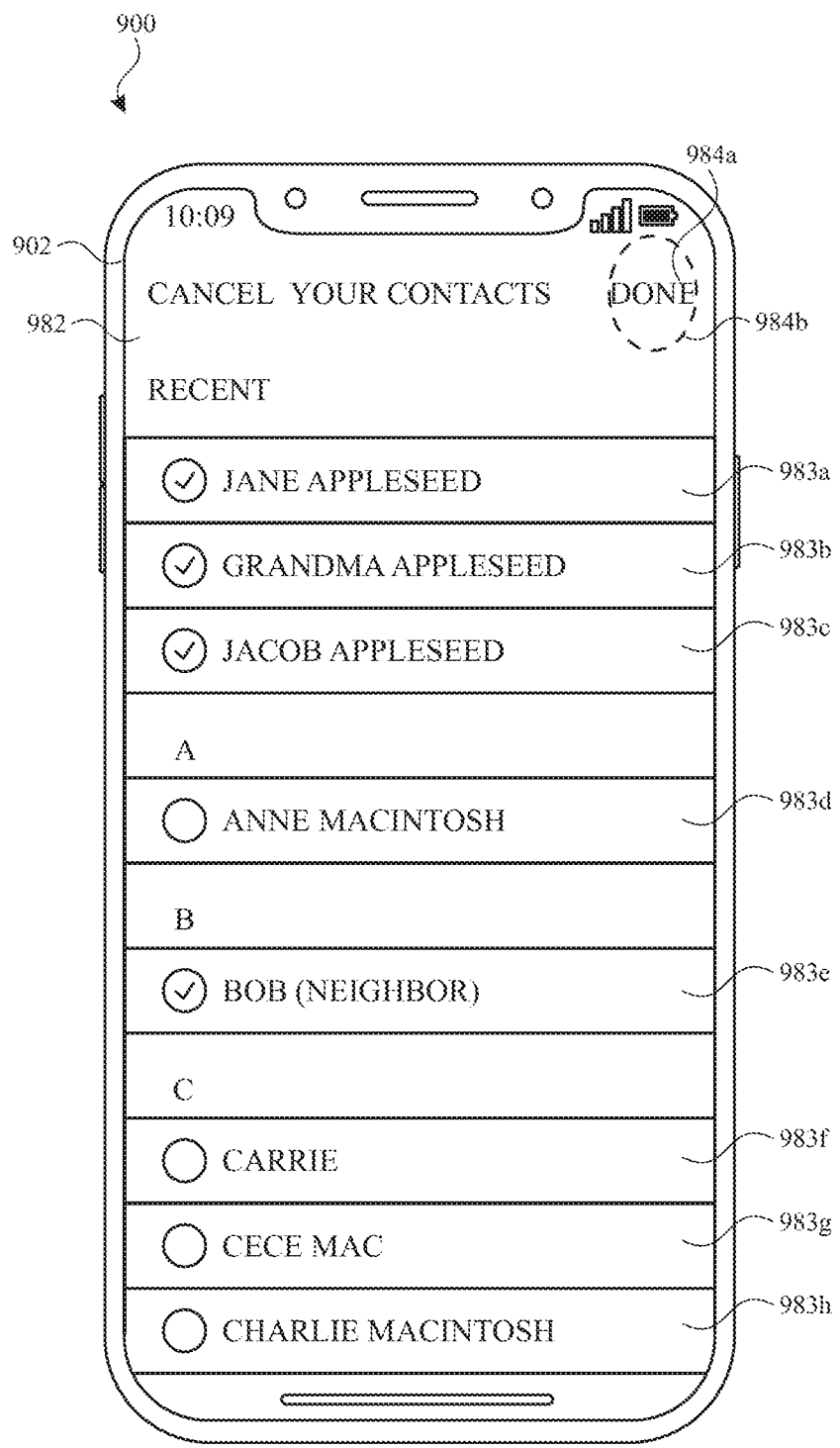
Figure 9A:
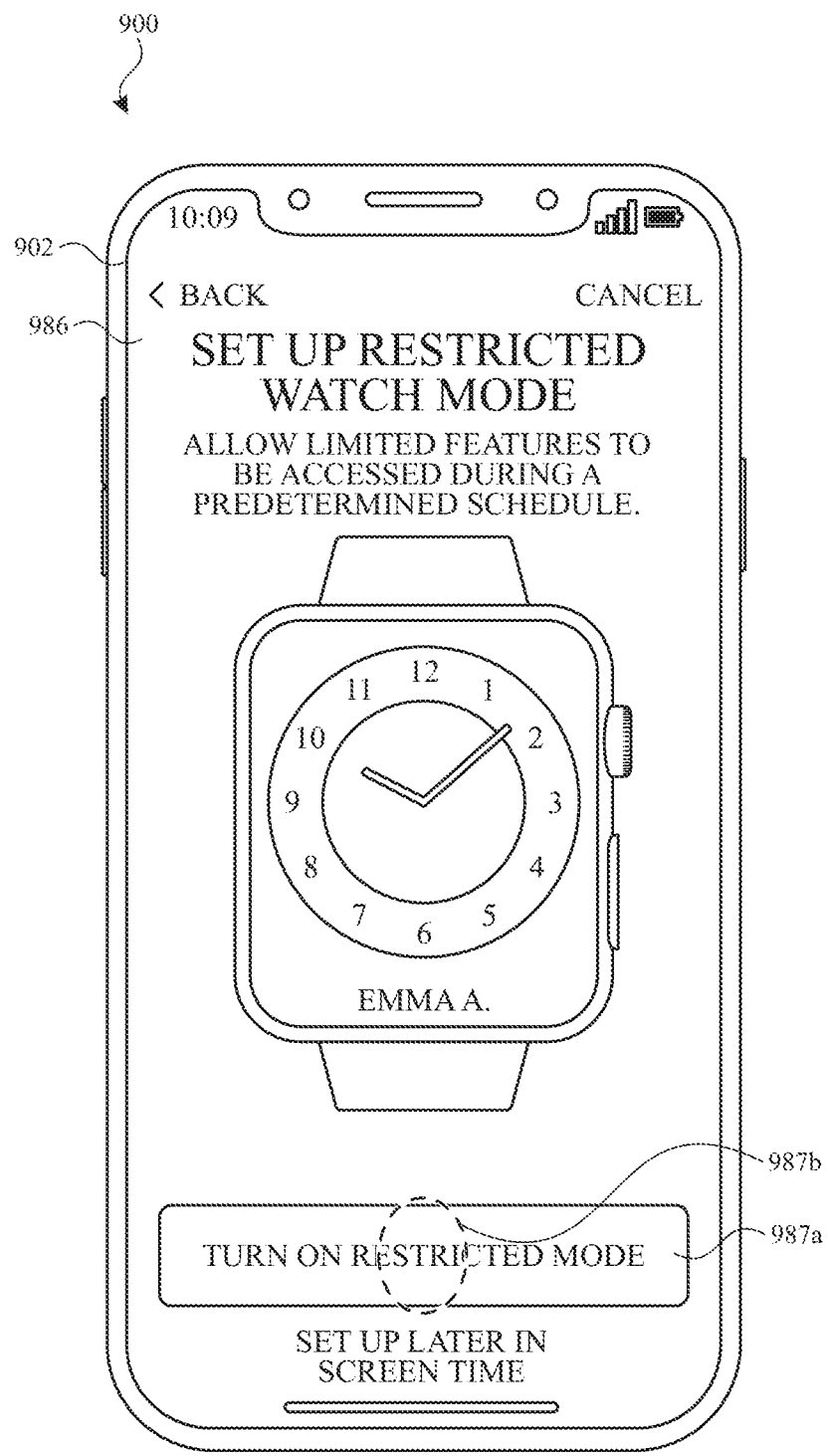
Figure 9A:
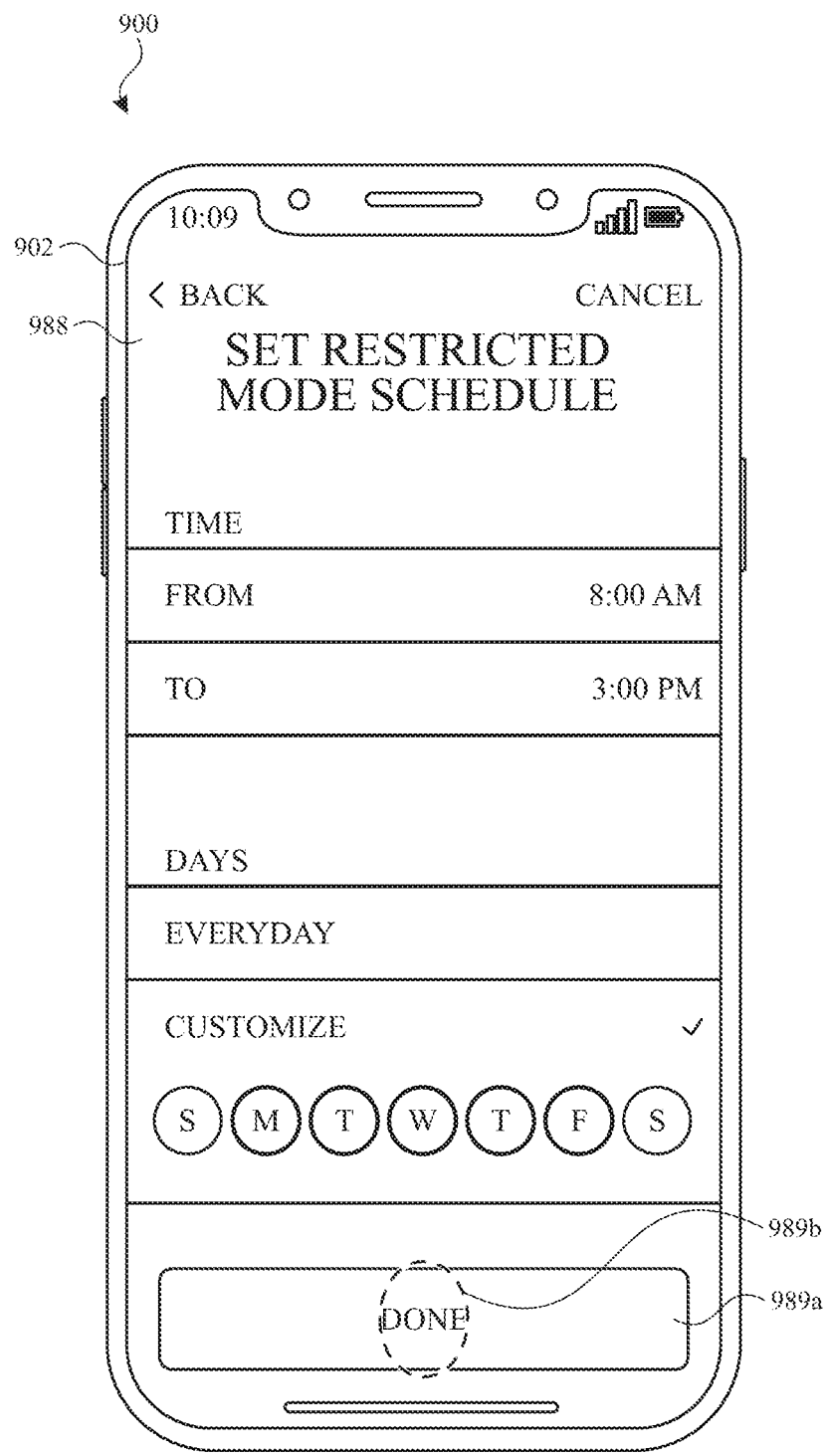
Figure 9A:
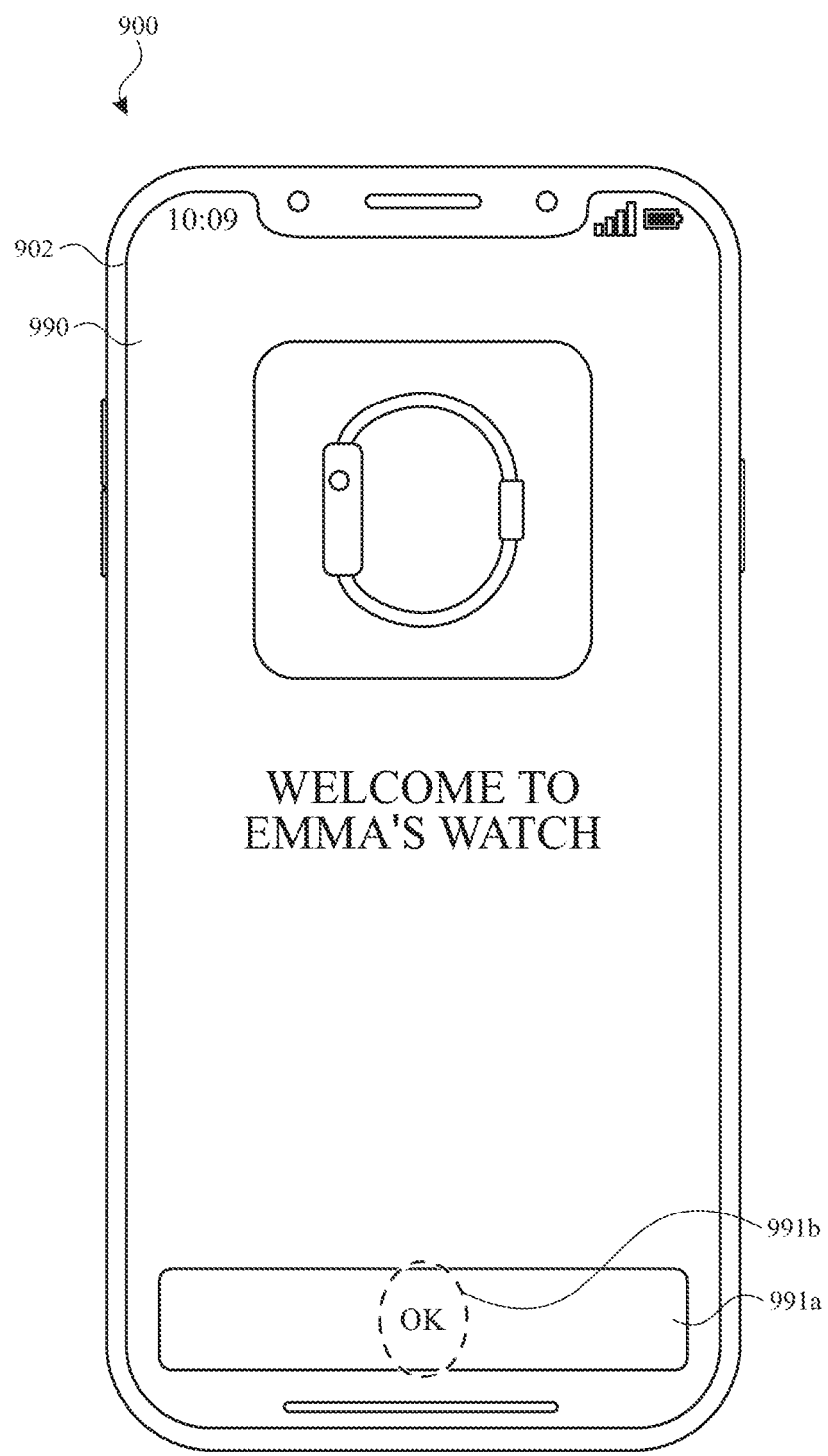
Figure 9A:
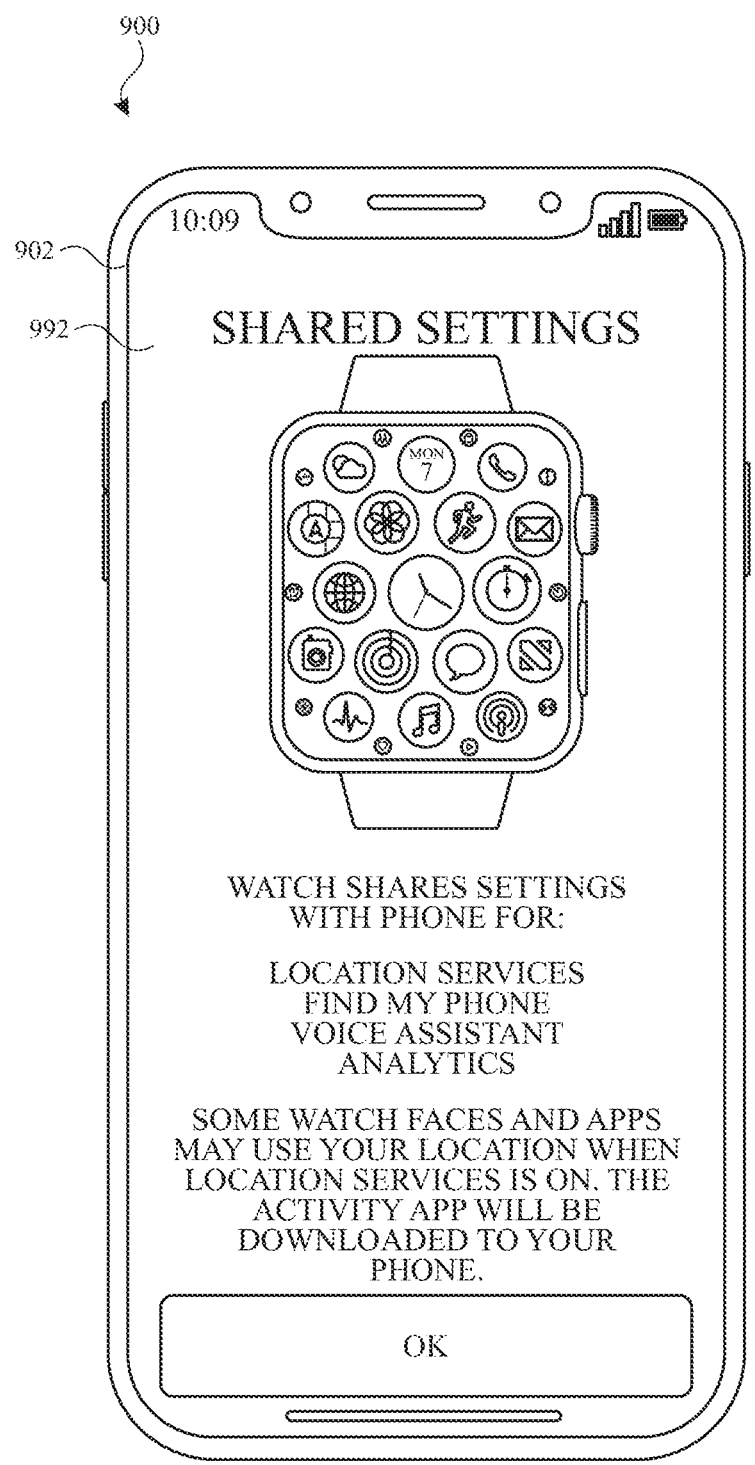

At FIGS. 9Z-9AA, after initiating the process for configuring the external device with specified application restrictions, device 900 detects one or more inputs (e.g., 973b, 975b) to generate a contact card for Emma Appleseed. While displaying user interface 972, device 900 detects input 973b at affordance 973a. In response to detecting input 973b, device 900 displays user interface 974 with information about Emma Appleseed. While displaying user interface 974, device 900 detects input 975b at done button 975a. In response to detecting input 975b, device 900 generates a contact card for Emma Appleseed.

At FIGS. 9AB-9AC, after generating the contact card for Emma Appleseed, device 900 displays user interface 976 for requesting access to manage contacts at the external device. While displaying user interface 976, device 900 detects input 977b at affordance 977a. In response to detecting input 977b, device 900 transmits a request to manage the contacts at the external device. Further in response to detecting input 977b, device 900 displays notification 979c in user interface 978, which provides a visual indication that the request has been sent. While displaying user interface 978, device 900 detects input 979b at confirmation button 979a. In response to detecting input 979b, device 900 completes the process for requesting access to manage contacts at the external device.

At FIGS. 9AD-9AE, after completing the process for requesting access to manage contacts at the external device, device 900 detects one or more inputs (e.g., 981b, 984b) for adding contacts to the external device. While displaying user interface 980, device 900 detects input 981b at affordance 981a. In response to detecting input 981b, device 900 displays user interface 982 with representations 983a-983h of contacts. The user selects representations 983a-983c and 983e to add their corresponding contacts to the external device. Once the contacts have been selected, device 900 detects input 984b (e.g., tap gesture) at done button 984a. In response to detecting input 984b, device 900 initiates a process for adding the selected contacts to the external device.

At FIGS. 9AF-9AG, after initiating the process for adding the selected contacts to the external device, device 900 detects one or more inputs (e.g., 987b, 989b) for configuring a restricted mode at the external device. It is noted that a restricted mode at the external device is further described above with respect to FIGS. 6A-6AC. In some embodiments, a restricted mode is a mode in which a first set of one or more functions available in an unrestricted mode is not available while in the restricted mode, and in which a second set of one or more functions available in an unrestricted mode is available while in the restricted mode.

At FIG. 9AF, while displaying user interface 986, device 900 detects input 987b at affordance 987a. In response to detecting input 987b, device 900 displays user interface 988, as shown in FIG. 9AG. User interface 988 includes one or more options for setting a restricted mode schedule at the external device. Once the schedule has been set, device 900 detects user input 989b at done button 989a. In response to detecting user input 989b, device 900 initiates a process for configuring the external device with the set restricted mode schedule.

At FIG. 9AH, after initiating the process for configuring the external device with the set restricted mode schedule, device 900 displays user interface 990 to indicate that the end of the setup process has been reached. While displaying user interface 990, device 900 detects input 991b at confirmation button 991a. In response to detecting input 991b, device 900 exits the setup process.

In some embodiments, device 900 enables sharing of one or more features (e.g., settings, data) with the external device if the external device is being configured to be associated with the first user account (e.g., the user account associated with device 900). Accordingly, in some embodiments, device 900 displays user interface 992 in FIG. 9AI at some point during the setup process. In contrast, if the external device is being configured to be associated with the second user account (e.g., a user account other than the user account associated with device 900), device 900 forgoes displaying user interface 992 during the setup process.

FIG. 10 is a flow diagram illustrating a method for configuring a second device using a first electronic device in accordance with some embodiments. Method 1000 is performed at a first device (e.g., 100, 300, 500, 650, 900) with a display device. Some operations in method 1000 are, optionally, combined, the orders of some operations are, optionally, changed, and some operations are, optionally, omitted.

As described below, method 1000 provides an intuitive way for configuring a second device. The method reduces the cognitive burden on a user for configuring the second device, thereby creating a more efficient human-machine interface. For battery-operated computing devices, enabling a user to configure a second device faster and more efficiently conserves power and increases the time between battery charges.

In some embodiments, the first device (e.g., 900) displays (1002), via the display device (e.g., 902), a setup user interface (e.g., 904) of a setup process for setting up a second device (e.g., 600 for configuring an external device). In some embodiments, the setup user interface includes a first affordance (e.g., 906a) (e.g., with a visual indication of the user for which the second device will be configured (e.g., text "set up for myself")) and a second affordance (e.g., 906b) (e.g., with a visual indication of the user for which the second device will be configured (e.g., with text "set up for a family member")). In some embodiments, activation of the first affordance results in initiating a process for configuring a second device to be associated with a first user/user account (e.g., a user/user account of the first device). In some embodiments, activation of the second affordance results in initiating a process for configuring the second device to be associated with a second user/user account different from the first user/user account.

In some embodiments, while displaying, via the display device, the setup user interface, the first device detects (1004) a first user input (e.g., 908, a gesture (e.g., tap, swipe), an audio input) selecting a respective account to be associated with the second device and while the first device is associated with a first account (e.g., the first device is associated with (configured for) the first account of the user of the first device, a user account).

After the respective account has been selected to be associated with the second device and during the setup process, the first device displays (1006), via the display device, a setup user interface (e.g., 940*a*-940*b*, 944*a*-944*b*, 946*a*-946*b*, 954*a*-954*b*, 956*a*-956*b*, 958*a*-958*b*) for configuring a respective function of the second device, including, in accordance with a determination that the first account (e.g., the account associated with the first device) was selected to be associated with the second device (and the second account was not selected to be associated with the second device), displaying (1008), via the display device, one or more selectable options (e.g., 942*a*, 945*a*, 947*a*, 955*a*, 957*a*, 959*a*) associated with configuring the respective function of the second device without explicitly identifying a user account (e.g., the second account) associated with the second device (e.g., without displaying 941), and in accordance with a determination that a second account (e.g., a user account, not corresponding to the user of the first device), different from the first account, was selected to be associated with the second device (and the first account was not selected to be associated with the second device), displaying (1010), via the display device, the one or more selectable options (e.g., 942*a*, 945*a*, 947*a*, 955*a*, 957*a*, 959*a*) associated with configuring the respective function of the second device concurrently with an identifier (e.g. 941) that explicitly identifies the second account (e.g., displaying a name of the user corresponding to the second account, displaying an email address corresponding to the second account).

In some embodiments, the first account is an existing user account. In some embodiments, the first account is a user account in which the first device (e.g., 900) is logged into during the setup process. In some embodiments, the second user account is a user account to be created. In some embodiments, the second account is a user account in which the first device is not logged into during the setup process.

Explicitly identifying, at an first device, the user account for which an second device is being configured for another user instead of a user of the first device provides the user with visual feedback about configuration settings that will be used to configure the second device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the first account (e.g., the account associated with the first device (e.g., 900)) was selected to be associated with the second device (e.g., 600), the first device initiates a process (e.g., display of user interfaces) for configuring the second device for the first account. In some embodiments, the process for configuring the second device for the first account includes enabling a first set of features on the second device requiring communication between the first device and the second device (e.g., such that the first device transmits information to the second device to enable the first set of features on the second device, sharing of a first set of features between the second device and the first device). In some embodiments, in accordance with the determination that the second account (different from the first account) was selected to be associated with the second device, the first device initiates a process (e.g., display of user interfaces) for configuring the second device for the second account. In some embodiments, the process for configuring the second device for the second account does not include enabling the first set of features on the second device that require communication between the first device and the second device.

In some embodiments, the first set of features includes one or more of: sharing of physical activity data (e.g., corresponding to 948) (e.g., data collected based on movement (or lack of movement) of the second device and the first device that is indicative of physical activity of the corresponding user), automatic unlocking of devices (e.g., of the second device, of the first device) (e.g., based on, for example, proximity of the second device to the first device), sharing of location data (e.g., of the second device, of the first device, coordination of notifications/alerts (e.g., automatically dismissing a notification on one device (e.g., first device) when input has been received at the other device (e.g., the second device) to dismiss a corresponding notification, automatically silencing an audio alert at one device (e.g., the first device) when input is received at the other device (e.g., the second device) to silence a corresponding alert being provided at the other device), handoff of application tasks (e.g., displaying an indication on the display of one device (e.g., the first device) based on a currently active (e.g., currently displayed) application of the other device (e.g., the second device), camera control tasks (e.g., controlling (such as accessing a viewfinder of, initiating an image capture of) the camera of one device (e.g., the first device) using the other device (e.g., second device)), application installations (e.g., automatically installing a first application on one device (e.g., the second device) in response to a user request (at the other device) to install a corresponding (e.g., same, different version of) application on the other device (e.g., the first device), communication disabling features (e.g., automatically placing one device (e.g., the first device) into airplane mode (e.g., by disabling cellular communications) in response to a user request (received at the other device) to place the other device (e.g., the second device) into airplane mode)), and payment account configuration (e.g., providing an affordance (or initiating a process) for configuring (e.g., for NFC payments) a payment account onto one device (e.g., the second device) in response to user input (e.g., received at the other device) configuring the payment account for use on the other device (e.g., the first device).

Sharing the set of features between the first device and the second device enables a user to access their information across multiple devices. Similarly, not sharing set of features between the first device and the second device enables different user to maintain their own information on the separate devices. Managing how feature sharing is configured enhances the operability of the devices and makes their user-device interfaces more efficient (e.g., by helping to provide appropriate information to the appropriate user based on the account that is configured on the device) which, additionally, reduces power usage and improves battery life of the device by enabling the users to use the devices more quickly and efficiently.

In some embodiments, displaying the identifier that explicitly identifies the second account includes displaying a name (e.g., 941, a first name, a last name, a first and last name) corresponding to the second account. In some embodiments, the name is concurrently displayed with a function or feature being configured, such as "Voice Control for Emma," to identify the function/feature being configured and the user for which it is being configured. In some embodiments, when the second device is being configured for the first account, the configuration for the same function/feature does not identify the first account. For example, configuration user interface for the feature/function may display "Voice Control Setup," without concurrently displaying the name that corresponds to the first account. In some embodiments, the one or more selectable options are one or more selectable options (e.g., 945*a*) for configuring voice assistant settings on the second device. In some embodiments, in accordance with the determination that the second account was selected to be associated with the second device, the first device displays, via the display device (e.g., during the setup process), a user interface for configuring voice assistant settings on the second device. In some embodiments, the one or more selectable options are displayed as part of the user interface for configuring voice assistant settings, including a first voice assistant option to enable a voice assistant for use on the second device and a second voice assistant option to not enable voice assistant for use on the second device.

Explicitly identifying, at a first device, the user account for another user instead of a user of the first device for which a second device is being configured provides the user of the first device with visual feedback about configuration settings that will be used to configure the second device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, during the setup process, in accordance with the determination that the first account (e.g., the account associated with the first device) was selected to be associated with the second device, the first device displays, via the display device, a first prompt (e.g., 912*b* in FIG. 9B) instructing for the second device to be worn (e.g., by the user of the first device) and a second prompt (e.g., 912*a* in FIG. 9B) instructing for the second device (e.g., a display of the second device) to be placed within a field of view of a camera sensor of the first device (e.g., displayed subsequent to (and optionally not currently with) displaying the prompt instruction for the second device to be worn, displayed subsequent to receiving information indicating that the second device is worn). In some embodiments, the first device optionally monitors for information from the second device indicating that the second device is currently being worn before proceeding with display of additional prompts. In some embodiments, during the setup process, in accordance with the determination that the second account was selected to be associated with the second device, the first device displays, via the display device, a third prompt (e.g., the same as the second prompt, different from the second prompt) instructing for the second device (e.g., a display of the second device) to be placed within a field of view of a camera sensor of the first device without displaying a prompt (e.g., the first prompt) instructing for the second device to be worn.

By not prompting the user to wear the second device in certain circumstances, the device helps to avoid having the user wear the second device when the device is not being set up for the user. This improved feedback to the user helps to avoid the user to avoid performing an unnecessary (or unhelpful) task, which may not be helpful for proceeding to the next stage of the device setup. In contrast, prompting (under certain circumstances) the user to wear the second device provides the user with tasks to perform to proceed to the next stage of device setup. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, during the setup process, in accordance with the determination that the second account was selected to be associated with the second device, the first device (e.g., 900) displays, via the display device, (e.g., during the setup process) one or more details about data (e.g., application data, media (photos, videos, audio), documents, address book contacts) to be transmitted (e.g., from the first device, from a server using credentials (e.g., login/password) of the first account) to the second device (and, optionally, about configurations to be performed of the second device). In some embodiments, during the setup process, in accordance with the determination that the first account (e.g., the account associated with the first device) was selected to be associated with the second device, the first device forgoes displaying, via the display device, the one or more details about the data (e.g., application data, media (photos, videos, audio), documents, address book contacts) to be transmitted (e.g., from the first device, from a server using credentials (e.g., login/password) of the first account) to the second device. In some embodiments, in accordance with the determination that the second account was selected to be associated with the second device, the first device displays information to inform the user that the second device is being configured for someone other than a user corresponding to the first account. In some embodiments, in accordance with the determination that the second account was selected to be associated with the second device, the first device optionally informs (e.g., by displaying) the user that the setup process will include opportunities to transfer content (e.g., application data, media (photos, videos, audio), documents, address book contacts) to the second device. In some embodiments, in accordance with the determination that the second account was selected to be associated with the second device, the first device optionally informs (e.g., by displaying) the user that the setup process will include opportunities to configure the second device for operating in a restricted mode, such as described above with respect to FIGS. 6A-6AC, FIG. 7, and FIG. 8, above.

Displaying one or more details about data to be transmitted provides the user with visual feedback about the data that will be shared with the second device. This provides, for example, the user with an opportunity to decline the transmission of the information, thereby preventing unintended data from being shared with the second device. Providing improved visual feedback to the user enhances the security of the device and the operability of the device, making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, during the setup process, in accordance with the determination that the second account was selected to be associated with the second device, the first device displays, via the display device (e.g., during the setup process), a user interface (e.g., 936) for transmitting network settings (e.g., from the first device) to the second device. In some embodiments, the one or more selectable options are displayed as part of the user interface for transmitting network settings. In some embodiments, the one or more selectable options include a first network configuration option (e.g., 937*a*) to transmit network configuration data (e.g., network name, network credentials (e.g., password)) for a first network (e.g., a wireless network, a wireless local area network (wlan)) that is associated with a current location of the first device (e.g., a first network that is currently being accessed by the first device). In some embodiments, the first network configuration data is transmitted to the second device without transmitting network configuration data for a second network (e.g., a second wireless network, a second wlan network) that is not currently being accessed by the first device (e.g., only sharing network configuration data for one network, even though the device has shareable network configuration data for multiple networks).

In some embodiments, the user interface (e.g., 936) for transmitting network settings (e.g., from the first device) to the second device further includes a second network configuration option (e.g., 937*b*) to transmit network configuration data (e.g., network name, network credentials (e.g., password)) for a plurality of networks. In some embodiments, the plurality of networks includes the first network and the second network. In some embodiments, during the setup process, while displaying the user interface for transmitting network settings, the first device detects a second user input. In some embodiments, during the setup process, in accordance with a determination that the second user input corresponds to activation of the first network configuration option, the first device transmits, to the second device, network configuration data (e.g., network name, network credentials (e.g., password)) for the first network without transmitting network configuration data for the second network. In some embodiments, during the setup process, in accordance with a determination that the second user input corresponds to activation of the second network configuration option, the first device transmits, to the second device, network configuration data (e.g., network name, network credentials (e.g., password)) for the plurality of networks.

In some embodiments, the second user input indicates authorization to transfer the corresponding network configuration data one time (e.g., a single-time transfer, not to transfer network configuration data repeatedly for the same network, not to provide network configuration data for future networks configured on the first device).

In some embodiments, the one or more selectable options include a third network configuration option to not transmit network configuration data (e.g., network name, network credentials (e.g., password)) for the first network (e.g., a wireless network, a wlan network) and to not transmit network configuration data (e.g., network name, network credentials (e.g., password)) for the second network (e.g., to not transmit network configuration data for any network (any wifi network)). In some embodiments, in accordance with a determination that the second user input corresponds to activation of the third network configuration option: the first device forgoes transmitting, to the second device, network configuration data (e.g., network name, network credentials (e.g., password)) for the first network.

In some embodiments, the first device prompts the user to select from among sharing the current network's settings or sharing multiple networks' settings. In some embodiments, in accordance with the determination that the second account was selected to be associated with the second device, the first device displays, via the display device (e.g., during the setup process), a user interface for transmitting network settings (e.g., from the first device) to the second device. In some embodiments, displaying the user interface for transmitting network settings includes displaying a first network configuration option to transmit network configuration data (e.g., network name, network credentials (e.g., password)) for a first network (e.g., a wireless network, a wlan network) that is currently being accessed by the first device and a second network configuration option to transmit network configuration data (e.g., network name, network credentials (e.g., password)) for the first network (e.g., a wireless network, a wlan network) that is currently being accessed by the first device and a second network (e.g., a second wireless network different from the first network) that is not currently being accessed by the first device. In some embodiments, while displaying the user interface for transmitting network settings, the first device detects a second user input. In some embodiments, in accordance with a determination that the second user input corresponds to activation of the first network configuration option, the first device transmits, to the second device, network configuration data (e.g., network name, network credentials (e.g., password)) for the first network without transmitting network configuration data for the second network. In some embodiments, in accordance with a determination that the second user input corresponds to activation of the second network configuration option, the first device transmits, to the second device, network configuration data (e.g., network name, network credentials (e.g., password)) for the first network and the second network. In some embodiments, the second user input indicates authorization to transfer the corresponding network configuration data one time (e.g., a single-time transfer, not to transfer network configuration data repeatedly for the same network, not to provide network configuration data for future networks configured on the first device).

In some embodiments, during the setup process, in accordance with the determination that the second account was selected to be associated with the second device, the first device displays, via the display device (e.g., during the setup process), a user interface (e.g., 964, 966) for transmitting media (e.g., from the first device) to the second device. In some embodiments, displaying the user interface for transmitting media to the second device includes displaying a first representation (e.g., 967*a*-967*g*) of a first media (e.g., a photo, an album of photos, a video, audio), wherein the first media is stored on the first device a second representation (e.g., 967*a*-967*g*) of a second media (e.g., a photo, an album of photos, a video, audio). In some embodiments, the second media is associated with an account that is associated with the first device (and, optionally, stored on the first device). In some embodiments, the first device detects a first set of one or more user inputs. In some embodiments, in accordance with a determination that the first set of one or more user inputs correspond to a request to transmit the first media without transmitting the second media, the first device transmits, to the second device, the first media without transmitting the second media.

In some embodiments, the first set of one or more user inputs includes authorization to transfer the corresponding media one time (e.g., a single-time transfer, not to repeatedly transfer the selected media or to transfer other (non-selected) media, not to transfer additional media in the future to the second device without first receiving user authorization). In some embodiments, the first set of one or more user inputs includes authorization to share a collection of media with the second device where the media that is shared changes if the collection of media changes (e.g., by the user of the first device adding to or deleting from the collection of media).

In some embodiments, during the setup process, in accordance with the determination that the second account was selected to be associated with the second device, the first device displays, via the display device (e.g., during the setup process), a user interface (e.g., 976) for requesting management access of a set of contactable users associated with a user of the second device. In some embodiments, displaying the user interface for requesting management access of a set of contactable users associated with a user of the second device includes displaying an option to transmit a request (e.g., to the second device) to provide the first account access to manage the set of contactable users associated with the user of the second device (e.g., an address book stored on the second device, an address book stored at a server; an address book including details for contactable users) of the second account. In some embodiments, during the setup process, in accordance with the determination that the first account (e.g., the account associated with the first device) was selected to be associated with the second device, the first device forgoes displaying, via the display device (e.g., during the setup process), the user interface for requesting management access of the set of contactable users associated with the user of the second device.

In some embodiments, subsequent to receiving the request to provide the first account access to manage the address book, the second device prompts for approval to provide the first account access to manage the address book. In response to receiving approval to provide the first account access to manage the address book, a predetermined time period is initiated during which the first account does not have access to manage (e.g., view contents of, modify contents of) the address book and after (after the predetermined time period) which the first account does have access to manage (e.g., view contents of, modify contents of) the address book.

Prompting the user with an option to transmit a request to provide access to manage an address book of the second device provides a technique by with the first user can modify address book entries of the second user, thereby reducing the need for the second user to configure the address book and providing the first device with access to more address book information. Providing the first device with access to additional address book information enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, during the setup process, in accordance with the determination that the second account was selected to be associated with the second device, the first device displays, via the display device (e.g., during the setup process), a user interface (e.g., 982) for transmitting a set of contactable users associated with the user of the first device (e.g., address book contents, from the first device) to the second device. In some embodiments, displaying the user interface for transmitting a set of contactable users associated with the user of the first device to the second device includes displaying a first representation (e.g., 983a-983h) (e.g., a name, a visual representation, such as a photo) of first contactable user information of a first contactable user (e.g., an address book entry for a first entity) and a second representation (e.g., 983a-983h) (e.g., a name, a visual representation, such as a photo) of second contactable user information of a second contactable user (e.g., an address book entry for a second entity). In some embodiments, the first contactable user information is stored on the first device. In some embodiments, the second contactable user information is stored on the first device. In some embodiments, during the setup process, the first device detects a second set of one or more user inputs. In some embodiments, during the setup process, in accordance with a determination that the second set of one or more user inputs correspond to a request to transmit the first contactable user information without transmitting the second contactable user information, the first device transmits, to the second device, the first contactable user information without transmitting the second contactable user information.

In some embodiments, in response to detecting the second set of user inputs and in accordance with a determination that the second set of one or more user inputs correspond to a request to transmit the first contactable user information and the second contactable user information, the first device transmits, to the second device, the first contactable user information and the second contactable user information. In some embodiments, the set of one or more user inputs includes authorization to transfer the corresponding media one time (e.g., a single-time transfer, not to repeatedly transfer the selected media or to transfer other (non-selected) media, not to transfer additional media in the future to the second device without first receiving user authorization). In some embodiments, transmitting the contact information occurs without coordinate the first device and the second device to synchronize other entries in the address book. Thus, the transfer is optionally a one-time transfer of contact information and future transfers of contact information would require user authorization.

In some embodiments, during the setup process, in accordance with the determination that the second account was selected to be associated with the second device, the first device displays, via the display device (e.g., during the setup process), a user interface (e.g., 986) for configuring the second device for a restricted mode (e.g., including displaying options for configuring a schedule (e.g., days, times, hours, during school hours) during which to place the second device in the restricted mode. In some embodiments, during the setup process, the first device receives a third set of one or more inputs to configure the schedule during which to place the second device in the restricted mode. In some embodiments, during the setup process, in response to receiving the third set of one or more inputs, the first device transmits (e.g., to the second device) the schedule.

In some embodiments, while the second device is in the restricted mode, the second device provides limited functionality or information (e.g., time and date), while restricting other functions, thereby allowing a user of the second device to maintain focus on a current task. The restricted mode is described in further detail above with respect to FIGS. 6A-6AC, FIG. 7, and FIG. 8, above.

In some embodiments, during the setup process, in accordance with the determination that the second account was selected to be associated with the second device, the first device displays, via the display device (e.g., during the setup process), a security user interface (e.g., 930a, 930b) for configuring security (e.g., passcode) for the second device. In some embodiments, displaying the security user interface includes: in accordance with a determination that an age of the user corresponding to the second account is less than a (non-zero) threshold age, displaying a prompt (e.g., 931a) instructing for the user corresponding to the first account to enter (e.g., at the first device, at the second device) a security input (e.g., a password, a passcode) to secure the second device and to be subsequently used for unlocking the second device; and in accordance with a determination that the age of the user corresponding to the second account is greater than (or equal to) the (non-zero) threshold age, displaying a prompt (e.g., 931*b*) instructing for (e.g., instructing for the first device to be handed to the user corresponding the second account) the user corresponding to the second account to enter (e.g., at the first device, at the second device) a security input (e.g., a password, a passcode, biometric information) to secure the second device and to be subsequently used for unlocked the second device.

In some embodiments, prior to detecting the first user input selecting the respective account to be associated with the second device, the first device displays, via the display device (e.g., during the setup process), an account selection user interface (e.g., 918, 922*a*, 922*b*) for selecting the respective account to be associated with the second device. In some embodiments, the account selection user interface includes a first account option (e.g., 920*b*) to create a new account (e.g., creating the second account) to be associated with the second device and a second account option (e.g., 920*a*, 923*a*-923*c*) to receive input identifying an existing account (e.g., identifying the second account that already exists) to be associated with the second device. In some embodiments, prior to detecting the first user input selecting the respective account to be associated with the second device, the first device receives a third user input. In some embodiments, prior to detecting the first user input selecting the respective account to be associated with the second device, in accordance with a determination that the third user input corresponds to activation of the first account option, the first device displays an account creation user interface configured to receive account information (e.g., email address, name, password) to create the second account. In some embodiments, prior to detecting the first user input selecting the respective account to be associated with the second device, in accordance with a determination that the third user input corresponds to activation of the second account option, the first device displays an account selection user interface that includes identifiers for one or more existing accounts corresponding to a grouping of accounts (e.g., accounts linked together such as accounts identified as corresponding to members of a family that includes the first user account), wherein the identifiers for the one or more existing accounts includes an identifier (e.g., the name of the user corresponding to the second account, an email address corresponding to the second account, a login corresponding to the second account) for the second account, and wherein the first account is a member of the grouping of accounts (e.g., the first account is linked to the one or more existing accounts as their corresponding users being in the same family).

Displaying an account selection user interface that includes identifiers for the one or more existing accounts corresponding to the grouping of accounts provides the user with ability to efficiently select from among a list of likely accounts to use for setting up the second device. As a result, the device avoids the need for the user to provide various extraneous inputs to otherwise identify the account that should be used for setting up the second device. Reducing the number of inputs required to select an account enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, account selection user interface does not include an identifier for the first account. In some embodiments, the account selection user interface includes an option for creating a new account to be configured as part of the grouping of accounts (e.g., account would be created and linked to the one or more existing accounts).

In some embodiments, during the setup process, in accordance with a determination that the second account was selected to be associated with the second device and that the second account is not currently configured on a different device (e.g., other than the second device) of a first type (e.g., of a type that is compatible with linking to the second device, a smartphone of a particular model or models), the first device proceeds with the setup process for setting up the second device using the first device (e.g., proceeding to displaying user interfaces for/and transmitting: address book contacts, media, and network settings to the second device). In some embodiments, during the setup process, in accordance with a determination that the second account was selected to be associated with the second device and that the second account is currently configured on a different device (e.g., other than the second device) of the first type (e.g., of a type that is compatible with linking to the second device, a smartphone of a particular model or models), the first device displays, via the display device, a prompt (e.g., as shown on 932) instructing for the second device to be set up using the different device without proceeding with the setup process for setting up the second device using the first device (e.g., without proceeding to display user interfaces for/and transmitting: address book contacts, media, and network settings to the second device). In some embodiments, the first device returns to the setup process after the first device detects an input (e.g., 934) corresponding to a request to continue while the prompt is displayed.

In some embodiments, during the setup process, in accordance with the determination that the second account was selected to be associated with the second device, the first device displays, via the display device (e.g., during the setup process), a user interface (e.g., 964, 966) for selecting a media collection for synchronization (e.g., between the first device and the second device) with the second device. In some embodiments, displaying the user interface for selecting a media collection for synchronization (e.g., between the first device and the second device) with the second device includes displaying a representation of a media collection (e.g., 967*a*-967*g*) (e.g., a collection of media items, an album of photos and/or videos). In some embodiments, the first media collection is associated with a user of the first device (e.g., stored on the first device, stored on an external server using an account of the user of the first device). In some embodiments, the user interface for selecting a media collection for synchronization also includes a second representation of a second media collection. In some embodiments, the second media is stored on the first device. In some embodiments, during the setup process, the first device detects selection of the representation of the media collection. In some embodiments, during the setup process, subsequent to (e.g., in response to) detecting selection of the representation of the media collection, the first device configures the media collection to be synchronized with a corresponding media collection of the second device. In some embodiments, photos and other media items in the media collection will be available at the second device. In some embodiments, in the future, while the synchronization of the media collection is maintained, media items added to the media collection will become available at the second device and media items removed from the media collection will cease to be available at the second device.

Note that details of the processes described above with respect to method 1000 (e.g., FIG. 10) are also applicable in an analogous manner to the methods described above. For example, methods 700 and 800 optionally includes one or more of the characteristics of the various methods described above with reference to method 1000. For example, the second device being configured in method 1000 is electronic device 600 in methods 700 and 800. Thus, the first device (e.g., 900) can configure electronic device 600 (e.g., the second device) to enter a restricted mode during certain times (as configured at user interface 988 of FIG. 9AG). Techniques related to the restricted mode are further described with respect to FIGS. 6A-6AC and methods 700 and 800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to report electronic devices exiting a restricted mode of operation. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide more details regarding an electronic device exiting a restricted mode. Accordingly, use of such personal information data enables users to control a restricted mode associated with a user or an electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of devices operating according to a restricted mode, the present technology can be configured to allow users to select to "opt in" or "opt out" of participation in the collection of personal information data during registration for services or anytime thereafter. In another example, users can select not to provide certain data related to exiting a restricted mode of an electronic device. In yet another example, users can select to limit the length of time data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, reports of an electronic device exiting a restricted mode can be based on non-personal information data or a bare minimum amount of personal information, such as the content being requested by the device associated with a user, other non-personal information available to the service producing the report, or publicly available information.

What is claimed is:

1. A first device, comprising:
a display device;
one or more processors; and
memory storing one or more programs configured to be executed by the one or more processors, the one or more programs including instructions for:
displaying, via the display device, a setup user interface of a setup process for setting up a second device;
while displaying, via the display device, the setup user interface, detecting a first user input selecting a respective account to be associated with the second device and while the first device is associated with a first account; and
after the respective account has been selected to be associated with the second device and during the setup process, displaying, via the display device, a setup user interface for configuring a respective function of the second device, including:
in accordance with a determination that the first account was selected to be associated with the second device, displaying, via the display device, one or more selectable options associated with configuring the respective function of the second device without explicitly identifying a user account associated with the second device; and
in accordance with a determination that a second account, different from the first account, was selected to be associated with the second device, displaying, via the display device, the one or more selectable options associated with configuring the respective function of the second device concurrently with an identifier that explicitly identifies the second account.

2. The first device of claim 1, the one or more programs further including instructions for:
in accordance with the determination that the first account was selected to be associated with the second device, initiating a process for configuring the second device for the first account, wherein the process for configuring the second device for the first account includes enabling a first set of features on the second device requiring communication between the first device and the second device; and
in accordance with the determination that the second account was selected to be associated with the second device, initiating a process for configuring the second device for the second account, wherein the process for configuring the second device for the second account does not include enabling the first set of features on the second device that require communication between the first device and the second device.

3. The first device of claim 1, wherein:
displaying the identifier that explicitly identifies the second account includes displaying a name corresponding to the second account, and
the one or more selectable options are one or more selectable options for configuring voice assistant settings on the second device.

4. The first device of claim 1, the one or more programs further including instructions for, during the setup process:
in accordance with the determination that the first account was selected to be associated with the second device, displaying, via the display device:
a first prompt instructing for the second device to be worn; and
a second prompt instructing for the second device to be placed within a field of view of a camera sensor of the first device; and
in accordance with the determination that the second account was selected to be associated with the second device, displaying, via the display device, a third prompt instructing for the second device to be placed within a field of view of a camera sensor of the first device without displaying a prompt instructing for the second device to be worn.

5. The first device of claim 1, the one or more programs further including instructions for, during the setup process:
in accordance with the determination that the second account was selected to be associated with the second device, displaying, via the display device, one or more details about data to be transmitted to the second device; and
in accordance with the determination that the first account was selected to be associated with the second device, forgoing displaying, via the display device, the one or more details about the data to be transmitted to the second device.

6. The first device of claim 1, the one or more programs further including instructions for, during the setup process:
in accordance with the determination that the second account was selected to be associated with the second device, displaying, via the display device, a user interface for transmitting network settings to the second device, wherein the one or more selectable options are displayed as part of the user interface for transmitting network settings, including:
a first network configuration option to transmit network configuration data for a first network that is associated with a current location of the first device.

7. The first device of claim 6, wherein the user interface for transmitting network settings to the second device further includes a second network configuration option to transmit network configuration data for a plurality of networks, wherein the plurality of networks includes the first network and the second network, the one or more program further including instructions for, during the setup process:
while displaying the user interface for transmitting network settings, detecting a second user input;
in accordance with a determination that the second user input corresponds to activation of the first network configuration option:
transmitting, to the second device, network configuration data for the first network without transmitting network configuration data for the second network; and
in accordance with a determination that the second user input corresponds to activation of the second network configuration option:
transmitting, to the second device, network configuration data for the plurality of networks.

8. The first device of claim 1, the one or more programs further including instructions for, during the setup process:

in accordance with the determination that the second account was selected to be associated with the second device, displaying, via the display device, a user interface for transmitting media to the second device, including displaying:
a first representation of a first media, wherein the first media is stored on the first device; and
a second representation of a second media, wherein the second media is associated with an account that is associated with the first device; and
detecting a first set of one or more user inputs;
in accordance with a determination that the first set of one or more user inputs correspond to a request to transmit the first media without transmitting the second media:
transmitting, to the second device, the first media without transmitting the second media.

9. The first device of claim 1, the one or more programs further including instructions for, during the setup process:
in accordance with the determination that the second account was selected to be associated with the second device, displaying, via the display device, a user interface for requesting management access of a set of contactable users associated with a user of the second device, including:
an option to transmit a request to provide the first account access to manage the set of contactable users associated with the user of the second device of the second account; and
in accordance with the determination that the first account was selected to be associated with the second device, forgoing displaying, via the display device, the user interface for requesting management access of the set of contactable users associated with the user of the second device.

10. The first device of claim 1, the one or more programs further including instructions for, during the setup process:
in accordance with the determination that the second account was selected to be associated with the second device, displaying, via the display device, a user interface for transmitting a set of contactable users associated with the user of the first device to the second device, including displaying:
a first representation of first contactable user information of a first contactable user, wherein the first contactable user information is stored on the first device; and
a second representation of second contactable user information of a second contactable user, wherein the second contactable user information is stored on the first device; and
detecting a second set of one or more user inputs; and
in accordance with a determination that the second set of one or more user inputs correspond to a request to transmit the first contactable user information without transmitting the second contactable user information:
transmitting, to the second device, the first contactable user information without transmitting the second contactable user information.

11. The first device of claim 1, the one or more programs further including instructions for, during the setup process:
in accordance with the determination that the second account was selected to be associated with the second device, displaying, via the display device, a user interface for configuring the second device for a restricted mode, including displaying options for configuring a schedule during which to place the second device in the restricted mode;

receiving a third set of one or more inputs to configure the schedule during which to place the second device in the restricted mode; and
in response to receiving the third set of one or more inputs, transmitting the schedule.

12. The first device of claim 1, the one or more programs further including instructions for, during the setup process:
in accordance with the determination that the second account was selected to be associated with the second device, displaying, via the display device, a security user interface for configuring security for the second device; and
wherein displaying the security user interface includes:
in accordance with a determination that an age of the user corresponding to the second account is less than a threshold age, displaying:
a prompt instructing for the user corresponding to the first account to enter a security input to secure the second device and to be subsequently used for unlocked the second device; and
in accordance with a determination that the age of the user corresponding to the second account is greater than the threshold age, displaying:
a prompt instructing for the user corresponding to the second account to enter a security input to secure the second device and to be subsequently used for unlocked the second device.

13. The first device of claim 1, the one or more programs further including instructions for:
prior to detecting the first user input selecting the respective account to be associated with the second device:
displaying, via the display device, an account selection user interface for selecting the respective account to be associated with the second device, wherein the account selection user interface includes:
a first account option to create a new account to be associated with the second device, and
a second account option to receive input identifying an existing account to be associated with the second device; and
receiving a third user input;
in accordance with a determination that the third user input corresponds to activation of the first account option:
displaying an account creation user interface configured to receive account information to create the second account; and
in accordance with a determination that the third user input corresponds to activation of the second account option:
displaying an account selection user interface that includes identifiers for one or more existing accounts corresponding to a grouping of accounts, wherein the identifiers for the one or more existing accounts includes an identifier for the second account, and wherein the first account is a member of the grouping of accounts.

14. The first device of claim 1, the one or more programs further including instructions for, during the setup process:
in accordance with a determination that the second account was selected to be associated with the second device and that the second account is not currently configured on a different device of a first type, proceeding with the setup process for setting up the second device using the first device; and
in accordance with a determination that the second account was selected to be associated with the second device and that the second account is currently configured on a different device of the first type, displaying, via the display device, a prompt instructing for the second device to be set up using the different device without proceeding with the setup process for setting up the second device using the first device.

15. The first device of claim 1, the one or more programs further including instructions for, during the setup process:
   in accordance with the determination that the second account was selected to be associated with the second device, displaying, via the display device, a user interface for selecting a media collection for synchronization with the second device, including displaying:
      a representation of a media collection, wherein the first media collection is associated with a user of the first device;
   detecting selection of the representation of the media collection; and
   subsequent to detecting selection of the representation of the media collection, configuring the media collection to be synchronized with a corresponding media collection of the second device.

16. The first device of claim 1, wherein the respective function of the second device includes sharing information from the first device with the second device.

17. A non-transitory computer-readable storage medium storing one or more programs configured to be executed by one or more processors of a first device with a display device, the one or more programs including instructions for:
   displaying, via the display device, a setup user interface of a setup process for setting up a second device;
   while displaying, via the display device, the setup user interface, detecting a first user input selecting a respective account to be associated with the second device and while the first device is associated with a first account; and
   after the respective account has been selected to be associated with the second device and during the setup process, displaying, via the display device, a setup user interface for configuring a respective function of the second device, including:
      in accordance with a determination that the first account was selected to be associated with the second device, displaying, via the display device, one or more selectable options associated with configuring the respective function of the second device without explicitly identifying a user account associated with the second device; and
      in accordance with a determination that a second account, different from the first account, was selected to be associated with the second device, displaying, via the display device, the one or more selectable options associated with configuring the respective function of the second device concurrently with an identifier that explicitly identifies the second account.

18. The computer-readable storage medium of claim 17, the one or more programs further including instructions for:
   in accordance with the determination that the first account was selected to be associated with the second device, initiating a process for configuring the second device for the first account, wherein the process for configuring the second device for the first account includes enabling a first set of features on the second device requiring communication between the first device and the second device; and
   in accordance with the determination that the second account was selected to be associated with the second device, initiating a process for configuring the second device for the second account, wherein the process for configuring the second device for the second account does not include enabling the first set of features on the second device that require communication between the first device and the second device.

19. The computer-readable storage medium of claim 17, wherein:
   displaying the identifier that explicitly identifies the second account includes displaying a name corresponding to the second account, and
   the one or more selectable options are one or more selectable options for configuring voice assistant settings on the second device.

20. The computer-readable storage medium of claim 17, the one or more programs further including instructions for, during the setup process:
   in accordance with the determination that the first account was selected to be associated with the second device, displaying, via the display device:
      a first prompt instructing for the second device to be worn; and
      a second prompt instructing for the second device to be placed within a field of view of a camera sensor of the first device; and
   in accordance with the determination that the second account was selected to be associated with the second device, displaying, via the display device, a third prompt instructing for the second device to be placed within a field of view of a camera sensor of the first device without displaying a prompt instructing for the second device to be worn.

21. The computer-readable storage medium of claim 17, the one or more programs further including instructions for, during the setup process:
   in accordance with the determination that the second account was selected to be associated with the second device, displaying, via the display device, one or more details about data to be transmitted to the second device; and
   in accordance with the determination that the first account was selected to be associated with the second device, forgoing displaying, via the display device, the one or more details about the data to be transmitted to the second device.

22. The computer-readable storage medium of claim 17, the one or more programs further including instructions for, during the setup process:
   in accordance with the determination that the second account was selected to be associated with the second device, displaying, via the display device, a user interface for transmitting network settings to the second device, wherein the one or more selectable options are displayed as part of the user interface for transmitting network settings, including:
      a first network configuration option to transmit network configuration data for a first network that is associated with a current location of the first device.

23. The computer-readable storage medium of claim 22, wherein the user interface for transmitting network settings to the second device further includes a second network configuration option to transmit network configuration data for a plurality of networks, wherein the plurality of networks includes the first network and the second network, the one or more programs further including instructions for, during the setup process:
while displaying the user interface for transmitting network settings, detecting a second user input;
in accordance with a determination that the second user input corresponds to activation of the first network configuration option:
transmitting, to the second device, network configuration data for the first network without transmitting network configuration data for the second network; and
in accordance with a determination that the second user input corresponds to activation of the second network configuration option:
transmitting, to the second device, network configuration data for the plurality of networks.

24. The computer-readable storage medium of claim 17, the one or more programs further including instructions for, during the setup process:
in accordance with the determination that the second account was selected to be associated with the second device, displaying, via the display device, a user interface for transmitting media to the second device, including displaying:
a first representation of a first media, wherein the first media is stored on the first device; and
a second representation of a second media, wherein the second media is associated with an account that is associated with the first device; and
detecting a first set of one or more user inputs;
in accordance with a determination that the first set of one or more user inputs correspond to a request to transmit the first media without transmitting the second media:
transmitting, to the second device, the first media without transmitting the second media.

25. The computer-readable storage medium of claim 17, the one or more programs further including instructions for, during the setup process:
in accordance with the determination that the second account was selected to be associated with the second device, displaying, via the display device, a user interface for requesting management access of a set of contactable users associated with a user of the second device, including:
an option to transmit a request to provide the first account access to manage the set of contactable users associated with the user of the second device of the second account; and
in accordance with the determination that the first account was selected to be associated with the second device, forgoing displaying, via the display device, the user interface for requesting management access of the set of contactable users associated with the user of the second device.

26. The computer-readable storage medium of claim 17, the one or more programs further including instructions for, during the setup process:
in accordance with the determination that the second account was selected to be associated with the second device, displaying, via the display device, a user interface for transmitting a set of contactable users associated with the user of the first device to the second device, including displaying:
a first representation of first contactable user information of a first contactable user, wherein the first contactable user information is stored on the first device; and
a second representation of second contactable user information of a second contactable user, wherein the second contactable user information is stored on the first device; and
detecting a second set of one or more user inputs; and
in accordance with a determination that the second set of one or more user inputs correspond to a request to transmit the first contactable user information without transmitting the second contactable user information:
transmitting, to the second device, the first contactable user information without transmitting the second contactable user information.

27. The computer-readable storage medium of claim 17, the one or more programs further including instructions for, during the setup process:
in accordance with the determination that the second account was selected to be associated with the second device, displaying, via the display device, a user interface for configuring the second device for a restricted mode, including displaying options for configuring a schedule during which to place the second device in the restricted mode;
receiving a third set of one or more inputs to configure the schedule during which to place the second device in the restricted mode; and
in response to receiving the third set of one or more inputs, transmitting the schedule.

28. The computer-readable storage medium of claim 17, the one or more programs further including instructions for, during the setup process:
in accordance with the determination that the second account was selected to be associated with the second device, displaying, via the display device, a security user interface for configuring security for the second device; and
wherein displaying the security user interface includes:
in accordance with a determination that an age of the user corresponding to the second account is less than a threshold age, displaying:
a prompt instructing for the user corresponding to the first account to enter a security input to secure the second device and to be subsequently used for unlocked the second device; and
in accordance with a determination that the age of the user corresponding to the second account is greater than the threshold age, displaying:
a prompt instructing for the user corresponding to the second account to enter a security input to secure the second device and to be subsequently used for unlocked the second device.

29. The computer-readable storage medium of claim 17, the one or more programs further including instructions for:
prior to detecting the first user input selecting the respective account to be associated with the second device:
displaying, via the display device, an account selection user interface for selecting the respective account to be associated with the second device, wherein the account selection user interface includes:
a first account option to create a new account to be associated with the second device, and
a second account option to receive input identifying an existing account to be associated with the second device; and receiving a third user input;
in accordance with a determination that the third user input corresponds to activation of the first account option:
displaying an account creation user interface configured to receive account information to create the second account; and
in accordance with a determination that the third user input corresponds to activation of the second account option:
displaying an account selection user interface that includes identifiers for one or more existing accounts corresponding to a grouping of accounts, wherein the identifiers for the one or more existing accounts includes an identifier for the second account, and wherein the first account is a member of the grouping of accounts.

30. The computer-readable storage medium of claim 17, the one or more programs further including instructions for, during the setup process:
in accordance with a determination that the second account was selected to be associated with the second device and that the second account is not currently configured on a different device of a first type, proceeding with the setup process for setting up the second device using the first device; and
in accordance with a determination that the second account was selected to be associated with the second device and that the second account is currently configured on a different device of the first type, displaying, via the display device, a prompt instructing for the second device to be set up using the different device without proceeding with the setup process for setting up the second device using the first device.

31. The computer-readable storage medium of claim 17, the one or more programs further including instructions for, during the setup process:
in accordance with the determination that the second account was selected to be associated with the second device, displaying, via the display device, a user interface for selecting a media collection for synchronization with the second device, including displaying:
a representation of a media collection, wherein the first media collection is associated with a user of the first device;
detecting selection of the representation of the media collection; and
subsequent to detecting selection of the representation of the media collection, configuring the media collection to be synchronized with a corresponding media collection of the second device.

32. The computer-readable storage medium of claim 17, wherein the respective function of the second device includes sharing information from the first device with the second device.

33. A method, comprising:
at a first device with a display device:
displaying, via the display device, a setup user interface of a setup process for setting up a second device;
while displaying, via the display device, the setup user interface, detecting a first user input selecting a respective account to be associated with the second device and while the first device is associated with a first account; and
after the respective account has been selected to be associated with the second device and during the setup process, displaying, via the display device, a setup user interface for configuring a respective function of the second device, including:
in accordance with a determination that the first account was selected to be associated with the second device, displaying, via the display device, one or more selectable options associated with configuring the respective function of the second device without explicitly identifying a user account associated with the second device; and
in accordance with a determination that a second account, different from the first account, was selected to be associated with the second device, displaying, via the display device, the one or more selectable options associated with configuring the respective function of the second device concurrently with an identifier that explicitly identifies the second account.

34. The method of claim 33, further comprising:
in accordance with the determination that the first account was selected to be associated with the second device, initiating a process for configuring the second device for the first account, wherein the process for configuring the second device for the first account includes enabling a first set of features on the second device requiring communication between the first device and the second device; and
in accordance with the determination that the second account was selected to be associated with the second device, initiating a process for configuring the second device for the second account, wherein the process for configuring the second device for the second account does not include enabling the first set of features on the second device that require communication between the first device and the second device.

35. The method of claim 33, wherein:
displaying the identifier that explicitly identifies the second account includes displaying a name corresponding to the second account, and
the one or more selectable options are one or more selectable options for configuring voice assistant settings on the second device.

36. The method of claim 33, further comprising, during the setup process:
in accordance with the determination that the first account was selected to be associated with the second device, displaying, via the display device:
a first prompt instructing for the second device to be worn; and
a second prompt instructing for the second device to be placed within a field of view of a camera sensor of the first device; and
in accordance with the determination that the second account was selected to be associated with the second device, displaying, via the display device, a third prompt instructing for the second device to be placed within a field of view of a camera sensor of the first device without displaying a prompt instructing for the second device to be worn.

37. The method of claim 33, further comprising, during the setup process:
in accordance with the determination that the second account was selected to be associated with the second device, displaying, via the display device, one or more details about data to be transmitted to the second device; and
in accordance with the determination that the first account was selected to be associated with the second device, forgoing displaying, via the display device, the one or more details about the data to be transmitted to the second device.

38. The method of claim 33, further comprising, during the setup process:
   in accordance with the determination that the second account was selected to be associated with the second device, displaying, via the display device, a user interface for transmitting network settings to the second device, wherein the one or more selectable options are displayed as part of the user interface for transmitting network settings, including:
      a first network configuration option to transmit network configuration data for a first network that is associated with a current location of the first device.

39. The method of claim 38, wherein the user interface for transmitting network settings to the second device further includes a second network configuration option to transmit network configuration data for a plurality of networks, wherein the plurality of networks includes the first network and the second network, the method further comprising, during the setup process:
   while displaying the user interface for transmitting network settings, detecting a second user input;
   in accordance with a determination that the second user input corresponds to activation of the first network configuration option:
      transmitting, to the second device, network configuration data for the first network without transmitting network configuration data for the second network; and
   in accordance with a determination that the second user input corresponds to activation of the second network configuration option:
      transmitting, to the second device, network configuration data for the plurality of networks.

40. The method of claim 33, further comprising, during the setup process:
   in accordance with the determination that the second account was selected to be associated with the second device, displaying, via the display device, a user interface for transmitting media to the second device, including displaying:
      a first representation of a first media, wherein the first media is stored on the first device; and
      a second representation of a second media, wherein the second media is associated with an account that is associated with the first device; and
   detecting a first set of one or more user inputs;
   in accordance with a determination that the first set of one or more user inputs correspond to a request to transmit the first media without transmitting the second media:
      transmitting, to the second device, the first media without transmitting the second media.

41. The method of claim 33, further comprising, during the setup process:
   in accordance with the determination that the second account was selected to be associated with the second device, displaying, via the display device, a user interface for requesting management access of a set of contactable users associated with a user of the second device, including:
      an option to transmit a request to provide the first account access to manage the set of contactable users associated with the user of the second device of the second account; and
   in accordance with the determination that the first account was selected to be associated with the second device, forgoing displaying, via the display device, the user interface for requesting management access of the set of contactable users associated with the user of the second device.

42. The method of claim 33, further comprising, during the setup process:
   in accordance with the determination that the second account was selected to be associated with the second device, displaying, via the display device, a user interface for transmitting a set of contactable users associated with the user of the first device to the second device, including displaying:
      a first representation of first contactable user information of a first contactable user, wherein the first contactable user information is stored on the first device; and
      a second representation of second contactable user information of a second contactable user, wherein the second contactable user information is stored on the first device; and
   detecting a second set of one or more user inputs; and
   in accordance with a determination that the second set of one or more user inputs correspond to a request to transmit the first contactable user information without transmitting the second contactable user information:
      transmitting, to the second device, the first contactable user information without transmitting the second contactable user information.

43. The method of claim 33, further comprising, during the setup process:
   in accordance with the determination that the second account was selected to be associated with the second device, displaying, via the display device, a user interface for configuring the second device for a restricted mode, including displaying options for configuring a schedule during which to place the second device in the restricted mode;
   receiving a third set of one or more inputs to configure the schedule during which to place the second device in the restricted mode; and
   in response to receiving the third set of one or more inputs, transmitting the schedule.

44. The method of claim 33, further comprising, during the setup process:
   in accordance with the determination that the second account was selected to be associated with the second device, displaying, via the display device, a security user interface for configuring security for the second device; and
   wherein displaying the security user interface includes:
      in accordance with a determination that an age of the user corresponding to the second account is less than a threshold age, displaying:
         a prompt instructing for the user corresponding to the first account to enter a security input to secure the second device and to be subsequently used for unlocked the second device; and
      in accordance with a determination that the age of the user corresponding to the second account is greater than the threshold age, displaying:
         a prompt instructing for the user corresponding to the second account to enter a security input to secure the second device and to be subsequently used for unlocked the second device.

45. The method of claim 33, further comprising:
prior to detecting the first user input selecting the respective account to be associated with the second device:
- displaying, via the display device, an account selection user interface for selecting the respective account to be associated with the second device, wherein the account selection user interface includes:
  - a first account option to create a new account to be associated with the second device, and
  - a second account option to receive input identifying an existing account to be associated with the second device; and
- receiving a third user input;
- in accordance with a determination that the third user input corresponds to activation of the first account option:
  - displaying an account creation user interface configured to receive account information to create the second account; and
- in accordance with a determination that the third user input corresponds to activation of the second account option:
  - displaying an account selection user interface that includes identifiers for one or more existing accounts corresponding to a grouping of accounts, wherein the identifiers for the one or more existing accounts includes an identifier for the second account, and wherein the first account is a member of the grouping of accounts.

46. The method of claim 33, further comprising, during the setup process:
- in accordance with a determination that the second account was selected to be associated with the second device and that the second account is not currently configured on a different device of a first type, proceeding with the setup process for setting up the second device using the first device; and
- in accordance with a determination that the second account was selected to be associated with the second device and that the second account is currently configured on a different device of the first type, displaying, via the display device, a prompt instructing for the second device to be set up using the different device without proceeding with the setup process for setting up the second device using the first device.

47. The method of claim 33, further comprising, during the setup process:
- in accordance with the determination that the second account was selected to be associated with the second device, displaying, via the display device, a user interface for selecting a media collection for synchronization with the second device, including displaying:
  - a representation of a media collection, wherein the first media collection is associated with a user of the first device;
- detecting selection of the representation of the media collection; and
- subsequent to detecting selection of the representation of the media collection, configuring the media collection to be synchronized with a corresponding media collection of the second device.

48. The method of claim 33, wherein the respective function of the second device includes sharing information from the first device with the second device.

* * * * *

UNITED STATES PATENT AND TRADEMARK OFFICE
CERTIFICATE OF CORRECTION

PATENT NO. : 11,301,130 B2
APPLICATION NO. : 16/867002
DATED : April 12, 2022
INVENTOR(S) : Heena Ko et al.

Page 1 of 1

It is certified that error appears in the above-identified patent and that said Letters Patent is hereby corrected as shown below:

In the Claims

In Column 86, Line 50, Claim 7, delete "program" and insert -- programs --.

In Column 88, Line 20, Claim 12, delete "unlocked" and insert -- unlocking --.

In Column 88, Line 27, Claim 12, delete "unlocked" and insert -- unlocking --.

In Column 92, Line 47, Claim 28, delete "unlocked" and insert -- unlocking --.

In Column 92, Line 54, Claim 28, delete "unlocked" and insert -- unlocking --.

In Column 96, Line 60, Claim 44, delete "unlocked" and insert -- unlocking --.

In Column 96, Line 67, Claim 44, delete "unlocked" and insert -- unlocking --.

Signed and Sealed this
Twenty-eighth Day of June, 2022

Katherine Kelly Vidal
*Director of the United States Patent and Trademark Office*